US009918099B2

(12) United States Patent
Takahashi et al.

(10) Patent No.: US 9,918,099 B2
(45) **Date of Patent: *Mar. 13, 2018**

(54) FILE GENERATION APPARATUS, FILE GENERATING METHOD, FILE REPRODUCTION APPARATUS, AND FILE REPRODUCING METHOD

(71) Applicant: Sony Corporation, Tokyo (JP)

(72) Inventors: Ryohei Takahashi, Kanagawa (JP); Kouichi Uchimura, Kanagawa (JP); Shinobu Hattori, Kanagawa (JP)

(73) Assignee: Sony Corporation, Tokyo (JP)

( * ) Notice: Subject to any disclaimer, the term of this patent is extended or adjusted under 35 U.S.C. 154(b) by 290 days.

This patent is subject to a terminal disclaimer.

(21) Appl. No.: 14/416,396

(22) PCT Filed: Jul. 10, 2014

(86) PCT No.: PCT/JP2014/068379

§ 371 (c)(1),
(2) Date: Jan. 22, 2015

(87) PCT Pub. No.: WO2015/008684

PCT Pub. Date: Jan. 22, 2015

(65) Prior Publication Data

US 2015/0208078 A1 Jul. 23, 2015

(30) Foreign Application Priority Data

Jul. 19, 2013 (JP) ................................ 2013-150437

(51) Int. Cl.
*H04N 19/46* (2014.01)
*H04N 21/431* (2011.01)
(Continued)

(52) U.S. Cl.
CPC ............ *H04N 19/46* (2014.11); *G11B 20/10* (2013.01); *H04N 5/76* (2013.01); *H04N 7/0117* (2013.01);
(Continued)

(58) Field of Classification Search
CPC ...... H04N 19/46; H04N 7/0117; H04N 19/70; H04N 21/431; H04N 7/01; H04N 7/012; G11B 20/10
See application file for complete search history.

(56) References Cited

U.S. PATENT DOCUMENTS

| | | | | |
|---|---|---|---|---|
| 9,596,430 | B2 * | 3/2017 | Takahashi | H04N 21/431 |
| 2007/0223813 | A1 | 9/2007 | Segall et al. | |

(Continued)

FOREIGN PATENT DOCUMENTS

| | | | |
|---|---|---|---|
| EP | 1667156 | A1 | 6/2006 |
| JP | 2007-257641 | A | 10/2007 |

(Continued)

OTHER PUBLICATIONS

No Author Listed, Information technology—coding of audio-visual objects, ISO/IEC 14496-12:2008(E), 4th Edition, JTC1/SC29/WG11, 2012, 190p.

(Continued)

*Primary Examiner* — Behrooz Senfi
(74) *Attorney, Agent, or Firm* — Wolf, Greenfield & Sacks, P.C.

(57) ABSTRACT

The present technique relates to a file generation apparatus, a file generating method, a file reproduction apparatus, and a file reproducing method capable of enabling a user to enjoy an HDR image.
HDR information designated by HDR designating information is acquired from a file storing a track of a stream including the HDR information which is configured with
(Continued)

feature information representing features of luminance of an HDR (high dynamic range) image having a dynamic range higher than that of an STD (standard) image and conversion information representing a conversion rule of converting the one of the STD image and the HDR image into the other and a target track including the HDR designating information designating the HDR information which is to be applied to the target track of interest in the HDR information of the track. The present technique can be applied, for example, to the case of storing data of images of a subtitle or the like and HDR information which is to be applied to the images in an MP4 file or the like.

28 Claims, 84 Drawing Sheets

(51) Int. Cl.

| | |
|---|---|
| ***H04N 21/4402*** | (2011.01) |
| ***H04N 21/485*** | (2011.01) |
| ***H04N 5/76*** | (2006.01) |
| ***H04N 9/82*** | (2006.01) |
| ***H04N 19/70*** | (2014.01) |
| ***H04N 7/01*** | (2006.01) |
| ***H04N 21/854*** | (2011.01) |
| ***G11B 20/10*** | (2006.01) |

(52) U.S. Cl.

CPC ........... *H04N 9/8205* (2013.01); *H04N 19/70* (2014.11); *H04N 21/431* (2013.01); *H04N 21/4402* (2013.01); *H04N 21/4854* (2013.01); *H04N 21/85406* (2013.01)

(56) References Cited

U.S. PATENT DOCUMENTS

2008/0192819 A1 8/2008 Ward et al.
2010/0172411 A1 7/2010 Efremov et al.
2012/0051635 A1* 3/2012 Kunkel ................... G06T 5/009 382/165
2013/0010062 A1 1/2013 Redmann
2013/0124471 A1 5/2013 Chen et al.
2013/0215360 A1* 8/2013 Pollack ................ G09G 3/3413 349/61
2013/0241931 A1 9/2013 Mai et al.
2015/0030234 A1* 1/2015 Lenseigne ............. G06T 7/0053 382/154
2015/0208024 A1 7/2015 Takahashi et al.
2015/0208102 A1 7/2015 Takahashi et al.
2016/0100183 A1 4/2016 Yamamoto et al.

FOREIGN PATENT DOCUMENTS

JP 2007-534238 A 11/2007
JP 2009-524371 A 6/2009
WO WO 2010/021705 A1 2/2010
WO WO 2012/027405 A2 3/2012
WO WO 2012/153224 A1 11/2012
WO WO 2013/090120 A1 6/2013

OTHER PUBLICATIONS

No Author Listed, Information technology—Coding of audio-visual objects—Part 30: Timed Text and other visual overlays in ISO base media file format, ISO/IEC CD 14496-30, JTC 1/SC 29/WG 11, 2012, 24p.

No Author Listed, Information technology—Coding of audio-visual objects—Part 15: Carriage of NAL unit structured video in the ISO Base Media File Format, ISO/IEC 14496-15:2013(E), 3rd Edition, 2013, 118p.

Segall et al., Tone Mapping SEI Message: New Results, Joint Video Team (JVT) of ISO/IEC MPEG & ITU-T VCEG, 21st Meeting, Hangzhou, China Oct. 20-27, 2006, 8p.

Wilken et al., Bit-Depth Scalable Video Coding, Image Processing, ICIP 2007, IEEE, Sep. 1, 2007, pp. 1-5.

Leonce et al., An Intelligent High Dynamic Range Video Codec For Handheld Devices, 2011 IEEE International Conference on Consumer Electronics (ICCE), Jan. 9, 2011, pp. 691-692.

Hattori et al., Signaling of luminance dynamic range in tone mapping information SEI, Joint Collaborative Team on Video Coding (JCT-VC) of ITU-T SG 16 WP 3 and ISO/IEC JTC 1/SC29/WG 11, JCTVC-J0149, 10th Meeting: Stockholm, SE, 2012, pp. 1-7.

* cited by examiner

FIG. 7

| tone_mapping_info(payloadSize){ | Descriptor |
|---|---|
| **tone_map_id** | ue(v) |
| **tone_map_cancel_flag** | u(1) |
| if(!tone_map_cancel_flag){ | |
| **tone_map_persistence_flag** | u(1) |
| **coded_data_bit_depth** | u(8) |
| **target_bit_depth** | u(8) |
| **tone_map_model_id** | ue(v) |
| if(tone_map_model_id==0){ | |
| **min_value** | u(32) |
| **max_value** | u(32) |
| }else if(tone_map_model_id==1){ | |
| **sigmoid_midpoint** | u(32) |
| **sigmoid_width** | u(32) |
| }else if(tone_map_model_id==2){ | |
| for(i=0;i<(1<<target_bit_depth);i++) | |
| **start_of_coded_interval[i]** | u(v) |
| else if(tone_map_model_id==3){ | |
| **num_pivots** | u(16) |
| for(i=0;i<num_pivots;i++){ | |
| **coded_pivot_value[i]** | u(v) |
| **target_pivot_value[i]** | u(v) |
| } | |
| }else if(tone_map_model_id==4){ | |
| **camera_iso_speed_idc** | u(8) |
| if(camera_iso_speed_idc==EXTENDED_ISO) | |
| **camera_iso_speed_value** | u(32) |
| **exposure_index_idc** | u(8) |
| if(exposure_index_idc==EXTENDED_ISO) | |
| **exposure_index_value** | u(32) |
| **exposure_compensation_value_sign_flag** | u(1) |
| **exposure_compensation_value_numerator** | u(16) |
| **exposure_compensation_value_denom_idc** | u(16) |
| **ref_screen_luminance_white** | u(32) |
| **extended_range_white_level** | u(32) |
| **nominal_black_level_code_value** | u(16) |
| **nominal_white_level_code_value** | u(16) |
| **extended_white_level_code_value** | u(16) |
| } | |
| } | |
| } | |

FIG. 8

```
(tone_map_model_id=0)
        min_value
        max_value

(tone_map_model_id=2)
        for(i=0; i<(1<<target_bit_depth); i++)
                start_of_coded_interval[i]

(tone_map_model_id=3)
        num_pivots
        for(i=0; i<num_pivots; i++){
                coded_pivot_value[i]
                target_pivot_value[i]
        }


(tone_map_model_id=4)
 camera_iso_speed_idc
 if(camera_iso_speed_idc==EXTENDED_ISO)
         camera_iso_speed_value
 exposure_index_idc
 if(exposure_index_idc==EXTENDED_ISO)
         exposure_index_value
 exposure_compensation_value_sign_flag
 exposure_compensation_value_numerator
 exposure compensation value denom idc
 ref_screen_luminance_white
 extended_range_white_level
 nominal_black_level_code_value
 nominal_white_level_code_value
 extended_white_level_code_value
```

ONE OF THREE TYPES IS USED AS CONVERSION INFORMATION. (tone_map_model_id=0, 2, 3)

USED AS FEATURE INFORMATION. (ref_screen_luminance_white through extended_white_level_code_value)

FIG. 19

```
<?xml version="1.0" encoding="UTF-8"?>
<tt xml:lang= "aa" xmlns= "http://www.w3.org/ns/ttml" xmlns:ttm= "http://www.w3.org/ns/ttml#metadata"
xmlns:tts= "http://www.w3.org/ns/ttml#styling" xmlns:xsi= "http://www.w3.org/2001/XMLSchema-instance" xmlns:smpte= "http://www.smpte-
ra.org/schemas/2052-1/2010/smpte-tt" xsi:schemaLocation= "http://www.w3.org/ns/ttml ttaf1-dfxp.xsd http://www.smpte-ra.org/schemas/2052-
1/2010/smpte-tt smpte-tt.xsd" tts:extent="854px 480px">
  <head>
   <layout>
    <region xml:id="region1" tts:origin="227px 400px" tts:extent="452px 60px"/>
   </layout>
  </head>
  <body>
   <div region= "region1" >
    <p begin= "00:00:05:05" end= "00:00:10:05" >subtitle#1 is presented</p>
   </div>
   <div region= "region1" >
    <p begin= "00:00:10:05" end= "00:00:15:05" >subtitle#2 is presented</p>
   </div>
  </body>
</tt>
```

```
Box Type: `tref'
Container: Track Box( 'trak' )
Mandatory: No
Quantity: Zero or one

aligned(8) class TrackReferenceBox extends Box( 'tref' ){
}
```

FIG. 23

```
aligned(8) class TrackReferenceTypeBox (unsigned int(32) reference_type) extends
Box(reference_type){
unsigned int(32) track_IDs[];
}
```

FIG. 24

Tone Mapping Information Reference Box ( 'tirf' )
Box Type 'tirf'
Container Sample Table Box ( 'stbl' ) or Track Fragment Box ( 'traf' )
Mandatory No
Quantity Zero, or one in every track/track fragment

```
aligned(8) class ToneMappingInformationReferenceBox
      extends FullBox( 'tirf' , version=0, flags=0)
{
      for(i=0;i< sample_count; i++){
            unsigned int(8) number_of_tone_mapping_info_id_ref
            for(i=0;i<number_of_tone_mapping_info_id_ref; i++)
            {
                  unsigned int(8) tone_mapping_info_id_ref
            }
      }
}
```

EQUAL TO sample_count OF stsz, stz2, trun

FIG. 41

```
Tone Mapping Information Box ( 'tinf' )
Box Type  'tinf'
Container  Sample Table Box ( 'stbl' ) or
           Track Fragment Box ( 'traf' )
Mandatory No
Quantity  Zero, or one in every track/track fragment

 aligned(8) class ToneMappingInformationBox
       extends FullBox( 'tinf' , version=0, flags=0)
 {
       unsigned int(32) number_of_tone_mapping_info
       for(i = 0; i < number_of_tone_mapping_info; i++)
       {
            ToneMapInfo tonemap;
       }
 }
```

FIG. 42

```
aligned(8) class ToneMapInfo
 {
        unsigned int(32) tone_map_id
        unsigned int(7) padding_value
        unsigned int(1) tone_map_cancel_flag
        if( !tone_map_cancel_flag ) {
                unsigned int(7) padding_value
                unsigned int(1) tone_map_persistence_flag
                unsigned int(8) coded_data_bit_depth
                unsigned int(8) target_bit_depth
                unsigned int(8) tone_map_model_id
                if( tone_map_model_id  = =  0 ) {
                        unsigned int(32) min_value
                        unsigned int(32) max_value
                } else if( tone_map_model_id  = =  1 ) {
                        unsigned int(32) sigmoid_midpoint
                        unsigned int(32) sigmoid_width
                } else if( tone_map_model_id  = =  2 )
                        for( j = 0; j < ( 1  <<  target_bit_depth ); j++ )
                                unsigned int(256) start_of_coded_interval[ j ]
                else if( tone_map_model_id  = =  3 ) {
                        unsigned int(16) num_pivots
                        for( j = 0; j < num_pivots; j++ ) {
                                unsigned int(256) coded_pivot_value[ j ]
                                unsigned int(256) target_pivot_value[ j ]
                        }
                } else if( tone_map_model_id  = =  4 ) {
                        unsigned int(8) camera_iso_speed_idc
                        if( camera_iso_speed_idc  = =  EXTENDED_ISO )
                                unsigned int(32) camera_iso_speed_value
                        unsigned int(8) exposure_index_idc
                        if( exposure_index_idc  = =  EXTENDED_ISO )
                                unsigned int(32) exposure_index_value
                        unsigned int(7) padding_value
                        unsigned int(1) exposure_compensation_value_sign_flag
                        unsigned int(16) exposure_compensation_value_numerator
                        unsigned int(16) exposure_compensation_value_denom_idc
                        unsigned int(32) ref_screen_luminance_white
                        unsigned int(32) extended_range_white_level
                        unsigned int(16) nominal_black_level_code_value
                        unsigned int(16) nominal_white_level_code_value
                        unsigned int(16) extended_white_level_code_value
                }
        }
}
```

FIG. 43

```
aligned(8) class ToneMapInfo
 {
          unsigned int(32) tone_map_id
          unsigned int(5) padding_value
          unsinged int(2) component_idc
          unsigned int(1) tone_map_cancel_flag
          if( !tone_map_cancel_flag ) {
                    unsigned int(7) padding_value
                    unsigned int(1) tone_map_persistence_flag
                    unsigned int(8) coded_data_bit_depth
                    unsigned int(8) target_bit_depth
                    unsigned int(8) tone_map_model_id
                    if( tone_map_model_id  = =  0 ) {
                              unsigned int(32) min_value
                              unsigned int(32) max_value
                    } else if( tone_map_model_id  = =  1 ) {
                              unsigned int(32) sigmoid_midpoint
                              unsigned int(32) sigmoid_width
                    } else if( tone_map_model_id  = =  2 )
                              for( i = 0; i < ( 1  <<  target_bit_depth ); i++ )
                                        unsigned int(256) start_of_coded_interval[ i ]
                    else if( tone_map_model_id  = =  3 ) {
                              unsigned int(16) num_pivots
                              for( i = 0; i < num_pivots; i++ ) {
                                        unsigned int(256) coded_pivot_value[ i ]
                                        unsigned int(256) target_pivot_value[ i ]
                              }
                    } else if( tone_map_model_id  = =  4 ) {
                              unsigned int(8) camera_iso_speed_idc
                              if( camera_iso_speed_idc  = =  EXTENDED_ISO )
                                        unsigned int(32) camera_iso_speed_value
                              unsigned int(8) exposure_index_idc
                              if( exposure_index_idc  = =  EXTENDED_ISO )
                                        unsigned int(32) exposure_index_value
                              unsigned int(7) padding_value
                              unsigned int(1) exposure_compensation_value_sign_flag
                              unsigned int(16) exposure_compensation_value_numerator
                              unsigned int(16) exposure_compensation_value_denom_idc
                              unsigned int(32) ref_screen_luminance_white
                              unsigned int(32) extended_range_white_level
                              unsigned int(16) nominal_black_level_code_value
                              unsigned int(16) nominal_white_level_code_value
                              unsigned int(16) extended_white_level_code_value
                    }
          }
}
```

component_idc IS NEWLY DEFINED
0 : common for all component
1:component 1(e.g. R)
2:component 2 (e.g. G)
3:component 3 (e.g. B)

FIG. 44

```
aligned(8) class ToneMapInfo
{
        unsigned int(32) tone_map_id
        unsigned int(7) padding_value
        unsigned int(1) tone_map_cancel_flag
        if( !tone_map_cancel_flag ) {
                unsigned int(5) padding_value
                unsinged int(2) num_of_components
                for( i = 0; i < num_of_components; i++ )
                {
                        unsigned int(7) padding_value
                        unsigned int(1) tone_map_persistence_flag
                        unsigned int(8) coded_data_bit_depth
                        unsigned int(8) target_bit_depth
                        unsigned int(8) tone_map_model_id
                        if( tone_map_model_id = = 0 ) {
                                unsigned int(32) min_value
                                unsigned int(32) max_value
                        } else if( tone_map_model_id = = 1 ) {
                                unsigned int(32) sigmoid_midpoint
                                unsigned int(32) sigmoid_width
                        } else if( tone_map_model_id = = 2 )
                                for( j = 0; j < ( 1  <<  target_bit_depth ); j++ )
                                  unsigned int(256) start_of_coded_interval[ j ]
                        else if( tone_map_model_id = = 3 ) {
                                unsigned int(16) num_pivots
                                for( j = 0; j < num_pivots; j++ ) {
                                  unsigned int(256) coded_pivot_value[ j ]
                                  unsigned int(256) target_pivot_value[ j ]
                                }
                        } else if( tone_map_model_id = = 4 ) {
                                unsigned int(8) camera_iso_speed_idc
                                if( camera_iso_speed_idc = = EXTENDED_ISO )
                                  unsigned int(32) camera_iso_speed_value
                                unsigned int(8) exposure_index_idc
                                if( exposure_index_idc = = EXTENDED_ISO )
                                  unsigned int(32) exposure_index_value
                                unsigned int(7) padding_value
                                unsigned int(1) exposure_compensation_value_sign_flag
                                unsigned int(16) exposure_compensation_value_numerator
                                unsigned int(16) exposure_compensation_value_denom_idc
                                unsigned int(32) ref_screen_luminance_white
                                unsigned int(32) extended_range_white_level
                                unsigned int(16) nominal_black_level_code_value
                                unsigned int(16) nominal_white_level_code_value
                                unsigned int(16) extended_white_level_code_value
                        }
                }
        }
}
```

num_of_components IS NEWLY DEFINED
0 : reserved
1:common for all component
2:reserved
3:each RGB component has independent tone map (stored in RGB order)

FIG. 57

```
aligned(8) class TrackReferenceTypeBox (unsigned int(32) reference_type) extends
Box(reference_type) {
unsigned int(32) track_IDs[];
}
```

FIG. 58

```
aligned(8) class ToneMapSample
{
        unsigned int Length = sample_size;
        for (i=0; i<Length; )
        {
                unsigned int(24) ToneMapInfoLength;
                bit(ToneMapInfoLength * 8) ToneMapInfo;
                i += sizeof(ToneMapInfoLength) + ToneMapInfoLength;
        }
}
```

FIG. 72

ToneMap element

A

```
<ToneMap xml:id="1">
  <Persistent>false</Persistent>
  <CodedDataBitDepth>8</CodedDataBitDepth>
  <TargetBitDepth>10</TargetBitDepth>
  <LinearMapping min="128" max="1024"/>
</ToneMap>
```

B

```
<ToneMap xml:id="2">
  <Persistent>false</Persistent>
  <CodedDataBitDepth>8</CodedDataBitDepth>
  <TargetBitDepth>10</TargetBitDepth>
  <UserDefinedMapping>
    <StartOfCodeInterval value="5"/>
    <StartOfCodeInterval value="3"/>
    <StartOfCodeInterval value="7"/>
    <StartOfCodeInterval value="1"/>
    <StartOfCodeInterval value="5"/>
  </UserDefinedMapping>
</ToneMap>
```

C

```
<ToneMap xml:id="3">
  <Persistent>false</Persistent>
  <CodedDataBitDepth>8</CodedDataBitDepth>
  <TargetBitDepth>10</TargetBitDepth>
  <PieceWiseLinearMapping>
    <Mapping codedValue="8" targetValue="16"/>
    <Mapping codedValue="9" targetValue="17"/>
    <Mapping codedValue="11" targetValue="22"/>
    <Mapping codedValue="12" targetValue="30"/>
    <Mapping codedValue="13" targetValue="44"/>
  </PieceWiseLinearMapping>
</ToneMap>
```

HdrInfo element

D

```
<HdrInfo xml:id="4">
  <Persistent>false</Persistent>
  <CodedDataBitDepth>8</CodedDataBitDepth>
  <TargetBitDepth>10</TargetBitDepth>
  <LuminanceDynamicRangeInfo>
    <CameraISOSpeed>800</CameraISOSpeed>
    <ExprosureIndexValue>254</ExprosureIndexValue>
    <ExposureCompensationValue>-2</ExposureCompensationValue>
    <RefScreenLuminanceWhite>100</RefScreenLuminanceWhite>
    <ExtendedRangeWhiteLevel>16</ExtendedRangeWhiteLevel>
    <NominalBlackLevelCodeValue>16</NominalBlackLevelCodeValue>
    <NominalWhiteLevelCodeValue>17</NominalWhiteLevelCodeValue>
    <ExtendedRangeWhiteLevelCodeValue>16</ExtendedRangeWhiteLevelCodeValue>
  </LuminanceDynamicRangeInfo>
</HdrInfo>
```

FIG. 73 toneMapRef attribute
value: any string (indicate xml:id of ToneMap)
Initial: none
Applies to: body, div, p, region, span, set
Inherited: yes
Percentage:N/A
Animatable: discrete hdrInfoRef attribute
value: any string (indicate xml:id of HdrInfo)
Initial: none
Applies to: body, div, p, region, span, set
Inherited: yes
Percentage:N/A
Animatable: discrete

FIG. 74

```
<?xml version="1.0" encoding="UTF-8"?>
<tt xml:lang= "aa"  xmlns= "http://www.w3.org/ns/ttml"  xmlns:ttm= "http://www.w3.org/ns/ttml#metadata"
xmlns:tts= "http://www.w3.org/ns/ttml#styling"  xmlns:xsi= "http://www.w3.org/2001/XMLSchema-instance"  xmlns:smpte= "http://www.smpte-
ra.org/schemas/2052-1/2010/smpte-tt"  xsi:schemaLocation= "http://www.w3.org/ns/ttml ttafl-dfxp.xsd http://www.smpte-ra.org/schemas/2052-
1/2010/smpte-tt smpte-tt.xsd"  xmlns:hdr= "http://extension.net/schema/hdr"  tts:extent="854px 480px">
 <head>                                       n1
  <layout>
   <region xml:id="region1" tts:origin="227px 400px" tts:extent="452px 60px"/>
  </layout>
 </head>
 <body>
  <hdr:ToneMap xml:id= "A" >omit_UserDefindMapping</hdr:ToneMap>  n2
  <hdr:ToneMap xml:id= "B" >omit_PieceWiseLinearMapping</hdr:ToneMap>  n3
  <div region= "region1"  >
   <p begin= "00:00:05:05"  end= "00:00:10:05"   hdr:toneMapRef= "A" >this subtitle references ToneMap whose id is A</p>  n4
  </div>
  <div region= "region1" >
   <p begin= "00:00:10:05"  end= "00:00:15:05"   hdr:toneMapRef= "B" >this subtitle references ToneMap whose id is B</p>  n5
  </div>
 </body>
</tt>
```

FIG. 75

```
<?xml version="1.0" encoding="UTF-8"?>
<tt xml:lang= "aa"  xmlns= "http://www.w3.org/ns/ttml"  xmlns:ttm= "http://www.w3.org/ns/ttml#metadata"
xmlns:tts= "http://www.w3.org/ns/ttml#styling"  xmlns:xsi= "http://www.w3.org/2001/XMLSchema-instance"  xmlns:smpte= "http://www.smpte-
ra.org/schemas/2052-1/2010/smpte-tt"  xsi:schemaLocation= "http://www.w3.org/ns/ttml ttafl-dfxp.xsd http://www.smpte-ra.org/schemas/2052-
1/2010/smpte-tt smpte-tt.xsd"  xmlns:hdr= "http://extension.net/schema/hdr"  tts:extent="854px 480px">
  <head>                                   n11
   <layout>
    <region xml:id="region1" tts:origin="227px 400px" tts:extent="452px 60px"/>
   </layout>
  </head>
  <body>
   <hdr:HdrInfo xml:id= "AA" >omit_ LuminanceDynamicRangeInfo </hdr:HdrInfo>  n12
   <hdr:HdrInfo xml:id= "BB" >omit_ LuminanceDynamicRangeInfo </hdr:HdrInfo>  n13
   <div region= "region1" >
    <p begin= "00:00:05:05"  end= "00:00:10:05"  hdr:hdrInfoRef= "AA" >this subtitle references HdrInfo whose id is AA</p>  n14
   </div>
   <div region= "region1" >
    <p begin= "00:00:10:05"  end= "00:00:15:05"  hdr:hdrInfoRef= "BB" >this subtitle references HdrInfo whose id is BB</p>  n15
   </div>
  </body>
</tt>
```

FIG. 76

```
<?xml version="1.0" encoding="UTF-8"?>
<tt xml:lang= "aa"  xmlns= "http://www.w3.org/ns/ttml"  xmlns:ttm= "http://www.w3.org/ns/ttml#metadata"
xmlns:tts= "http://www.w3.org/ns/ttml#styling"  xmlns:xsi= "http://www.w3.org/2001/XMLSchema-instance"  xmlns:smpte= "http://www.smpte-
ra.org/schemas/2052-1/2010/smpte-tt"  xsi:schemaLocation= "http://www.w3.org/ns/ttml ttaf1-dfxp.xsd http://www.smpte-ra.org/schemas/2052-
1/2010/smpte-tt smpte-tt.xsd"  xmlns:hdr= "http://extension.net/schema/hdr"  tts:extent="854px 480px">
                                   n21
  <head>
   <layout>
    <region xml:id="region1" tts:origin="227px 400px" tts:extent="452px 60px"/>
   </layout>
  </head>
  <body>
   <div region= "region1" > ~n22
    <hdr:ToneMap xml:id= "A" >omit_UserDefindMapping</hdr:ToneMap> ~n23
    <p  begin= "00:00:05:05"  end= "00:00:10:05" >this subtitle references ToneMaps whose identifiers are A</p> ~n24
   </div>
   <div region= "region1"  > ~n25
    <hdr:ToneMap xml:id= "B" >omit_PieceWiseLinearMapping</hdr:ToneMap> ~n26
    <p begin= "00:00:10:05"  end= "00:00:15:05" >this subtitle references ToneMaps whose identifiers are B</p> ~n27
   </div>
  </body>
</tt>
```

FIG. 77

```
<?xml version="1.0" encoding="UTF-8"?>
<tt xml:lang= "aa" xmlns= "http://www.w3.org/ns/ttml" xmlns:ttm= "http://www.w3.org/ns/ttml#metadata"
xmlns:tts= "http://www.w3.org/ns/ttml#styling" xmlns:xsi= "http://www.w3.org/2001/XMLSchema-instance" xmlns:smpte= "http://www.smpte-
ra.org/schemas/2052-1/2010/smpte-tt" xsi:schemaLocation= "http://www.w3.org/ns/ttml ttafl-dfxp.xsd http://www.smpte-ra.org/schemas/2052-
1/2010/smpte-tt smpte-tt.xsd" xmlns:hdr= "http://extension.net/schema/hdr" tts:extent="854px 480px">   n31
 <head>
  <layout>
   <region xml:id="region1" tts:origin="227px 400px" tts:extent="452px 60px"/>
  </layout>
 </head>
 <body>
  <div region= "region1" >   n32
   <hdr:HdrInfo xml:id= "AA" >omit_ LuminanceDynamicRangeInfo </hdr:HdrInfo>   n33
   <p  begin= "00:00:05:05"  end= "00:00:10:05" >this subtitle references HdrInfo whose identifiers are AA</p>   n34
  </div>
  <div region= "region1"  >   n35
   <hdr:HdrInfo xml:id= "BB" >omit_ LuminanceDynamicRangeInfo </hdr:HdrInfo>   n36
   <p begin= "00:00:10:05"  end= "00:00:15:05" >this subtitle references HdrInfo whose identifiers are BB</p>   n37
  </div>
 </body>
</tt>
```

FILE GENERATION APPARATUS, FILE GENERATING METHOD, FILE REPRODUCTION APPARATUS, AND FILE REPRODUCING METHOD

CROSS REFERENCE TO RELATED APPLICATIONS

The present application is a U.S. national stage application under 35 U.S.C. § 371 of International Application No. PCT/JP2014/068379, filed on Jul. 10, 2014, which claims priority to Japanese Patent Application JP 2013-150437, filed on Jul. 19, 2013, the entire contents of each of which is incorporated herein by reference.

TECHNICAL FIELD

The present technique relates to a file generation apparatus, a file generating method, a file reproduction apparatus, and a file reproducing method, and more particularly, to a file generation apparatus, a file generating method, a file reproduction apparatus, and a file reproducing method capable of increasing the chance that a user enjoys an HDR (high dynamic range) image which is an image having a high dynamic range.

BACKGROUND ART

In recent years, apparatuses which treat images as digital signals and compression-encode the image by employing an encode scheme of performing compression through orthogonal transform such as discrete cosine transform and motion compensation by using redundancy unique to the image for the purpose of information transmission or storage with high efficiency have spread. As this encode scheme, for example, there are MPEG (Moving Picture Experts Group), H. 264, MPEG-4 Part 10 (Advanced Video Coding, hereinafter, referred to as AVC), and the like.

At present, for the purpose of improving encode efficiency further than the H. 264/AVC, standardization of the encode scheme called HEVC (High Efficiency Video Coding) has been promoted by JCTVC (Joint Collaboration Team-Video Coding) which is a standardization organization in collaboration with ITU-T and ISO/IEC.

At the present time, in the draft of the HEVC (Non-Patent Document 1), in "D 2.15 Tone mapping information SEI message syntax" and "D.3.15 Tone mapping information SEI message semantics", it is regulated that tone_mapping_info as HDR information on an HDR (high dynamic range) image which is an image having a high dynamic range is transmitted by using SEI (Supplemental Enhancement Information).

In addition, besides the HEVC, the tone_mapping_info has also been introduced to the AVC.

CITATION LIST

Non-Patent Document

Non-Patent Document 1: Benjamin Bross et al., "High Efficiency Video Coding (HEVC) text specification draft 10 (for FDIS & Last Call)", Joint Collaborative Team on Video Coding (JCT-VC) of ITU-T SG 16WP 3 and ISO/IEC JTC 1/SC 29/WG 11, 12th Meeting: Geneva, CH, 14-23 Jan. 2013 (Document: JCTVC-L1003_v34, Date: 19 Mar., 2013)

SUMMARY OF THE INVENTION

Problems to be Solved by the Invention

At present, a camera capturing an HDR image or a display displaying the HDR image has been spread. Under such circumstances, it is requested to increase the chance that a user enjoys an HDR image by facilitating introduction of HDR information to a file format or a data format besides an HEVC or AVC format.

The present technique is to increase the chance that a user enjoys an HDR image.

Solutions to Problems

A first file generation apparatus according to the present technique includes a file generation unit which generates a file storing a target track including HDR information which is configured with feature information representing features of luminance of an HDR (high dynamic range) image having a dynamic range higher than that of an STD (standard) image and conversion information representing a conversion rule of converting the one of the STD image and the HDR image into the other, and HDR designating information designating the HDR information which is to be applied to the target track of interest.

A first file reproducing method according to the present technique includes acquiring HDR information designated by HDR designating information from a file storing a target track including the HDR information which is configured with feature information representing features of luminance of an HDR (high dynamic range) image having a dynamic range higher than that of an STD (standard) image and conversion information representing a conversion rule of converting the one of the STD image and the HDR image into the other, and the HDR designating information designating the HDR information which is to be applied to the target track of interest.

In the first file generation apparatus and the file generating method according to the present technique, there is generated a file storing an HDR information which is configured with feature information representing features of luminance of an HDR (high dynamic range) image having a dynamic range higher than that of an STD (standard) image and conversion information representing a conversion rule of converting the one of the STD image and the HDR image into the other and a target track including HDR designating information designating the HDR information which is to be applied to the target track of interest.

A first file reproduction apparatus according to the present technique includes an acquisition unit which acquires HDR information designated by HDR designating information from a file storing the HDR information which is configured with feature information representing features of luminance of an HDR (high dynamic range) image having a dynamic range higher than that of an STD (standard) image and conversion information representing a conversion rule of converting the one of the STD image and the HDR image into the other and a target track including the HDR designating information designating the HDR information which is to be applied to the target track of interest.

A first file reproducing method according to the present technique includes acquiring HDR information designated by HDR designating information from a file storing the HDR information which is configured with feature information representing features of luminance of an HDR (high dynamic range) image having a dynamic range higher than that of an STD (standard) image and conversion information representing a conversion rule of converting the one of the STD image and the HDR image into the other and a target track including the HDR designating information designating the HDR information which is to be applied to the target track of interest.

In the first file reproduction apparatus and the file reproducing method according to the present technique, HDR information designated by HDR designating information is acquired from a file storing the HDR information which is configured with feature information representing features of luminance of an HDR (high dynamic range) image having a dynamic range higher than that of an STD (standard) image and conversion information representing a conversion rule of converting the one of the STD image and the HDR image into the other and a target track including the HDR designating information designating the HDR information which is to be applied to the target track of interest.

A second file generation apparatus according to the present technique includes a file generation unit which generates a file storing an HDR information track which is a track of a stream of HDR information which is configured with feature information representing features of luminance of an HDR (high dynamic range) image having a dynamic range higher than that of an STD (standard) image and conversion information representing a conversion rule of converting the one of the STD image and the HDR image into the other, and a target track including track designating information designating the HDR information track including the HDR information which is to be applied to the target track of interest and HDR designating information designating the HDR information which is to be applied to the target track in the HDR information of the HDR information track designated by the track designating information.

A second file generating method according to the present technique includes generating a file storing an HDR information track which is a track of a stream of HDR information which is configured with feature information representing features of luminance of an HDR (high dynamic range) image having a dynamic range higher than that of an STD (standard) image and conversion information representing a conversion rule of converting the one of the STD image and the HDR image into the other, and a target track including track designating information designating the HDR information track including the HDR information which is to be applied to the target track of interest and HDR designating information designating the HDR information which is to be applied to the target track in the HDR information of the HDR information track designated by the track designating information.

In the second file generation apparatus and the file generating method according the present technology, there is generated a file storing an HDR information track which is a track of a stream of HDR information which is configured with feature information representing features of luminance of an HDR (high dynamic range) image having a dynamic range higher than that of an STD (standard) image and conversion information representing a conversion rule of converting the one of the STD image and the HDR image into the other, and a target track including track designating information designating the HDR information track including the HDR information which is to be applied to the target track of interest and HDR designating information designating the HDR information which is to be applied to the target track in the HDR information of the HDR information track designated by the track designating information.

A second file reproduction apparatus according to the present technique includes an acquisition unit which acquires HDR information designated by HDR designating information in the HDR information of an HDR information track designated by track designating information from a file storing the HDR information track which is a track of a stream of the HDR information which is configured with feature information representing features of luminance of an HDR (high dynamic range) image having a dynamic range higher than that of an STD (standard) image and conversion information representing a conversion rule of converting the one of the STD image and the HDR image into the other, and a target track including the track designating information designating the HDR information track including the HDR information which is to be applied to the target track of interest and the HDR designating information designating the HDR information which is to be applied to the target track in the HDR information of the HDR information track designated by the track designating information.

A second file reproducing method according to the present technique includes acquiring HDR information designated by HDR designating information in the HDR information of an HDR information track designated by track designating information from a file storing the HDR information track which is a track of a stream of the HDR information which is configured with feature information representing features of luminance of an HDR (high dynamic range) image having a dynamic range higher than that of an STD (standard) image and conversion information representing a conversion rule of converting the one of the STD image and the HDR image into the other, and a target track including the track designating information designating the HDR information track including the HDR information which is to be applied to the target track of interest and the HDR designating information designating the HDR information which is to be applied to the target track in the HDR information of the HDR information track designated by the track designating information.

In the second file reproduction apparatus and the file reproducing method, HDR information designated by HDR designating information in the HDR information of an HDR information track designated by track designating information is acquired from a file storing the HDR information track which is a track of a stream of the HDR information which is configured with feature information representing features of luminance of an HDR (high dynamic range) image having a dynamic range higher than that of an STD (standard) image and conversion information representing a conversion rule of converting the one of the STD image and the HDR image into the other, and a target track including the track designating information designating the HDR information track including the HDR information which is to be applied to the target track of interest and the HDR designating information designating the HDR information which is to be applied to the target track in the HDR information of the HDR information track designated by the track designating information.

In addition, the file generation apparatus or the file reproduction apparatus may be an independent apparatus or may be an internal block constituting one apparatus.

In addition, the file may be supplied by transmitting the file through a transmission medium or by recording the file in a recording medium.

Effects of the Invention

According to the present technique, it is possible to increase the chance that a user enjoys an HDR image.

In addition, the effects described herein are not necessarily limited but may be any of the effects described in this disclosure.

BRIEF DESCRIPTION OF DRAWINGS

FIG. 7 is a diagram illustrating syntax of tone_mapping_info regulated in accordance with an HEVC scheme.

FIG. 8 is a diagram illustrating a relationship between TMI to which each value is set as tone_map_model_id and conversion information and feature information.

FIG. 19 is a diagram illustrating an example of data of ST of SMPTE-TT.

FIG. 22 is a diagram illustrating definition of a tref box.

FIG. 23 is a diagram illustrating an example of definition of a TrackReferenceTypeBox as a vtmi box.

FIG. 24 is a diagram illustrating an example of definition of a tirf box.

FIG. 41 is a diagram illustrating an example of definition of a tinf box.

FIG. 42 is a diagram illustrating a first example of syntax of ToneMapinfo.

FIG. 43 is a diagram illustrating a second example of the syntax of ToneMapinfo.

FIG. 44 is a diagram illustrating a third example of the syntax of ToneMapinfo.

FIG. 57 is a diagram illustrating an example of definition of a TrackReferenceTypeBox as a tmpi box.

FIG. 58 is a diagram illustrating an example of syntax of a sample (ToneMapSample) of TMI as actual data stored in an mdat box of a TMI track (tone map track) stored in the third MP4 file.

FIG. 72 is a diagram illustrating an example of an HDR storing element.

FIG. 73 is a diagram illustrating an example of definition of a toneMapRef attribute and an example of definition of an hdrInfoRef attribute.

FIG. 74 is a diagram illustrating a first example of new TT data.

FIG. 75 is a diagram illustrating a second example of the new TT data.

FIG. 76 is a diagram illustrating a third example of the new TT data.

FIG. 77 is a diagram illustrating a fourth example of the new TT data.

MODE FOR CARRYING OUT THE INVENTION

<Embodiment of Signal Processing System Employing the Present Technique>

Figure 1:
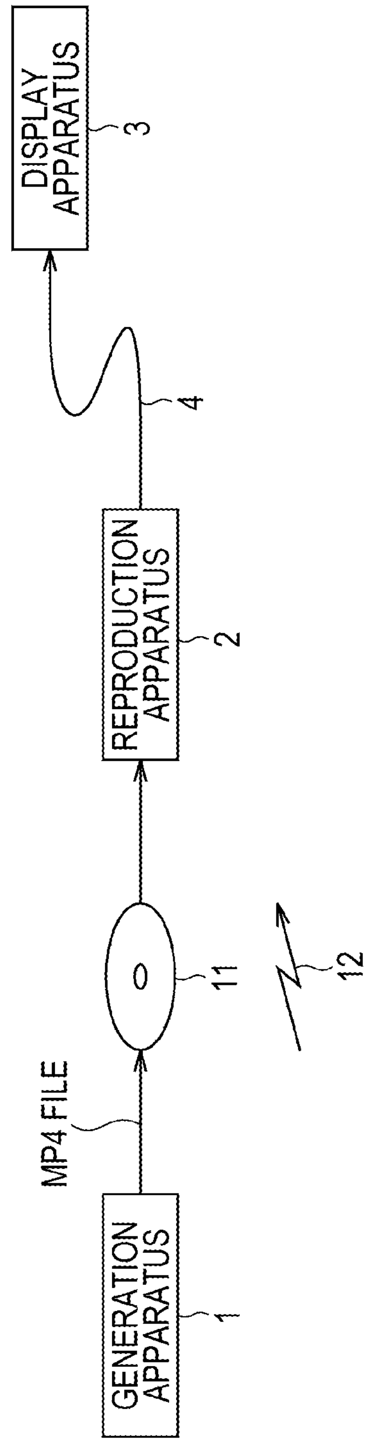
FIG. 1 is a diagram illustrating a configurational example of an embodiment of a signal processing system employing the present technique.

FIG. 1 is a diagram illustrating a configurational example of an embodiment of a signal processing system employing the present technique.

The signal processing system of FIG. 1 is configured to include a generation apparatus 1, a reproduction apparatus 2, and a display apparatus 3. The reproduction apparatus 2 and the display apparatus 3 are connected to each other through a cable 4 such as HDMI (registered trademark) (High Definition Multimedia Interface). The reproduction apparatus 2 and the display apparatus 3 may be connected to each other through a cable of another standard, and the reproduction apparatus 2 and the display apparatus 3 may be connected to each other through wireless communication.

The generation apparatus 1 generates a stream of content and supplies the stream. The reproduction apparatus 2 reproduces the content from the stream supplied by the generation apparatus 1.

The generation apparatus 1 may supply the stream, for example, without change. In addition, the generation apparatus 1 may supply the stream, for example, in the state that the stream is stored in a predetermined packet such as an IP packet or may supply the stream, for example, in the state that the stream is stored in a predetermined file such as an MP4 file regulated in ISO/IEC 14496-14.

In addition, in the generation apparatus 1, the stream may be supplied, for example, in the state that the stream is recorded in a recording medium 11 such as a Blu-ray (registered trademark) disk or may be supplied, for example, in the manner where the stream is transmitted through a transmission medium 12 such as a terrestrial wave or the Internet.

Herein, in the generation apparatus 1, in a case where the stream is stored in a file, for example, a file (file in an ISO base media file format) regulated in ISO/IEC 14496-12, a file regulated in ISO/IEC 14496-15, a file in a QuickTime format, a file having a box structure, or a file having no box structure may be employed as the file storing the stream besides the MP4 file.

An HDR (High Dynamic Range) image which is an image having a dynamic range higher than that of an STD (standard) image which is an image having a predetermined dynamic range (luminance range) which can be displayed by a monitor having standard luminance is input to the generation apparatus 1. The standard luminance is, for example, 100 cd/$m^2$ (=100 nit). In addition, the STD image and the HDR image are not particularly limited. Namely, the STD image and the HDR image are images which are different from each other in terms of only the dynamic range and denote images which have a relationship where the one can be converted into the other according to the later-described conversion information. Therefore, the STD image is an image of which only dynamic range is lower (narrower) than that of the HDR image, and the HDR image is an image of which only dynamic range is higher (wider) than that of the STD image.

Herein, the images include videos, graphics, backgrounds (background images), subtitles, or other displayable media. In addition, the data format of the subtitle (subtitles, closed captions, or the like) may be any one of texts and images.

For example, plural videos or plural HDR images such as one or more videos and one or more graphics are input to the generation apparatus 1.

Hereinafter, for simplifying the description, it is assumed that, for example, a video (hereinafter, sometimes referred to as an HDR video) of one (sequence) of HDR images and a subtitle (hereinafter, sometimes referred to as an HDR ST (HDR subtitle)) of one (sequence) of the HDR images are input to the generation apparatus 1.

However, as the data input to the generation apparatus 1, any images such as a combination of a video and graphics, a combination of a video, graphics, and a subtitle, a combination of graphics and a subtitle, or only graphics may be employed. In addition, the image of the same kind of media of the video, the subtitle, or the like input to the generation apparatus 1 is not limited to one image (one sequence), but plural images (sequence) may be used.

In addition, the HDR video and the HDR ST are sometimes collectively referred to as HDR data if there is no particular need to distinguish.

In addition, the video and the ST (subtitle) of the STD image where the dynamic ranges of the HDR video and the HDR ST are compressed into predetermined dynamic ranges which can be displayed by a monitor having standard luminance are sometimes referred to as an STD video and an STD ST, respectively.

In addition, the STD video and the STD ST are sometimes collectively referred to as STD data if there is no particular need to distinguish.

If the dynamic range of the STD data is considered to be, for example, 0 to 100%, the dynamic range of the HDR data is represented to be a range of 0% to 101% or more, for example, 0 to 500%, 0 to 1000%, or the like.

The generation apparatus 1 encodes, for example, the input HDR data of the master without change and stores the encoded data in, for example, the MP4 file.

Alternatively, the generation apparatus 1 converts the input HDR data of the master into STD data and performs encoding, and after that, stores the encoded data in, for example, the MP4 file.

The MP4 file stores, besides the HDR data or the STD data, the feature information representing the features of the luminance of the HDR data of the master and the conversion information representing the conversion rule of converting the one of the HDR data and the STD data to the other.

Herein, for example, a so-called 4K-resolution video, of which horizontal×vertical resolution is 4096×2160 pixels, 3840×2160 pixel, or the like may be employed as the HDR video and the STD video.

In addition, for example, an HEVC scheme, an AVC scheme, or other arbitrary schemes may be employed as the video encode scheme. Namely, the video encode (decode) scheme is not limited to the HEVC scheme, the AVC scheme, or the like.

If the feature information representing the features of the luminance of the HDR image and the conversion information representing the conversion rule of converting the one of the HDR image and the STD image to the other are considered to be the HDR information, for example, in accordance with the HEVC scheme, tone_mapping_info is regulated as the HDR information. In addition, in accordance with the HEVC scheme, it is regulated that the tone_mapping_info as the HDR information is transmitted in the state that the tone_mapping_info is included in the SEI.

The reproduction apparatus 2 performs communication with the display apparatus 3 through the cable 4 to acquire information on the display performance of the display apparatus 3. The reproduction apparatus 2 identifies whether the display apparatus 3 is an HDR monitor which is a monitor capable of displaying the HDR data or an STD monitor which is a monitor capable of displaying only the STD data.

In addition, the reproduction apparatus 2 acquires the MP4 file by reading the MP4 file recorded in the recording medium 11 or acquires the MP4 file by receiving the MP4 file transmitted through the transmission medium 12 and reproduces the data stored in the MP4 file.

Namely, the reproduction apparatus 2 decodes a video stream which is a stream of video stored in the MP4 file and an ST stream which is a stream of ST (subtitle).

Next, for example, in a case where the data obtained through the decoding are HDR data and the display apparatus 3 is configured to include an HDR monitor, the reproduction apparatus 2 outputs the HDR data obtained through the decoding to the display apparatus 3. In this case, the reproduction apparatus 2 outputs the feature information stored in the MP4 file together with the HDR data to the display apparatus 3.

On the other hand, in a case where the data obtained through the decoding are HDR data and the display apparatus 3 is configured to include an STD monitor, the reproduction apparatus 2 converts the HDR data obtained through the decoding into STD data and outputs the STD data. The conversion of the HDR data into the STD data is performed by using the conversion information stored in the MP4 file.

In a case where the data obtained through the decoding are STD data and the display apparatus 3 is configured to include an HDR monitor, the reproduction apparatus 2 converts the STD data obtained through the decoding into the HDR data and outputs the HDR data to the display apparatus 3. The conversion of the STD data into the HDR data is performed by using the conversion information stored in the MP4 file. In this case, the reproduction apparatus 2 outputs the feature information stored in the MP4 file together with the HDR data to the display apparatus 3.

In addition, in a case where the data obtained through the decoding are STD data and the display apparatus 3 is configured to include an STD monitor, the reproduction apparatus 2 outputs the STD data obtained through the decoding to the display apparatus 3.

The display apparatus 3 receives the STD data or the HDR data transmitted from the reproduction apparatus 2 and displays the STD image or the HDR image corresponding to the STD data or the HDR data on the monitor based on the STD data or the HDR data.

For example, in a case where the feature information is transmitted, the display apparatus 3 recognizes that the data transmitted from the reproduction apparatus 2 together with the feature information are the HDR data. As described above, to the display apparatus 3 configured to include the HDR monitor, the feature information together with the HDR data is transmitted.

In this case, the display apparatus 3 displays the HDR image corresponding to the HDR data corresponding to features designated by the feature information. Namely, in a case where the monitor included in the display apparatus 3 is a monitor having a dynamic range of 0 to 500% and a predetermined feature that the dynamic range of the HDR data is 0 to 500% is designated by the feature information, the display apparatus 3 adjusts the luminance in a range of 0 to 500% according to the predetermined feature to display the HDR image.

By allowing the features of the luminance of the HDR data of the master to be designated, an author of content can display the image with intended luminance.

Generally, the display apparatus such as TV (television set) recognizes externally input data as the data having a dynamic range of 0 to 100%. In addition, in a case where the monitor of the display apparatus has a dynamic range wider (higher) than the above-mentioned dynamic range, the display apparatus may extend the luminance according to the characteristics of the monitor by itself to display the image. By designating the features of the luminance and adjusting the luminance of the HDR data according to the designated features, it is possible to prevent author's unintended luminance adjustment from being performed at the display apparatus side.

In addition, generally, the reproduction apparatus which outputs data to the display apparatus such as TV converts the luminance according to the characteristics of transmission line and, after that, output the data. The display apparatus which receives the data converts the luminance of the received data according to the characteristics of the monitor to display the image. The reproduction apparatus 2 does not perform the conversion of the luminance, and the HDR data are output without change from the reproduction apparatus 2 to the display apparatus 3, so that it is possible to reduce the number of luminance conversion processes, and it is possible to display the image having the luminance close to that of the master on the display apparatus 3.

On the other hand, in a case where the feature information is not transmitted, the display apparatus 3 recognizes that the data transmitted from the reproduction apparatus 2 are the STD data and displays the STD image corresponding to the STD data. If the STD data are transmitted from the reproduction apparatus 2, the display apparatus 3 denotes an apparatus including an STD monitor.

In addition, in a case where audio data are stored in the MP4 file by the generation apparatus 1, the reproduction apparatus 2 reproduces the audio data and transmits the audio data to the display apparatus 3. The display apparatus 3 outputs sound corresponding to the audio data based on the audio data transmitted from the reproduction apparatus 2.

Hereinafter, a process mode of storing the HDR data of the master in the MP4 file in the state that the dynamic range is maintained is referred as mode-i, and a process mode of converting the HDR data of the master into STD data and storing the STD data in the MP4 file is referred to as mode-ii.

<Signal Processing of Mode-i>

Figure 2:
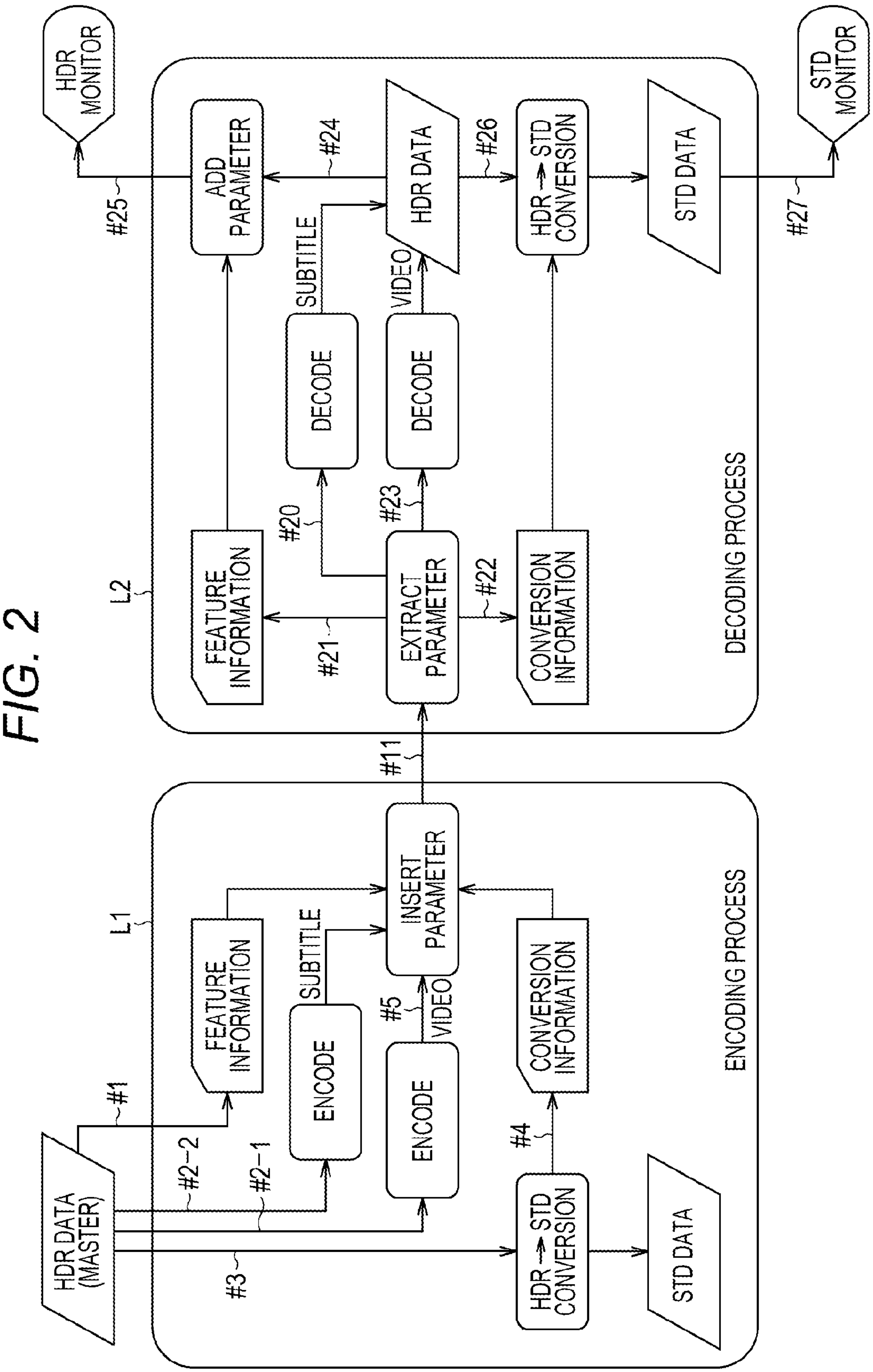
FIG. 2 is a diagram illustrating an example of signal processing of mode-i performed by the signal processing system.

FIG. 2 is a diagram illustrating an example of signal processing of mode-i performed by the signal processing system of FIG. 1.

The process of the left side indicated to be surrounded by a solid line L1 represents an encoding process performed by the generation apparatus 1, and the process of the right side indicated to be surrounded by a solid line L2 represents a decoding process performed by the reproduction apparatus 2.

In a case where HDR data of a master is input, the generation apparatus 1 detects luminance of the HDR data of the master and generates feature information as indicated by an arrow #1. In addition, the generation apparatus 1 encodes the HDR video of the master, for example, in accordance with an HEVC scheme to generate encoded data as indicated by an arrow #2-1, and the generation apparatus 1 encodes the HDR ST of the master to generate an ST stream which is a stream of ST as indicated by an arrow #2-2.

The generation apparatus 1 converts the HDR data of the master into STD data as indicated by an arrow #3. An STD image corresponding to the STD data obtained through the conversion is displayed on a monitor (not illustrated). The conversion of the HDR data into the STD data is appropriately performed by adjusting conversion parameters while an author visually checks the STD image corresponding to the converted STD data.

The generation apparatus 1 generates conversion information based on adjustment performed by the author as indicated by an arrow #4.

The conversion information represents a conversion rule of converting the one of each luminance value in a high dynamic range of 0 to 400% or the like which is wider than a standard dynamic range and each luminance value in a dynamic range of 0 to 100% which is the standard dynamic range into the other, so that the conversion information represents correspondence relationship between the luminance values.

The generation apparatus 1 inserts the feature information and the conversion information as SEI into encoded data of the HDR video to generate a video stream as indicated by an arrow #5. The generation apparatus 1 stores the generated video stream and the ST stream of the HDR ST in the MP4 file and supplies the MP4 file to the reproduction apparatus 2 as indicated by an arrow #11.

In this manner, the feature information and the conversion information of the HDR video and the HDR ST are supplied to the reproduction apparatus 2 in a form of being inserted into the video stream by using the SEI.

The reproduction apparatus 2 reads the ST stream from the MP4 file and decodes the ST stream to generate an HDR ST as indicated by an arrow #20.

In addition, the reproduction apparatus 2 reads the video stream from the MP4 file to extract the feature information and the conversion information from the SEI of the video stream as indicated by arrows #21 and #22.

In addition, the reproduction apparatus 2 decodes the encoded data included in the video stream in accordance with an HEVC scheme to generate an HDR video as indicated by an arrow #2. In a case where the display apparatus 3 is configured to include an HDR monitor, the reproduction apparatus 2 adds the feature information to the HDR data obtained through the decoding as indicated by an arrow #24 and outputs the HDR data added with the feature information to the display apparatus 3 as indicated by an arrow #25.

On the other hand, in a case where the display apparatus 3 is configured to include an STD monitor, the reproduction apparatus 2 converts the HDR data obtained through the decoding into the STD data by using the conversion information extracted from the video stream as indicated by an arrow #26. The reproduction apparatus 2 outputs the STD data obtained through the conversion to the display apparatus 3 as indicated by an arrow #27.

In this manner, the HDR data obtained through the decoding together with the feature information are output to the display apparatus 3 which is configured to include the HDR monitor. Alternatively, after the HDR data obtained through the decoding are converted into the STD data, the converted data are output to the display apparatus 3 which is configured to include the STD monitor.

Figure 3:
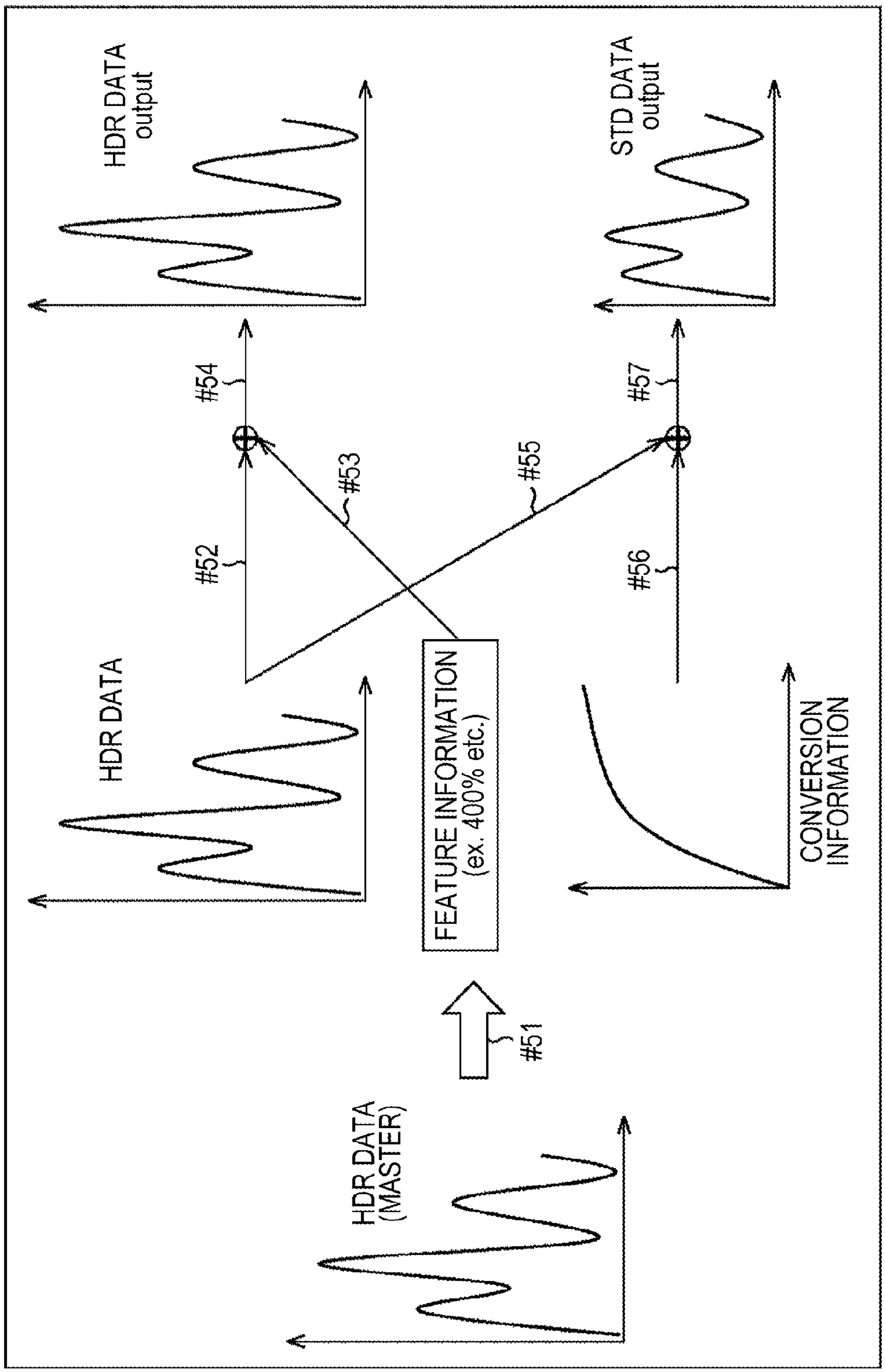
FIG. 3 is a diagram illustrating a flow of signal processing of mode-i from the time when HDR data of a master are input to a generation apparatus 1 to the time when data are output from a reproduction apparatus 2.

FIG. 3 is a diagram illustrating a flow of signal processing of mode-i from the time when the HDR data of the master are input to the generation apparatus 1 to the time when data are output from the reproduction apparatus 2.

The HDR data of the master together with the feature information and the conversion information generated based on the HDR data of the master by the generation apparatus 1 are supplied to the reproduction apparatus 2 as indicated by a white arrow #51. The feature information includes, for example, information representing that the dynamic range is extended to a range of 0 to 400%.

In a case where the display apparatus 3 is configured to include an HDR monitor, in the reproduction apparatus 2, the feature information is added to the HDR data obtained through the decoding as indicated by arrows #52 and #53. In addition, the HDR data added with the feature information are output to the display apparatus 3 as indicated by an arrow #54.

On the other hand, in a case where the display apparatus 3 is configured to include an STD monitor, in the reproduction apparatus 2, the HDR data obtained through the decoding are converted into STD data by using the conversion information as indicated by arrows #55 and #56. In addition, the STD data obtained through the conversion are output to the display apparatus 3 as indicated by an arrow #57. In FIG. 3, an amplitude of a wave form representing the HDR data and an amplitude of a wave form representing the STD data represent respective dynamic ranges.

In this manner, in the mode-i, the HDR data of the master are stored in the MP4 file in the state of the HDR data. In addition, according to the performance of the display apparatus 3 which is to be the output destination, it is switched whether the HDR data obtained through the decoding are added without change to the feature information to be output or the HDR data obtained through the decoding are converted into STD data to be output.

<Signal Processing of Mode-ii>

Figure 4:
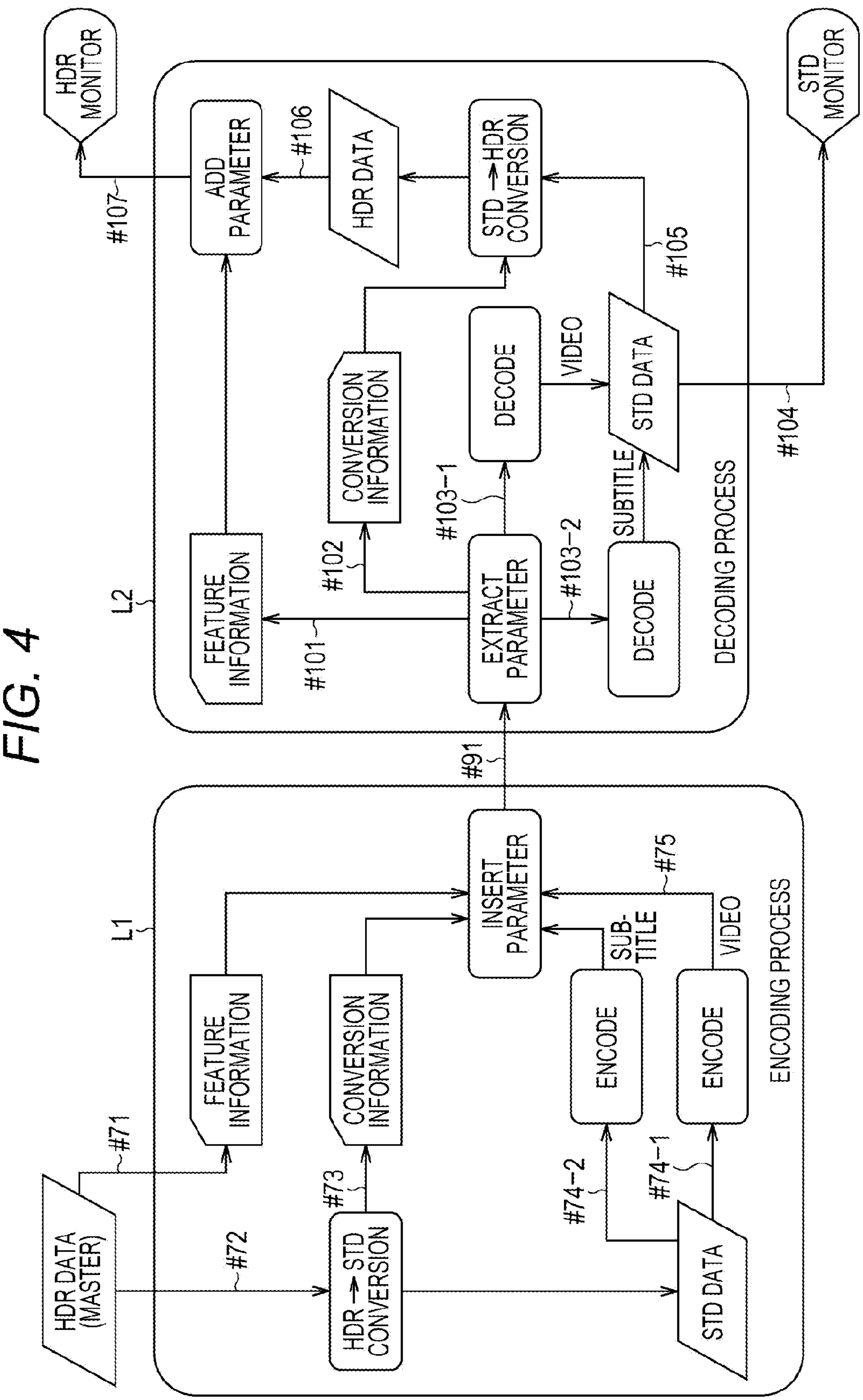
FIG. 4 is a diagram illustrating an example of signal processing of mode-ii performed by the signal processing system.

FIG. 4 is a diagram illustrating an example of signal processing of mode-ii performed by the signal processing system of FIG. 1.

In a case where the HDR data of the master are input, the generation apparatus 1 detects the luminance of the HDR data of the master to generate feature information as indicated by an arrow #71.

The generation apparatus 1 converts the HDR data of the master into STD data as indicated by an arrow #72. The STD image corresponding to the STD data obtained through the conversion is displayed on a monitor (not illustrated).

The generation apparatus 1 generates the conversion information based on adjustment by an author as indicated by an arrow #73.

In addition, the generation apparatus 1 encodes the STD video obtained through conversion of the HDR video of the master in accordance with an HEVC scheme to generate encoded data as indicated by an arrow #74-1. In addition, the generation apparatus 1 encodes the STD ST obtained through the conversion of the HDR ST of the master to generate an ST stream as indicated by an arrow #74-2.

The generation apparatus 1 inserts the feature information and the conversion information as SEI into the encoded data to generate a video stream as indicated by an arrow #75. The generation apparatus 1 stores the generated video stream and ST stream in the MP4 file and supplies the video stream and the ST stream in the reproduction apparatus 2 as indicated by an arrow #91.

The reproduction apparatus 2 reads the video stream from the MP4 file and extracts the feature information and the conversion information from the SEI of the video stream as indicated by arrows #101 and #102.

In addition, the reproduction apparatus 2 decodes the encoded data included in the video stream in accordance with an HEVC scheme to generate an STD video as indicated by an arrow #103-1 and decodes the ST stream to generate an STD ST as indicated by an arrow #103-2. In a case where the display apparatus 3 is configured to include an STD monitor, the reproduction apparatus 2 outputs the STD data obtained through the decoding to the display apparatus 3 as indicated by an arrow #104.

On the other hand, in a case where the display apparatus 3 is configured to include an HDR monitor, the reproduction apparatus 2 converts the STD data obtained through the decoding into the HDR data by using the conversion information extracted from the video stream as indicated by an arrow #105. The reproduction apparatus 2 adds the feature information to the HDR data obtained through the conversion as indicated by an arrow #106 and outputs the HDR data added with the feature information to the display apparatus 3 as indicated by an arrow #107.

In this manner, after the STD data obtained through the decoding are converted into the HDR data, the converted data together with the feature information are output to the display apparatus 3 including the HDR monitor. In addition, the STD data obtained through the decoding are output without change to the display apparatus 3 including the STD monitor.

Figure 5:
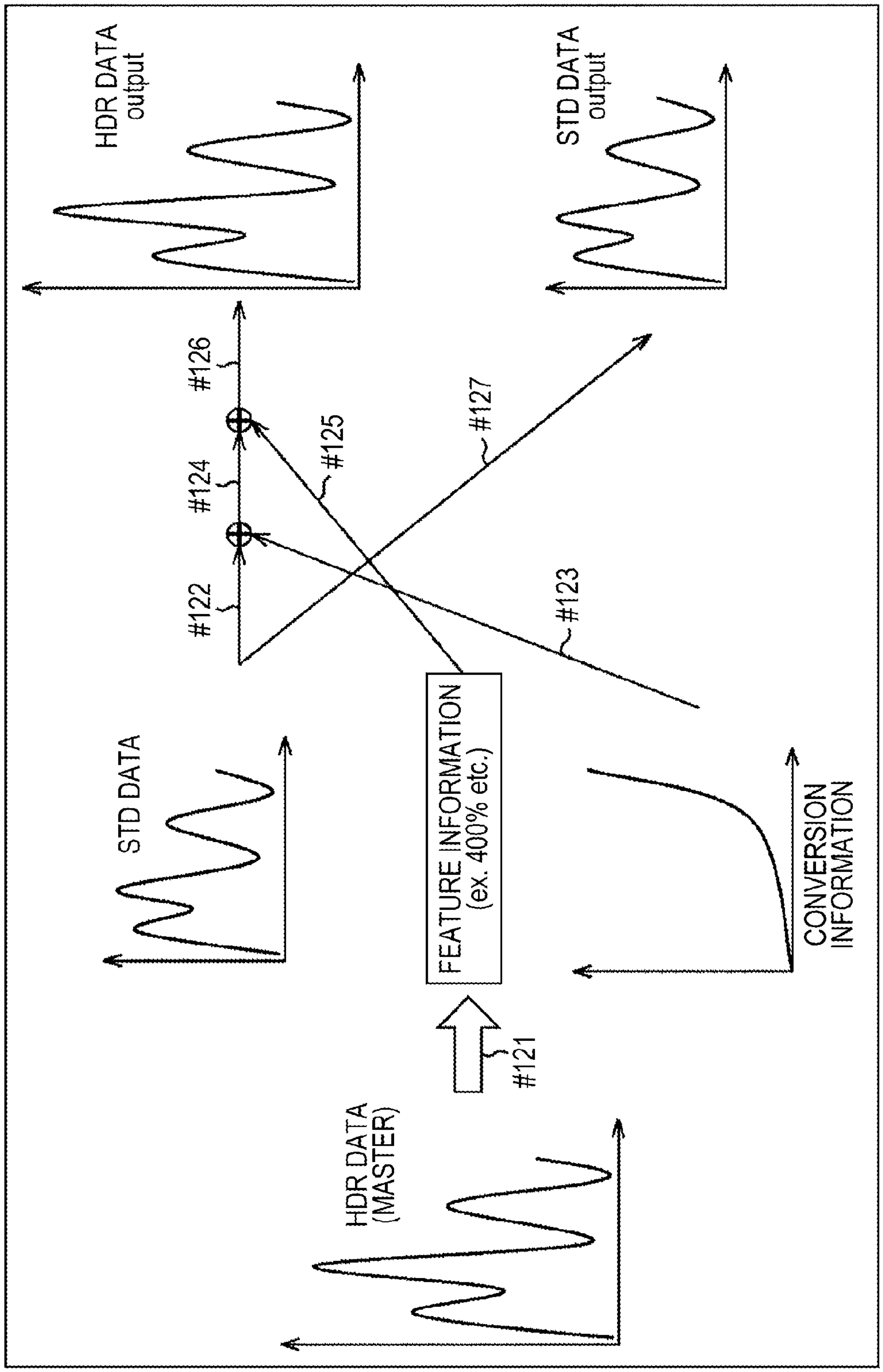
FIG. 5 is a diagram illustrating a flow of signal processing of mode-ii from the time when the HDR data of the master are input to the generation apparatus 1 to the time when data are output from the reproduction apparatus 2.

FIG. 5 is a diagram illustrating a flow of signal processing of mode-ii from the time when the HDR data of the master are input to the generation apparatus 1 to the time when data are output from the reproduction apparatus 2.

As indicated by a white arrow #121, after the HDR data of the master are converted into the STD data, the converted data together with the feature information and conversion information generated by the generation apparatus 1 based on the HDR data of the master are supplied to the reproduction apparatus 2.

In a case where the display apparatus 3 is configured to include an HDR monitor, in the reproduction apparatus 2, the STD data obtained through the decoding are converted into HDR data by using the conversion information as indicated by arrows #122 and #123. In addition, the feature information is added to the HDR data obtained through the conversion of the STD data as indicated by arrows #124 and #125, the HDR data added with the feature information are output to the display apparatus 3 as indicated by an arrow #126.

On the other hand, in a case where the display apparatus 3 is configured to include an STD monitor, in the reproduction apparatus 2, the STD data obtained through the decoding are output to the display apparatus 3 as indicated by an arrow #127.

In this manner, in the mode-ii, the HDR data of the master are converted into STD data, and the STD data are stored in the MP4 file. In addition, according to the performance of the display apparatus 3 which is to be the output destination, it is switched whether the STD data obtained through the decoding are converted into the HDR data and are added with the feature information to be output or the STD data are output without changed.

The configurations and operations of the generation apparatus 1 and the reproduction apparatus 2 described heretofore will be described later in detail.

<Configuration of Access Unit in HEVC Scheme>

Figure 6:
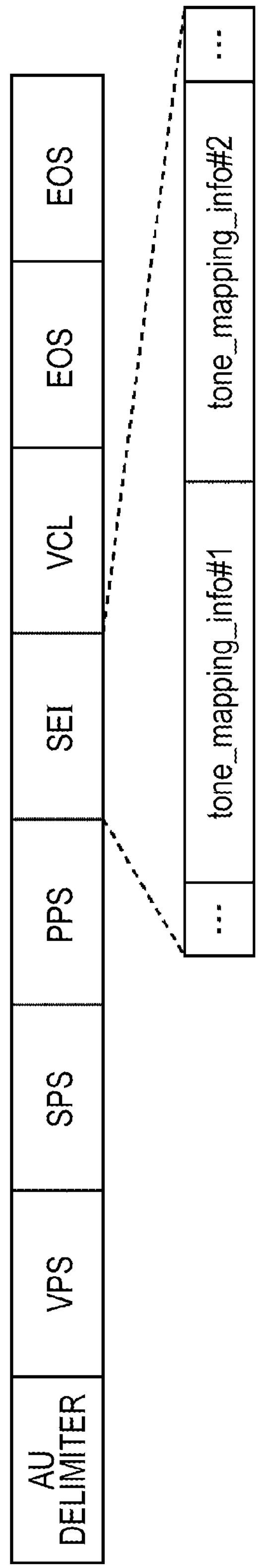
FIG. 6 is a diagram illustrating a configuration of an HEVC-scheme access unit.

FIG. 6 is a diagram illustrating a configuration of an access unit in accordance with an HEVC scheme.

The video stream in accordance with the HEVC scheme is configured with access units, each of which is a group of NAL (Network Abstraction Layer) units. One access unit includes, for example, video data of one picture.

As illustrated in FIG. 6, one access unit is configured with an AU delimiter (Access Unit delimiter), a VPS (Video Parameter Set), an SPS (Sequence Parameter Set), a PPS (Picture Parameter Set), an SEI, a VCL (Video Coding Layer), an EOS (End of Sequence), and an EOS (End of Stream).

The AU delimiter represents the front of the access unit. The VPS includes meta data representing content of a bit stream. The SPS includes information such as a picture size and a CTB (Coding Tree Block) size which needs to be referred to by the HEVC decoder through a sequence decoding process. The PPS includes information which needs to be referred to by the HEVC decoder in order to perform a picture decoding process.

The SEI is auxiliary information including timing information of each picture or information on random access, and the like. The video stream in accordance with the HEVC scheme may include feature information and conversion information as tone_mapping_info which is one of the SEIs. The tone_mapping_info is allocated with tone_map_id as identification information identifying the tone_mapping_info.

The VCL is encoded data of one picture. The EOS (End of Sequence) represents the end position of a sequence, and the EOS (End of Stream) represents the end position of a stream.

<tone_mapping_info>

FIG. 7 is a diagram illustrating syntax of tone_mapping_info regulated in accordance with the HEVC scheme.

Brightness or color of the image obtained through the decoding is converted by using the tone_mapping_info in accordance with the performance of the monitor which is an output destination of the image. In addition, the row numbers and colons (:) in the left side of FIG. 7 do not constitute the syntax.

In the second row, tone_map_id is identification information of the tone_mapping_info. In the eighth row, tone_map_ model_id represents a model (conversion rule) of the tone map which is to be used for conversion.

On the syntax of the tone_mapping_info, the tone_map_model_id may have values of 0, 1, 2, 3, and 4.

The tone_mapping_info (hereinafter, appropriately abbreviated to TMI) of which tone_map_model_id has a value of any one of 0, 1, 2, and 3 corresponds to the conversion information, and the TMI of which tone_map_model_id has a value of 4 corresponds to the feature information.

In addition, in accordance with the HEVC scheme, with respect to the TMI as the conversion information, the tone_map_model_id may be allowed to have 0, 2, or 3. In the embodiment, the tone_map_model_id of the TMI as the conversion information is assumed to have a value of any one of 0, 2, and 3.

The generation apparatus 1 includes the HDR information, that is, both of the conversion information and the feature information in the MP4 file. Therefore, in the generation apparatus 1, at least one of the TMIs of which tone_map_model_id has a value of any one of 0, 2, and 3 is generated as the conversion information, and at least one of the TMIs of which tone_map_model_id has a value of 4 is generated at the feature information.

The ninth to eleventh rows in FIG. 7 are description for tone_map_model_id=0. In a case where tone_map_model_id=0, a min_value and a max_value are described.

The fifteenth to seventeenth rows in FIG. 7 are description for tone_map_model_id=2. In a case where tone_map_model_id=2, start_of_coded_interval[i] having the same number as that of max_target_data and representing a step function is described.

The eighteenth to twenty third rows in FIG. 7 are description for tone_map_model_id=3. In a case where tone_map_model_id=3, coded_pivot_value[i] and target_pivot_value[i] having the numbers designated by num_pivots representing and a polygonal line function are described.

The twenty fourth to thirty ninth rows in FIG. 7 are description for tone_map_model_id=4. Among the information on tone_map_model_id=4, for example, ref_screen_luminance_white, extended_range_white_level, nominal_black_level_code_value, nominal_white_level_code_value, and extended_white_level_code_value are parameters constituting the feature information.

FIG. 8 is a diagram illustrating a relationship between the TMI to which each value is set as tone_map_model_id and the conversion information and the feature information.

As illustrated in FIG. 8, the TMI to which the value of any one of 0, 2, and 3 is set as tone_map_model_id corresponds to the conversion informational, and the TMI to which the value of 4 is set as tone_map_model_id corresponds to the feature information.

Figure 9:
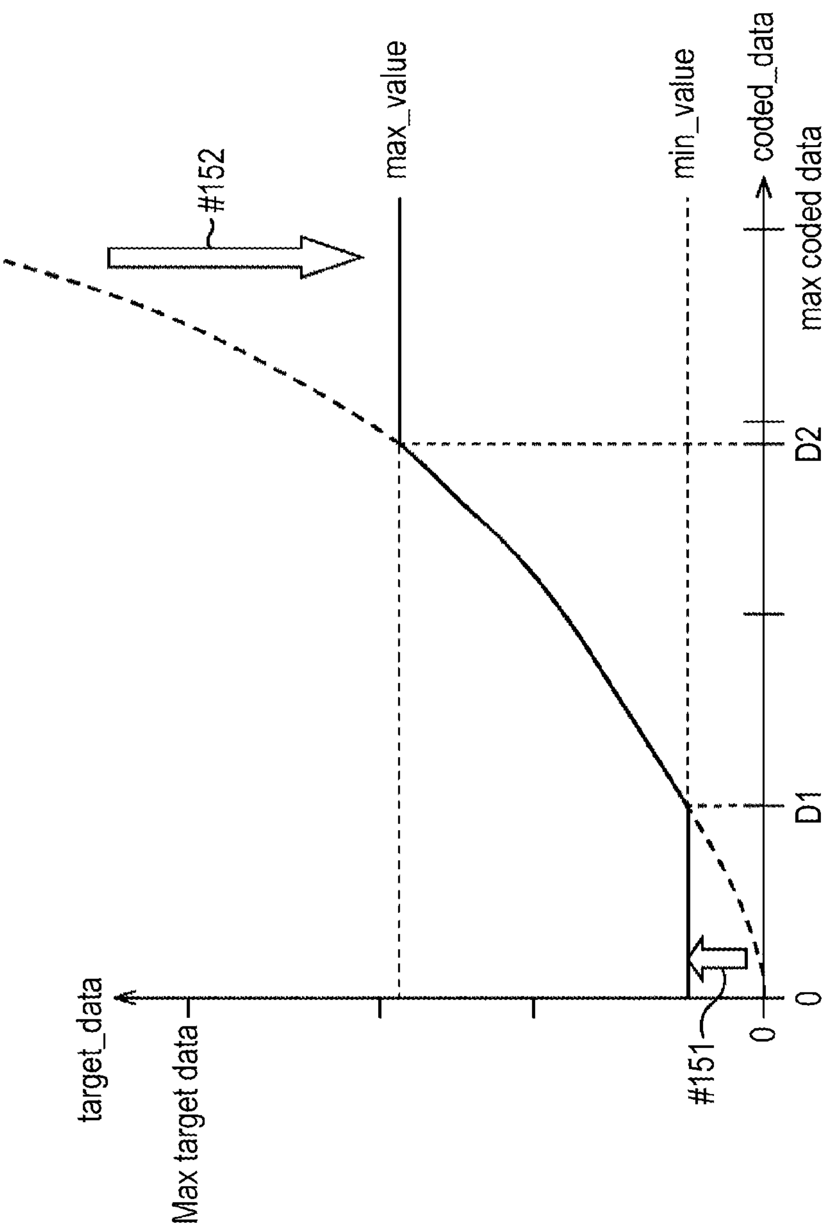
FIG. 9 is a diagram illustrating an example of a tone curve as a conversion rule represented by tone_mapping_info having tone_map_model_id=0 as conversion information.

FIG. 9 is a diagram illustrating an example of a tone curve as a conversion rule represented by the tone_mapping_info having tone_map_model_id=0 as the conversion information.

The horizontal axis in FIG. 9 represents coded_data (before-conversion RGB value), and the vertical axis represents target_data (after-conversion RGB value). In the case of using the tone curve of FIG. 9, the RGB values which are lower than the value D1 are converted into the RGB values represented by the min_value as indicated by a white arrow #151. In addition, the RGB values which are equal to or higher than the value D2 (>D1) are converted into the RGB values represented by the max_value as indicated by a white arrow #152.

In the conversion using the TMI having tone_map_model_id=0, although there are no luminance over the max_value and no luminance below the min_value (luminance represented by the RGB values), the load of the conversion process is decreased.

Figure 10:
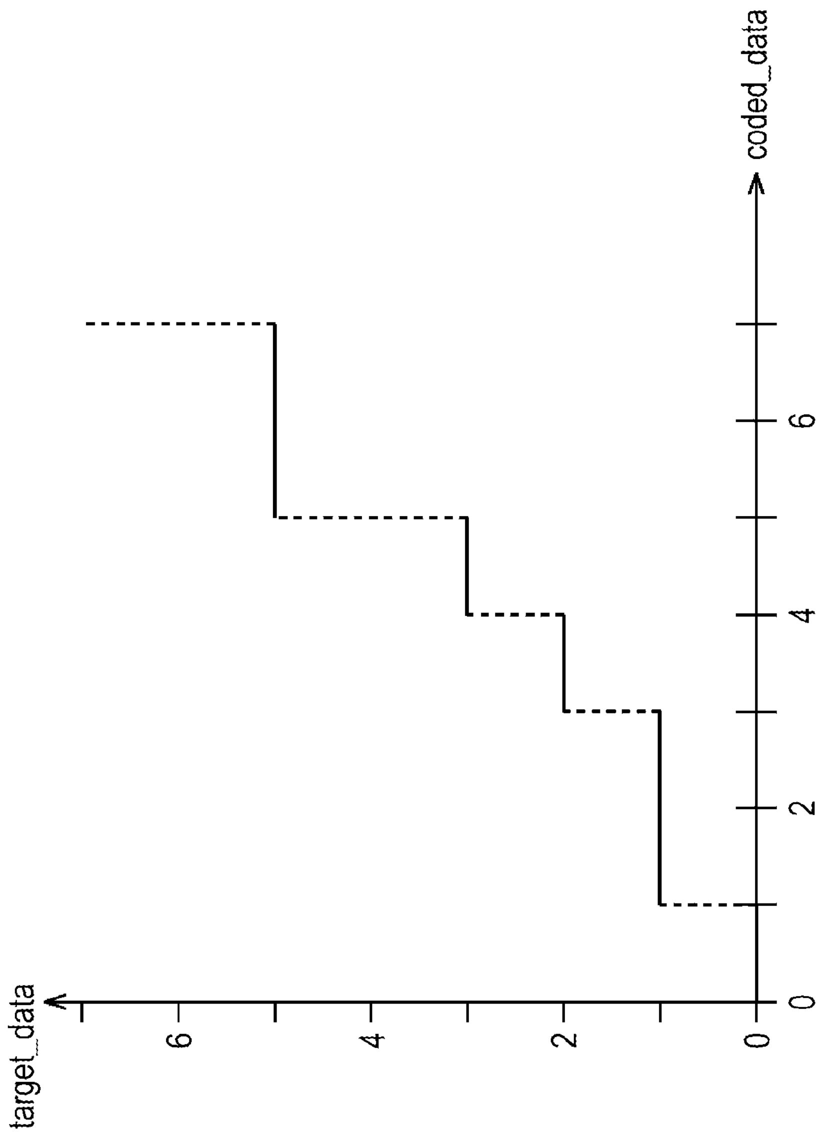
FIG. 10 is a diagram illustrating an example of a step function as a conversion rule represented by TMI having tone_map_model_id=2 as conversion information.

FIG. 10 is a diagram illustrating an example of a step function as a conversion rule represented by the TMI having tone_map_model_id=2 as the conversion information.

In the case of using the step function of FIG. 10, for example, coded_data=5 is converted into target_data=3.

Although the TMI having tone_map_model_id=2 has a large data amount, the load of the conversion process is decreased.

Figure 11:
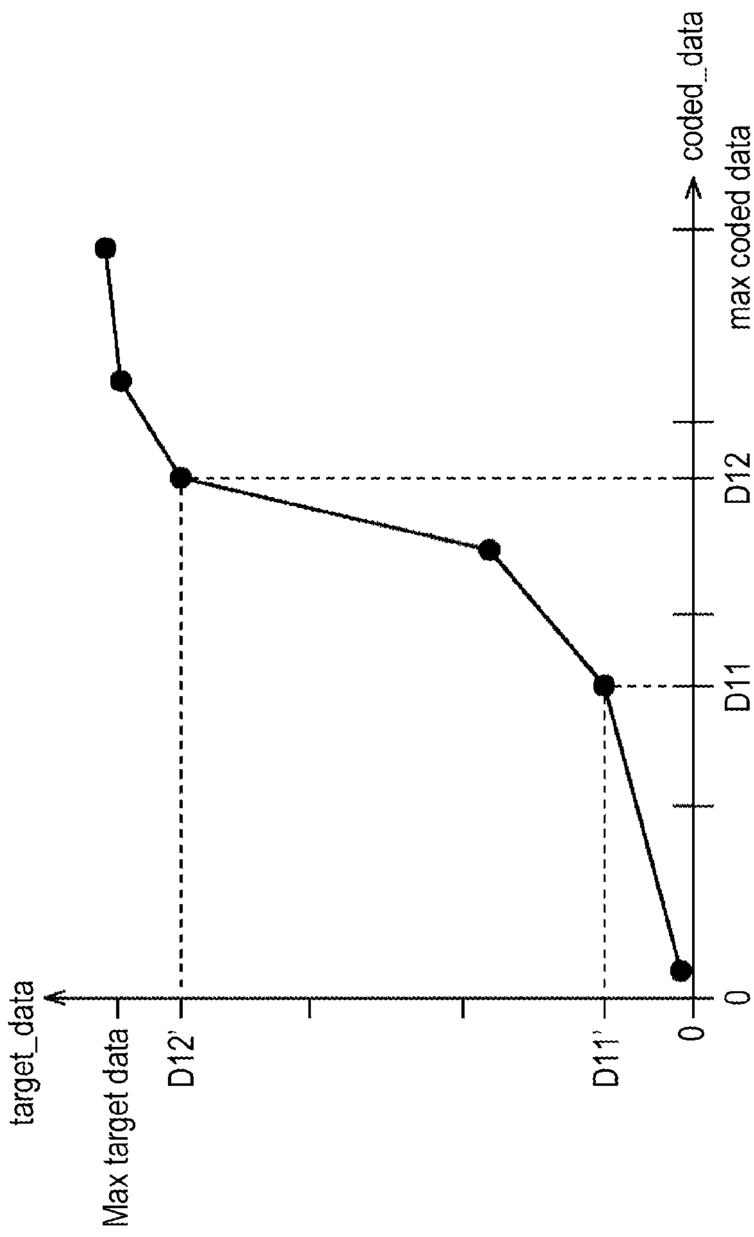
FIG. 11 is a diagram illustrating an example of a polygonal line function as a conversion rule represented by TMI having tone_map_model_id=3 as conversion information.

FIG. 11 is a diagram illustrating an example of a polygonal line function as a conversion rule represented by the TMI having tone_map_model_id=3 as the conversion information.

In the case of using the polygonal line function of FIG. 11, for example, coded_data=D11 is converted into target_data=D11', and coded_data=D12 is converted into target_data=D12'.

Figure 12:
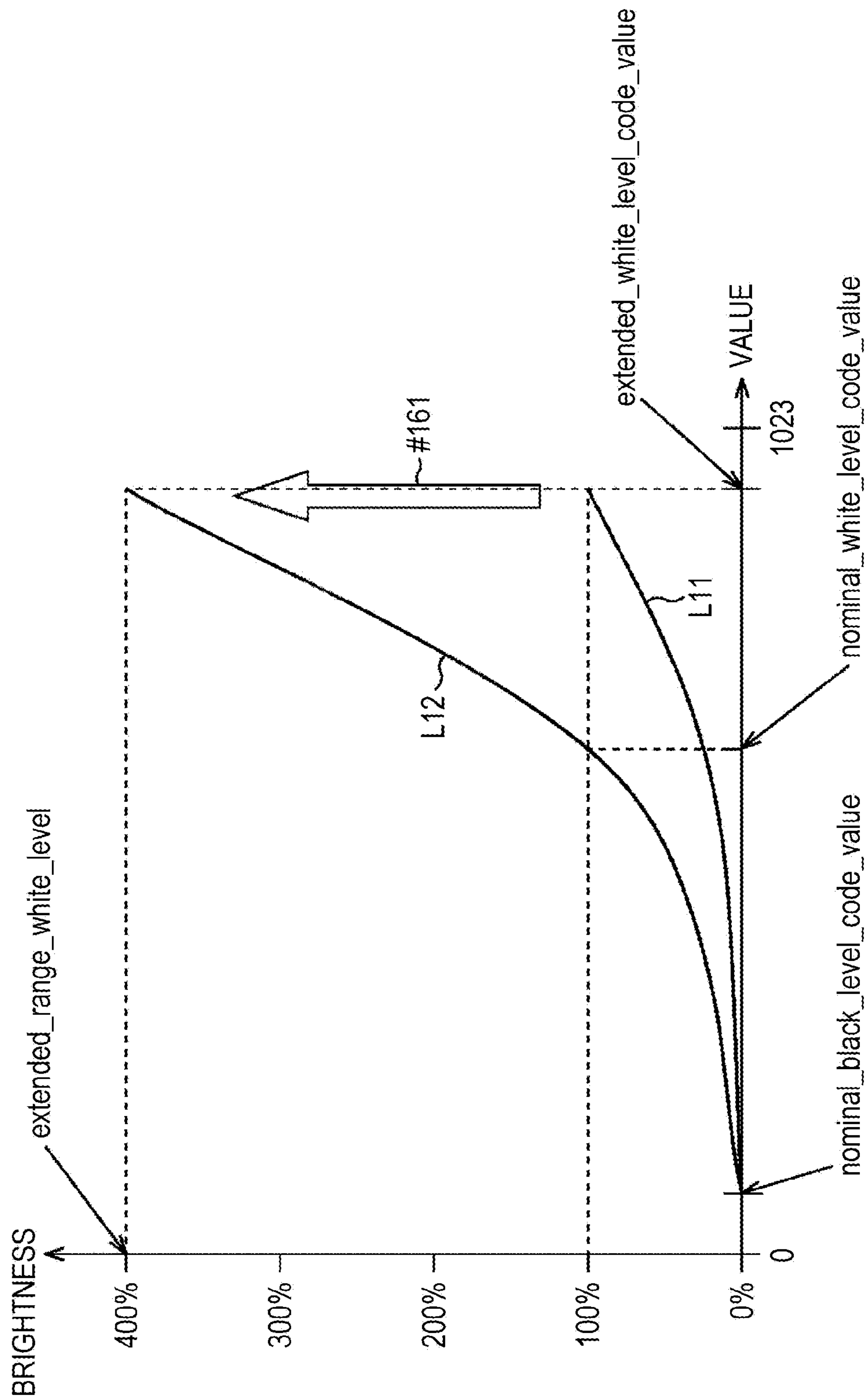
FIG. 12 is a diagram illustrating an example of each piece of information included in feature information.

FIG. 12 is a diagram illustrating an example of each piece of information included in the feature information.

The horizontal axis in FIG. 12 represents a luminance value. In a case where the bit length is 10 bits, the luminance value has a value of 0 to 1023. The vertical axis in FIG. 12 represents brightness. A curve L11 represents a relationship between luminance values and brightness of a monitor having standard luminance. The dynamic range of the monitor having the standard luminance is 0 to 100%.

ref_screen_luminance_white (FIG. 7) represents brightness (maximum brightness of the STD image) ($cd/m^2$) of a standard monitor. Extended_range_white_level represents brightness (maximum brightness of the HDR image) of an extended dynamic range. In the case of the example of FIG. 12, 400 is set as the value of the extended_range_white_level.

The nominal_black_level_code_value indicates the luminance value of black (brightness 0%), and the nominal_white_level_code_value indicates the luminance value of white (brightness 100%) of a monitor having standard luminance. The extended_white_level_code_value indicates the luminance value of white in the extended dynamic range.

In the case of the example of FIG. 12, as indicated by a white arrow #161, the dynamic range of 0 to 100% is extended to the dynamic range of 0 to 400% according to the value of the extended_range_white_level. In addition, the luminance value corresponding to the brightness of 400% is indicated by the extended_white_level_code_value.

With respect to the features of the luminance of the HDR data, a value of nominal_black_level_code_value, a value of nominal_white_level_code_value, and a value of extended_white_level_code_value become the features represented by a curve L12 taking brightness 0%, 100%, and 400%, respectively.

In this manner, the TMI to which the value of 4 is set as the tone_map_model_id represents the features of the luminance of the HDR data of the master.

<MP4 File>

Figure 13:
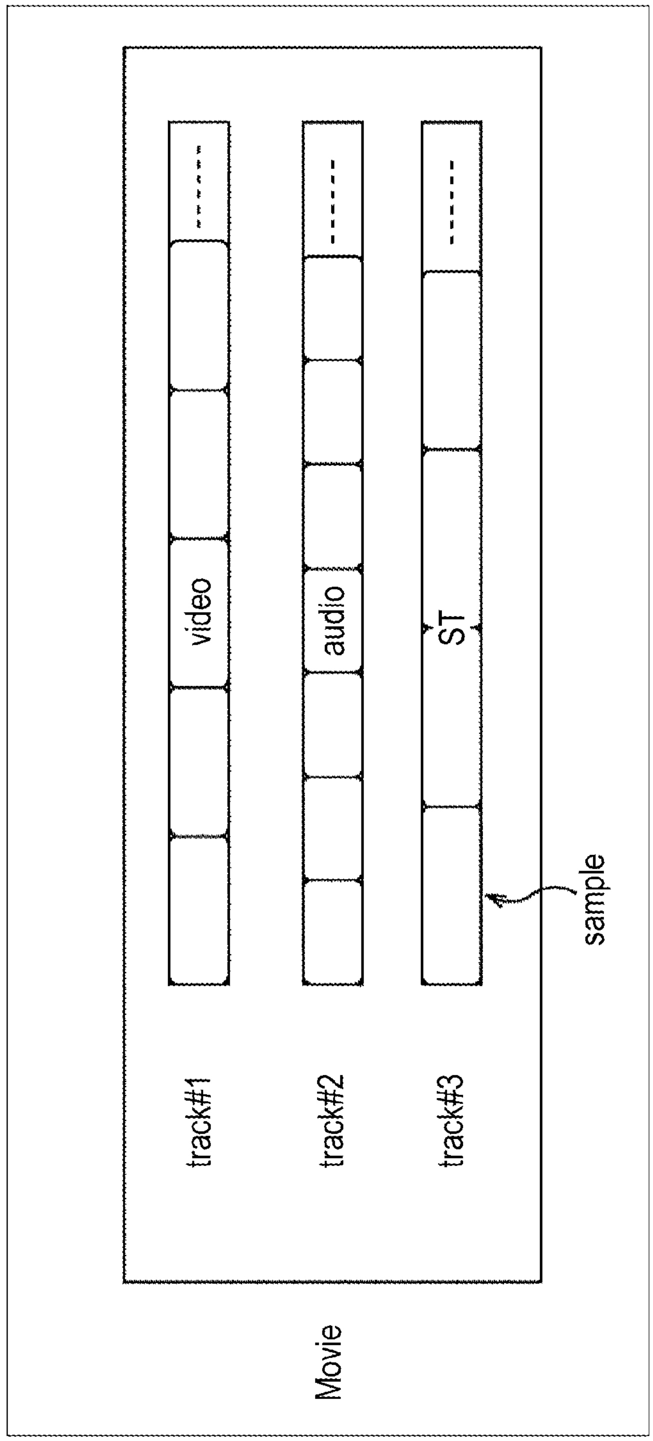
FIG. 13 is a diagram illustrating an example of a Movie of an MP4 file.

FIG. 13 is a diagram illustrating an example of a Movie of an MP4 file.

Herein, details of the MP4 file are regulated in ISO/IEC ((International Organization for Standardization/International Engineering Consortium)) 14496-12.

In the MP4 file, a set of the media data such as a video, an audio, or an ST (subtitle) as a reproduction object is referred as to a Movie, and the Movie is configured with one or more tracks.

The media data (data stream (for example, es (elementary stream))) of independent one of the video, the ST, and the like as the reproduction object may constitute one track, and one or more tracks included in the Movie may be reproduced simultaneously.

In FIG. 13, the Movie is configured with three tracks #1, #2, and #3. In addition, the track #1 is configured with a data stream of a video; track #2 is configured with a data stream of one-channel audio accompanying the video; and the track #3 is configured with a data stream of one-channel ST overlapping the video.

The media data of each track are configured with samples.

A sample denotes a first unit (access unit) in the case of accessing the media data in the MP4 file. Therefore, it is not possible to access the media data in the MP4 file in more detailed units than the sample.

With respect to the media data of a video, for example, 1 frame (or 1 field) or the like becomes 1 sample. In addition, with respect to the media of an audio, for example, 1 audio frame or the like defined by the standard of the media data of the audio becomes 1 sample.

Figure 14:
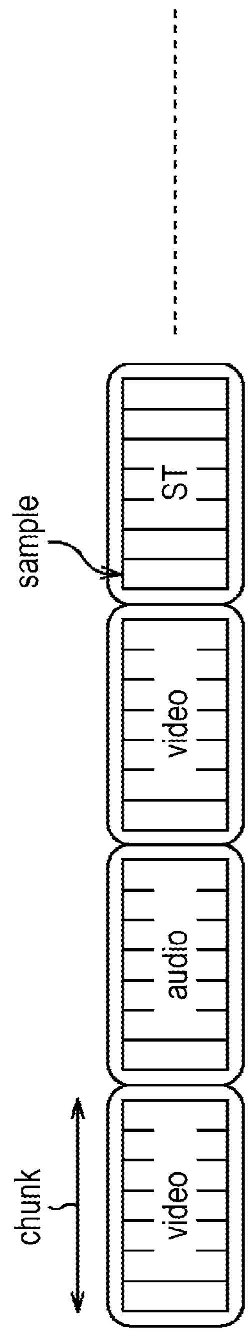
FIG. 14 is a diagram illustrating an example of a logical arrangement of media data (Movie) in an MP4 file.

FIG. 14 is a diagram illustrating an example of logical arrangement of the media data (Movie) in the MP4 file.

The media data are arranged in units, each of which is called chunk.

In a case where plural data, namely, for example, three data streams of the data stream of the video, the data stream of the audio, and the data stream of the ST exist as the media data of the Movie, the plural media data are arranged in the state that the plural data are interleaved in units of a chunk.

Herein, the chunk is a set of one or more samples which are arranged at logically consecutive addresses.

Figure 15:
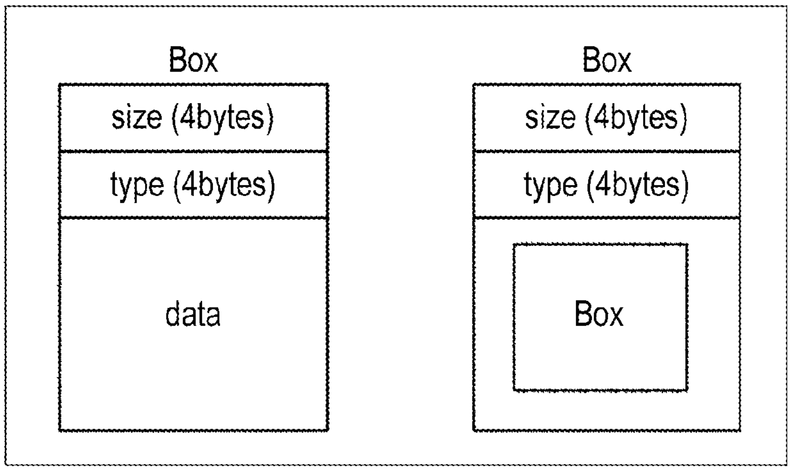
FIG. 15 is a diagram illustrating a data structure of an MP4 file.

FIG. 15 is a diagram illustrating a data structure of an MP4 file.

The MP4 file is configured in units called boxes as containers storing data and has a structure called a box structure.

The box includes 4-byte 'size' (box size), 4-byte 'type' (box type), and actual data (data).

The 'size' represent the size of the entire box, and the 'type' represents the type of the actual data in the box.

As the actual data, for example, data of the above-described media data themselves and other boxes may be employed.

Namely, the box may include a box as actual data. Therefore, a hierarchical structure may be constructed.

Figure 16:
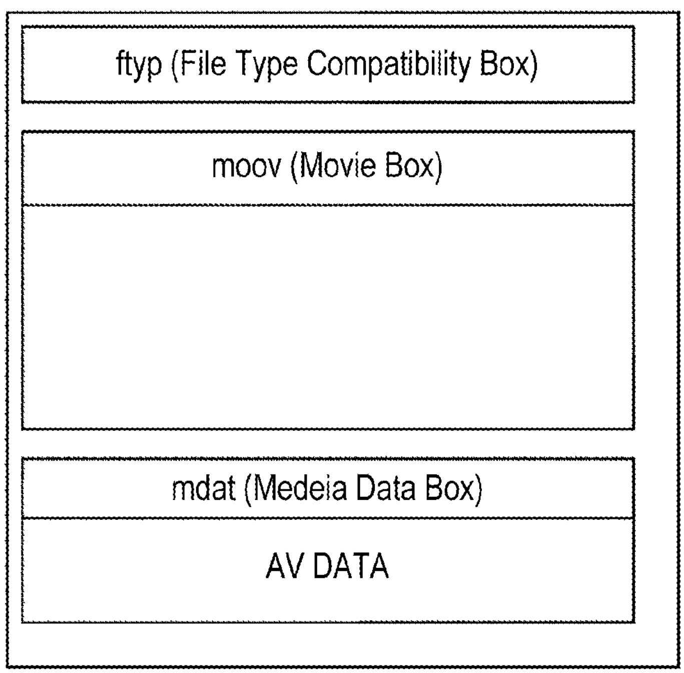
FIG. 16 is a diagram illustrating an example of a data structure of an MP4 file in which media data are stored.

FIG. 16 is a diagram illustrating an example of the data structure of the MP4 file stored in the media data.

In FIG. 16, the MP4 file is configured with an ftyp box (File Type Compatibility Box), a moov box (Movie Box), and an mdat box (Media Data Box).

The ftyp box includes information of a file format, namely, for example, information that the file is an MP4 file, a version of the box, a name of a maker producing the MP4 file, and the like.

The moov box includes meta data such as time axis or address for managing the media data.

The mdat box includes media data (AV data).

Figure 17:
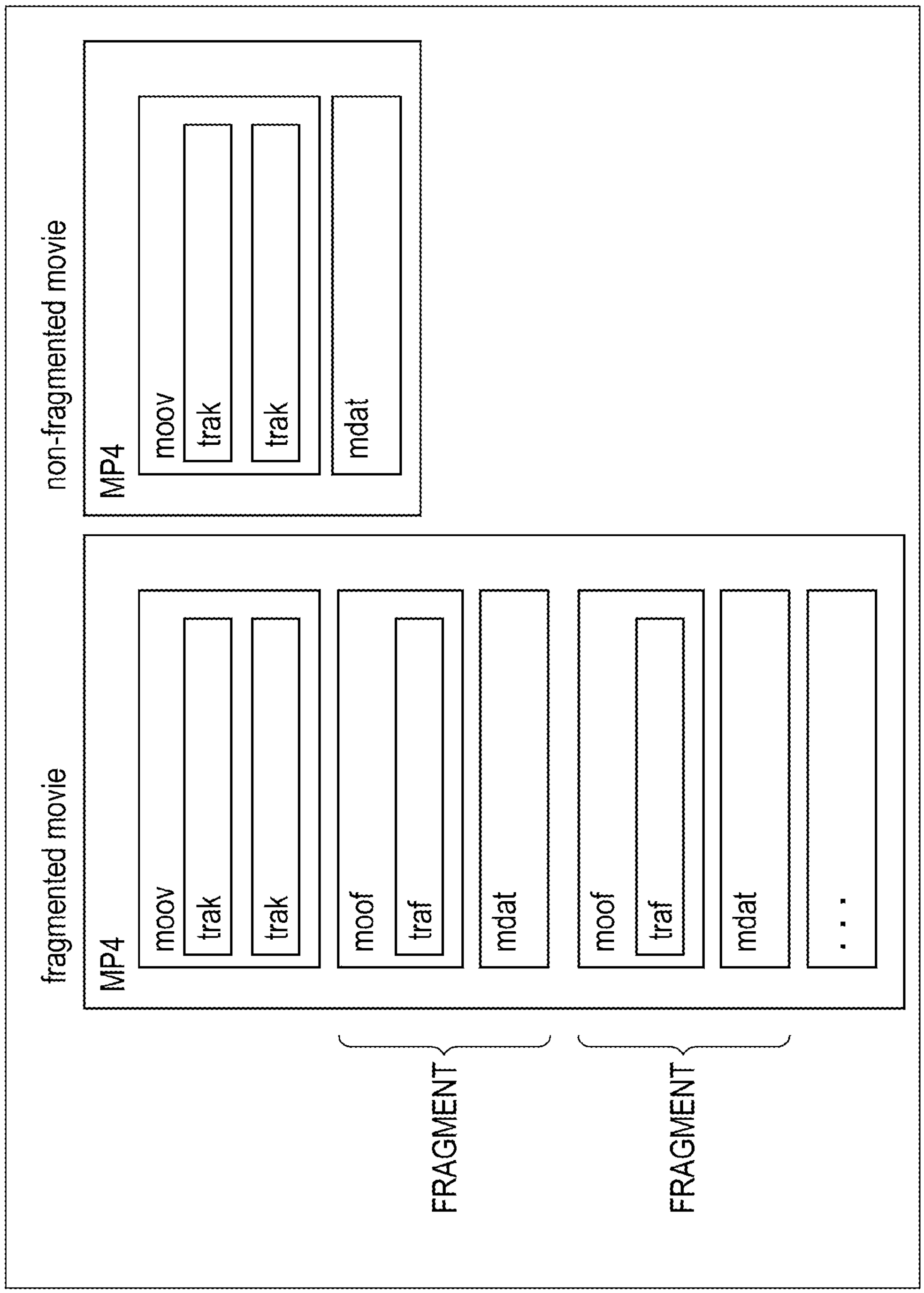
FIG. 17 is a diagram illustrating an example of an MP4 file of a fragmented movie and an example of an MP4 file of a non-fragmented movie.

FIG. 17 is a diagram illustrating an example of an MP4 file of a fragmented movie and an example of an MP4 file of a non-fragmented movie.

The MP4 file of the fragmented movie is configured to include a moov box (movie box) (MovieBox), a moof box (movie fragment box) (MovieFragmentBox), and an mdat box (media data box) (MediaDataBox).

The MP4 file of the non-fragmented movie is configured to include a moov box and an mdat box.

Herein, in FIG. 17, the moov box includes a trak box (track box) (TrackBox), and the moof box includes a traf box (track fragment box) (TrackFragmentBox).

The information (for example, display time or the like) required to reproduce the media data (actual data) of the video, the audio, the ST, and the like stored in the mdat box is stored in the moov box and the moof box.

Independent data sequence information (for example, display size or the like) or the like for each of the data of the track (data of the video, the audio, the ST, or the like) is stored in the trak box and the traf box.

The media data (actual data) such as the video, the audio, and the ST are stored in the mdat box.

A set of the moof box and the mdat box is called a fragment. The MP4 file of the fragmented movie is configured with the moov box and one or more fragments and is suitable for streaming.

On the other hand, the MP4 file of the non-fragmented movie does not have a fragment and, as described above, the MP4 file includes the moov box and the mdat box.

Figure 18:
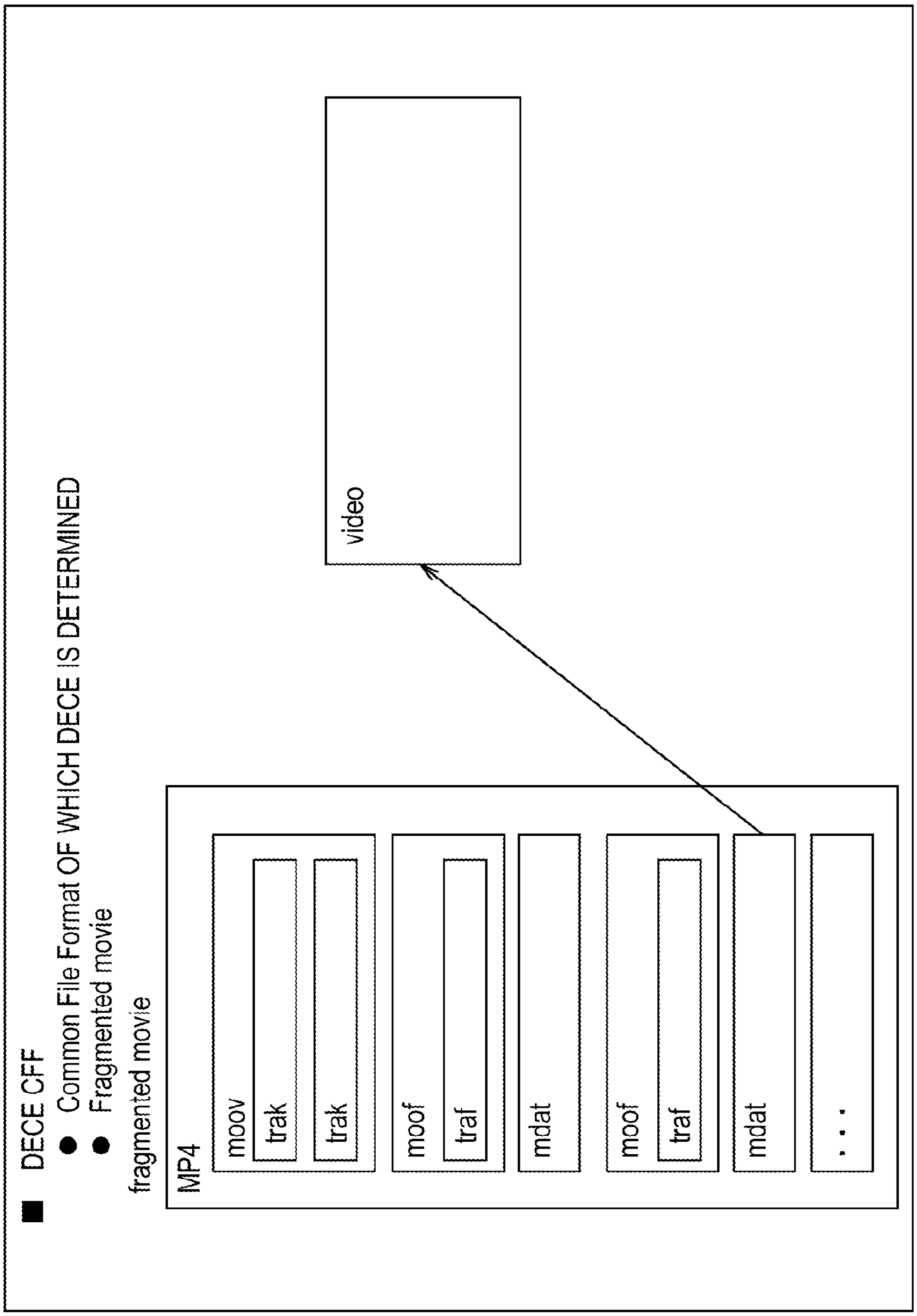
FIG. 18 is a diagram for describing a DECE (Digital Entertainment Content Ecosystem) CFF (Common File Format).

FIG. 18 is a diagram for describing DECE (Digital Entertainment Content Ecosystem) CFF (Common File Format).

The DECE CFF is a file format which is based on the MP4 file and is regulated by the DECE and employs the MP4 file of the fragmented movie.

In the MP4 file of the fragmented movie, plural kinds of es (elementary streams) can be stored in the mdat box of one fragment. However, in the DECE CFF, one es is stored in the mdat box of one fragment.

In addition, in the DECE CFF, the es which can be multiplexed in the MP4 file of the fragmented movie is limited.

In the DECE CFF, as the es of the audio which can be multiplexed in the MP4 file of the fragmented movie, there are, for example, AVC audio: MPEG4 (Moving Picture Experts Group)—AAC (Advanced Audio Coding) and Dolby AC-3; and as the es of the ST (subtitle), there is for example, SMPTE (Society of Motion Picture and Television Engineers)—TT (Timed Text).

FIG. 19 is diagram illustrating an example of the data of the ST of SMPTE-TT.

The SMPTE-TT is a standard where a PNG display function is added to TTML (Timed Text Markup Language) which has a specification of XML (Extensible Markup Language) standardized by W3C and regulates a data format of the ST which provides time concept to the XML.

According to the data (document) of the SMPTE-TT of FIG. 19, for example, in an element 1001, a text "subtitle #1 is presented" as the ST is displayed in the time interval from the time "00:00:05:05" to the time "00:00:10:05".

In addition, for example, in an element 1002, a text "subtitle #2 is presented" as the ST is displayed in the time interval from the time "00:00:10:05" to the time "00:00:15:05".

In the embodiment, although the SMPTE-TT is employed as the data (format) of the ST, besides the XML, for example, a format using a markup language other than HTML (HyperText Markup Language), or other arbitrary format may be employed as the data of the ST.

<First Configurational Example of Generation Apparatus 1>

Figure 20:
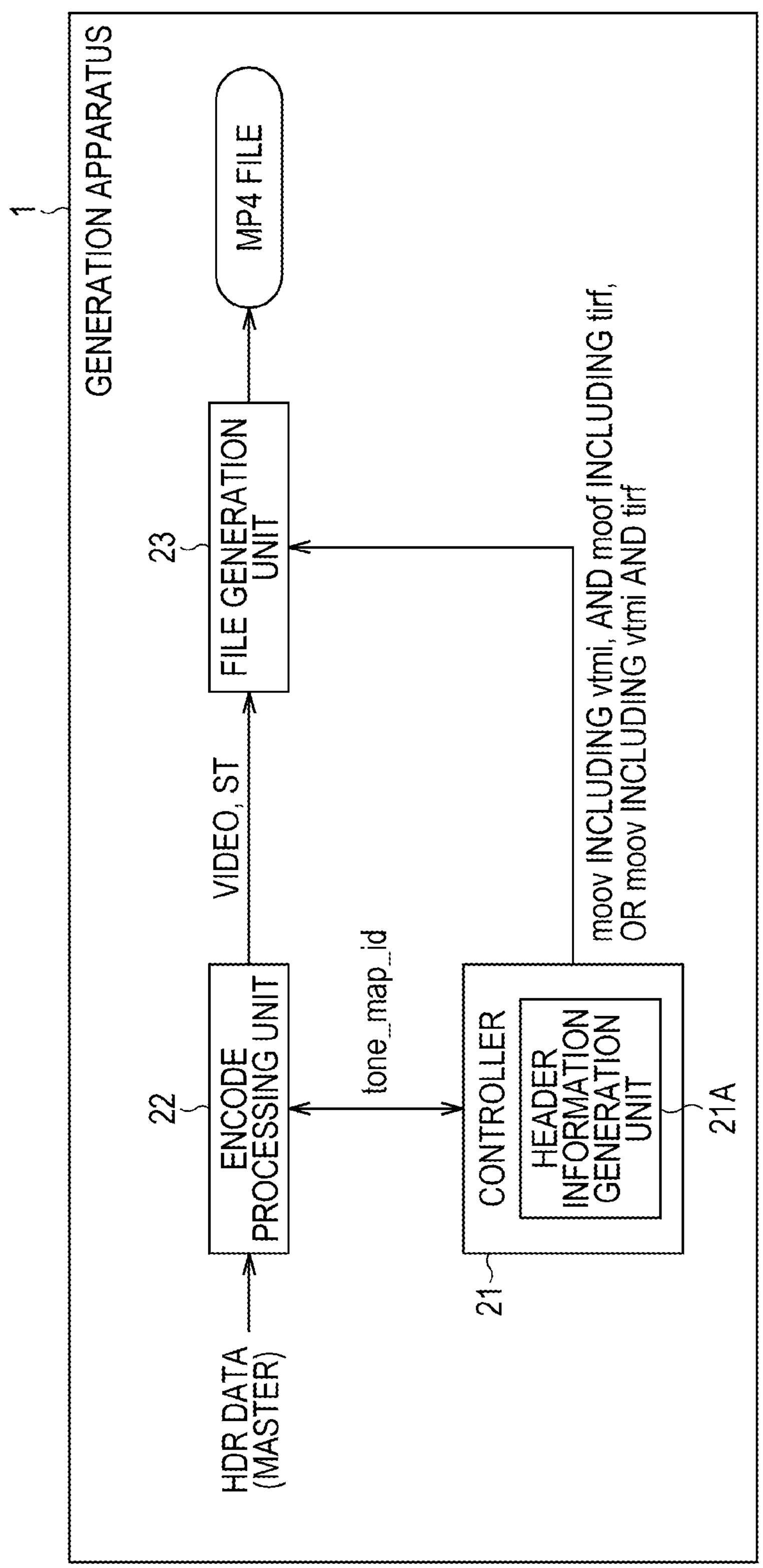
FIG. 20 is a block diagram illustrating a first configurational example of the generation apparatus 1.

FIG. 20 is a block diagram illustrating a first configurational example of the generation apparatus 1 of FIG. 1.

In FIG. 20, the generation apparatus 1 is configured to include a controller 21, an encode processing unit 22, and a file generation unit 23.

In the generation apparatus 1 of FIG. 20, HDR data of a master are input to the encode processing unit 22.

The controller 21 is configured to include a CPU (Central Processing Unit), ROM (Read Only Memory), RAM (Random Access Memory), and the like. The controller 21 controls overall operations of the generation apparatus 1 by executing a predetermined program.

In the controller 21, a predetermined program is executed, so that a header information generation unit 21A is implemented.

The header information generation unit 21A generates a moof box including a tirf box (ToneMappingInformationReferenceBox) which stores tone_map_id supplied by the encode processing unit 22 as tone_mapping_info_id_ref and a moov box including a vtmi box (reference_type is a TrackReferenceTypeBox of "vtmi") as header information and supplies the header information to the file generation unit 23.

Alternatively, the header information generation unit 21A generates a tirf box which stores tone_map_id supplied by the encode processing unit 22 as tone_mapping_info_id_ref and a moov box including a vtmi box as header information and supplies the header information to the file generation unit 23.

The tirf box and the vtmi box will be described later.

The encode processing unit 22 generates a video stream and an ST stream by performing encoding the HDR data of the master and outputs the video stream and the ST stream to the file generation unit 23.

In addition, the encode processing unit 22 supplies tone_map_id of TMI (tone_mapping_info) which is to be applied to the video or the ST to the controller 21 (header information generation unit 21A thereof).

The file generation unit 23 generates an MP4 file which stores the header information supplied by the controller 21 (header information generation unit 21A thereof) and the video stream and the ST stream supplied by the encode processing unit 22 and outputs the MP4 file.

Figure 21:
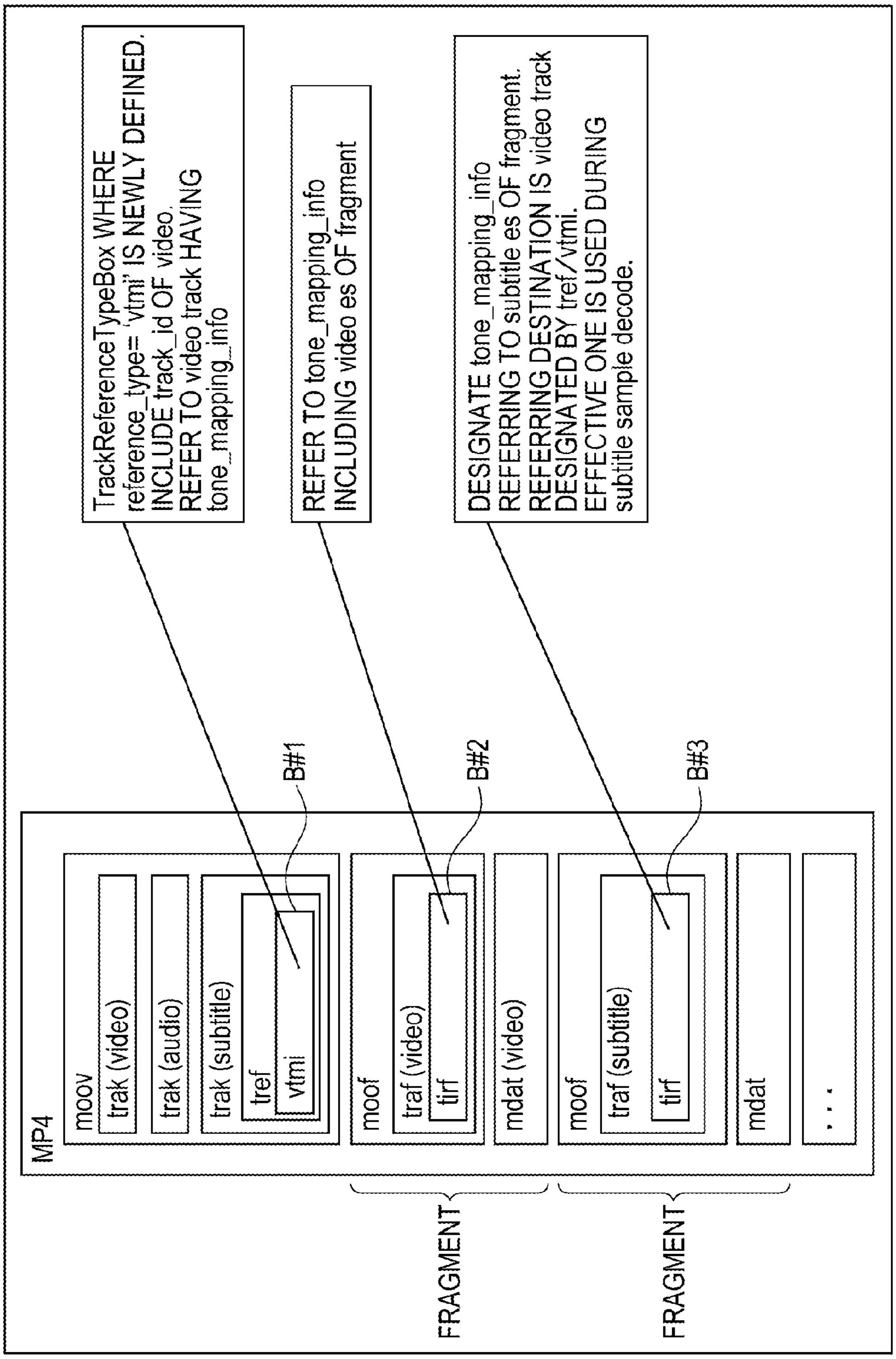
FIG. 21 is a diagram illustrating an example of an MP4 file generated by the generation apparatus 1.

FIG. 21 is a diagram illustrating an example of the MP4 file generated by the generation apparatus 1 of FIG. 20.

The MP4 file of FIG. 21 is an MP4 file of a fragmented movie which includes fragments, and a moon box includes a trak box of a video, a trak box of an audio, and a trak box of an ST.

Therefore, the MP4 file of FIG. 21 is configured to include a track of a video, a track of an audio, and a track of an ST.

Herein, the video stream stored in the MP4 file is a stream obtained by encoding the video, for example, in accordance with the HEVC scheme, and if the video stream is a stream including the TMI, the TMI is included in the track of the video.

The MP4 file of FIG. 21 (MP4 file of FIG. 25 described later is the same) may be applied to a case where the video stream including the TMI (including the same HDR information (feature information and conversion information) as the TMI) such as the video stream which is encoded, for example, in accordance with the AVC scheme other than the video stream which is encoded in accordance with the HEVC scheme is stored in the MP4 file.

The generation apparatus 1 of FIG. 20 generates an MP4 file which can be usefully applied to the track of the ST by referring to the TMI included in the track of the video, for example, from the track of the ST besides the track of the video.

Therefore, a trak box of an ST (subtitle) of a moon box includes a tref box (TrackReferenceBox) including a vtmi box.

The tref box may include the TrackReferenceTypeBox, and however, the vtmi box is a box which is newly defined as a kind of the TrackReferenceTypeBox.

Now, if a track of an ST including the vtmi box is considered to be a target track of interest, the track_id (track_IDs[ ] described later representing the track_id) of the track including the TMI (HDR information) which is to be applied to the target track, namely, herein, the track of the video as track designating information designating the track of the video is stored in the vtmi box included in the track of the ST as the target track.

Therefore, the reference track which is to be referred to as the track including the TMI which is to be applied to the target track may be recognized by the track_id stored in the vtmi box included in the track of the ST as the target track.

In addition, if the track of the video including the TMI is considered to be a target track, the track of the video as the target track becomes a reference track which is to be referred to as the track including the TMI which is to be applied to the track of the video.

In this manner, in a case where the target track is a reference track including the TMI which is to be applied to the target track, with respect to the target track, the storing of the tref box including the vtmi box which stores the track_id of the reference track in the trak box of the target box of the moov box may be omitted.

In this case, in a case where the tref box including the vtmi box does not exist in the trak box of the target box of the moov box, it may be recognized that the target track is a reference track.

In the FIG. 21, the tref box including the vtmi box is not stored in the trak box of the video of the moov box, and therefore, with respect to the track of the video, the track of the video is recognized as a reference track.

Herein, even in a case where the target track is a reference track including the TMI which is to be applied to the target track, the tref box including the vtmi box which stores the track_id of the reference track may be stored in the trak box of the target box of the moov box.

Namely, for example, in FIG. 21, with respect to the track of the video, similarly to the track of the ST, the tref box including the vtmi box which stores the track_id of the track of the video as the reference track may be stored in the trak box of the video of the moov box.

In addition, by determining the track_id of the track which becomes a reference track in advance, the tref box including the vtmi box may be omitted.

In the MP4 file of FIG. 21, the moof box of each track of the video and the ST includes the traf box including the tirf box which stores the tone_mapping_info_id_ref representing the tone_map_id as the HDR designating information designating the TMI which is to be applied to the track.

By referring to the tone_mapping_info_id_ref stored in the tirf box of the target box, the TMI which has the tone_map_id represented by the tone_mapping_info_id_ref is recognized as a TMI which is to be applied to the target track.

In addition, the MP4 file of the fragmented movie includes a moof box for each fragment. Valid TMIs among the TMIs having the tone_map_id represented by the tone_mapping_info_id_ref stored in the tirf box included in the moof box of the fragments are applied to data of some fragments.

The effective TMI is, for example, the newest TMI among the TMIs of which decoding is completed (which is acquired).

As illustrated in FIG. 21, in the MP4 file of the fragmented movie, the tirf box B#2 which stores the tone_mapping_info_id_ref representing the tone_map_id of the TMI which is to be applied to the track of the video is stored in the traf box included in the moof box of the track of the video including the TMI.

In addition, with respect to the track of the ST referring to the TMI included in the track of the video, the vtmi box B#1 storing the track_id of the track of the video as the reference track is stored in the tref box of the trak box of the track of the ST (subtitle) of the moov box.

In addition, with respect to the track of the ST, the tirf box B#3 which stores the tone_mapping_info_id_ref representing the tone_map_id of the TMI (TMI included in the track of the video as the reference track) which is to be applied to the track of the ST is stored in the traf box included in the moof box of the track of the ST.

Therefore, according to the MP4 file of FIG. 21, for example, if the track of the video is considered to be a target track, since the trak box of the video of the moov box does not include a tref box including the vtmi box, it may be recognized that the track of the video which is a target track is a reference track including the TMI which is to be applied to the track of the video.

In addition, it may be recognized that the TMI which has the tone_map_id represented by the tone_mapping_info_id_ref stored in the moof/tarf/tirf box B#2 (tirf box included in the tarf box included in the moof box) of the track of the video which is a target track among the TMIs included in the reference track is a TMI which is to be applied to the target track.

In addition, according to the MP4 file of FIG. 21, for example, if the track of the ST is considered to be a target track, it may be recognized by the track_id stored in the trak/tref/vtmi box B#1 (vtmi box included in the tref box included in the trak box) of the ST of the moon box that the track of the video is a reference track including the TMI which is to be applied to the track of the ST.

In addition, it may be recognized that the TMI which has the tone_map_id represented by the tone_mapping_info_id_ref stored in the moof/tarf/tirf box B#3 of the track of the ST which is a target track among the TMIs included in the reference track is a TMI which is to be applied to the target track.

FIG. 22 is a diagram illustrating definition of the tref box.

As described with reference to FIG. 21, the tref box may include the TrackReferenceTypeBox.

With respect to the TrackReferenceTypeBox, reference_type of the TrackReferenceTypeBox may be arbitrarily defined to be used according to the use of the TrackReferenceTypeBox.

In the embodiment, the "vtmi" is newly defined as the reference_type representing that the TrackReferenceTypeBox is to be used for storing the track_id of the track of the video including the TMI, and the TrackReferenceTypeBox where the reference_type becomes the "vtmi" is used as the vtmi box which stores the track_id of the track of the video including the TMI.

FIG. 23 is a diagram illustrating an example of definition of the TrackReferenceTypeBox as the vtmi box.

The vtmi box includes (stores) track_IDs[ ] representing the track_id.

The track_IDs[ ] is an array variable and can store plural track_ids. Therefore, according to the vtmi box, plural tracks may be designated as the track including the TMI which is to be applied to the track of the ST.

FIG. 24 is a diagram illustrating an example of definition of the tirf box.

The tirf box (tone mapping information reference box) (ToneMappingInformationReferenceBox) is a box which is newly defined as a box which stores the tone_mapping_info_id_ref representing the tone_map_id of the TMI which is to be applied to the track including the tirf box, and the tirf box is stored in the trak box (stbl box (sample table box) stored therein) or the traf box.

In FIG. 24, sample_count is equal to the sample_count stored in the stsz box, the stz2 box, or the trun box and represents the number of samples.

In FIG. 24, for each sample, the number of tone_mapping_info_id_refs which can be stored in the tirf box is only the number of tone_mapping_info_id_ref.

Therefore, according to the tirf box, with respect to one sample, the number of the TMIs having the tone_map_id represented by the tone_mapping_info_id_ref which can be designated as a TMI which is to be applied to the one sample is only the number_of_tone_mapping_info_id_ref.

Figure 25:
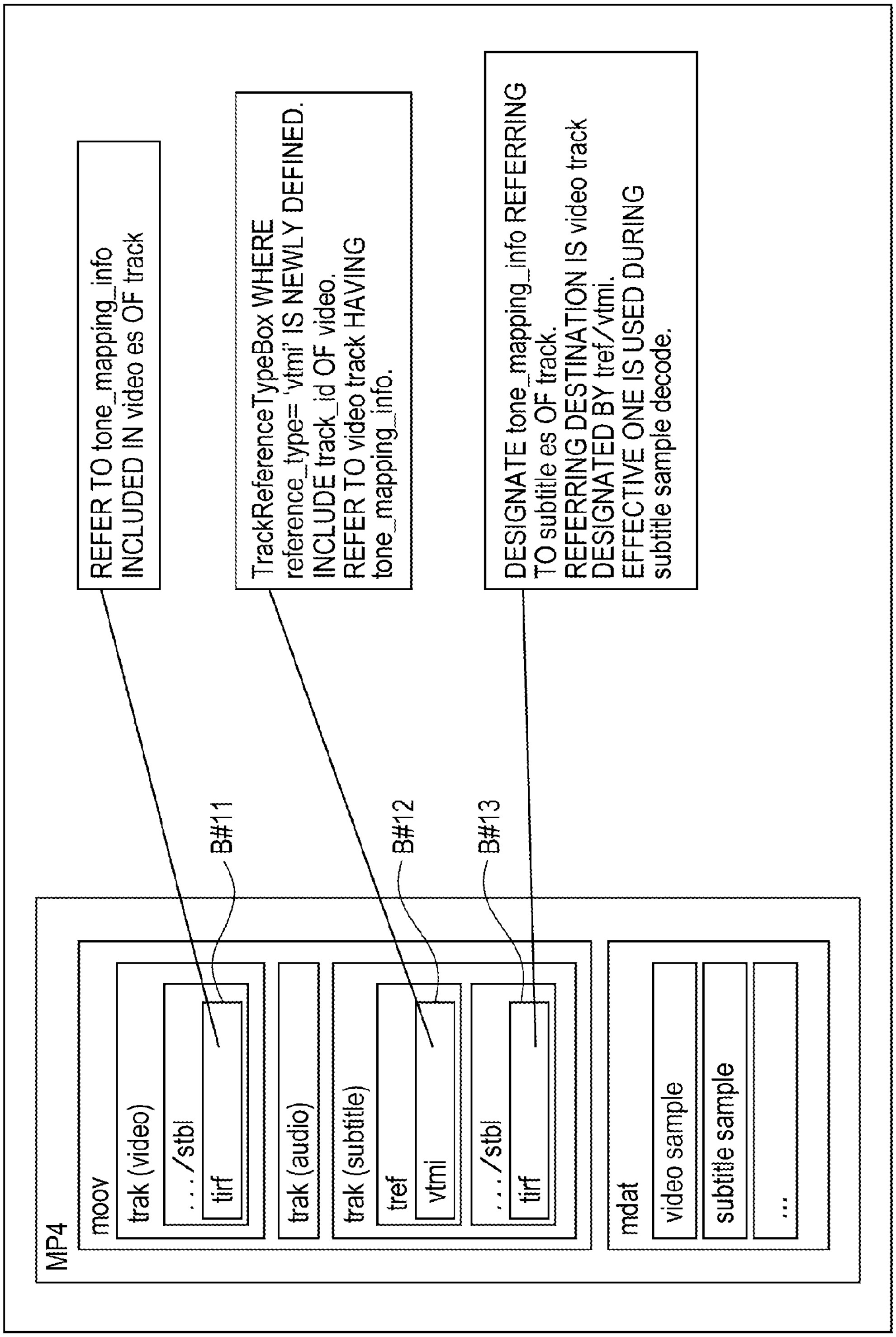
FIG. 25 is a diagram illustrating another example of the MP4 file generated by the generation apparatus 1.

FIG. 25 is a diagram illustrating another example of the MP4 file generated by the generation apparatus 1 of FIG. 20.

The MP4 file of FIG. 25 is an MP4 file of the non-fragmented movie which does not include any fragment, and a moon box includes a trak box of a video, a trak box of an audio, and a trak box of an ST.

Therefore, the MP4 file of FIG. 25 is configured to include a track of a video, a track of an audio, and a track of an ST.

Similarly to FIG. 21, in FIG. 25, the track of the video also includes the TMI, and the TMI included in the track of the video may be applied, for example, to the track of the ST besides the track of the video.

Namely, in the MP4 file of the non-fragmented movie, as illustrated in FIG. 25, the tirf box B#11 which stores the tone_mapping_info_id_ref representing the tone_map_id of the TMI which is to be applied to the track of the video is stored in the stbl box included in the trak box of the track of the video including the TMI of the moov box.

In addition, with respect to the track of the ST referring to the TMI included in the track of the video, the vtmi box B#12 which stores the track_IDs[ ] (FIG. 23) representing the track_id of the track of the video as the reference track is stored in the tref box included in the trak box of the track of the ST of the moov box.

In addition, with respect to the track of the ST, the tirf box B#13 which stores the tone_mapping_info_id_ref representing the tone_map_id of the TMI which is to be applied to the track of the ST (TMI included in the track of the video as the reference track) is stored in the stbl box included in the trak box of the track of the ST of the moov box.

Therefore, according to the MP4 file of FIG. 25, if the track of the video is considered to be a target track, since the trak box of the video of the moov box does not include a tref box including the vtmi box, it is recognized that the track of the video which is a TMI which is to be applied to the target track is a reference track including the track of the video.

In addition, since the trak/stbl box of the video of the moov box (stbl box included in the trak box) includes the tirf box B#11, it is recognized that the TMI which has the tone_map_id represented by the tone_mapping_info_id_ref stored in the trak/stbl/tirf box B#11 (tirf box included in the stbl box included in the trak box) of the video among the TMIs included in the reference box (herein, the track of the video) is a TMI which is to be applied to the target track.

In addition, in FIG. 25, for example, if the track of the ST is considered to be a target track, since the trak/tref/vtmi box B#12 of the ST of the moov box exists, it is recognized by the track_id included in the trak/tref/vtmi box B#12 that the track of the video is a reference track including the TMI which is to be applied to the track of the ST.

In addition, since the tark/stbl/tirf box B#13 of the track of the ST which is a target box of the moov box exists, it is recognized that the TMI which has the tone_map_id represented by the tone_mapping_info_id_ref stored in the tark/stbl/tirf box B#13 of the track of the ST which is a target track among the TMIs included in the reference track is a TMI which is to be applied to the target track.

In addition, in the MP4 file of the non-fragmented movie, an effective TMI among the TMIs having the tone_map_id represented by the tone_mapping_info_id_ref stored in the tirf box of the target track is applied to the target track.

As described above, the effective TMI is, for example, the newest TMI among the TMIs of which decoding is completed (which is acquired).

As described above, in the generation apparatus 1 of FIG. 20, since the MP4 file which stores the track of the video including the TMI as the HDR information and the track of the ST including the tone_mapping_info_id_ref as the HDR designating information designating the TMI which is to be applied to the track of the ST among the TMIs included in the track of the video is generated, the TMI included in the track of the video can be diverted to be used to the ST, so that there is no need to separately add the TMI to the ST.

Therefore, the video including the TMI having an m2ts format recorded in, for example, a Blu-ray (registered trademark) disk and the ST reproduced together with the video can be converted into the MP4 file without separately adding the TMI to the ST.

As a result, the introduction of the TMI to the MP4 file is facilitated, so that it is possible to increase the chance that a user enjoys an HDR image such as an HDR video or an HDR ST.

<Configurational example of Encode Processing Unit 22>

Figure 26:
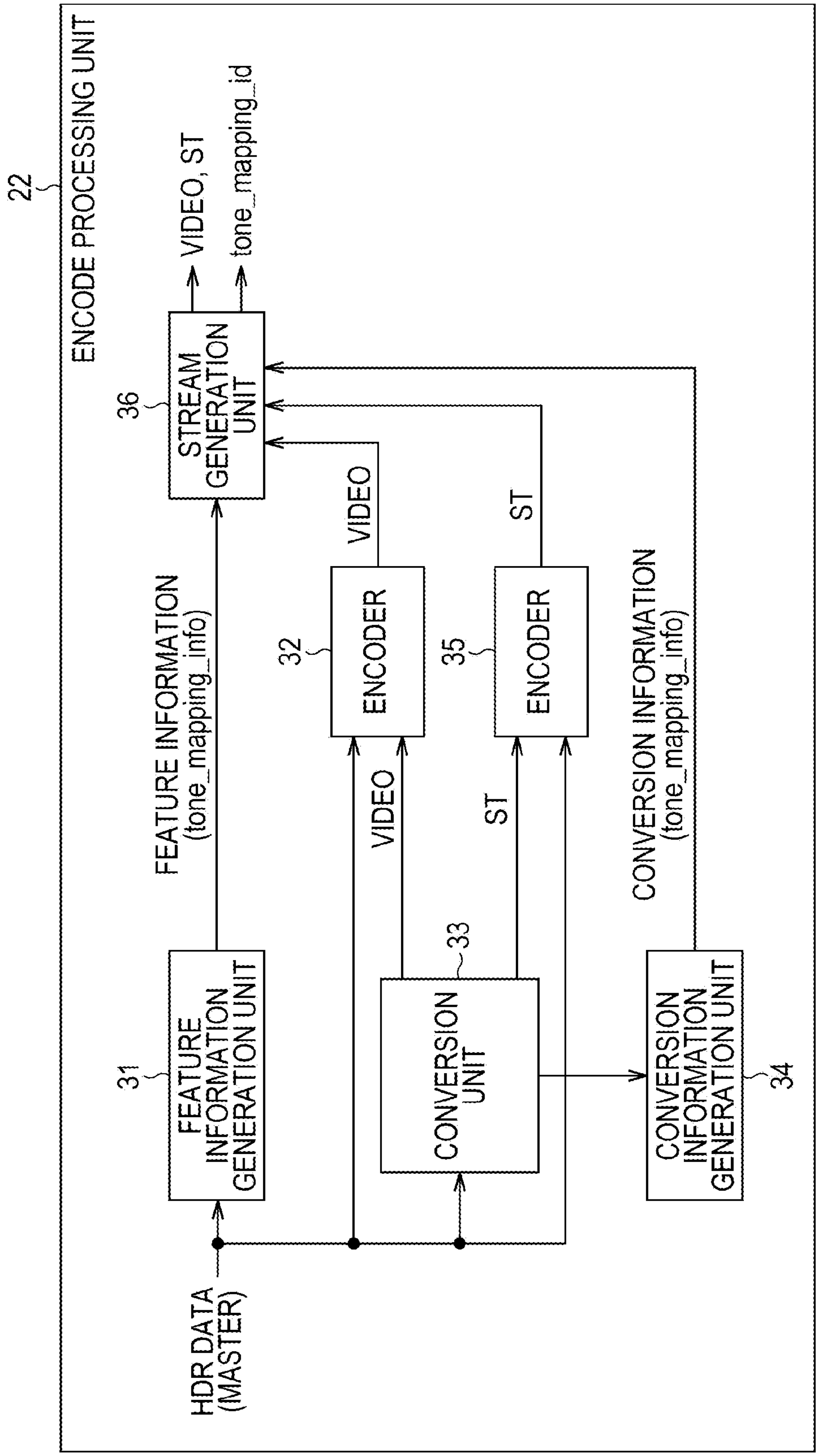
FIG. 26 is a block diagram illustrating a configurational example of an encode processing unit 22.

FIG. 26 is a block diagram illustrating a configurational example of the encode processing unit 22 of FIG. 20.

The encode processing unit 22 is configured to include a feature information generation unit 31, an encoder 32, a conversion unit 33, a conversion information generation unit 34, an encoder 35, and a stream generation unit 36.

The feature information generation unit 31 detects the luminance of the HDR data of the master input to the encode processing unit 22 to generate a TMI (tone_mapping_info) as the feature information including the information described with reference to FIG. 12. The feature information generation unit 31 supplies the generated TMI as the feature information to the stream generation unit 36.

In addition, the feature information generation unit 31 detects, for example, the luminance of the HDR video among the HDR data of the master to generate a TMI as the feature information of the video (HDR video). In addition, for example, with respect to the HDR ST, the feature information generation unit 31 employs the TMI as the feature information of the HDR video which is displayed simultaneously with the HDR ST among the HDR data of the master as the TMI as the feature information of the ST (HDR ST).

In a case where the process mode is the mode-i, the encoder 32 encodes the input HDR video of the master, for example, in accordance with the HEVC scheme. In addition, in a case where the process mode is the mode-ii, the encoder 32 encodes the STD video supplied by the conversion unit 33 in accordance with the HEVC scheme. The encoder 32 supplies the encoded data of the HDR video or the encoded data of the STD video to the stream generation unit 36. In addition, the video encode scheme is not limited to the HEVC scheme.

The conversion unit 33 converts the HDR data of the master input the encode processing unit 22 into STD data. The conversion by the conversion unit 33 is performed appropriately according to conversion parameters input by an author. The conversion unit 33 outputs information representing a relationship between the input data and the output data where the RGB signals of the HDR data are set to the input data and the RGB signals of the STD data are set to the output data to the conversion information generation unit 34.

In addition, in a case where the process mode is the mode-ii, the conversion unit 33 supplies the STD video obtained through the conversion of the HDR video to the encoder 32 and supplies the STD ST obtained through the conversion of the HDR ST to the encoder 35.

The conversion information generation unit 34 generates a TMI as the conversion information based on the information supplied by the conversion unit 33.

For example, in a case where tone_map_model_id=0 is used, the conversion information generation unit 34 generates a TMI (tone_mapping_info) including values of a min_value and a max_value of FIG. 9 as the conversion information.

In addition, in a case where tone_map_model_id=2 is used, the conversion information generation unit 34 generates a TMI including start_of_coded_interval[i] of FIG. 10 as the conversion information.

In addition, in a case where tone_map_model_id=3 is used, conversion information generation unit 34 generates a TMI including coded_pivot_value[i] and target_pivot_value [i] of the numbers designated by num_pivots of FIG. 11 as the conversion information.

In addition, for example, the conversion information generation unit 34 generates a TMI as the conversion information with respect to the video and employs, as the TMI as the conversion information of the ST, a TMI as the conversion information of the value displayed simultaneously together with the ST with respect to the ST.

In a case where the process mode is the mode-i, the encoder 35 encodes the HDR ST of the master input to the encode processing unit 22 into data of the ST having an SMPTE-TT format. In addition, in a case where the process mode is the mode-ii, the encoder 35 encodes the STD ST supplied by the conversion unit 33 into data of the ST having an SMPTE-TT format. The encoder 35 supplies the data of the ST obtained as a result of the encoding to the stream generation unit 36.

The stream generation unit 36 supplies the tone_map_id of the TMI as the feature information of the video and the ST supplied by the feature information generation unit 31 to the controller 21 (FIG. 20).

In addition, the stream generation unit 36 supplies the tone_map_id as the TMI of the conversion information of the video and the ST supplied by the conversion information generation unit 34 to the controller 21.

In addition, the stream generation unit 36 inserts the TMI of the video (which is also the TMI of the ST) as the SEI into the encoded data of the video supplied by the encoder 32 to generate a video stream.

In addition, the stream generation unit 36 supplies the data of the ST supplied by the encoder 35 as the ST stream together with the video stream to the file generation unit 23 of FIG. 20.

Figure 27:
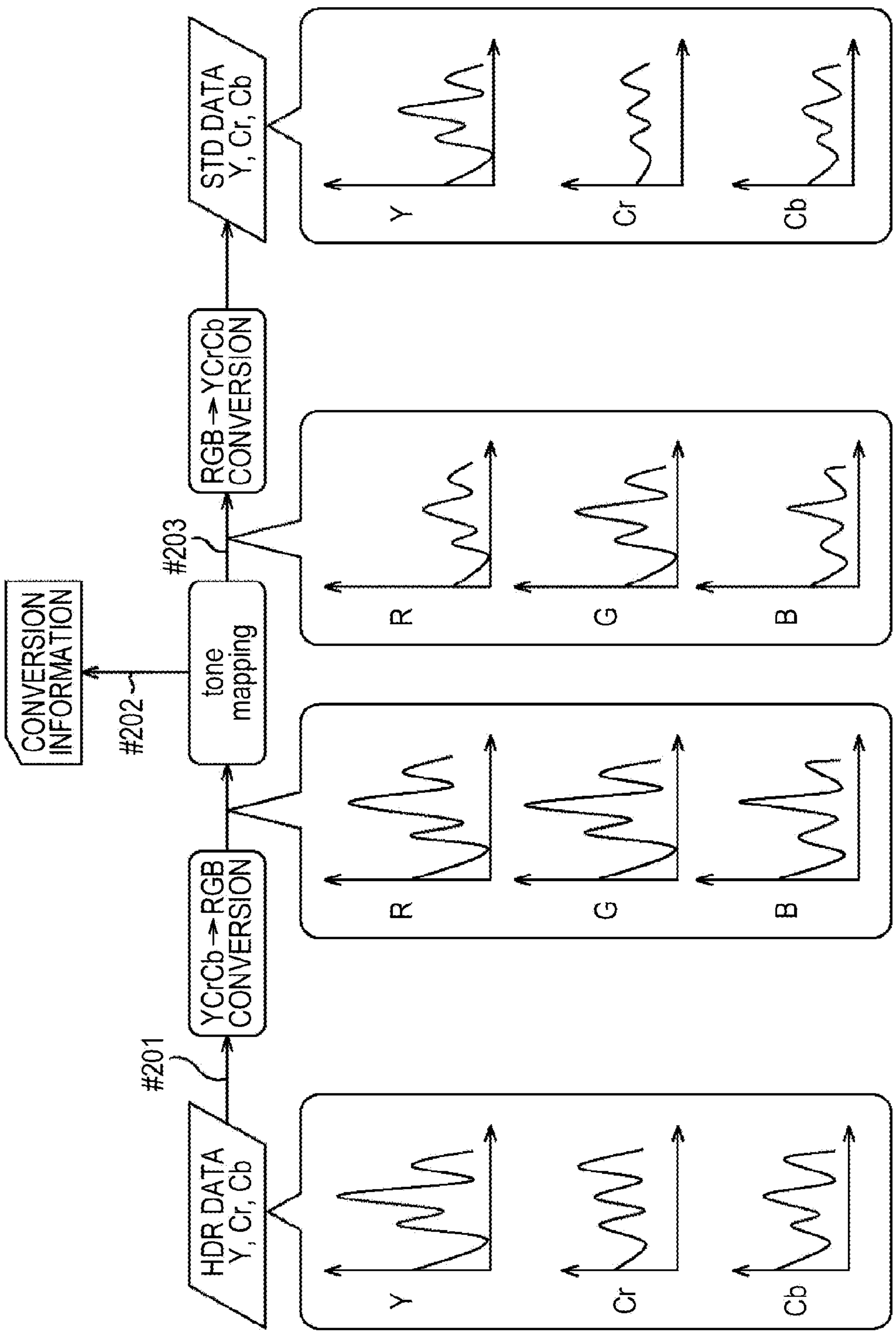
FIG. 27 is a diagram illustrating an example of a converting process for converting HDR data into STD data by a conversion unit 33.

FIG. 27 is a diagram illustrating an example of a converting process for converting HDR data into STD data by the conversion unit 33 of FIG. 26.

As indicated by an arrow #201, the conversion unit 33 converts YCrCb signals of the HDR data of the master input to the encode processing unit 22 into RGB (red, green, blue) signals and performs converting (tone mapping) the respective signals of the RGB as a conversion object into the respective signals of the RGB of the STD data.

The conversion unit 33 outputs information representing a relationship between the RGB signals of the HDR data which are the input data and the RGB signals of the STD data which are the output data to the conversion information generation unit 34. The information output to the conversion information generation unit 34 is used for generating the conversion information as indicated by an arrow #202.

In addition, the conversion unit 33 converts the RGB signals of the STD data into YCrCb signals and outputs the YCrCb signal as indicated by an arrow #203.

Figure 28:
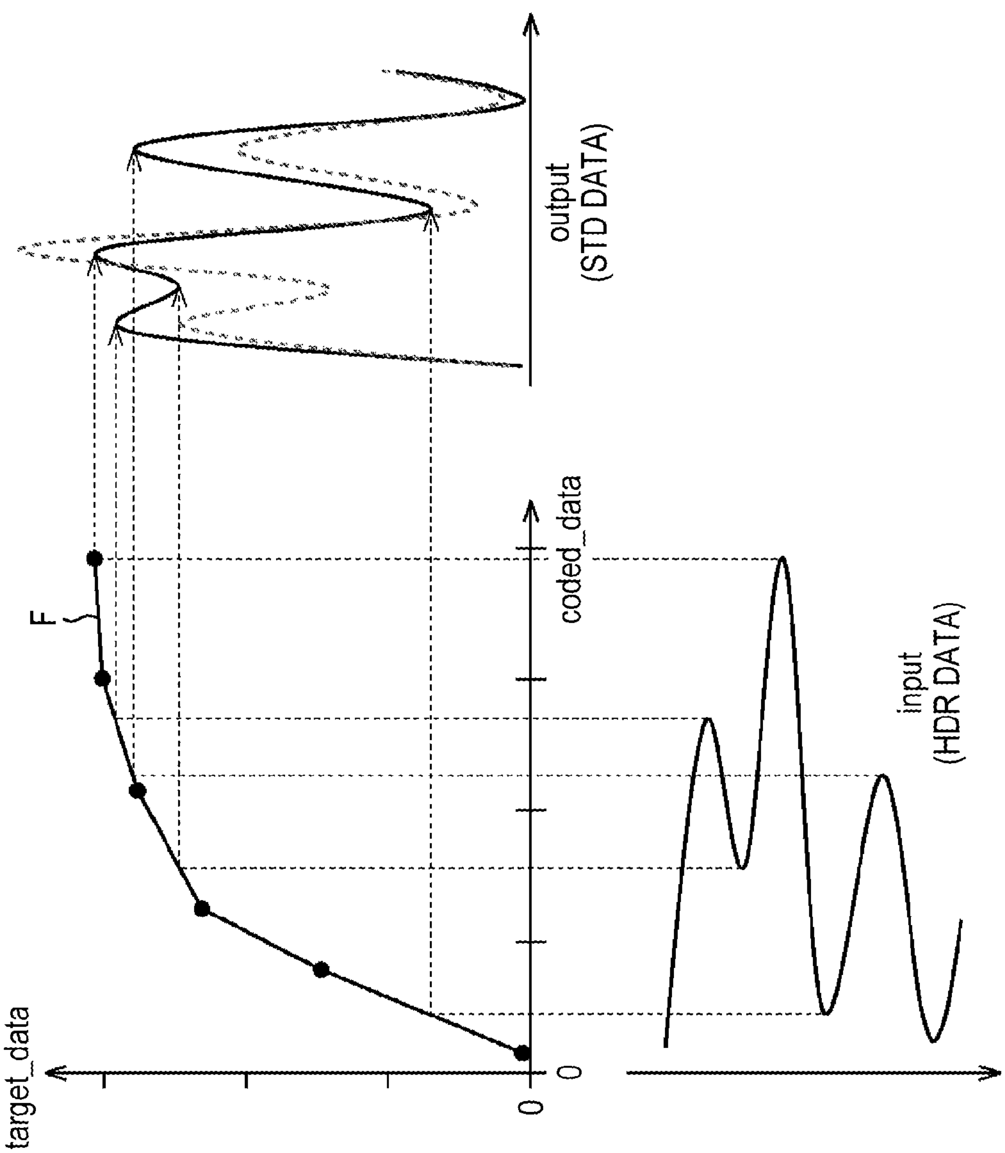
FIG. 28 is a diagram illustrating an example of tone mapping.

FIG. 28 is a diagram illustrating an example of the tone mapping.

For example, as illustrated in FIG. 28, the RGB signals of the HDR data are converted into the RGB signals of the STD data by compressing high luminance components to extend medium-range or low-range luminance components. Information corresponding to a function F mapping the RGB signals of the HDR data and the RGB signals of the STD data illustrated in FIG. 28 is generated as conversion information by the conversion information generation unit 34.

In addition, the conversion information corresponding to the function F illustrated in FIG. 28 corresponds the TMI having tone_map_model_id=3 indicating the relationship between the coded_data and the target_data with the polygonal line function which is described with reference to FIG. 11.

<File Generating Process of Generation Apparatus 1>

Figure 29:
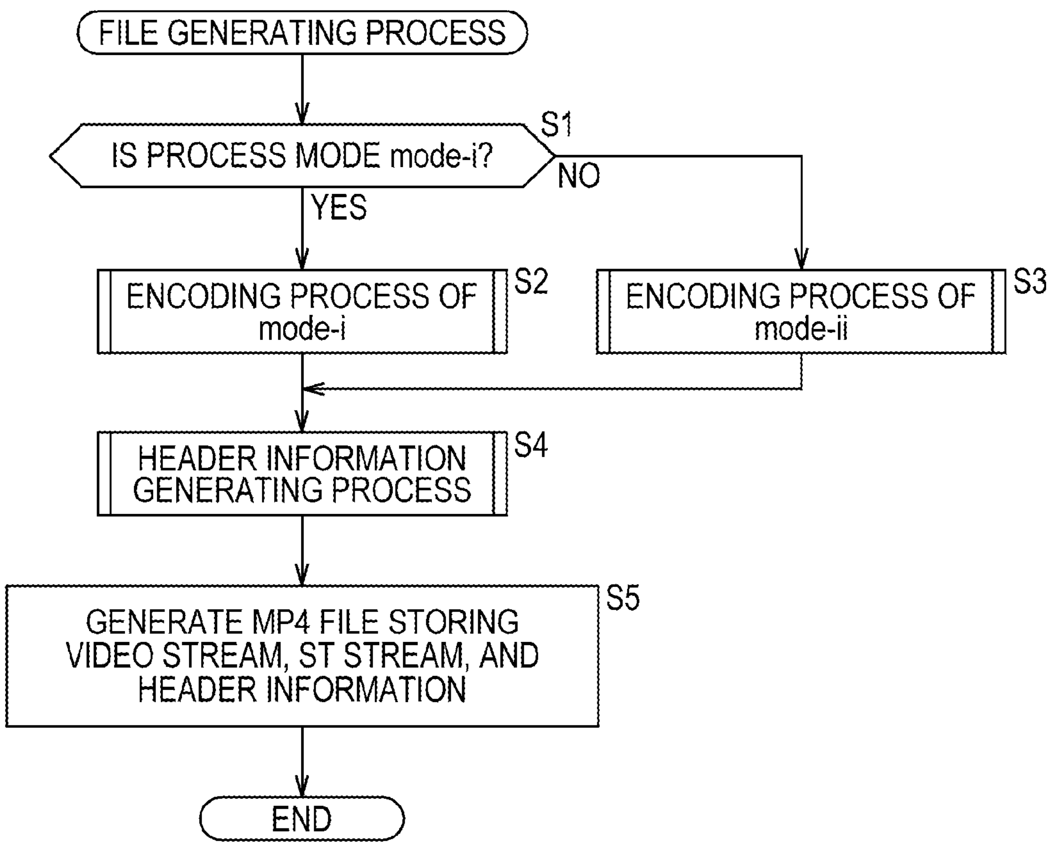
FIG. 29 is a flowchart for describing an example of a file generating process performed by the generation apparatus 1.

FIG. 29 is a flowchart for describing an example of the file generating process performed by the generation apparatus 1 of FIG. 20.

If the HDR data of the master are input to the generation apparatus 1, in step S1, the controller 21 of the generation apparatus 1 determines whether or not the process mode is mode-i. The process mode is set by, for example, an author.

In a case where it is determined in step S1 that the process mode is mode-i, the procedure proceeds to step S2, and the encode processing unit 22 performs the encoding process of the mode-i. The video stream and the ST stream generated through the encoding process of the mode-i are supplied from the encode processing unit 22 to the file generation unit 23.

On the other hand, in a case where it is determined in step S1 that the process mode is mode-ii, the procedure proceeds to step S3, the encode processing unit 22 performs the encoding process of the mode-ii. The video stream and the ST stream generated through the encoding process of the mode-ii are supplied from the encode processing unit 22 to the file generation unit 23.

After step S2 or S3, the procedure proceeds to step S4, and the header information generation unit 21A performs a header information generating process. The header information generated in the header information generating process is supplied from the header information generation unit 21A to the file generation unit 23, and the procedure proceeds to step S5.

In step S5, the file generation unit 23 generates and outputs the MP4 file of FIG. 21 or 25 which stores the video stream and the ST stream supplied by the encode processing unit 22 and the header information supplied by the header information generation unit 21A, and the file generating process is ended.

Figure 30:
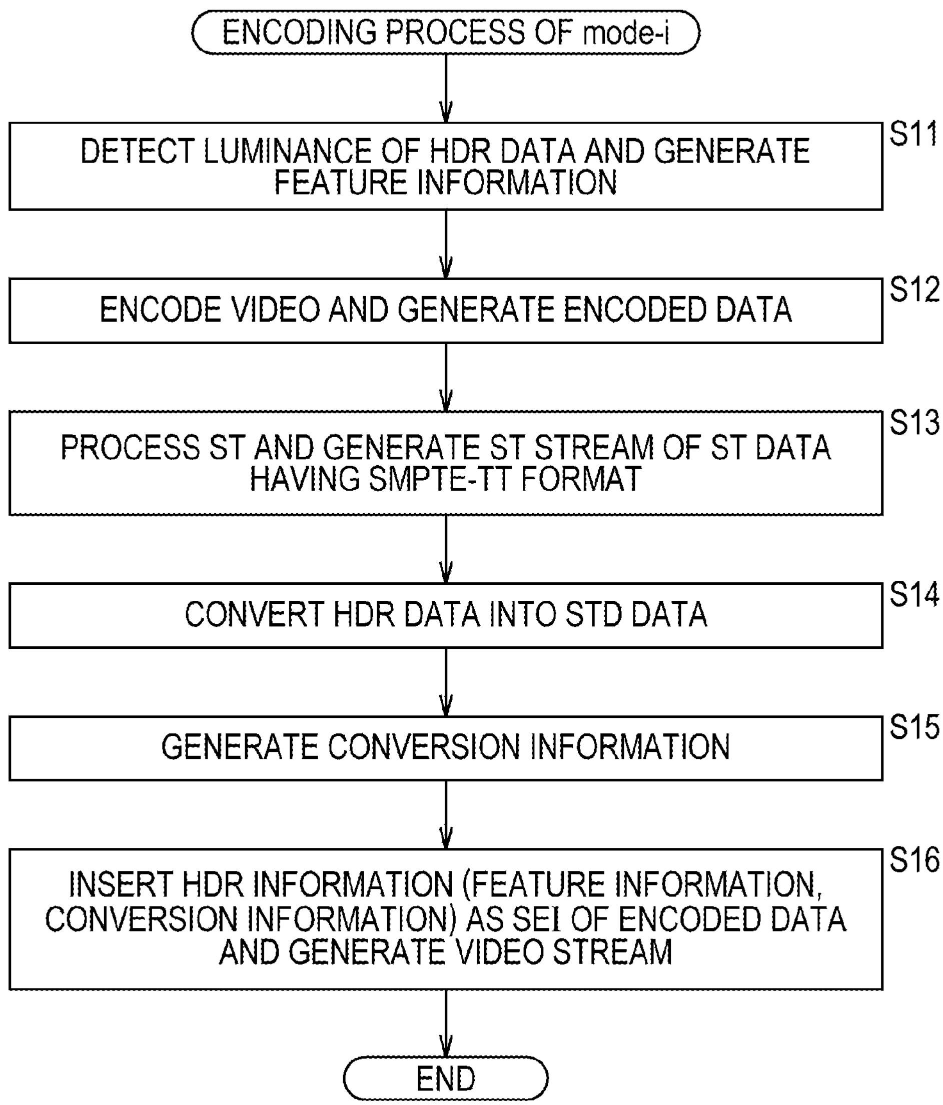
FIG. 30 is a flowchart for describing an example of an encoding process of mode-i performed in step S2.

FIG. 30 is a flowchart for describing an example of the encoding process of the mode-i performed in step S2 of FIG. 29.

In step S11, the feature information generation unit 31 of the encode processing unit 22 (FIG. 26) detects the luminance of the HDR data of the master to generate a TMI as the feature information of the video and the ST and supplies the TMI to the stream generation unit 36, and the procedure proceeds to step S12.

In step S12, the encoder 32 encodes the HDR video of the master in accordance with the HEVC scheme to generate encoded data of the HDR video and supplies the encoded data to the stream generation unit 36, and the procedure proceeds to step S13. In addition, the video encode scheme is not limited to the HEVC scheme.

In step S13, the encoder 35 encodes the HDR ST of the master to generate data of the ST having an SMPTE-TT format and supplies the data of the ST to the stream generation unit 36, and the procedure proceeds to step S14.

In step S14, the conversion unit 33 converts the input HDR data of the master into STD data and supplies information representing a relationship between the input data and the output data where the RGB signals of the HDR data are the input data and the RGB signals of the STD data are the output data to the conversion information generation unit 34.

After that, the procedure proceeds from step S14 to step S15, and the conversion information generation unit 34 generates TMI as conversion information of video and ST based on the information supplied from the conversion unit 33 and supplies the TMI to the stream generation unit 36. The procedure proceeds to step S16.

In step S16, the stream generation unit 36 inserts, as the SEI of the encoded data, the TMI as the feature information supplied by the feature information generation unit 31 and the TMI as the conversion information supplied by the conversion information generation unit 34 into the encoded data supplied by the encoder 32 to generate a video stream.

Next, the stream generation unit 36 supplies the data of the ST supplied by the encoder 35 as the ST stream together with the video stream to the file generation unit 23 (FIG. 20).

In addition, the stream generation unit 36 supplies the tone_map_id of the TMI (TMI which is to be applied to the video) of the video and the tone_map_id of the TMI (TMI which is to be applied to the ST) of the video to the controller 21 (FIG. 20), and the encoding process of the mode-i is ended (returned).

Figure 31:
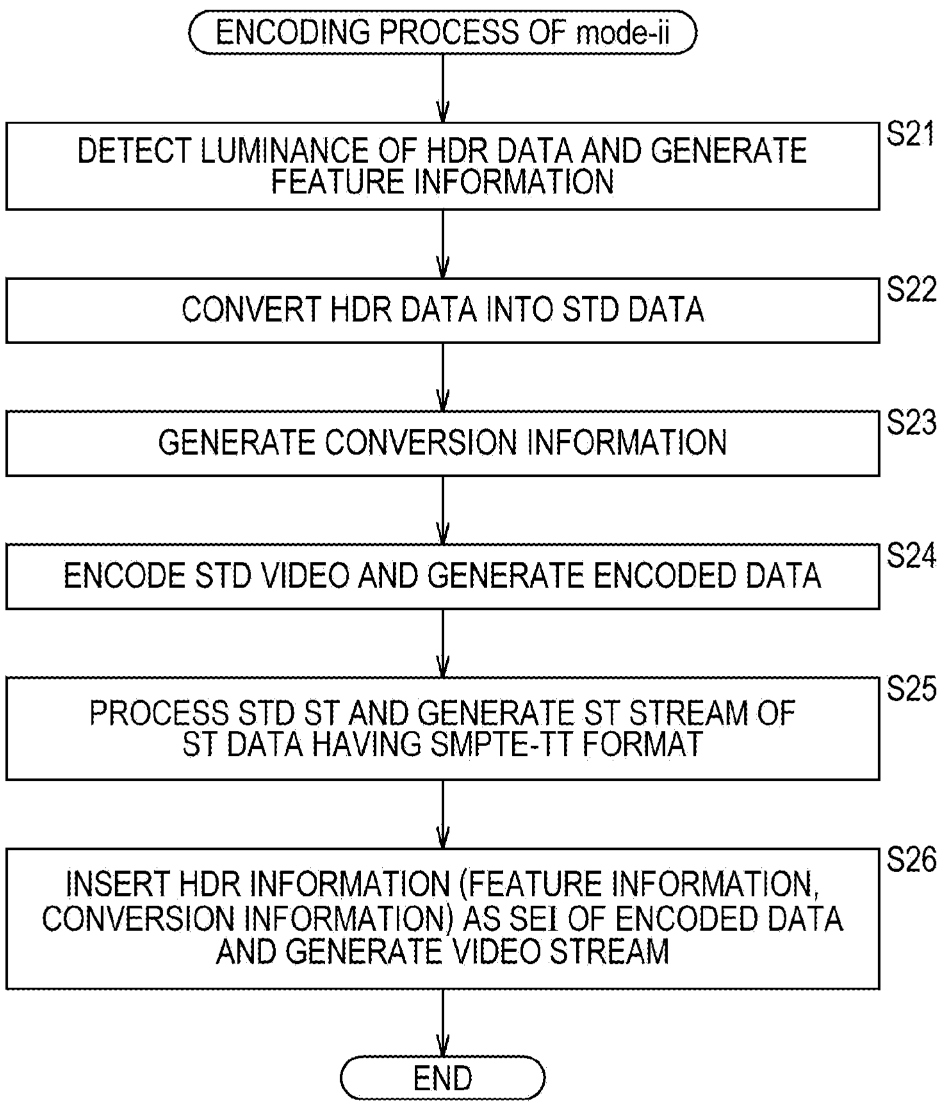
FIG. 31 is a flowchart for describing an example of an encoding process of mode-ii performed in step S3.

FIG. 31 is a flowchart for describing an example of the encoding process of the mode-ii performed in step S3 of FIG. 29.

In step S21, the feature information generation unit 31 of the encode processing unit 22 detects the luminance of the HDR data of the master to generate a TMI as the feature information of the video and the ST and supplies the TMI to the stream generation unit 36.

After that, in step S22, the conversion unit 33 converts the input HDR data of the master into STD data, and the conversion unit 33 supplies the STD video among the STD data to the encoder 32 and supplies the STD ST to the encoder 35.

In addition, the conversion unit 33 supplies information representing a relationship between the input data and the output data where the RGB signals of the HDR data are the input data and the RGB signals of the STD data are the output data to the conversion information generation unit 34, and the procedure proceeds from step S22 to step S23.

In step S23, the conversion information generation unit 34 generates a TMI as the conversion information of the video and the ST based on the information supplied by the conversion unit 33 and supplies the TMI to the stream generation unit 36, and the procedure proceeds to step S24.

In step S24, the encoder 32 encodes the STD video supplied from the conversion unit 33 in accordance with the HEVC scheme to generate encoded data of the STD video and supplies the encoded data to the stream generation unit 36. In addition, the video encode scheme is not limited to the HEVC scheme.

After that, in step S25, the encoder 35 encodes the STD ST supplied by the conversion unit 33 to generate data of the ST having an SMPTE-TT format and supplies the data of the ST to the stream generation unit 36.

Next, in step S26, the stream generation unit 36 inserts, as the SEI of the encoded data, the TMI as the feature information supplied by the feature information generation unit 31 and the TMI as the conversion information supplied by the conversion information generation unit 34 into the encoded data supplied by the encoder 32 to generate a video stream.

In addition, the stream generation unit 36 supplies the data of the ST supplied by the encoder 35 as the ST stream together with the video stream to the file generation unit 23 (FIG. 20).

In addition, the stream generation unit 36 supplies the tone_map_id of the TMI of the video and the tone_map_id of the TMI of the ST to the controller 21 (FIG. 20), and the encoding process of the mode-ii is ended (returned).

Figure 32:
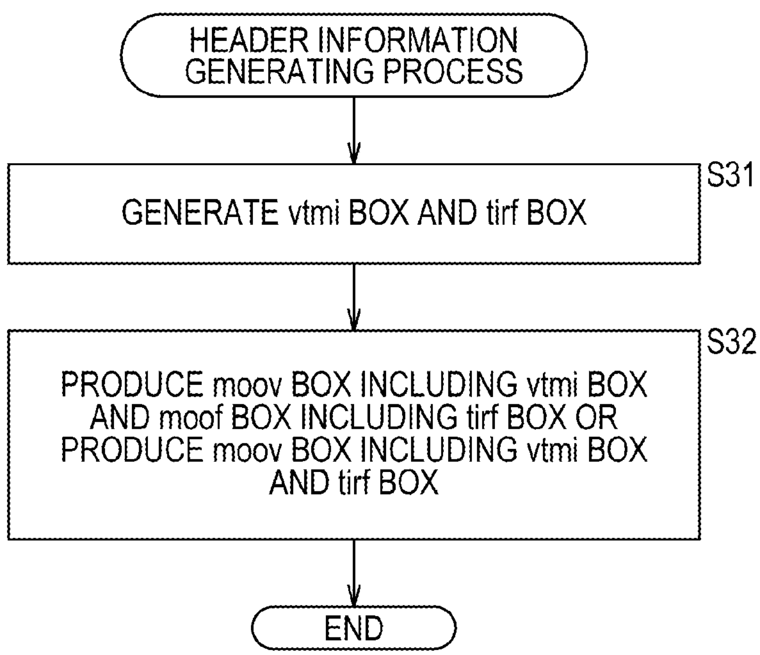
FIG. 32 is a flowchart for describing an example of a header information generating process performed in step S4.

FIG. 32 is a flowchart for describing an example of the header information generating process performed in step S4 of FIG. 29.

In step S31, the header information generation unit 21A of the controller 21 (FIG. 20) generates a tirf box (FIG. 21, FIG. 24, FIG. 25) which stores the tone_mapping_info_id_ref representing the tone_map_id of the TMI (TMI which is to be applied to the video) of the video supplied by the encode processing unit 22 (stream generation unit 36 (FIG. 26) thereof).

In addition, the header information generation unit 21A generates a tirf box (FIG. 21, FIG. 24, FIG. 25) which stores the tone_mapping_info_id_ref representing the tone_map_id of the TMI (TMI which is to be applied to the ST) of the ST supplied by the encode processing unit 22.

In addition, the header information generation unit 21A generates a vtmi box (FIG. 21, FIG. 23, FIG. 25) which stores the track_IDs[ ] representing the track_id of the track of the video stream including the TMI which is to be applied to the ST, and the procedure proceeds from step S31 to step S32.

In step S32, the header information generation unit 21A produces the moov box including the vtmi box and the moof box including the tirf box or produces the moov box including the vtmi box and the tirf box and supplies the produced box as the header information to the file generation unit 23 (FIG. 20), and the header information generating process is ended.

Namely, in the file generation unit 23, in a case where the MP4 file of the fragmented movie is generated, the header information generation unit 21A generates a moov box including the vtmi box in the trak/tref boxes of the track of the ST as illustrated in FIG. 21.

In addition, the header information generation unit 21A generates a moof box including the tirf box in the traf box of the track of the video and a moof box including the tirf box in the traf box of the track of the ST as illustrated in FIG. 21.

On the other hand, in the file generation unit 23, in a case where the MP4 file of the non-fragmented movie is generated, the header information generation unit 21A generates a moov box including the tirf box in the stbl box included in the trak box of the track of the video and the vtmi box in the trak/tref box of the track of the ST and including the tirf box in the stbl box included in the trak box of the track of the ST as illustrated in FIG. 25.

<First Configurational Example of Reproduction Apparatus 2>

Figure 33:
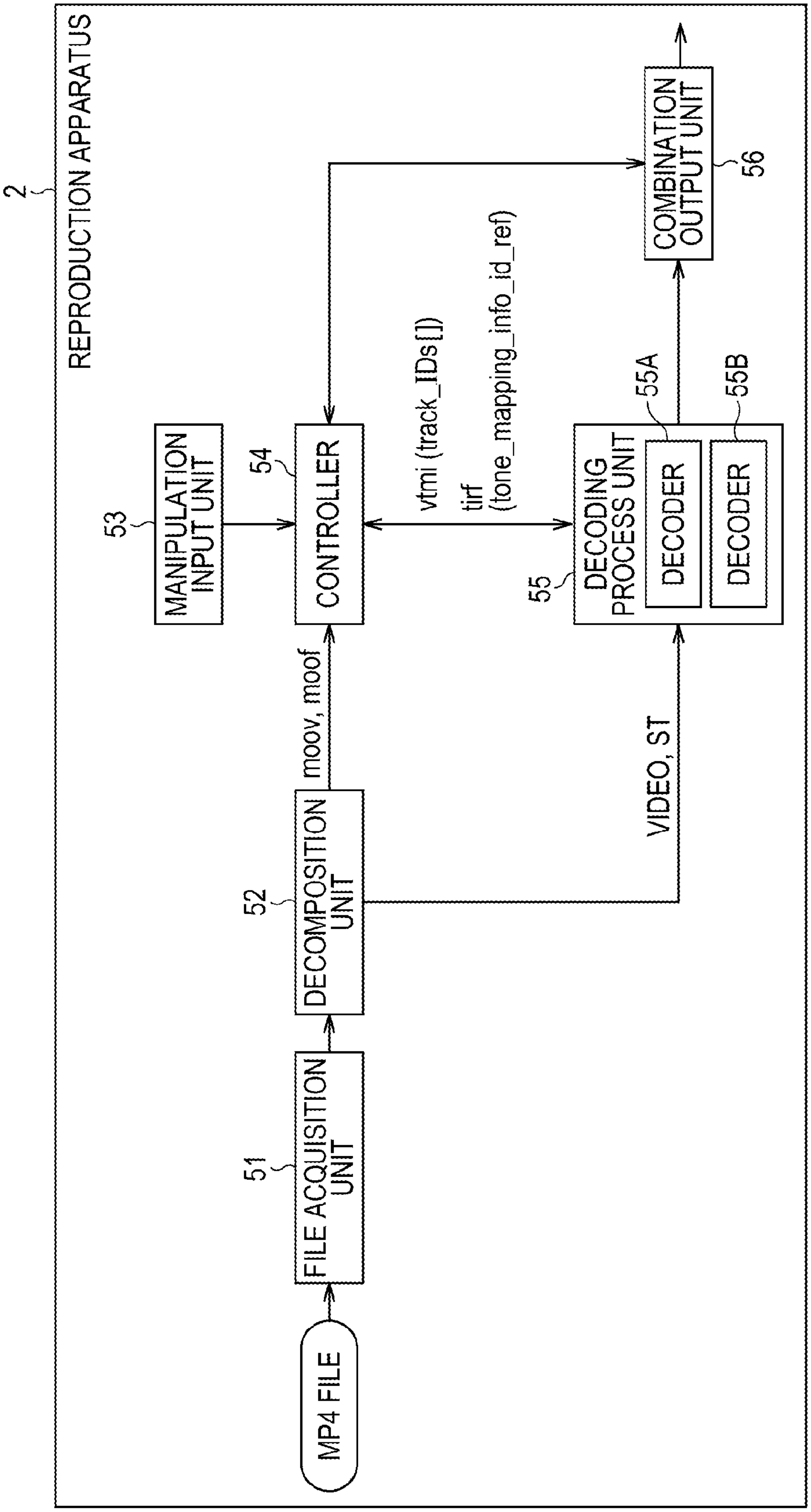
FIG. 33 is a block diagram illustrating a first configurational example of the reproduction apparatus 2.

FIG. 33 is a block diagram illustrating a first configurational example of the reproduction apparatus 2 of FIG. 1.

In FIG. 33, the reproduction apparatus 2 is configured to include a file acquisition unit 51, a decomposition unit 52, a manipulation input unit 53, a controller 54, a decoding process unit 55, and a combination output unit 56.

The file acquisition unit 51 acquires an MP4 file from the recording medium 11 or the transmission medium 12 (FIG. 1) and supplies the MP4 file to the decomposition unit 52.

The decomposition unit 52 extracts (acquires) the moov box or the moof box as the header information from the MP4 file supplied by the file acquisition unit 51 and supplies the moov box or the moof box to the controller 54.

In addition, the decomposition unit 52 extracts (acquires) the video stream or the ST stream as the actual data stored in the mdat box from the MP4 file supplied by the file acquisition unit 51 and supplies the video stream or the ST stream to the decoding process unit 55.

The manipulation input unit 53 is configured with a reception unit which receives a signal such as an infrared signal transmitted from an input device such as buttons, keys, or a touch panel or a predetermined remote controller to receive user's manipulation. Next, the manipulation input unit 53 supplies a manipulation signal corresponding to user's manipulation to the controller 54.

The controller 54 is configured to include a CPU, ROM, RAM, and the like. The controller 54 controls overall operations of the reproduction apparatus 2 by executing a predetermined program.

For example, the controller 54 supplies the track_IDs[ ] (FIG. 21, FIG. 23, FIG. 25) stored in the vtmi box included in the moov box supplied by the decomposition unit 52 and the tone_mapping_info_id_ref (FIG. 21, FIG. 24, FIG. 25) stored in the tirf box to the decoding process unit 55. In addition, for example, the controller 54 supplies the tone_mapping_info_id_ref stored in the tirf box included in the moof box supplied by the decomposition unit 52 to the decoding process unit 55.

The decoding process unit 55 is configured to include a decoder 55A and a decoder 55B.

The decoder 55A functions as an acquisition unit which recognizes the track of the video as reference track (track which is to be referred to the track including the to-be-applied TMI) and acquires, as a TMI included in the reference track, the TMI (tone_mapping_info) as the feature information and the conversion information from the SEI of the video stream of the track of the video supplied by the decomposition unit 52.

In addition, the decoder 55A decodes the encoded data included in the video stream supplied by the decomposition unit 52 in accordance with the HEVC scheme.

In addition, the decoder 55A acquires, as a TMI which is to be applied to the video, the TMI which has the tone_map_id represented by the tone_mapping_info_id_ref stored in the tirf box of the track of the video and is supplied by the controller 54 among the TMIs included in the track of the video as the reference track.

Next, if necessary, the decoder 55A converts the HDR video or the STD video obtained as a result of the decoding into an STD video or an HDR video based on the TMI as the conversion information which is to be applied to the video and outputs the STD video or the HDR video to the combination output unit 56.

In a case where the HDR video is output, the decoder 55A outputs the TMI as the feature information which is to be applied to the video together with the HDR video to the combination output unit 56.

The decoder 55B decodes the ST stream supplied by the decomposition unit 52.

In addition, the decoder 55B functions as an acquisition unit which recognizes, as the reference track, the track which has the track_id represented by the track_IDs[ ] stored in the vtmi box of the track of the ST and is supplied by the controller 54, namely, in the embodiment, the track of the video and acquires the TMI included in the reference track.

More specifically, the decoder 55B acquires, as a TMI included in the reference track, the TMI as the feature information and the conversion information which is supplied by the decomposition unit 52 from the SEI of the video stream of the track of the video as the reference track.

In addition, the decoder 55B acquires, as a TMI which is to be applied to the ST, the TMI which has the tone_map_id represented by the tone_mapping_info_id_ref stored in the tirf box of the track of the ST and is supplied by the controller 54 among the TMIs included in the track of the video as the reference track.

Next, if necessary, the decoder 55B converts the HDR ST or the STD ST obtained as a result of the decoding into an STD ST or an HDR ST based on the TMI as the conversion information which is to be applied to the ST and outputs the STD ST or the HDR ST to the combination output unit 56.

In a case where the decoder 55B output the HDR ST, the decoder 55B outputs the TMI as the feature information which is to be applied to the ST together with the HDR ST to the combination output unit 56.

The combination output unit 56 performs communication with the display apparatus 3 through the cable 4 (FIG. 1). For example, the combination output unit 56 acquires information on the performance of the monitor included in the display apparatus 3 and outputs the information to the controller 54.

In addition, the combination output unit 56 outputs the HDR video or the STD video supplied by the decoder 55A and the HDR ST or the STD ST supplied by the decoder 55B, after the combining thereof if necessary, to the display apparatus 3.

In addition, the combination output unit 56 outputs the TMI as the feature information supplied by the decoder 55A and the decoder 55B to the display apparatus 3.

<Reproducing Process of Reproduction Apparatus 2>

Figure 34:
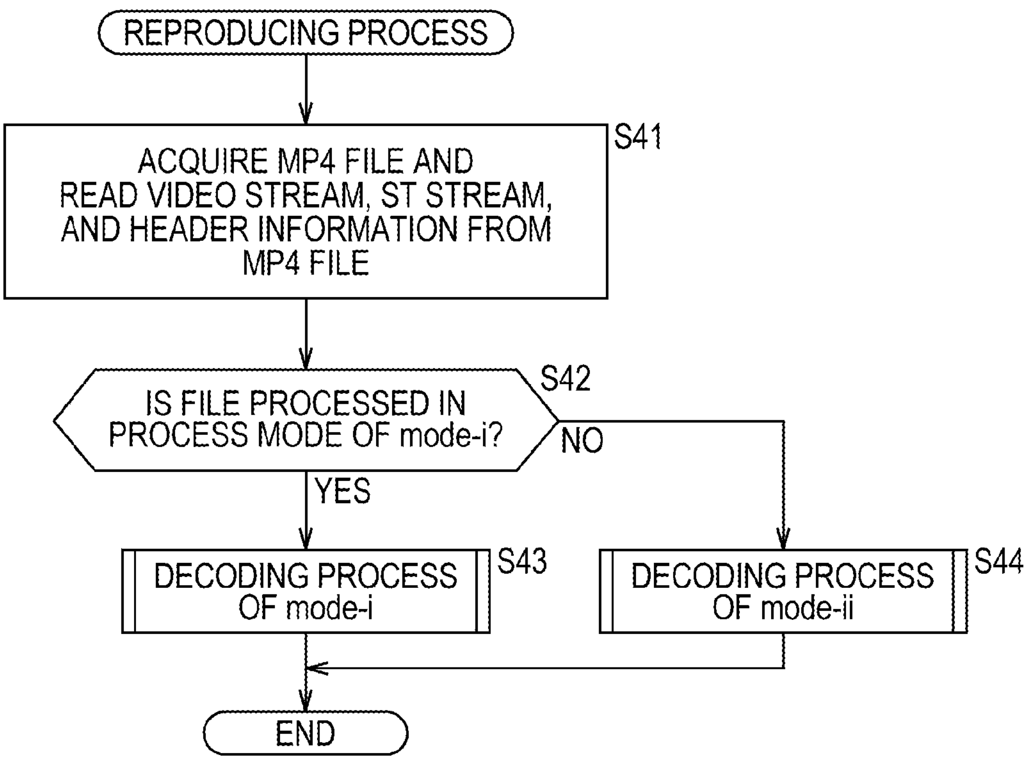
FIG. 34 is a flowchart for describing an example of a reproducing process performed by the reproduction apparatus 2.

FIG. 34 is a flowchart for describing an example of the reproducing process performed by the reproduction apparatus 2 of FIG. 33.

In addition, it is assumed that, in the reproduction apparatus 2, before the reproducing process is started, the controller 54 controls the combination output unit 56 to communicate with the display apparatus 3 to acquire, for example, EDID (Extended display identification data) as information representing the performance of the display apparatus 3.

In step S41, the file acquisition unit 51 acquires the MP4 file generated by the generation apparatus 1 and supplies the MP4 file to the decomposition unit 52.

The decomposition unit 52 reads the moov box or the moof box as the header information and reads the video stream or the ST stream as the actual data stored in the mdat box from the MP4 file supplied by the file acquisition unit 51.

Next, the decomposition unit 52 supplies the moov box or the moof box as the header information to the controller 54 and supplies the video stream or the ST stream to the decoding process unit 55.

In addition, the controller 54 supplies the track_IDs[ ] stored in the vtmi box included in the moov box supplied by the decomposition unit 52 and the tone_mapping_info_id_ref stored in the tirf box to the decoding process unit 55. In addition, the controller 54 supplies the tone_mapping_info_id_ref stored in the tirf box included in the moof box supplied by the decomposition unit 52 to the decoding process unit 55.

After that, the procedure proceeds from step S41 to step S42, and the controller 54 determines whether the process mode of the MP4 file acquired by the file acquisition unit 51 is mode-i or mode-ii, namely, whether the MP4 file acquired by the file acquisition unit 51 is a file obtained through the encoding process of mode-i or mode-ii.

Herein, the information representing the process mode of the MP4 file is allowed to be included in the moon box as the header information, and the determination of the process mode in step S42 by the controller 54 may be performed, for example, based on the information.

In a case where it is determined in step S42 that the process mode is mode-i, the procedure proceeds to step S43, and the decoding process unit 55 performs the decoding process of the mode-i.

On the other hand, in a case where it is determined in step S42 that the process mode is mode-ii, the procedure proceeds to step S44, and the decoding process unit 55 performs the decoding process of the mode-ii.

After the decoding process is performed in step S43 or step S44, the reproducing process is ended.

Figure 35:
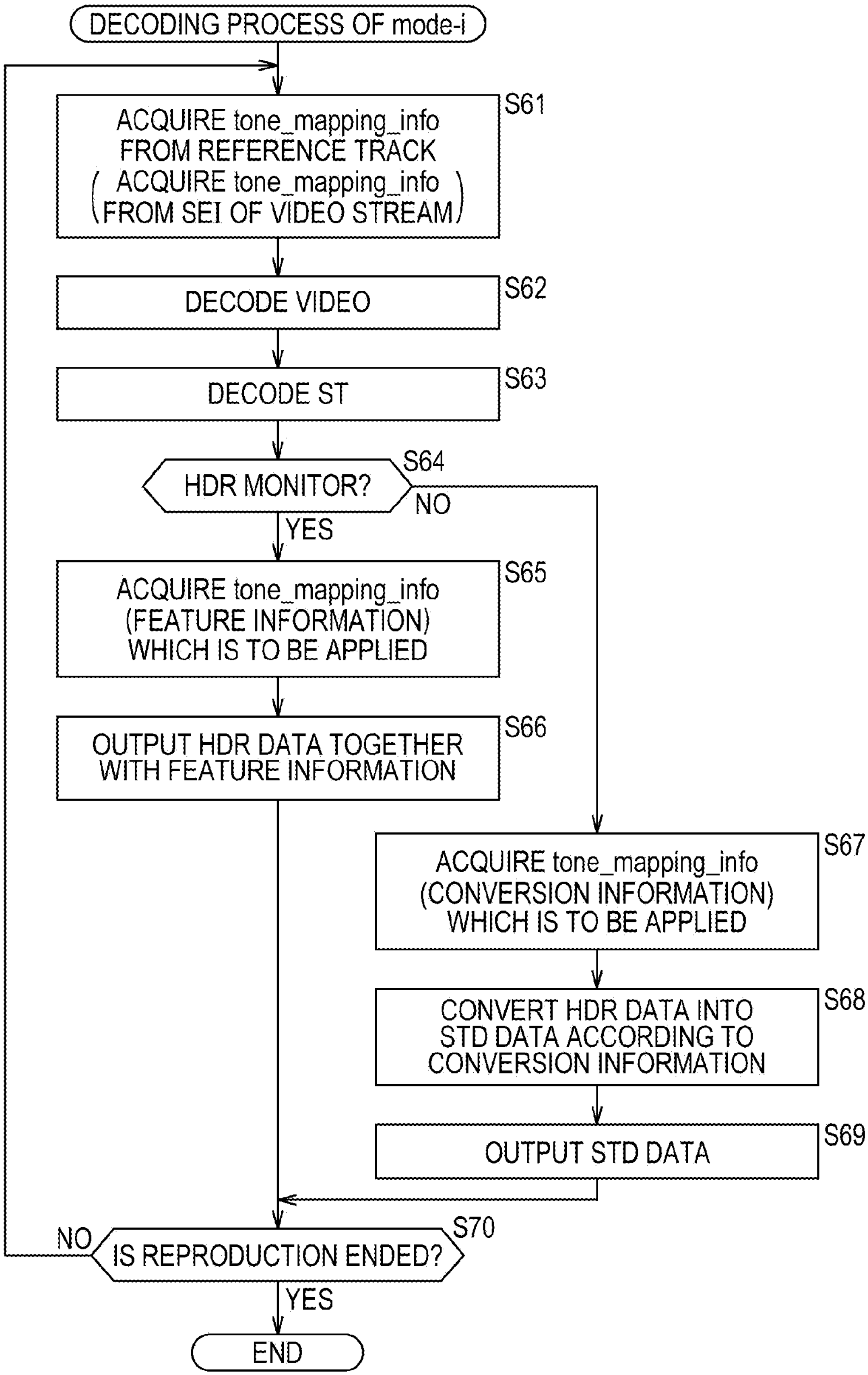
FIG. 35 is a flowchart for describing an example of a decoding process of mode-i performed in step S43.

FIG. 35 is a flowchart for describing the decoding process of the mode-i in step S43 of FIG. 34.

In step S61, the decoder 55A recognizes the track of the video as the reference track and acquires, as a TMI included in the reference track, the TMI as the feature information and the conversion information from the SEI of the video stream of the track of the video supplied by the decomposition unit 52.

In addition, in step S61, the decoder 55B recognizes, as the reference track, the track of the video which is the track which has the track_id represented by the track_IDs[ ] stored in the vtmi box of the track of the ST and is supplied by the controller 54 (track designated by the track_IDs[ ] as the track designating information) and acquires the TMI included in the reference track.

Namely, similarly to the decoder 55A, the decoder 55B acquires, as a TMI included in the reference track, the TMI as the feature information and the conversion information from the SEI of the video stream of the track of the video as the reference track supplied by the decomposition unit 52.

After that, the procedure proceeds from step S61 to step S62, and the decoder 55A decodes the encoded data included in the video stream supplied from the decomposition unit 52 in accordance with an HEVC scheme to generate an HDR video, and the procedure proceeds to step S63. In addition, the video decode (encode) scheme is not limited to the HEVC scheme.

In step S63, the decoder 55B decodes the ST stream supplied by the decomposition unit 52, namely, for example, the stream of the data of the ST having an SMPTE-TT format into an HDR ST, and the procedure proceeds to step S64.

In step S64, the controller 54 determines whether or not the monitor included in the display apparatus 3 is an HDR monitor.

Herein, as described with reference to FIG. 34, the controller 54 acquires the EDID as the information representing the performance of the display apparatus 3 from the display apparatus 3 and determines based on the EDID whether or not the monitor included in the display apparatus 3 is an HDR monitor.

In a case where it is determined in step S64 that the monitor included in the display apparatus 3 is an HDR monitor, the procedure proceeds to step S65.

In step S65, the decoder 55A acquires, as a TMI which is to be applied to the video, the TMI which has the tone_map_id represented by the tone_mapping_info_id_ref stored in the tirf box of the track of the video and is supplied by the controller 54 (TMI designated by the tone_mapping_ info_id_ref as the HDR designating information) among the TMIs included in the track of the video as the reference track.

In addition, the decoder 55B acquires, as a TMI which is to be applied to the ST, the TMI which has the tone_map_id represented by the tone_mapping_info_id_ref stored in the tirf box of the track of the ST and is supplied by the controller 54 (TMI designated by the tone_mapping_info_id_ ref as the HDR designating information) among the TMIs included in the track of the video as the reference track.

After that, the procedure proceeds from step S65 to step S66, and the decoder 55A supplies the HDR video together with the TMI as the feature information which is to be applied to the video to the combination output unit 56. In addition, the decoder 55B supplies the HDR ST together with the TMI as the feature information which is to be applied to the ST to the combination output unit 56.

In the combination output unit 56, if necessary, the HDR video and the HDR ST are combined to be supplied (transmitted) together with the TMI as the feature information to the display apparatus 3 (FIG. 1).

On the other hand, it is determined in step S64 that the monitor included in the display apparatus 3 is not an HDR monitor but an STD monitor, the procedure proceeds to step S67.

In step S67, the decoder 55A acquires, as a TMI which is to be applied to the video, the TMI which has the tone_map_id represented by the tone_mapping_info_id_ref stored in the tirf box of the track of the video and is supplied by the controller 54 (TMI designated by the tone_mapping_ info_id_ref as the HDR designating information) among the TMIs included in the track of the video as the reference track.

In addition, the decoder 55B acquires, as a TMI which is to be applied to the ST, the TMI which has the tone_map_id represented by the tone_mapping_info_id_ref stored in the tirf box of the track of the ST and is supplied by the controller 54 (TMI designated by the tone_mapping_info_id_ref as the HDR designating information) among the TMIs included in the track of the video as the reference track.

After that, the procedure proceeds from step S67 to step S68, and the decoder 55A converts the HDR video obtained as a result of the decoding into an STD video based on the TMI as the conversion information which is to be applied to the video.

In addition, the decoder 55B converts the HDR ST obtained as a result of the decoding into an STD ST based on the TMI as the conversion information which is to be applied to the ST.

Next, the procedure proceeds from step S68 to step S69, and the decoder 55A supplies the STD video to the combination output unit 56. In addition, the decoder 55B supplies the STD ST to the combination output unit 56.

In the combination output unit 56, if necessary, the STD video and the STD ST are combined to be supplied (transmitted) to the display apparatus 3 (FIG. 1).

After step S66 or S69, the procedure proceeds to step S70, and the controller 54 determines whether or not the reproduction is ended.

In a case where it is determined in step S70 that the reproduction is not ended, the process returns to step S61, and the same process is repetitively performed. On the other hand, in a case where it is determined in step S70 that the reproduction is ended, the decoding process of mode-i is ended.

Figure 36:
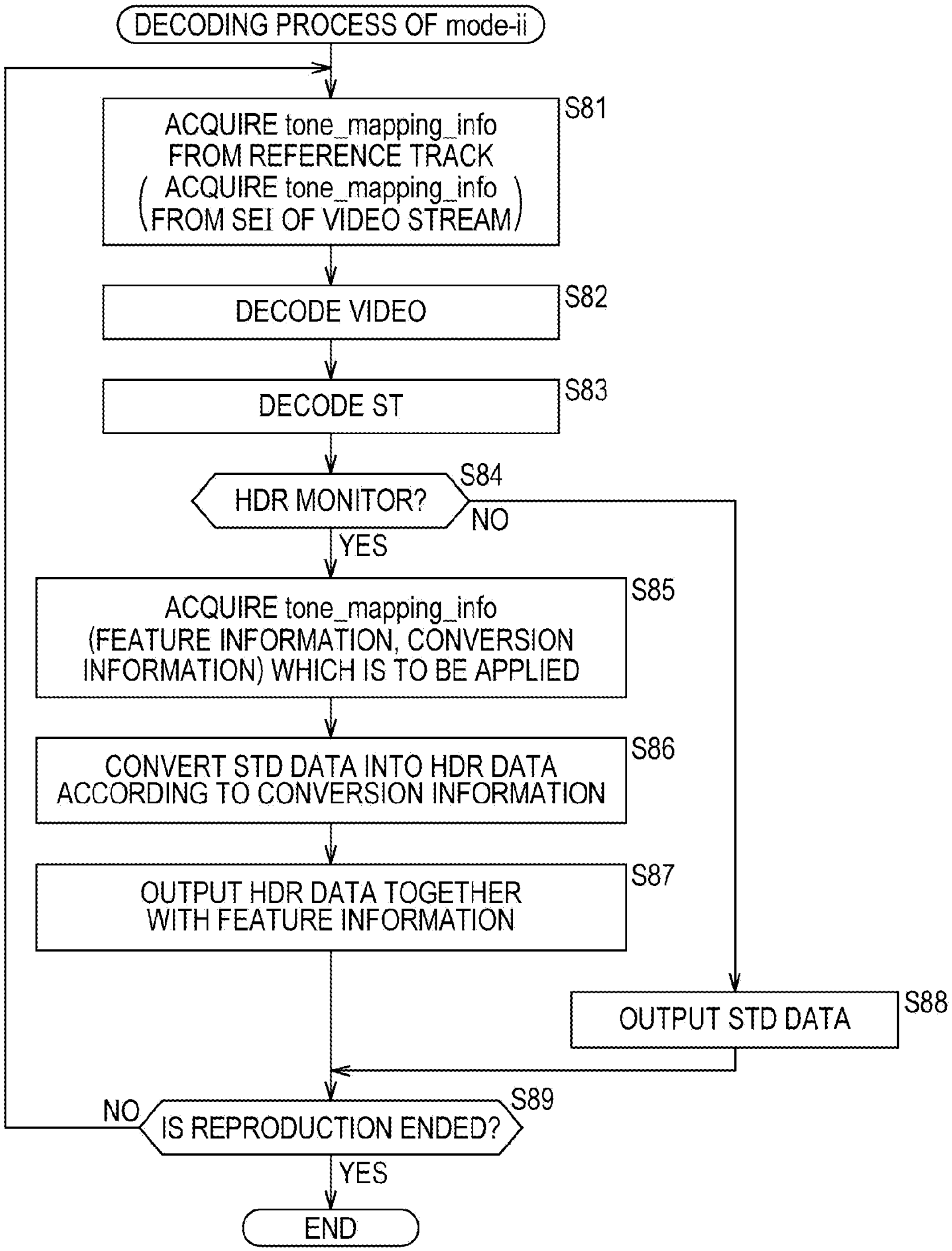
FIG. 36 is a flowchart for describing an example of a decoding process of mode-ii performed in step S44.

FIG. 36 is a flowchart for describing the decoding process of the mode-ii in step S44 of FIG. 34.

In step S81, similarly to step S61 of FIG. 35, the decoders 55A and 55B acquire the TMIs included in the reference track.

Namely, the decoder 55A recognizes the track of the video as the reference track and acquires, as a TMI included in the reference track, the TMI as the feature information and the conversion information from the SEI of the video stream of the video supplied by the decomposition unit 52.

The decoder 55B recognizes the track of the video which is the track (track designated by the track_IDs[ ] as the track designating information) having the track_id represented by the track_IDs[ ] stored in the vtmi box of the track of the ST and is supplied by the controller 54 as the reference track and acquires, as a TMI included in the reference track, the TMI as the feature information and the conversion information from the SEI of the video stream of the track of the video as the reference track supplied by the decomposition unit 52.

After that, the procedure proceeds from step S81 to step S82, and the decoder 55A decodes the encoded data included in the video stream supplied from the decomposition unit 52 in accordance with an HEVC scheme to generate an STD video. The procedure proceeds to step S83. In addition, the video decode (encode) scheme is not limited to the HEVC scheme.

In step S83, the decoder 55B decodes the ST stream, namely, the stream of the data of the ST, for example, in an SMPTE-TT format into an STD ST, and the procedure proceeds to step S84.

In step S84, for example, similarly to step S64 of FIG. 35, the controller 54 determines whether or not the monitor included in the display apparatus 3 is an HDR monitor.

In a case where it is determined in step S84 that the monitor included in the display apparatus 3 is an HDR monitor, the procedure proceeds to step S85.

In step S85, the decoder 55A acquires, as a TMI which is to be applied to the video, the TMI which has the tone_map_id represented by the tone_mapping_info_id_ref stored in the tirf box of the track of the video and is supplied by the controller 54 (TMI designated by the tone_mapping_info_id_ref as the HDR designating information) among the TMIs included in the track of the video as the reference track.

In addition, the decoder 55B acquires, as a TMI which is to be applied to the ST, the TMI which has the tone_map_id represented by the tone_mapping_info_id_ref stored in the tirf box of the track of the ST and is supplied by the controller 54 (TMI designated by the tone_mapping_info_id_ref as the HDR designating information) among the TMIs included in the track of the video as the reference track.

After that, the procedure proceeds from step S85 to step S86, and the decoder 55A converts the STD video obtained as a result of the decoding into an HDR video based on the TMI as the conversion information which is to be applied to the video. In addition, the decoder 55B converts, into the HDR ST, the STD ST obtained as a result of the decoding based on the TMI as the conversion information which is to be applied to the ST.

Next, the procedure proceeds from step S86 to step S87, and the decoder 55A supplies the HDR video together with the TMI as the feature information which is to be applied to the video to the combination output unit 56. In addition, the decoder 55B supplies the HDR ST together with the TMI as the feature information which is to be applied to the ST to the combination output unit 56.

In the combination output unit 56, if necessary, the HDR video and the HDR ST are combined to be supplied together with the TMI as the feature information to the display apparatus 3 (FIG. 1).

On the other hand, it is determined in step S84 that the monitor included in the display apparatus 3 is an STD monitor, the procedure proceeds to step S88, and the decoder 55A supplies the STD video obtained through the decoding of step S82 to the combination output unit 56. In addition, the decoder 55B supplies the STD ST obtained through the decoding of step S83 to the combination output unit 56.

In the combination output unit 56, if necessary, the STD video and the STD ST are combined to be supplied to the display apparatus 3 (FIG. 1).

After step S87 or S88, the procedure proceeds to step S89, and the controller 54 determines whether or not the reproduction is ended.

In a case where it is determined in step S89 that the reproduction is not ended, the process returns to step S81, and the same process is repetitively performed. On the other hand, in a case where it is determined in step S89 that the reproduction is ended, the decoding process of mode-ii is ended.

<Configurational Example of Display Apparatus 3>

Figure 37:
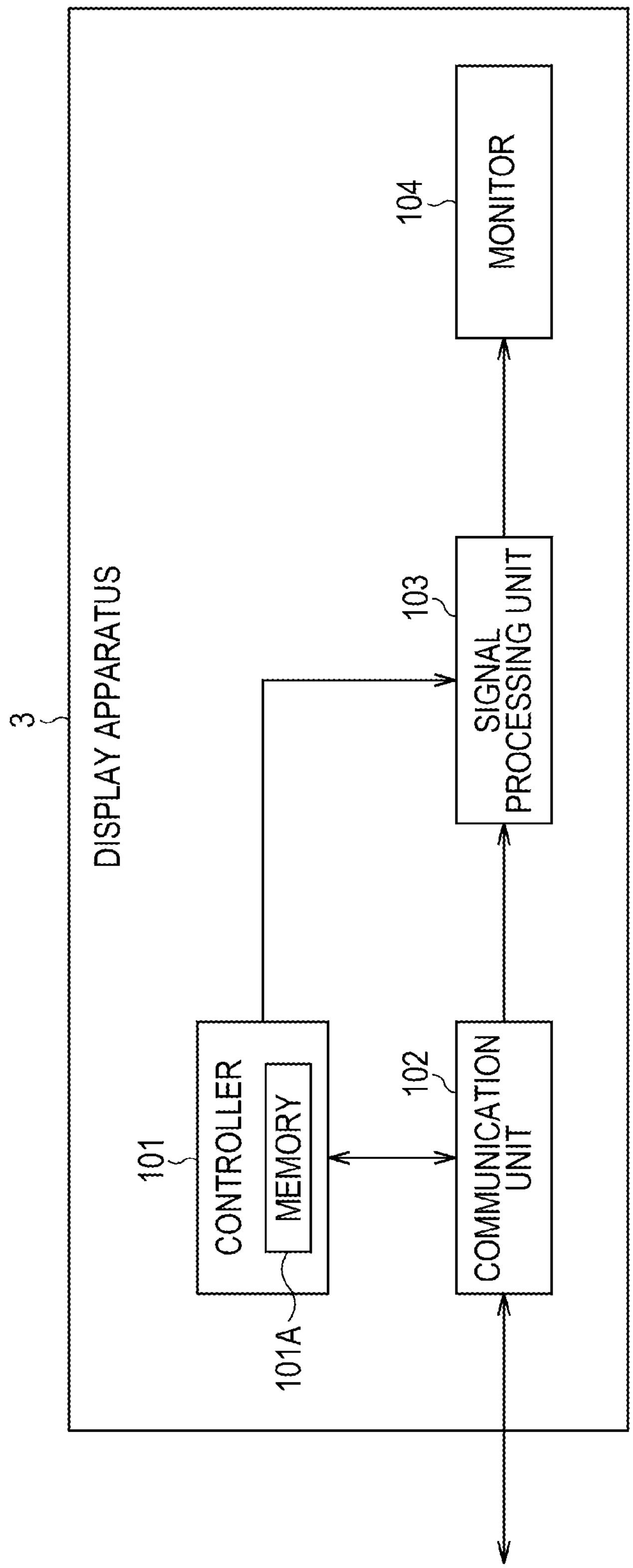
FIG. 37 is a block diagram illustrating a configurational example of a display apparatus 3.

FIG. 37 is a block diagram illustrating a configurational example of the display apparatus 3 of FIG. 1.

The display apparatus 3 is configured to include a controller 101, a communication unit 102, a signal processing unit 103, and a monitor 104. The controller 101 is configured to include a memory 101A which stores, for example, EDID (Extended display identification data) or the like representing the performance of the monitor 104.

The controller 101 is configured to include a CPU, ROM, RAM, and the like. The controller 101 controls overall operations of the display apparatus 3 by executing predetermined software.

For example, at the time of performing authentication with respect to the reproduction apparatus 2, the controller 101 outputs the EDID stored in the memory 101A to the communication unit 102 and allows the EDID to be transmitted to the reproduction apparatus 2. The performance of the monitor 104 of the display apparatus 3 is specified by the reproduction apparatus 2 based on the EDID.

The communication unit 102 performs communication with the reproduction apparatus 2 through the cable 4 (FIG. 1). The communication unit 102 receives the HDR data or the STD data transmitted from the reproduction apparatus 2 and outputs the HDR data or the STD data to the signal processing unit 103. In addition, the communication unit 102 transmits the EDID supplied by the controller 101 to the reproduction apparatus 2.

The signal processing unit 103 performs a process on the HDR data or the STD data supplied by the communication unit 102 and displays the image on the monitor 104.

<Displaying Process of Display Apparatus 3>

Figure 38:
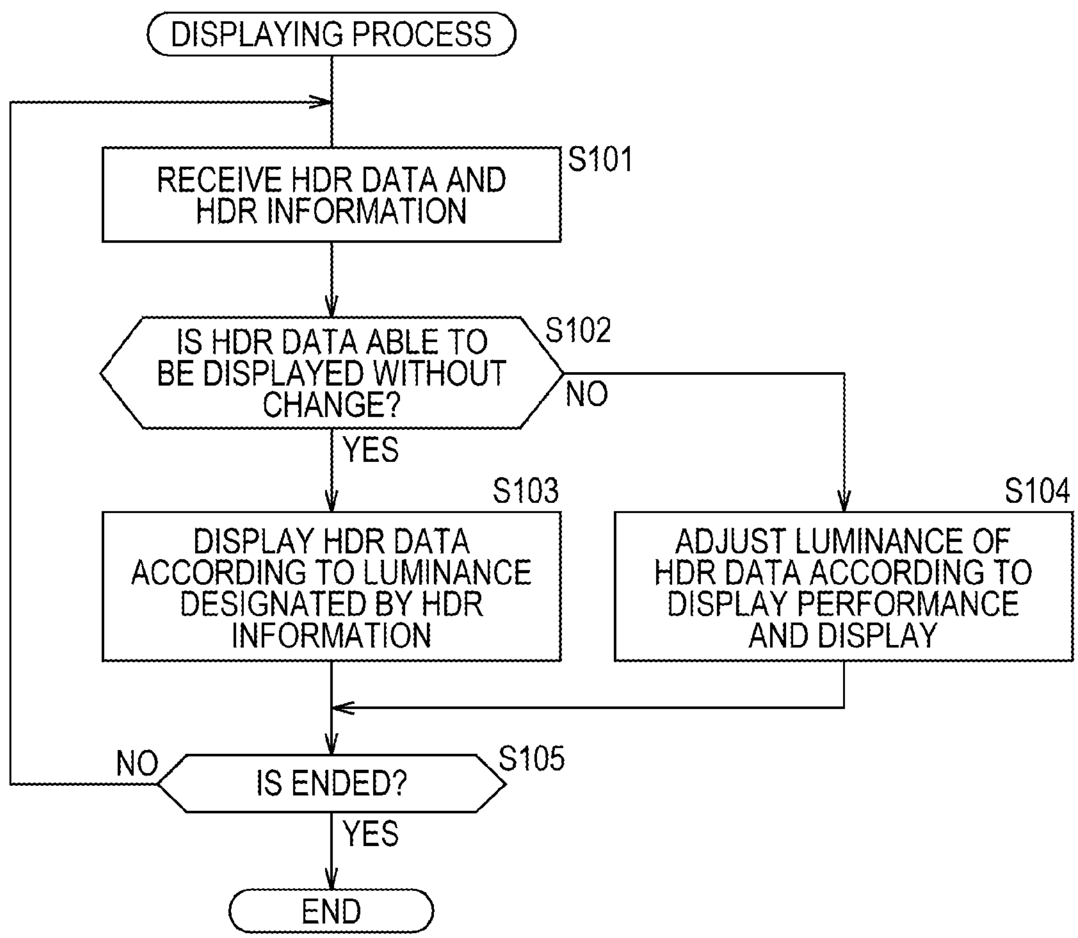
FIG. 38 is a flowchart for describing an example of a displaying process performed by the display apparatus 3.

FIG. 38 is a flowchart for describing an example of the displaying process of the display apparatus 3 of FIG. 37.

Herein, a case where the monitor 104 included in the display apparatus 3 is an HDR monitor will be described. To the display apparatus 3 including the HDR monitor, the HDR data added with the feature information are transmitted from the reproduction apparatus 2.

In step S101, the communication unit 102 of the display apparatus 3 receives the HDR data and the feature information transmitted from the reproduction apparatus 2, and the procedure proceeds to step S102.

In step S102, the controller 101 determines with reference to the feature information whether or not the HDR data transmitted from the reproduction apparatus 2 can be displayed without change. The feature information includes the HDR data of the master, namely, the TMI as the feature information representing the features of luminance of the HDR data transmitted from the reproduction apparatus 2. The determination of step S102 is performed by comparing the features of the luminance of the HDR data specified by the TMI as the feature information with the display performance of the monitor 104.

For example, in a case where the dynamic range of the HDR data specified by the TMI as the feature information is 0 to 400% and the dynamic range of the monitor 104 is 0 to 500% (for example, 500 cd/$m^2$ if the brightness of 100% is 100 cd/$m^2$) it is determined that the HDR data can be displayed without change. On the other hand, in a case where the dynamic range of the HDR data specified by the TMI as the feature information is 0 to 400% and the dynamic range of the monitor 104 is 0 to 300%, it is determined that the HDR data is not able to be displayed without change.

In a case where it is determined in step S102 that HDR data can be displayed without change, the procedure proceeds to step S103, and the signal processing unit 103 displays the HDR image corresponding to the HDR data on the monitor 104 according to the luminance designated by the TMI as the feature information. For example, in a case where the features of the luminance indicated by the curve L12 of FIG. 12 are designated by the TMI as the feature information, each luminance value represents the brightness in a range of 0 to 400% indicated by the curve L12.

On the other hand, in a case where it is determined in step S102 that the HDR data is not allowed to be displayed without change, the procedure proceeds step S104, the signal processing unit 103 adjusts the luminance of the HDR data according to the display performance of the monitor 104 and displays the HDR image corresponding to the HDR data of which luminance is adjusted. For example, in a case where the features of the luminance indicated by the curve L12 of FIG. 12 are designated by the feature information and the dynamic range of the monitor 104 is 0 to 300%, the compression is performed so that each luminance value represents the brightness in a range of 0 to 300%.

In step S103, in addition, after the HDR image corresponding to the HDR data is displayed in step S104, the procedure proceeds to step S105, and the controller 101 determines whether or not the displaying is to be ended. In a case where it is determined that the display is not to be ended, the processes after the step S101 are repeated. In a case where it is determined in step S105 that the displaying is to be ended, the displaying process is ended.

Due to a series of processes described above, the generation apparatus 1 stores the HDR data of the master in the MP4 file in the state of the HDR data, allows the HDR data to be reproduced in the reproduction apparatus 2, and allows the HDR image corresponding to the HDR data to be displayed on the display apparatus 3.

In addition, the generation apparatus 1 converts the HDR data of the master into the STD data to store the STD data in the MP4 file, allows the STD data to be recovered into the HDR data in the reproduction apparatus 2, and allows the HDR image corresponding to the HDR data to be displayed on the display apparatus 3.

During the reproducing of the HDR data, the features of the luminance of the HDR data of the master is allowed to be designated by the TMI as the feature information, so that an author of content can display the HDR image corresponding to the HDR data with intended luminance.

In addition, the generation apparatus 1 stores the track of the video (stream thereof) and the track of the ST (stream thereof) including the TMI as the HDR information (feature information and conversion information) in the MP4 file.

Therefore, the track of the ST may include the vtmi box which stores the track_IDs[ ] as the track designating information designating the track of the video including the TMI which is to be applied to the track of the ST and the tirf box which stores the tone_mapping_info_id_ref as the HDR designating information designating the TMI which is to be applied to the track of the ST.

As a result, the reproduction apparatus 2 acquires, as a TMI which is to be applied to the ST, the TMI (having the tone_map_id) designated by the tone_mapping_info_id_ref stored in the tirf box included in the track of the ST among the TMIs included in the track of the video (having the track_id) represented by the track_IDs[ ] stored in the vtmi box included in the track of the ST and can use the TMI for the processing of the ST.

Therefore, in the MP4 file (hereinafter, sometimes referred to as a first MP4 file) generated in the generation apparatus 1 of the first configurational example of FIG. 20, since the TMI included in the track of the video can be diverted to be used for the ST, there is no need to separately add the TMI to the ST.

In addition, in the case described above, during the generating of the first MP4 file, with respect to the ST, since the TMI of the video which is simultaneously displayed with the ST is employed as the TMI of the ST, the TMI of the ST depends on the TMI of the video.

However, with respect to the video and the ST, the TMIs are separately generated, and besides the TMI of the video, the TMI of the ST is included in the stream of the video, so that it is possible to prevent the TMI of the ST from depending on the TMI of the video.

<Second Configurational Example of Generation Apparatus 1>

Figure 39:
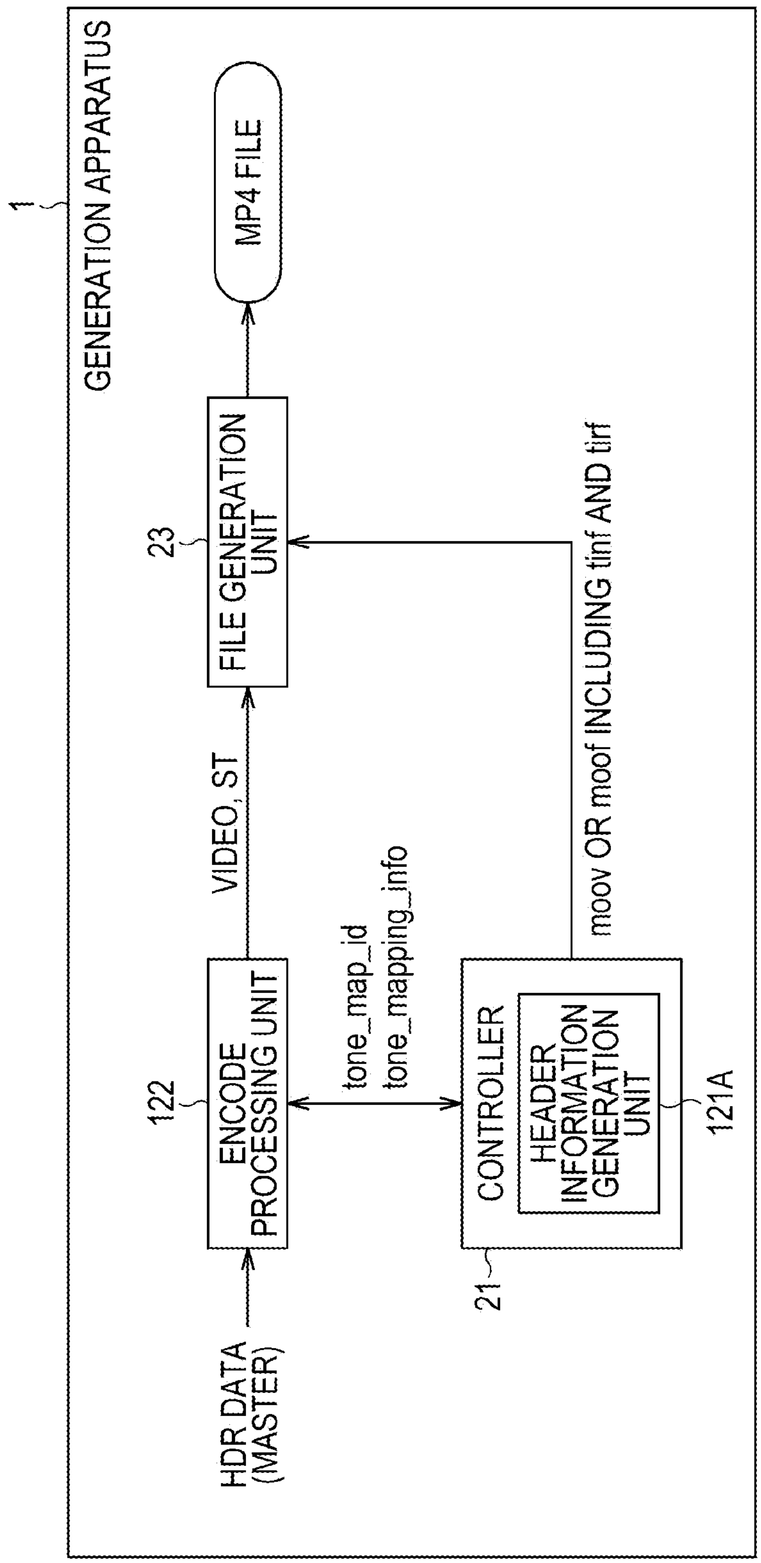
FIG. 39 is a block diagram illustrating a second configurational example of the generation apparatus 1.

FIG. 39 is a block diagram illustrating a second configurational example of the generation apparatus 1 of FIG. 1.

In addition, in the figure, the components corresponding to the case of FIG. 20 are denoted by the same reference numerals, and hereinafter, the description thereof will be appropriately omitted.

In FIG. 39, the generation apparatus 1 is configured to include a controller 21, a file generation unit 23, and an encode processing unit 122.

Therefore, the generation apparatus 1 of FIG. 39 is the same as that of the case of FIG. 20 in that the generation apparatus 1 is configured to include the controller 21 and the file generation unit 23, and the generation apparatus 1 is different from that of the case of FIG. 20 in that the encode processing unit 122 is installed instead of the encode processing unit 22.

In addition, the generation apparatus 1 of FIG. 39 is different from that of the case of FIG. 20 in that the controller 21 is configured to include a header information generation unit 121A instead of the header information generation unit 21A.

In the generation apparatus 1 of FIG. 39, HDR data of a master are input to the encode processing unit 22.

Similarly to the header information generation unit 21A of FIG. 20, the header information generation unit 121A generates a tirf box (FIG. 24) which stores tone_map_id supplied by the encode processing unit 122 as tone_mapping_info_id_ref.

In addition, the header information generation unit 121A generates a tinf box (ToneMappingInformationBox) which stores TMI (tone_mapping_info) supplied by the encode processing unit 122 as ToneMapinfo (class object).

Next, the header information generation unit 121A generates a moon box including the tirf box and the tinf box or a moof box as header information and supplies the header information to the file generation unit 23.

The tinf box will be described later.

Similarly to the encode processing unit 22 of FIG. 20, the encode processing unit 122 generates a video stream and an ST stream by performing encoding the HDR data of the master and outputs the video stream and the ST stream to the file generation unit 23.

In addition, similarly to the encode processing unit 22 of FIG. 20, the encode processing unit 122 supplies tone_map_id of the TMI (tone_mapping_info) which is to be applied to the video or the ST to the controller 21 (header information generation unit 121A thereof).

In addition, the encode processing unit 122 supplies the TMI which is to be applied to the video and the ST to the controller 21 (header information generation unit 121A thereof).

Figure 40:
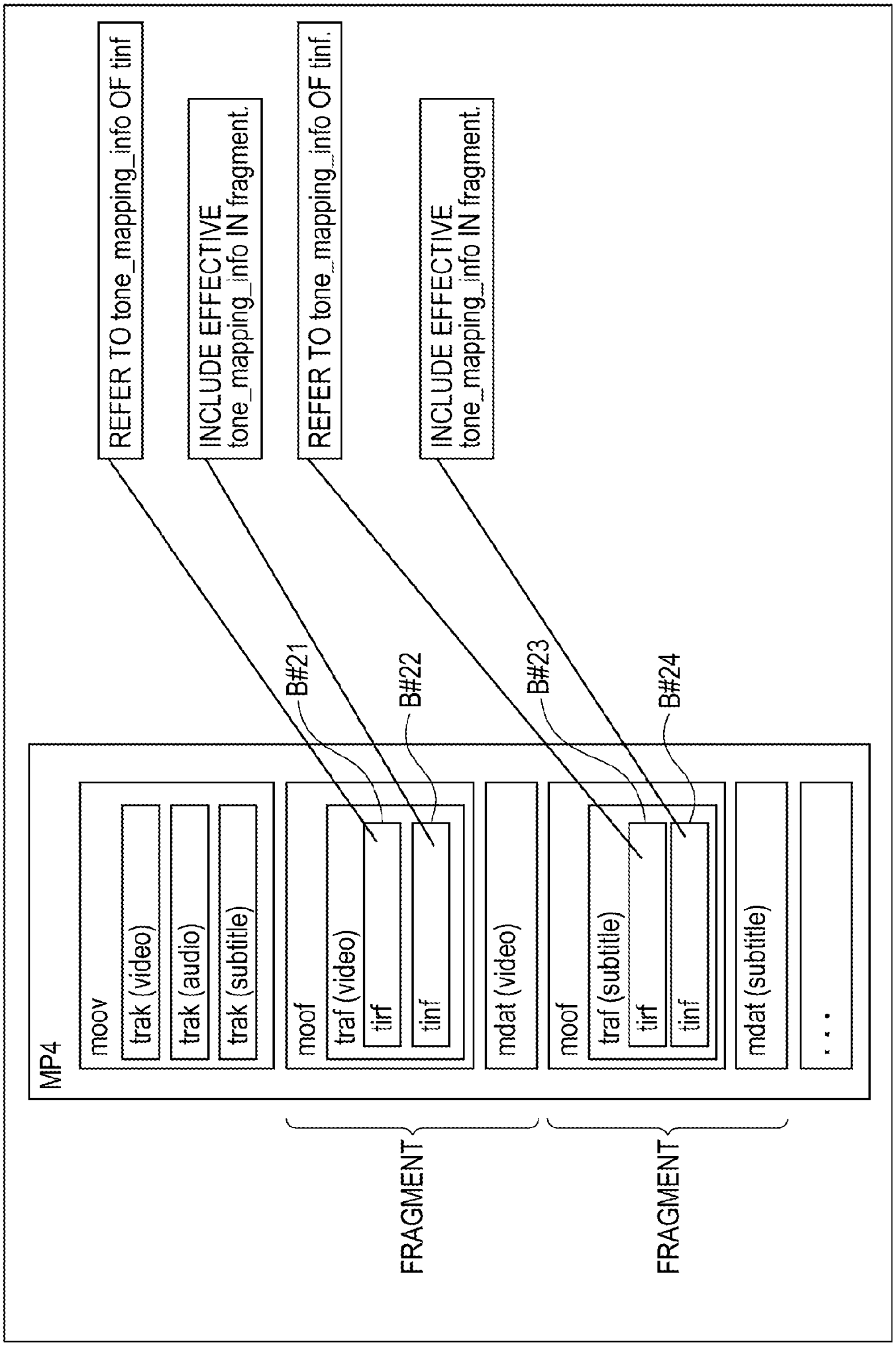
FIG. 40 is a diagram illustrating an example of a second MP4 file generated by the generation apparatus 1.

FIG. 40 is diagram illustrating an example of an MP4 file (hereinafter, sometimes referred to as a second MP4 file) generated by the generation apparatus 1 of FIG. 39.

The second MP4 file of FIG. 40 is an MP4 file of the fragmented movie having fragments, and a moon box include trak boxes of video, audio, and ST.

Therefore, the second MP4 file of FIG. 40 includes the track of the video, the track of the audio, and the track of the ST.

Herein, in the first MP file (FIG. 21, FIG. 25), since the TMI is included in the track of the video but not included in the track of the ST, the TMI included in the track of the video is diverted to be used for the ST. However, in the second MP file, the TMI which is to be applied to the media is included in the track of each of the media such as the video or the ST.

Namely, the generation apparatus 1 of FIG. 39 generates an MP4 file where TMI which is to be applied to the media is included in the track of the media as a second MP4 file for each of the media.

Therefore, in FIG. 40, the moof/traf box of each of media includes a tirf box and a tinf box (ToneMappingInformationBox) (tone mapping information box).

As described with reference to FIG. 21, the tirf box is a box which is newly defined to designate the TMI which is to be applied to the target track of interest and to store the tone_mapping_info_id_ref representing the tone_map_id.

The tinf box is a box which is newly defined to store the TMI (tone_mapping_info).

In the MP4 file of the fragmented movie, as illustrated in FIG. 40, the tinf box B#22 which stores the TMI which is to be applied to the video (track thereof) and the tirf box B#21 which stores the tone_mapping_info_id_ref representing the tone_map_id of the TMI which is to be applied to the video among the TMIs stored in the tinf box B#22 are stored in the moof/traf box of the track of the video.

Similarly, the tinf box B#24 which stores the TMI which is to be applied to the ST (track thereof) and the tirf box B#23 which stores the tone_mapping_info_id_ref representing the tone_map_id of the TMI which is to be applied to the ST among the TMIs stored in the tinf box B#24 are stored in the moof/traf box of the track of the ST.

Therefore, according to the second MP4 file of FIG. 40, for example, if the track of the video is considered to be a target track, it may be recognized that the TMI which has the tone_map_id represented by the tone_mapping_info_id_ref stored in the moof/tarf/tirf box B#21 of the target track among the TMIs stored in the moof/traf/tinf box B#22 of the target track is a TMI which is to be applied to the target track.

In addition, according to the MP4 file of FIG. 40, for example, if the track of the ST is considered to be a target track, it may also be recognized that the TMI which has the tone_map_id represented by the tone_mapping_info_id_ref stored in the moof/tarf/tirf box B#23 of the target track among the TMIs stored in the moof/traf/tinf box B#24 of the target track is a TMI which is to be applied to the target track.

In addition, although the MP4 file of the fragmented movie includes the moof box for each fragment, effective TMIs among the TMIs having the tone_map_id represented by the tone_mapping_info_id_ref stored in the moof/traf/tirf box of the fragment are applied to data of some fragments.

FIG. 41 is a diagram illustrating an example of definition of the tinf box.

The tinf box (ToneMappingInformationBox) (tone mapping information box) is a box which is newly defined as a box which stores the TMI which is to be applied to the track including the tinf box as ToneMapinfo (class object tonemap), and the tinf box is stored in the trak box (stbl box stored therein) or the traf box.

FIG. 42 is a diagram illustrating a first example of the syntax of the ToneMapinfo.

The ToneMapinfo of FIG. 42 has the same configuration as the TMI (tone_mapping_info) of FIG. 7 except that a padding_value for byte alignment is inserted.

FIG. 43 is a diagram illustrating a second example of the syntax of the ToneMapinfo.

The ToneMapinfo of FIG. 43 has the same configuration as the case of FIG. 42 except that the component_idc is newly defined.

In a case where the component_idc is, for example, 0, the TMI represented by the ToneMapinfo of FIG. 43 is commonly applied to, for example, all components R, G, and B as plural components constituting an image.

In addition, in a case where the component_idc is, for example, 1, the TMI represented by the ToneMapinfo of FIG. 43 is applied to, for example, only R which is one of the components R, G, and B constituting an image.

In addition, in a case where the component_idc is, for example, 2, the TMI represented by the ToneMapinfo of FIG. 43 is applied to, for example, only G which is one of the components R, G, and B constituting an image. In addition, in a case where the component_idc is, for example, 3, the TMI represented by the ToneMapinfo of FIG. 43 is applied to, for example, only B which is one of the components R, G, and B constituting an image.

According to the ToneMapinfo of FIG. 43, the to-be-applied TMI can be changed in units of a component.

FIG. 44 is a diagram illustrating a third example of the syntax of the ToneMapinfo.

The ToneMapinfo of FIG. 44 has the same configuration as the case of FIG. 42 except that the num_of_components is newly defined.

In a case where the num_of_components is, for example, 0, the TMI represented by the ToneMapinfo of FIG. 44 is commonly applied to, for example, all the R, G, and B as plural components constituting an image.

In addition, in a case where the component_idc is, for example, 3, the TMI for R, the TMI for G, and the TMI for B which are applied to the components R, G, and B constituting the image are described in the ToneMapinfo of FIG. 43, for example, in this order.

According to the ToneMapinfo of FIG. 43 or 44, with respect to each of the components constituting the image, the TMI which is to be applied to the component may be independently described.

Figure 45:
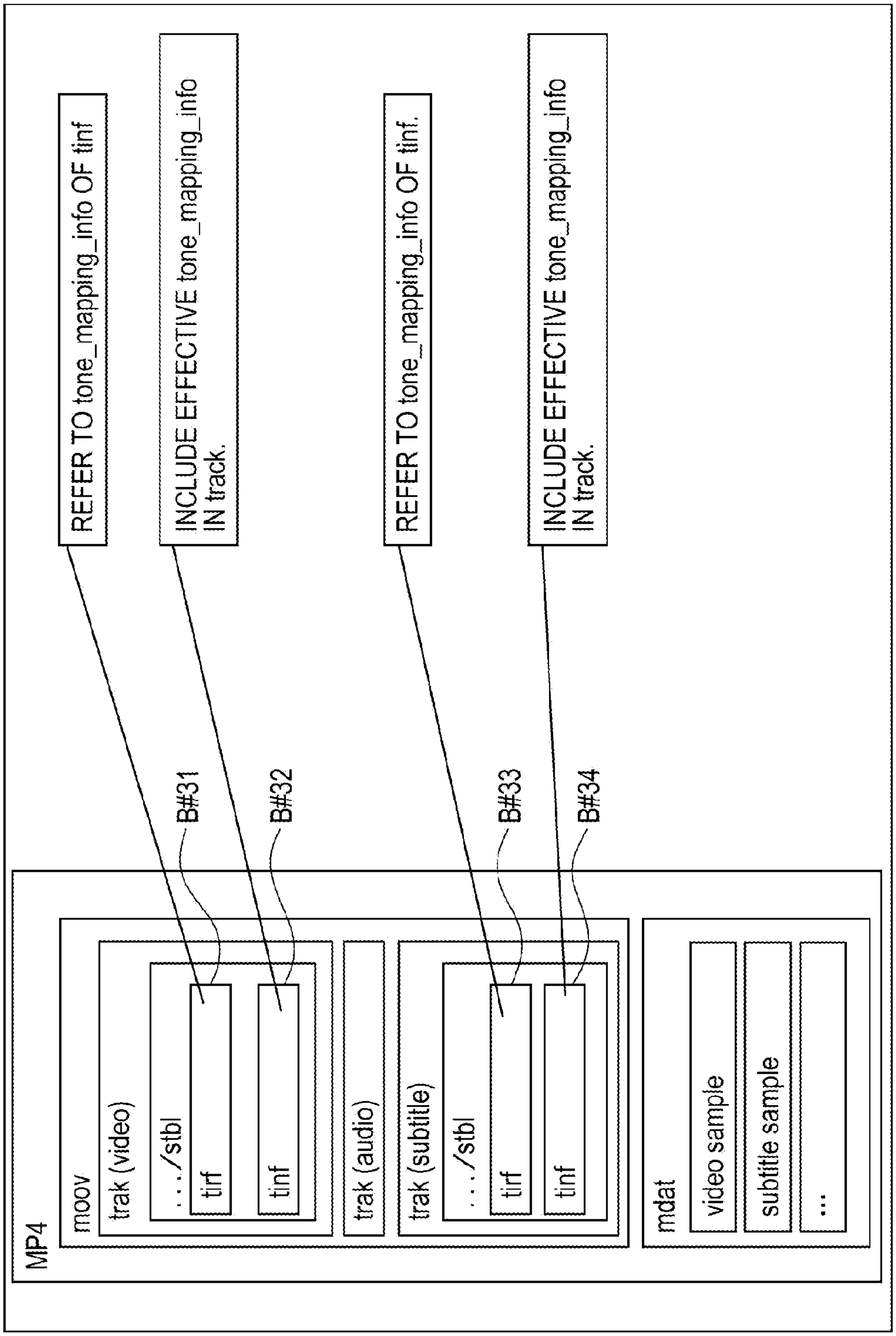
FIG. 45 is a diagram illustrating another example of the second MP4 file generated by the generation apparatus 1.

FIG. 45 is a diagram illustrating another example of the second MP4 file generated by the generation apparatus 1 of FIG. 39.

The second MP4 file of FIG. 45 is an MP4 file of the non-fragmented movie which does not include any fragment, and a moon box includes a trak box of a video, a trak box of an audio, and a trak box of an ST.

Therefore, the second MP4 file of FIG. 45 is configured to include a track of a video, a track of an audio, and a track of an ST.

Similarly to the case of FIG. 40, in the second MP file of FIG. 45, the TMIs which are to be applied to the media are included in the tracks of the respective media such as the video or the ST.

Namely, in the MP4 file of the non-fragmented movie, as illustrated in FIG. 45, with respect to the track of the video, the tinf box B#32 which stores the TMI which is to be applied to the video (track thereof) and the tirf box B#31 which stores the tone_mapping_info_id_ref representing the tone_map_id of the TMI which is to be applied to the video are stored in the trak/stbl box of the track of the video of the moov box.

Similarly, with respect to the track of the ST, the tinf box B#34 which stores the TMI which is to be applied to the ST (track thereof) and the tirf box B#33 which stores the tone_mapping_info_id_ref representing the tone_map_id of the TMI which is to be applied to the ST are stored in the trak/stbl box of the track of the ST of the moov box.

Therefore, according to second MP4 file of FIG. 45, for example, if the track of the video is considered to be a target track, it may be recognized that the TMI which has the tone_map_id represented by the tone_mapping_info_id_ref stored in the tirf box B#31 included in the stbl box among the TMIs stored in the tinf box B#32 included in the stbl box included in the trak box of the target track (herein, the track of the video) of the moov box is a TMI which is to be applied to the target track.

In addition, for example, if the track of the ST is considered to be the target track, similarly to the case of the video, it may be recognized that the TMI which has the tone_map_id represented by the tone_mapping_info_id_ref stored in the tirf box B#33 included in the stbl box among the TMIs stored in the tinf box B#34 included in the stbl box included in the trak box of the target track (herein, the track of the ST) of the moov box is a TMI which is to be applied to the target track.

In addition, in the MP4 file of the non-fragmented movie, an effective TMI among the TMIs stored in the tinf box of the target track is applied to the target track.

As described above, in the generation apparatus 1 of FIG. 39, since the second MP4 file which stores the target track including the TMI (tinf box storing the TMI) as the HDR information and the tone_mapping_info_id_ref (tirf box storing the tone_mapping_info_id_ref) as the HDR designating information designating the TMI which is to be applied to the target track of the interest among the TMIs is generated, the TMI which is to be applied to each of the media can be independently added to each of the media such as the video or the ST.

In addition, in the case of encoding the video, for example, in accordance with the HEVC scheme, although the video stream where the TMI of the video is inserted into the SEI is generated, in the second MP4 file, the TMI which is to be applied to the media can be added to the media other than the video independently of the TMI which is inserted into the SEI.

Therefore, the video including the TMI having an m2ts format recorded in, for example, a Blu-ray (registered trademark) disk and the ST reproduced together with the TMI can be converted into the MP4 file without separately adding the TMI which is to be applied to the ST to the ST.

As a result, the introduction of the TMI to the MP4 file is facilitated, so that it is possible to increase the chance that a user enjoys an HDR image such an HDR video or an HDR ST.

In addition, in the case of encoding the video, for example, in accordance with the HEVC scheme, since the video stream where the TMI of the video is inserted into the SEI is generated, in the second MP4 file, the TMI inserted into the SEI and the TMI stored in the tinf box included in the track of the video exist as the TMI of the video.

In this case, in the reproduction apparatus 2 (FIG. 1), which one of the TMI inserted into the SEI and the TMI stored in the tinf box included in the track of the video is used as the TMI which is to be applied to the video may, for example, be determined in advance or be selected according to user's manipulation.

In the embodiment, it is assumed that, with respect to the second MP4 file, for example, the TMI stored in the tinf box among the TMI inserted into the SEI and the TMI stored in the tinf box included in the track of the video is used as the TMI which is to be applied to the video.

Herein, according to the data of the ST having an SMPTE-TT format, although plural display screens of the ST may be included in one sample which is the unit of access to the MP4 file, in the second MP4 file, in a case where the plural display screens of the ST are included in one sample, the TMI which is to be applied to each of the plural display screens of the ST included in one sample is the same TMI, and it is difficult to change the to-be-applied TMI for each display screen.

<Configurational Example of Encode Processing Unit 122>

Figure 46:
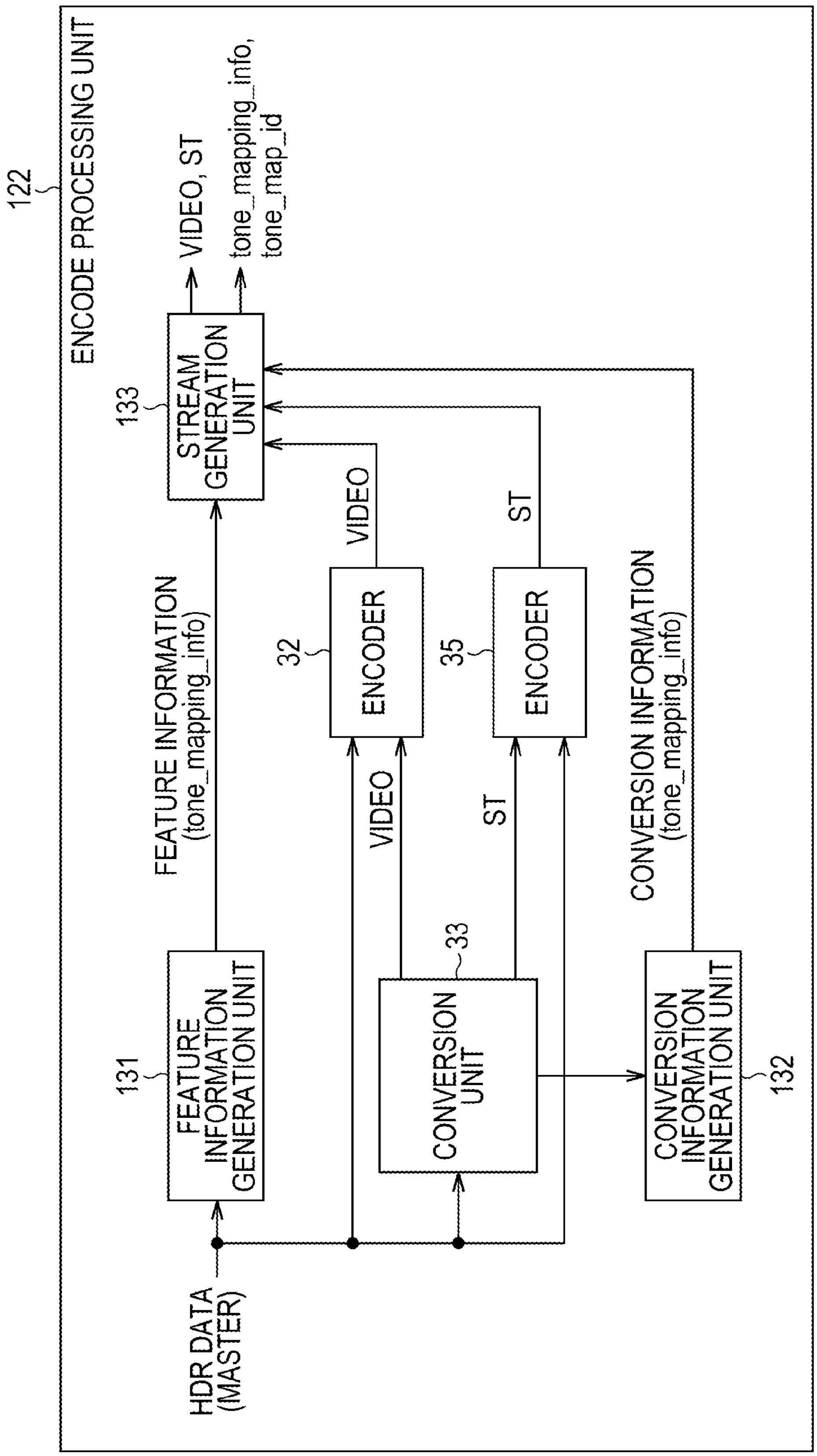
FIG. 46 is a block diagram illustrating a configurational example of an encode processing unit 122.

FIG. 46 is a configurational example of the encode processing unit 122 of FIG. 39.

In addition, in the figure, the components corresponding to the encode processing unit 22 of FIG. 26 are denoted by the same reference numerals, and hereinafter, the description thereof will be appropriately omitted.

The encode processing unit 122 is configured to include an encoder 32, a conversion unit 33, a conversion information generation unit 34, an encoder 35, a feature information generation unit 131, a conversion information generation unit 132, and a stream generation unit 133.

Therefore, the encode processing unit 122 of FIG. 46 is the same as the encode processing unit 22 of FIG. 26 in that the encode processing unit 122 is configured to include the encoder 32, the conversion unit 33, and the encoder 35.

However, the encode processing unit 122 of FIG. 46 is different from the encode processing unit 22 of FIG. 26 in that the feature information generation unit 131, the conversion information generation unit 132, and the stream generation unit 133 are installed instead of the feature information generation unit 31, the conversion information generation unit 34, and the stream generation unit 36.

Similarly to the feature information generation unit 31 of FIG. 26, the feature information generation unit 131 detects the luminance of the HDR data of the master which are input to the encode processing unit 122 to generate a TMI as the feature information and supplies the TMI to the stream generation unit 133.

However, the feature information generation unit 131 separately generates the TMIs as the feature information with respect to the HDR video and the HDR ST among the HDR data of the master.

In addition, similarly to the feature information generation unit 31 of FIG. 26, in the feature information generation unit 131, with respect to the HDR video, the TMI as the feature information of the HDR video may be generated; and with respect to the HDR ST, the TMI as the feature information of the HDR video which is simultaneously displayed with the HDR ST may be employed as the TMI as the feature information of the ST (HDR ST).

Similarly to the conversion information generation unit 34 of FIG. 26, the conversion information generation unit 132 generates a TMI as the conversion information based on the information supplied by the conversion unit 33.

However, the conversion information generation unit 132 separately generates the TMIs as the conversion information with respect to the HDR video and the HDR ST among the HDR data of the master and supplies the TMIs to the stream generation unit 133.

In addition, similarly to the conversion information generation unit 34 of FIG. 26, with respect to the HDR video, the conversion information generation unit 132 may generate a TMI as the conversion information of the HDR video, and with respect to the HDR ST, the conversion information generation unit 132 may employ the TMI as the conversion information of the HDR video which is to be displayed simultaneously together with the HDR ST as the TMI as the conversion information of the ST (HDR ST).

The stream generation unit 133 supplies the tone_map_id of the TMI as the feature information of the video and the ST supplied by the feature information generation unit 131 and the tone_map_id of the TMI as the conversion information of the video and the ST supplied by the conversion information generation unit 132 to the controller 21 (FIG. 39).

Besides, the stream generation unit 133 performs the same processes as those of the stream generation unit 36 of FIG. 26.

Namely, the stream generation unit 133 supplies the tone_map_id of the TMI as the feature information of the video and the ST supplied by the feature information generation unit 131 and the tone_map_id of the TMI as the conversion information of the video and the ST supplied by the conversion information generation unit 132 to the controller 21.

In addition, the stream generation unit 133 inserts, as the SEI, the TMI of the video into the encoded data of the video supplied by the encoder 32 to generate a video stream.

In addition, the stream generation unit 133 supplies the data of the ST supplied by the encoder 35 as the ST stream together with the video stream to the file generation unit 23 of FIG. 39.

In addition, in the stream generation unit 133, the TMI of the video may not be inserted into the encoded data of the video supplied by the encoder 32, but the encoded data may be used as the video stream with change.

<File Generating Process of Generation Apparatus 1>

Figure 47:
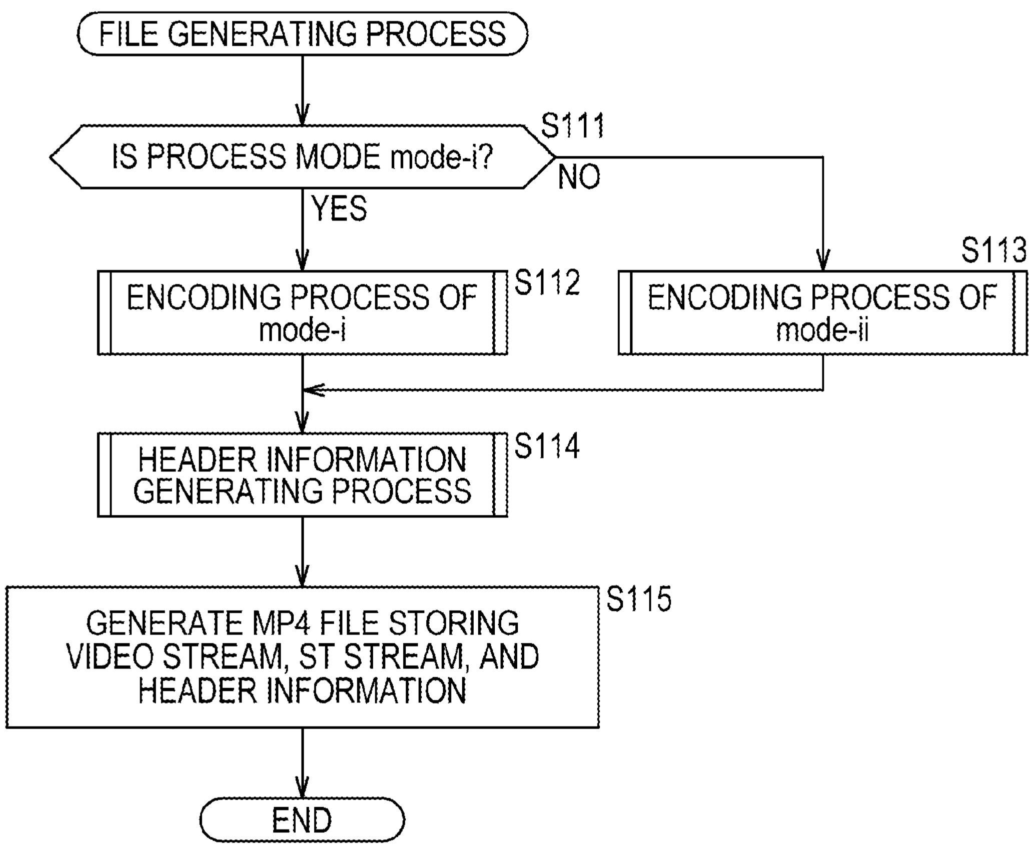
FIG. 47 is a flowchart for describing an example of a file generating process performed by the generation apparatus 1.

FIG. 47 is a flowchart for describing an example of the file generating process performed by the generation apparatus 1 of FIG. 39.

If the HDR data of the master are input to the generation apparatus 1, similarly to step S1 of FIG. 29, in step S111, the controller 21 of the generation apparatus 1 determines whether or not the process mode is mode-i.

In a case where it is determined in step S111 that the process mode is mode-i, the procedure proceeds to step S112, and the encode processing unit 122 performs the encoding process of the mode-i. The video stream and the ST stream generated through the encoding process of the mode-i are supplied from the encode processing unit 122 to the file generation unit 23.

On the other hand, in a case where it is determined in step S111 that the process mode is mode-ii, the procedure proceeds to step S113, and the encode processing unit 122 performs the encoding process of the mode-ii. The video stream and the ST stream generated through the encoding process of the mode-ii are supplied from the encode processing unit 122 to the file generation unit 23.

After step S112 or S113, the procedure proceeds to step S114, and the header information generation unit 121A performs a header information generating process. The header information generated in header information generating process is supplied from the header information generation unit 121A to the file generation unit 23, and the procedure proceeds to step S115.

In step S115, the file generation unit 23 generates and outputs the second MP4 file of FIG. 40 or 45 which stores the video stream and the ST stream supplied by the encode processing unit 122 and the header information supplied by the header information generation unit 121A, and the file generating process is ended.

Figure 48:
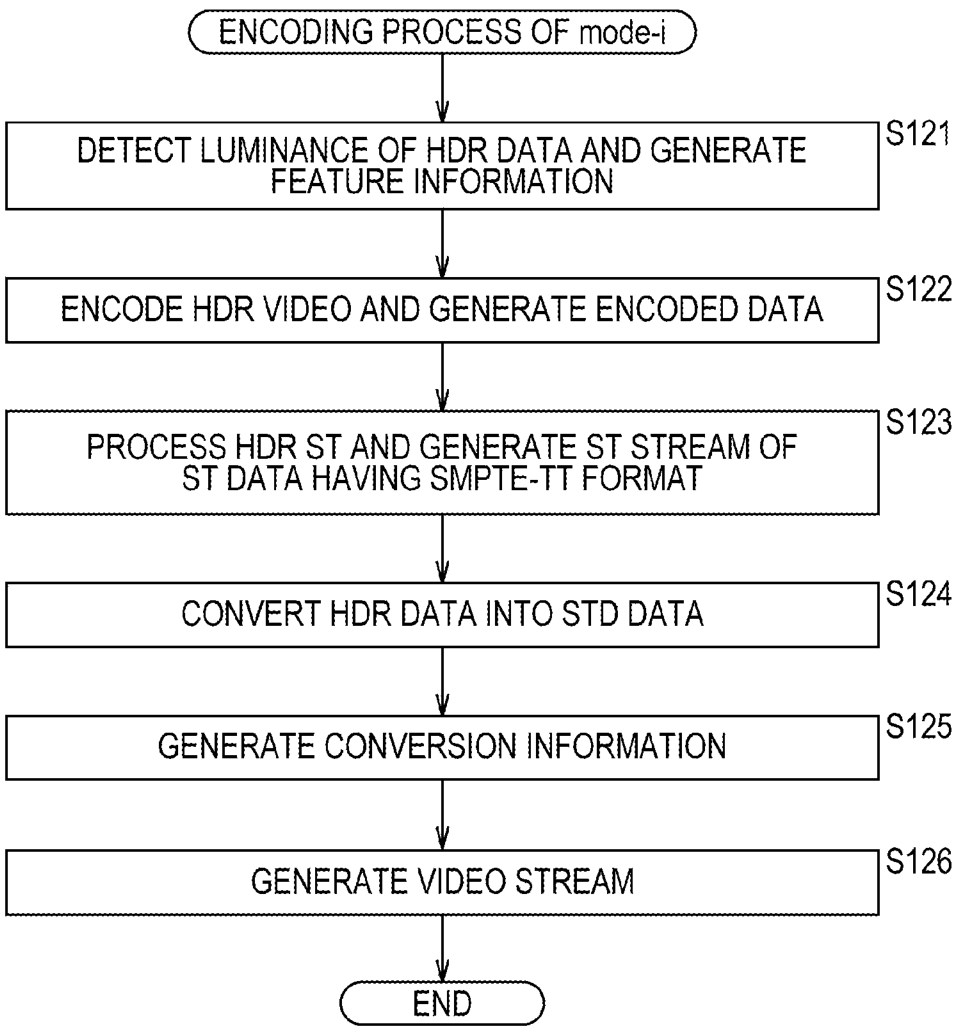
FIG. 48 is a flowchart for describing an example of an encoding process of mode-i performed in step S112.

FIG. 48 is a flowchart for describing an example of the encoding process of the mode-i performed in step S112 of FIG. 47.

In step S121, the feature information generation unit 131 of the encode processing unit 122 (FIG. 46) detects the luminance of the HDR data of the master to generate TMI as the feature information of the video and the ST and supplies the TMI to the stream generation unit 133, and the procedure proceeds to step S122.

In step S122, the encoder 32 encodes the HDR of the master in accordance with the HEVC scheme to generate encoded data of the HDR video and supplies the encoded data to the stream generation unit 133, and the procedure proceeds to step S123. In addition, the video encode scheme is not limited to the HEVC scheme.

In step S123, the encoder 35 encodes the HDR ST of the master to generate data of the ST having an SMPTE-TT format and supplies the data of the ST to the stream generation unit 133, and the procedure proceeds to step S124.

In step S124, the conversion unit 33 converts the input HDR data of the master into an STD data and supplies information representing a relationship between the HDR data and the STD data (information representing a relationship between the input data and the output data where the RGB signals of the HDR data are set to the input data and the RGB signals of the STD data are set to the output data) to the conversion information generation unit 132.

After that, the procedure proceeds from step S124 to step S125, the conversion information generation unit 132 generates a TMI as the conversion information of the video and the ST based on the information supplied by the conversion unit 33 and supplies the TMI to the stream generation unit 133, and the procedure proceeds to step S126.

In step S126, the stream generation unit 133 inserts, as the SEI of the encoded data, the TMI as the feature information supplied by the feature information generation unit 131 and the TMI as the conversion information supplied by the conversion information generation unit 132 into the encoded data supplied by the encoder 32 to generate a video stream.

Next, the stream generation unit 133 supplies the data of the ST supplied by the encoder 35 as the ST stream together with the video stream to the file generation unit 23 (FIG. 39).

In addition, the stream generation unit 133 supplies the TMI (TMI which is to be applied to the video) of the video and the tone_map_id of the TMI and the TMI (TMI which is to be applied to the ST) of the ST and the tone_map_id of the TMI to the controller 21 (FIG. 39), and the encoding process of the mode-i is ended.

Figure 49:
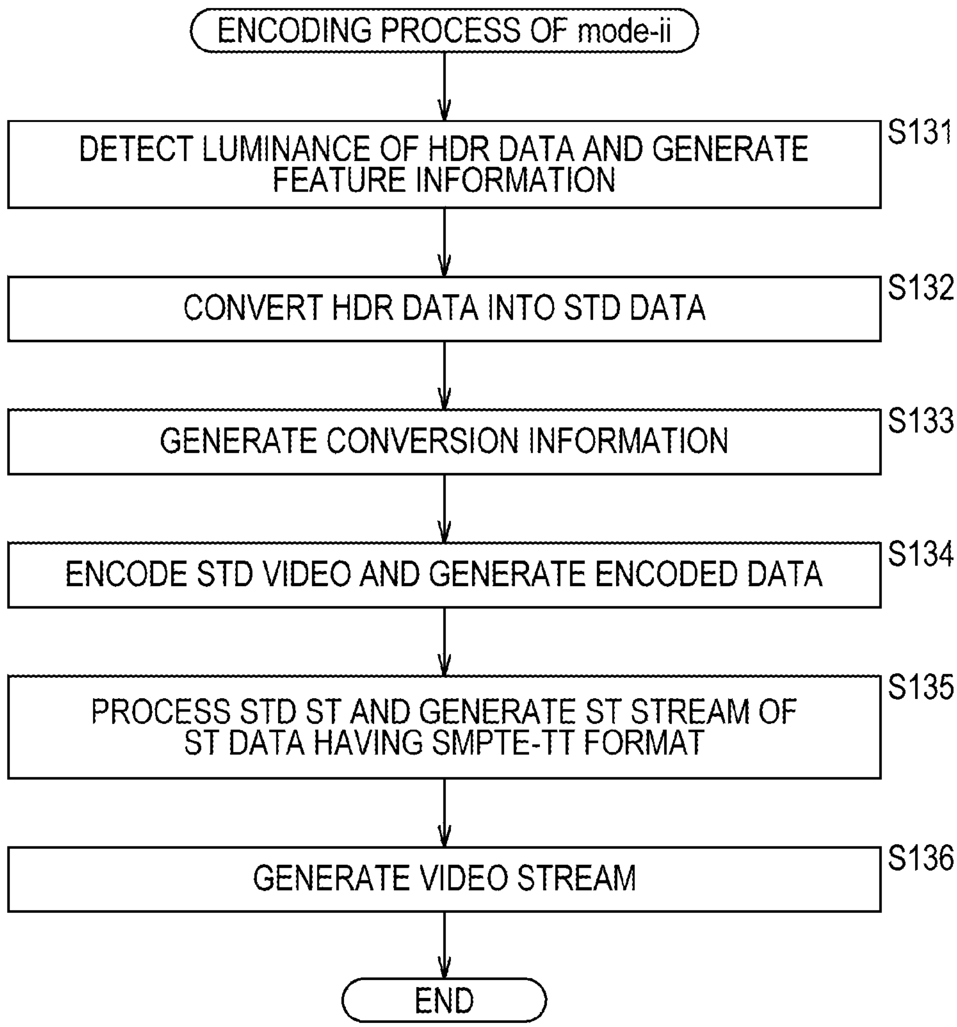
FIG. 49 is a flowchart for describing an example of an encoding process of mode-ii performed in step S113.

FIG. 49 is a flowchart for describing an example of the encoding process of the mode-ii performed in step S113 of FIG. 47.

In step S131, the feature information generation unit 131 of the encode processing unit 122 detects the luminance of the HDR data of the master to generate a TMI as the feature information of the video and the ST and supplies the TMI to the stream generation unit 133.

After that, in step S132, the conversion unit 33 converts the input HDR data of the master into STD data, and the conversion unit 33 supplies the STD video among the STD data to the encoder 32 and supplies the STD ST to the encoder 35.

In addition, the conversion unit 33 supplies information representing a relationship between the HDR data and the STD data to the conversion information generation unit 132, and the procedure proceeds from step S132 to step S133.

In step S133, the conversion information generation unit 132 generates a TMI as the conversion information of the video and the ST based on the information supplied by the conversion unit 33 and supplies the TMI to the stream generation unit 133, and the procedure proceeds to step S134.

In step S134, the encoder 32 encodes the STD video supplied by the conversion unit 33 in accordance with the HEVC scheme to generate encoded data of the STD video and supplies the encoded data to the stream generation unit 133. In addition, the video encode scheme is not limited to the HEVC scheme.

After that, in step S135, the encoder 35 encodes the STD ST supplied by the conversion unit 33 to generate data of the ST having an SMPTE-TT format and supplies the data of the ST to the stream generation unit 133.

Next, in step S136, the stream generation unit 133 inserts, as the SEI of the encoded data, the TMI as the feature information supplied by the feature information generation unit 131 and the TMI as the conversion information supplied by the conversion information generation unit 132 into the encoded data supplied by the encoder 32 to generate a video stream.

In addition, the stream generation unit 133 supplies the data of the ST supplied by the encoder 35 as the ST stream together with the video stream to the file generation unit 23 (FIG. 39).

In addition, the stream generation unit 133 supplies the TMI (TMI which is to be applied to the video) of the video and the tone_map_id of the TMI and the TMI (TMI which is to be applied to the ST) of the ST and the tone_map_id of the TMI to the controller 21 (FIG. 39), and the encoding process of the mode-ii is ended.

Figure 50:
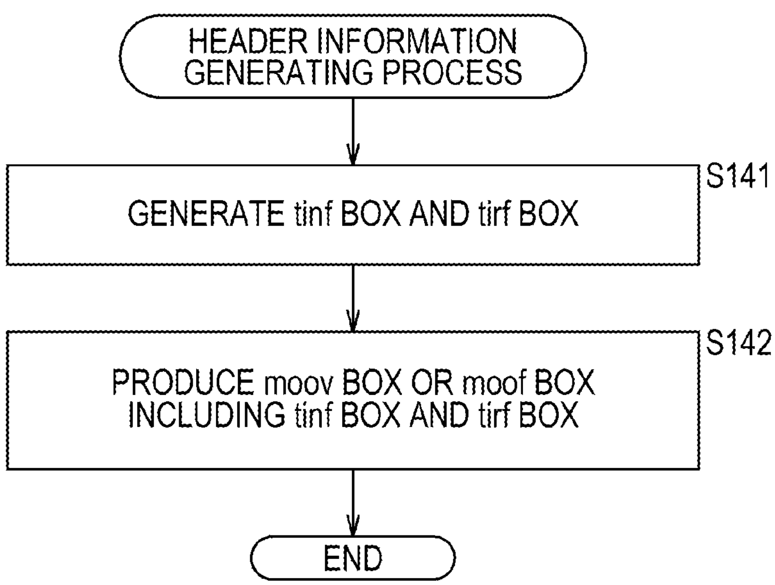
FIG. 50 is a flowchart for describing an example of a header information generating process performed in step S114.

FIG. 50 is a flowchart for describing an example of the header information generating process performed in step S114 of FIG. 47.

In step S141, the header information generation unit 121A of the controller 21 (FIG. 39) generates a tinf box (FIG. 40, FIG. 41, FIG. 45) which stores the TMI (TMI which is to be applied to the video) of the video supplied by the encode processing unit 122 (stream generation unit 133 (FIG. 46) thereof).

In addition, the header information generation unit 121A generates a tinf box which stores the TMI (TMI which is to be applied to the ST) of the ST supplied by the encode processing unit 122.

In addition, the header information generation unit 121A generates a tirf box (FIG. 24, FIG. 40, FIG. 45) which stores tone_mapping_info_id_ref representing tone_map_id of the TMI of the video supplied by the encode processing unit 122.

In addition, the header information generation unit 121A generates a tirf box which stores tone_mapping_info_id_ref representing tone_map_id of the TMI of the ST supplied by the encode processing unit 122, and the procedure proceeds from step S141 to step S142.

In step S142, the header information generation unit 121A produces the moov box or the moof box including the tinf box and the tirf box and supplies the produced box as the header information to the file generation unit 23 (FIG. 39), and the header information generating process is ended.

Namely, in the file generation unit 23, in a case where the MP4 file of the fragmented movie is generated, as illustrated in FIG. 40, the header information generation unit 121A generates the moof box where the tirf box and the tinf box are included in the traf box of the track of the video and the moof box where the tirf box and tinf box are included in the traf box of the track of the ST.

On the other hand, in the file generation unit 23, in a case where the MP4 file of the non-fragmented movie is generated, as illustrated in FIG. 45, the header information generation unit 121A generates the moov box where the tirf box and the tinf box are included in the stbl box included in the trak box of the track of the video and where the tirf box and the tinf box are included in the stbl box included in the trak box of the track of the ST.

<Second Configurational Example of Reproduction Apparatus 2>

Figure 51:
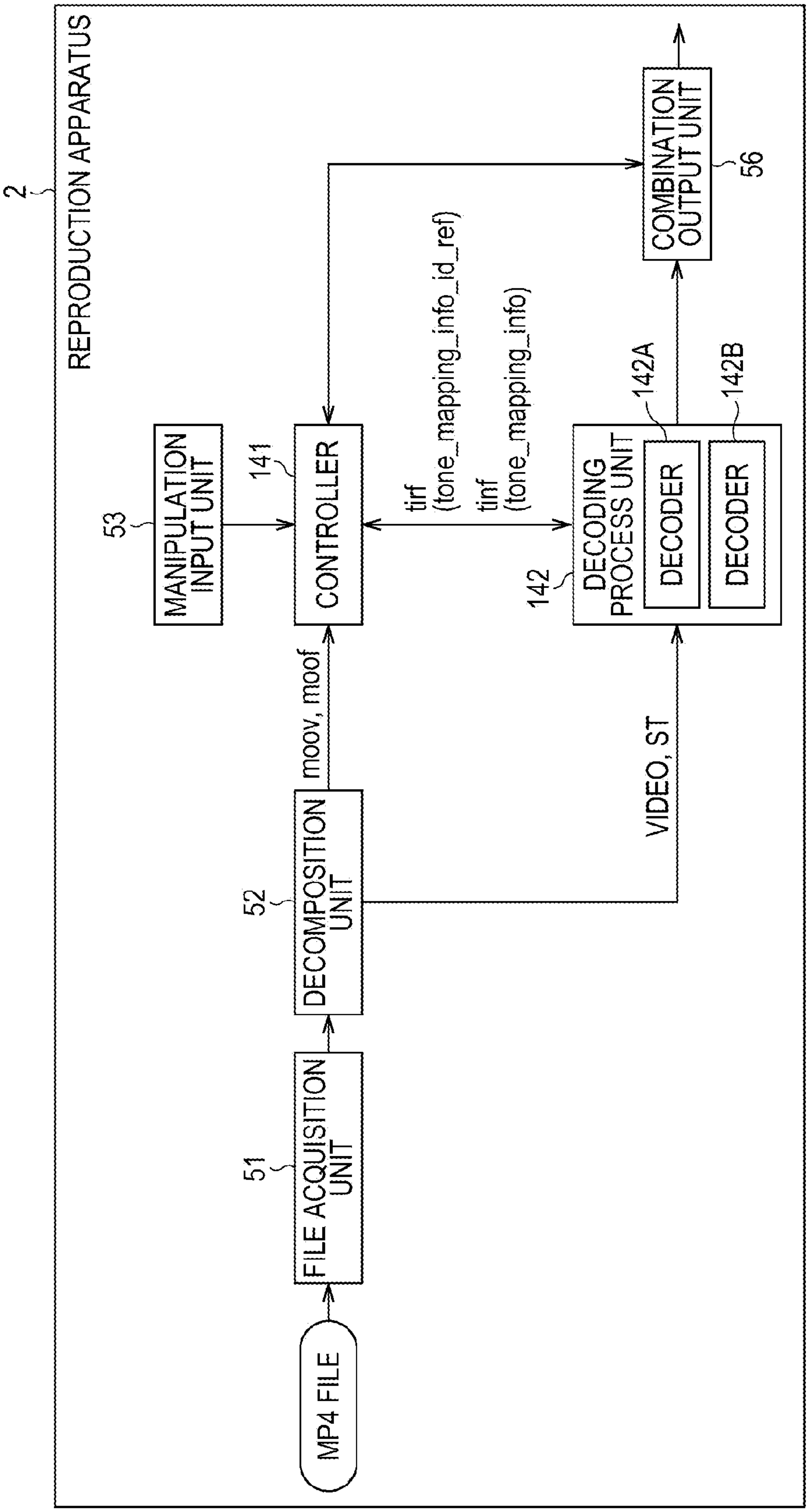
FIG. 51 is a block diagram illustrating a second configurational example of the reproduction apparatus 2.

FIG. 51 is a block diagram illustrating a second configurational example of the reproduction apparatus 2 of FIG. 1.

In addition, in the figure, the components corresponding to the case of FIG. 33 are denoted by the same reference numerals, and hereinafter, the description thereof will be appropriately omitted.

In FIG. 51, the reproduction apparatus 2 is configured to include a file acquisition unit 51, a decomposition unit 52, a manipulation input unit 53, a combination output unit 56, a controller 141, and a decoding process unit 142.

Therefore, the reproduction apparatus 2 of FIG. 51 is the same as that of the case of FIG. 33 in that the reproduction apparatus 2 is configured to include the file acquisition unit 51, the decomposition unit 52, the manipulation input unit 53, and the combination output unit 56.

However, the reproduction apparatus 2 of FIG. 51 is different from that of the case of FIG. 33 in that the controller 141 and the decoding process unit 142 are installed instead of the controller 54 and the decoding process unit 55.

The controller 141 is configured with a CPU, ROM, RAM, and the like and controls overall operations of the reproduction apparatus 2 by executing a predetermined program.

For example, the controller 141 supplies the TMI (tone_mapping_info) stored as the ToneMapinfo in the tinf box included in the moon box (FIG. 45) supplied by the decomposition unit 52 or the tone_mapping_info_id_ref stored in the tirf box to the decoding process unit 142. In addition, for example, the controller 141 supplies the TMI stored as the ToneMapinfo in the tinf box included in the moof box (FIG.

40) supplied by the decomposition unit 52 or the tone_mapping_info_id_ref stored in the tirf box to the decoding process unit 142.

The decoding process unit 142 is configured to include a decoder 142A and a decoder 142B.

The decoder 142A functions as an acquisition unit which acquires, as a TMI which is to be applied to the video, the TMI which is stored as the ToneMapinfo in the tinf box included in the TMI of the video and is supplied by the controller 141 and acquires, as a video, the TMI which has the tone_map_id represented by the tone_mapping_info_id_ref stored in the tirf box included in the track of the video and is supplied by the controller 141 among the TMIs of the video.

In addition, the decoder 142A decodes the encoded data included in the video stream supplied by the decomposition unit 52 in accordance with the HEVC scheme.

Next, if necessary, the decoder 142A converts the HDR video or the STD video obtained as a result of the decoding into an STD video or an HDR video based on the TMI as the conversion information which is to be applied to the video and outputs the STD video or the HDR video to the combination output unit 56.

In a case where the decoder 142A outputs the HDR video, the decoder 142A outputs the TMI as the feature information which is to be applied to the video together with the HDR video to the combination output unit 56.

The decoder 142B decodes the ST stream supplied by the decomposition unit 52.

In addition, the decoder 142B functions as an acquisition unit which acquires, as a TMI which is to be applied to the ST, the TMI which is stored as the ToneMapinfo in the tinf box included in the track of the ST and is supplied by the controller 141 and acquires, as the TMI of the ST, the TMI which has the tone_map_id represented by the tone_mapping_info_id_ref stored in the tirf box included in the track of the ST and is supplied by the controller 141 among the TMIs of the ST.

Next, if necessary, the decoder 142B converts the HDR ST or the STD ST obtained as a result of the decoding into an STD ST or an HDR ST based on the TMI as the conversion information which is to be applied to the ST and outputs the STD ST or the HDR ST to the combination output unit 56.

In the cases where the decoder 142B outputs the HDR ST, the decoder 142B outputs the TMI as the conversion information which is to be applied to the ST together with the HDR ST to the combination output unit 56.

<Reproducing Process of Reproduction Apparatus 2>

Figure 52:
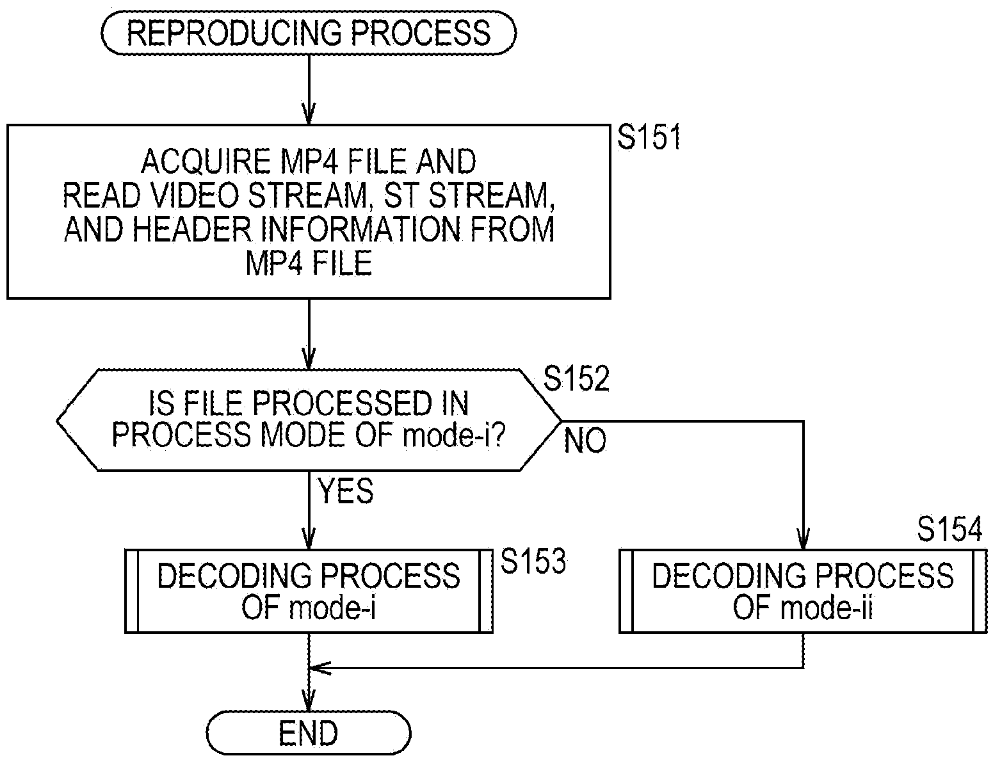
FIG. 52 is a flowchart for describing an example of a reproducing process performed by the reproduction apparatus 2.

FIG. 52 is a flowchart for describing an example of the reproducing process performed by the reproduction apparatus 2 of FIG. 51.

In step S151, the file acquisition unit 51 acquires the second MP4 file generated by the generation apparatus 1 of FIG. 39 and supplies the second MP4 file to the decomposition unit 52.

The decomposition unit 52 reads the moov box or the moof box as the header information from the second MP4 file of the file acquisition unit 51 and, at the same time, reads the video stream or the ST stream as the actual data stored in the mdat box.

Next, the decomposition unit 52 supplies the moov box or the moof box as the header information to the controller 141 and supplies the video stream or the ST stream to the decoding process unit 142.

In addition, the controller 141 supplies the TMI stored as ToneMapInfo in the tinf box included in the moov box or the moof box supplied by the decomposition unit 52 or the tone_mapping_info_id_ref stored in the tirf box to the decoding process unit 142.

After that, the procedure proceeds from step S151 to step S152, and similarly to the case of step S42 of FIG. 34, the controller 141 determines whether the process mode of the second MP4 file acquired by the file acquisition unit 51 is mode-i or mode-ii.

In a case where it is determined in step S152 that the process mode is mode-i, the procedure proceeds to step S153, and the decoding process unit 142 performs the decoding process of the mode-i.

On the other hand, in a case where it is determined in step S152 that the process mode is mode-ii, the procedure proceeds to step S154, and the decoding process unit 142 performs the decoding process of the mode-ii.

After the decoding process is performed in step S153 or step S154, the reproducing process is ended.

Figure 53:
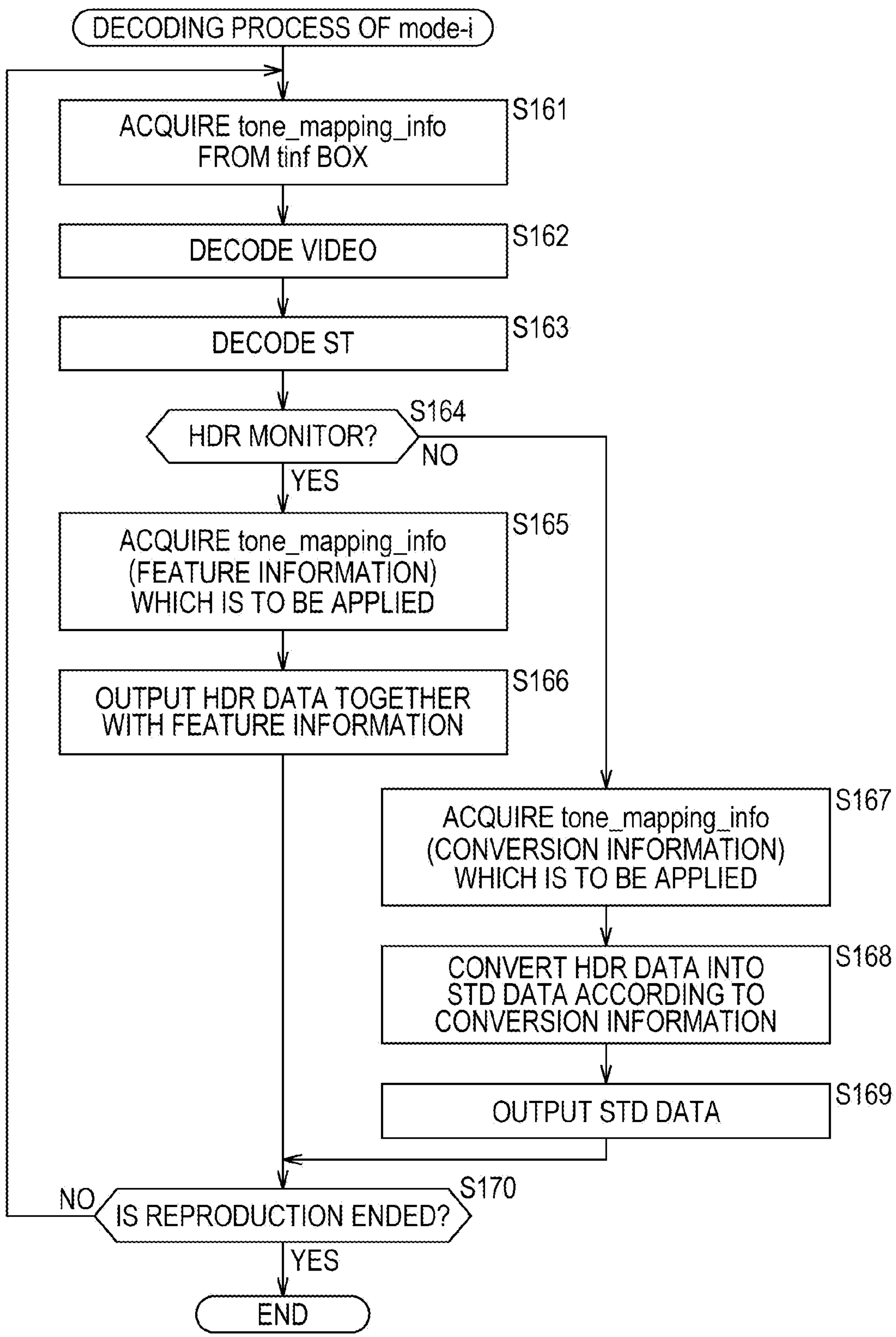
FIG. 53 is a flowchart for describing an example of a decoding process of mode-i performed in step S153.

FIG. 53 is a flowchart for describing the decoding process of the mode-i in step S153 of FIG. 52.

In step S161, the decoder 142A acquires, as a TMI of the video, the TMI which is stored as the ToneMapinfo in the tinf box included in the track of the video and is supplied by the controller 141.

In addition, the decoder 142B acquires, as a TMI of the ST, the TMI which is stored as the ToneMapInfo in the tinf box included in the track of the ST and is supplied by the controller 141, and the procedure proceeds to step S162.

In steps S162 to S164, the same processes as those of steps S62 to S64 of FIG. 35 are performed.

Namely, in step S162, the decoder 142A decodes the encoded data included in the video stream supplied from the decomposition unit 52 to generate an HDR video. In step S163, the decoder 142B decodes the ST stream of the data of the ST having an SMPTE-TT format which is supplied by the decomposition unit 52 into an HDR ST.

Next, in step S164, the controller 141 determines whether or not the monitor included in the display apparatus 3 is an HDR monitor.

In a case where it is determined in step S164 that the monitor included in the display apparatus 3 is an HDR monitor, the procedure proceeds to step S165.

In step S165, the decoder 142A acquires, as a TMI which is to be applied to the video, the TMI which has the tone_map_id represented by the tone_mapping_info_id_ref stored in the tirf box included in the track of the video and is supplied by the controller 141 among the TMIs of the video acquired in step S161.

In addition, the decoder 142B acquires, as a TMI which is to be applied to the ST, the TMI which has the tone_map_id represented by the tone_mapping_info_id_ref stored in the tirf box included in the track of the ST and is supplied by the controller 141 among the TMIs of the ST acquired in step S161.

After that, the procedure proceeds from step S165 to step S166, and hereinafter, in steps S166 and S170, the same processes as those of steps S66 and S70 of FIG. 35 are performed.

On the other hand, in a case where it is determined in step S164 that the monitor included in the display apparatus 3 is not an HDR monitor but an STD monitor, the procedure proceeds to step S167.

In step S167, similarly to step S165, the decoder 142A acquires, as a TMI which is to be applied to the video, the TMI which has the tone_map_id represented by the tone_mapping_info_id_ref stored in the tirf box included in the track of the video and is supplied by the controller 141 among the TMIs of the video acquired in step S161.

In addition, similarly to step S165, the decoder 142B acquires, as a TMI which is to be applied to the ST, the TMI which has the tone_map_id represented by the tone_mapping_info_id_ref stored in the tirf box included in the track of the ST and is supplied by the controller 141 among the TMIs of the ST acquired in step S161.

After that, the procedure proceeds from step S167 to step S168, and hereinafter, in steps S168 to S170, the same processes as those of steps S68 to S70 of FIG. 35 are performed.

Figure 54:
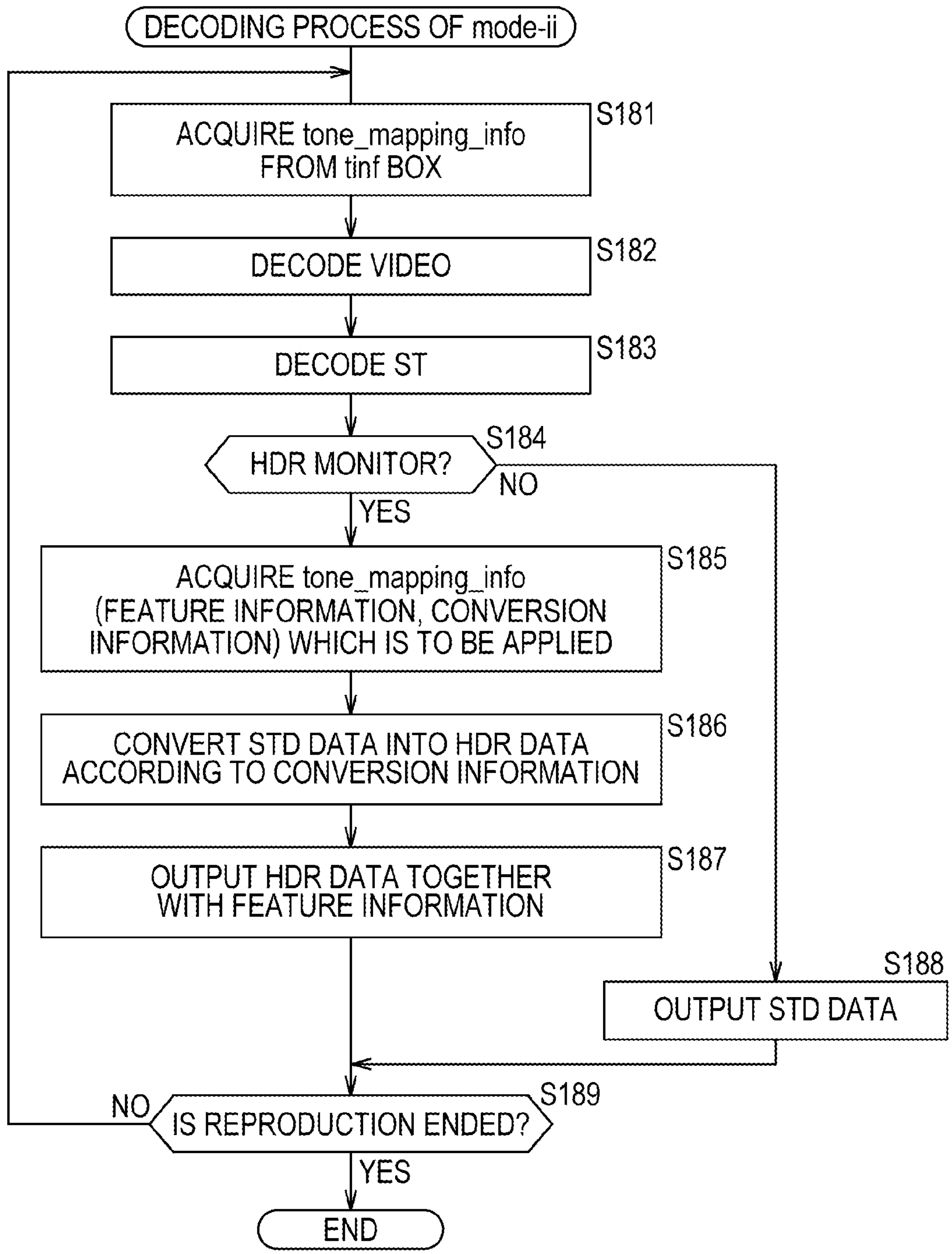
FIG. 54 is a flowchart for describing an example of a decoding process of mode-ii performed in step S154.

FIG. 54 is a flowchart for describing the decoding process of the mode-ii in step S154 of FIG. 52.

In step S181, similarly to step S161 of FIG. 53, the decoders 142A and 55B acquires the TMI of the video and the TMI of the ST, respectively.

Namely, the decoder 142A acquires, as a TMI of the video, the TMI which is stored as the ToneMapInfo in the tinf box included in the track of the video and is supplied by the controller 141.

In addition, the decoder 142B acquires, as a TMI of the ST, the TMI which is stored as the ToneMapInfo in the tinf box included in the track of the ST and is supplied by the controller 141, and the procedure proceeds to step S182.

In steps S182 to S184, the same processes as those of steps S82 to S84 of FIG. 36 are performed.

Namely, in step S182, the decoder 142A decodes the encoded data included in the video stream supplied from the decomposition unit 52 to generate an STD video. In step S183, the decoder 142B decodes the ST stream of the data of the ST having an SMPTE-TT format which is supplied by the decomposition unit 52 into an STD ST.

Next, in step S184, the controller 141 determines whether or not the monitor included in the display apparatus 3 is an HDR monitor.

In a case where it is determined in step S184 that the monitor included in the display apparatus 3 is an HDR monitor, the procedure proceeds to step S185.

In step S185, the decoder 142A acquires, as a TMI which is to be applied to the video, the TMI which has the tone_map_id represented by the tone_mapping_info_id_ref stored in the tirf box included in the track of the video and is supplied by the controller 141 among the TMIs of the video acquired in step S181.

In addition, the decoder 142B acquires, as a TMI which is to be applied to the ST, the TMI which has the tone_map_id represented by the tone_mapping_info_id_ref stored in the tirf box included in the track of the ST and is supplied by the controller 141 among the TMIs of the ST acquired in step S181.

After that, the procedure proceeds from step S185 to step S186, and in steps S186 to S189, the same processes as those of steps S86 to S89 of FIG. 36 are performed.

As described above, the generation apparatus 1 of the second configurational example stores the track of the video (stream thereof) and the track of the ST (stream thereof) in the second MP4 file.

Therefore, the track of each of the media may include a tinf box which stores the TMI which is to be applied to the media (track thereof) as the ToneMapinfo and a tirf box which stores the tone_mapping_info_id_ref as the HDR designating information designating the TMI which is to be applied to the media among the TMI stored in the tinf box.

As a result, the reproduction apparatus 2 may acquire, as a TMI which is to be applied to the media, the TMI (having the tone_map_id) designated by the tone_mapping_info_id_ref stored in the tirf box among the TMIs stored in the tinf box included in the track of the media with respect to each of the media and can use the TMI for the processing of the media.

<Third Configurational Example of Generation Apparatus 1>

Figure 55:
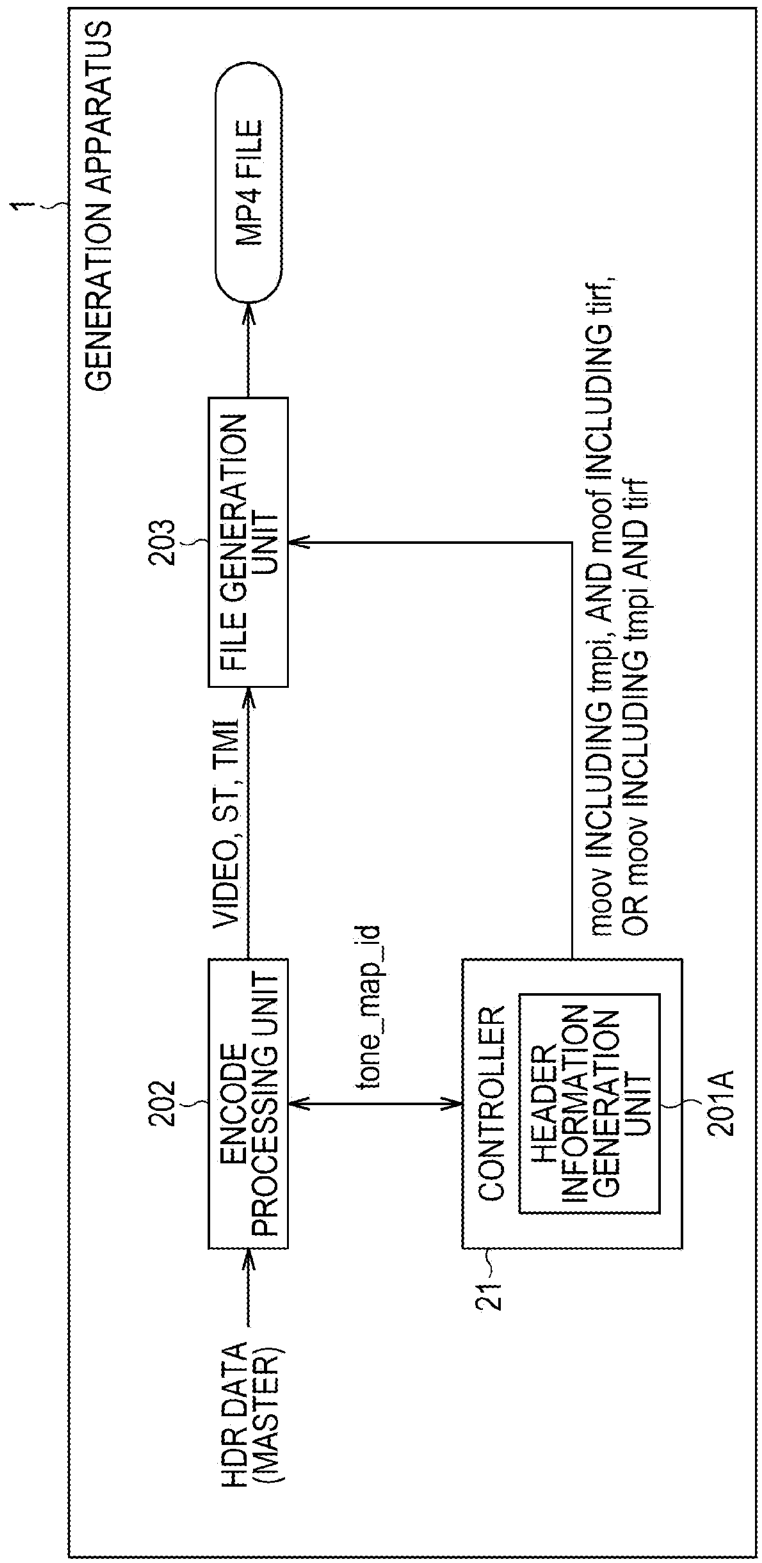
FIG. 55 is a block diagram illustrating a third configurational example of the generation apparatus 1.

FIG. 55 is a block diagram illustrating a third configurational example of the generation apparatus 1 of FIG. 1.

In addition, in the figure, the components corresponding to the case of FIG. 20 are denoted by the same reference numerals, and hereinafter, the description thereof will be appropriately omitted.

In FIG. 55, the generation apparatus 1 is configured to include a controller 21, an encode processing unit 202, and a file generation unit 203.

Therefore, the generation apparatus 1 of FIG. 55 is the same as that of the case of FIG. 20 in that the generation apparatus 1 is configured to include the controller 21.

However, the generation apparatus 1 of FIG. 55 is different from that of the case of FIG. 20 in that the encode processing unit 202 and the file generation unit 203 are installed instead of the encode processing unit 22 and the file generation unit 23.

In addition, the generation apparatus 1 of FIG. 55 is different from that of the case of FIG. 20 in that the controller 21 is configured to include a header information 201A instead of the header information generation unit 21A.

In the generation apparatus 1 of FIG. 55, HDR data of a master are input to the encode processing unit 202.

The header information generation unit 201A generates a moof box including a tirf box (FIG. 24) which stores tone_map_id supplied by the encode processing unit 202 as tone_mapping_info_id_ref and a moov box including a tmpi box (reference_type is a TrackReferenceTypeBox of "tmpi") as header information and supplies the header information to the file generation unit 203.

Alternatively, the header information generation unit 201A generates a tirf box which stores tone_map_id supplied by the encode processing unit 202 as tone_mapping_info_id_ref and a moov box including a tmpi box as header information and supplies the header information to the file generation unit 203.

The tmpi box will be described later.

Similarly to the encode processing unit 22 of FIG. 20, the encode processing unit 202 generates a video stream and an ST stream by performing encoding the HDR data of the master and outputs the video stream and the ST stream to the file generation unit 203.

In addition, the encode processing unit 202 generates an es (elementary stream) (hereinafter, sometimes referred to as a TMI stream) of TMI as HDR information which is to be applied to the video or the ST and outputs the es to the file generation unit 203.

In addition, the encode processing unit 202 supplies the tone_map_id of the TMI which is to be applied to the video or the ST to the controller 21 (header information generation unit 201A thereof).

The file generation unit 203 generates an MP4 file which stores the header information supplied by the controller 21 (header information generation unit 201A thereof) and the video stream, the ST stream, and the TMI stream supplied by the encode processing unit 202 and outputs the MP4 file.

Figure 56:
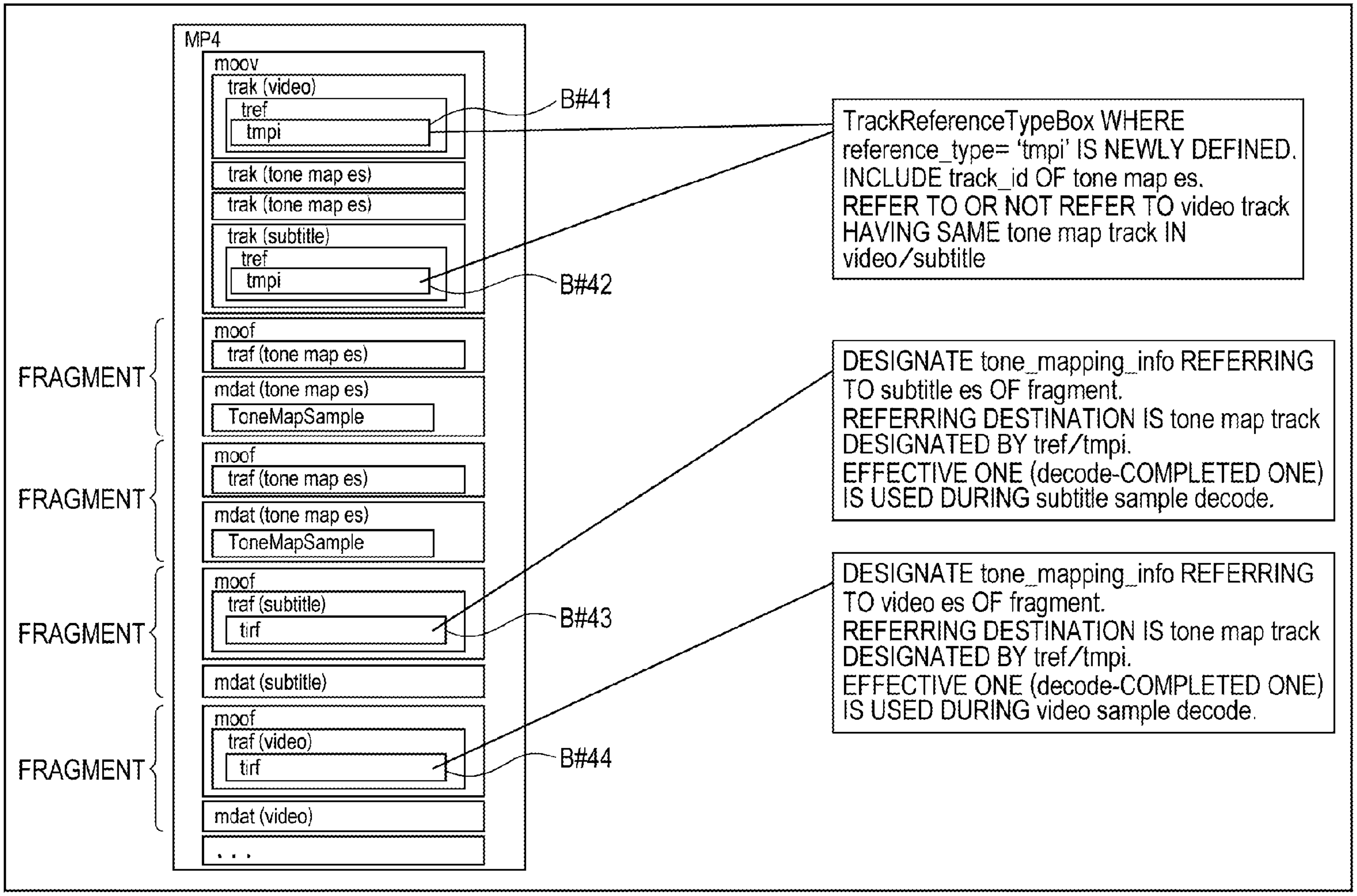
FIG. 56 is a diagram illustrating an example of a third MP4 file generated by the generation apparatus 1.

FIG. 56 is diagram illustrating an example of an MP4 file (hereinafter, sometimes referred to as a third MP4 file) generated by the generation apparatus 1 of FIG. 55.

The third MP4 file of FIG. 56 is an MP4 file of a fragmented movie having fragments, and a moov box includes trak boxes of video, ST, and TMI (tone map es).

Therefore, the MP4 file of FIG. 56 includes the track of the video, the track of the ST, and the track of the TMI.

The generation apparatus 1 of FIG. 55 generates, as the third MP4 file, an MP4 file to which the TMI included in the track of the TMI (hereinafter, sometimes referred to as a TMI track) can be applied by referring from other tracks.

Therefore, in the third MP4 file, the mdat box of the TMI track (tone map track) includes a sample (ToneMapSample) of the TMI as the actual data.

In addition, the trak box of the media besides the TMI of the moov box, namely, the trak box of the video or the ST (subtitle) includes the tref box including the tmpi box (TrackReferenceBox).

Herein, as described with reference to FIGS. 21 and 22, although the tref box may include the TrackReferenceType-Box, the tmpi box is a box which is newly defined as a kind of the TrackReferenceTypeBox.

Now, for example, if the track of the ST including the tmpi box is considered to be a target track of interest, the track_id of the TMI track (track_IDs[ ] representing thereof) as the track designating information designating the TMI track of the TMI (HDR information) which is to be applied to the target track is stored in the tmpi box included in the track of the ST which is a target track.

Therefore, the TMI track of the TMI which is to be applied to the target track may be recognized by the track_id stored in the tmpi box included in the track of the ST as the target track.

Similarly, if the track of the video including the tmpi box is considered to be a target track of interest, the track_id of the TMI track as the track designating information designating the TMI track of the TMI which is to be applied to the target track is stored in the tmpi box included in the track of the video as the target track.

Therefore, the TMI track of the TMI which is to be applied to the target track may be recognized by the track_id stored in the tmpi box included in the track of the video as the target track.

In addition, by determining the track_id of the track which becomes a TMI track in advance, the tref box including the tmpi box may be omitted.

In the third MP4 file of FIG. 56, the moof box of each track of the video and the ST includes the traf box including the tirf box which stores the tone_mapping_info_id_ref representing the tone_map_id as the HDR designating information designating the TMI which is to be applied to the track.

By referring to the tone_mapping_info_id_ref stored in the tirf box of the target box, the TMI which has the tone_map_id represented by the tone_mapping_info_id_ref stored in the tirf box may be recognized as a TMI which is to be applied to the target track among the TMIs of the TMI track having the track_id stored in the tmpi box.

In addition, although the MP4 file of the fragmented movie includes the moof box for each fragment, effective TMIs among the TMIs having the tone_map_id represented by the tone_mapping_info_id_ref stored in the tirf box included in the moof box of the fragment are applied to data of some fragments.

In addition, plural tracks may be stored as the TMI tracks (tone map tracks) in the third MP4 file. In FIG. 56, two TMI tracks are stored.

In addition, in the third MP4 file, for example, the TMI track of the TMI which is to be applied to the video and the TMI track of the TMI which is to be applied to the ST may be the same TMI track or other TMI tracks.

As illustrated in FIG. 56, besides the track of the video and the ST, the TMI track is stored in the MP4 file of the fragmented movie.

Therefore, with respect to the track of the video, the tmpi box B#41 which stores the track_id of the TMI track of the TMI which is to be applied to the ST is stored in the trak/tref box of the track of the video of the moov box.

In addition, with respect to the track of the video, the tirf box B#44 which stores the tone_mapping_info_id_ref representing the tone_map_id of the TMI (TMI included in the TMI track having the track_id stored in the tmpi box B#41) which is to be applied to the video is stored in the moof/traf box of the track of the video.

Therefore, according to the third MP4 file of FIG. 56, for example, if the track of the video is considered to be a target track, the TMI track of the TMI which is to be applied to the video may be recognized by the track_id stored in the trak/tref/tmpi box B#41 of the video of the moov box.

In addition, it may be recognized that the TMI which has the tone_map_id represented by the tone_mapping_info_id_ref stored in the moof/tarf/tirf box B#44 of the track of the video which is a target track among the TMIs included in the TMI track is a TMI which is to be applied to the target track.

On the other hand, with respect to the track of the ST, the tmpi box B#42 which stores the track_id of the TMI track of the TMI which is to be applied to the ST is stored in the trak/tref box of the track of the ST of the moov box.

In addition, with respect to the track of the ST, the tirf box B#43 which stores the tone_mapping_info_id_ref representing the tone_map_id of the TMI (TMI included in the TMI track having the track_id stored in the tmpi box) which is to be applied to the ST is stored in the moof/traf box of the track of the ST.

Therefore, according to the third MP4 file of FIG. 56, for example, if the track of the ST is considered to be a target track, the TMI track of the TMI which is to be applied to the ST may be recognized by the track_id stored in the trak/tref/tmpi box B#42 of the ST of the moon box.

In addition, it may be recognized that the TMI which has the tone_map_id represented by the tone_mapping_info_id_ref stored in the moof/tarf/tirf box B#43 of the track of the ST which is a target track among the TMIs included in the TMI track is a TMI which is to be applied to the target track.

FIG. 57 is a diagram illustrating an example of definition of the TrackReferenceTypeBox as the tmpi box.

In the embodiment, the "tmpi" is newly defined as the refernce_type representing that the TrackReferenceTypeBox is to be used for storing the track_id of the TMI track, and the TrackReferenceTypeBox where the refernce_type becomes "tmpi" is used as the tmpi box which stores the track_id of the TMI track.

The tmpi box includes (stores) track_IDs[ ] representing the track_id.

The track_IDs[ ] is an array variable and can be stored plural track_ids. Therefore, according to the tmpi box, plural tracks may be designated as the TMI track of the TMI which is to be applied to the media.

FIG. 58 is a diagram illustrating an example of the syntax of the sample (ToneMapSample) of the TMI as the actual data stored in the mdat box of the TMI track (tone map track) stored in the third MP4 file.

One sample of the TMI may include 0 or more sets of the ToneMapinfoLength representing the length of the Tone-Mapinfo representing the TMI and the ToneMapinfo.

Therefore, one sample of the TMI may include plural sets of the ToneMapinfoLength and the ToneMapinfo.

In addition, the Length=sample_size representing the length of the sample of the TMI does not exist in the sample of the TMI, and size information of each sample described in, for example, the stsz box, the stz2 box, and the trun box is referred to.

The ToneMapinfo or the like of the syntax, for example, illustrated in FIGS. 42 to 44 may be employed as the ToneMapinfo.

Figure 59:
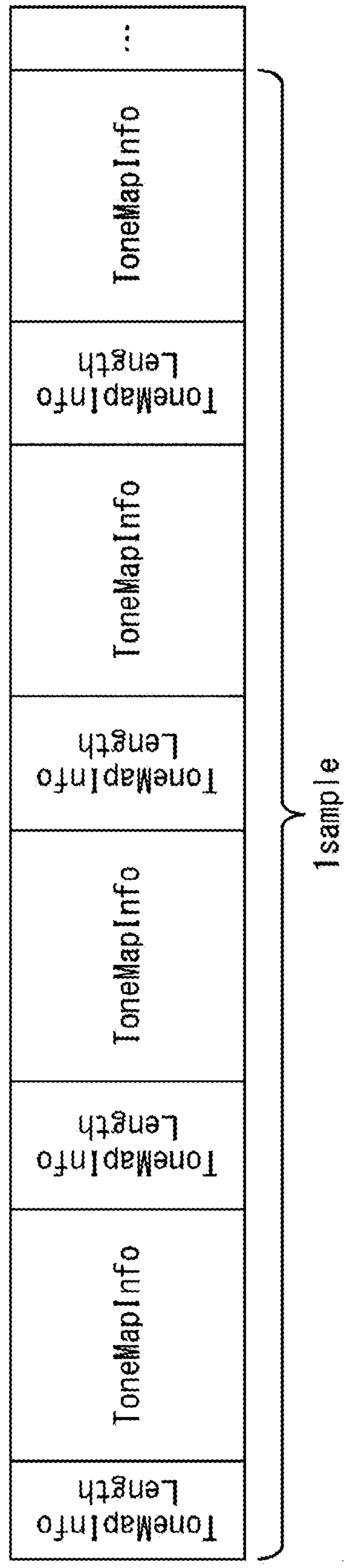
FIG. 59 is a diagram illustrating an example of a data structure of the sample (ToneMapSample) of TMI.

FIG. 59 is a diagram illustrating an example of the data structure of the sample (ToneMapSample) of the TMI.

As illustrated in FIG. 59, the sample of the TMI may repetitively include a set of the ToneMapinfoLength and the ToneMapInfo.

Figure 60:
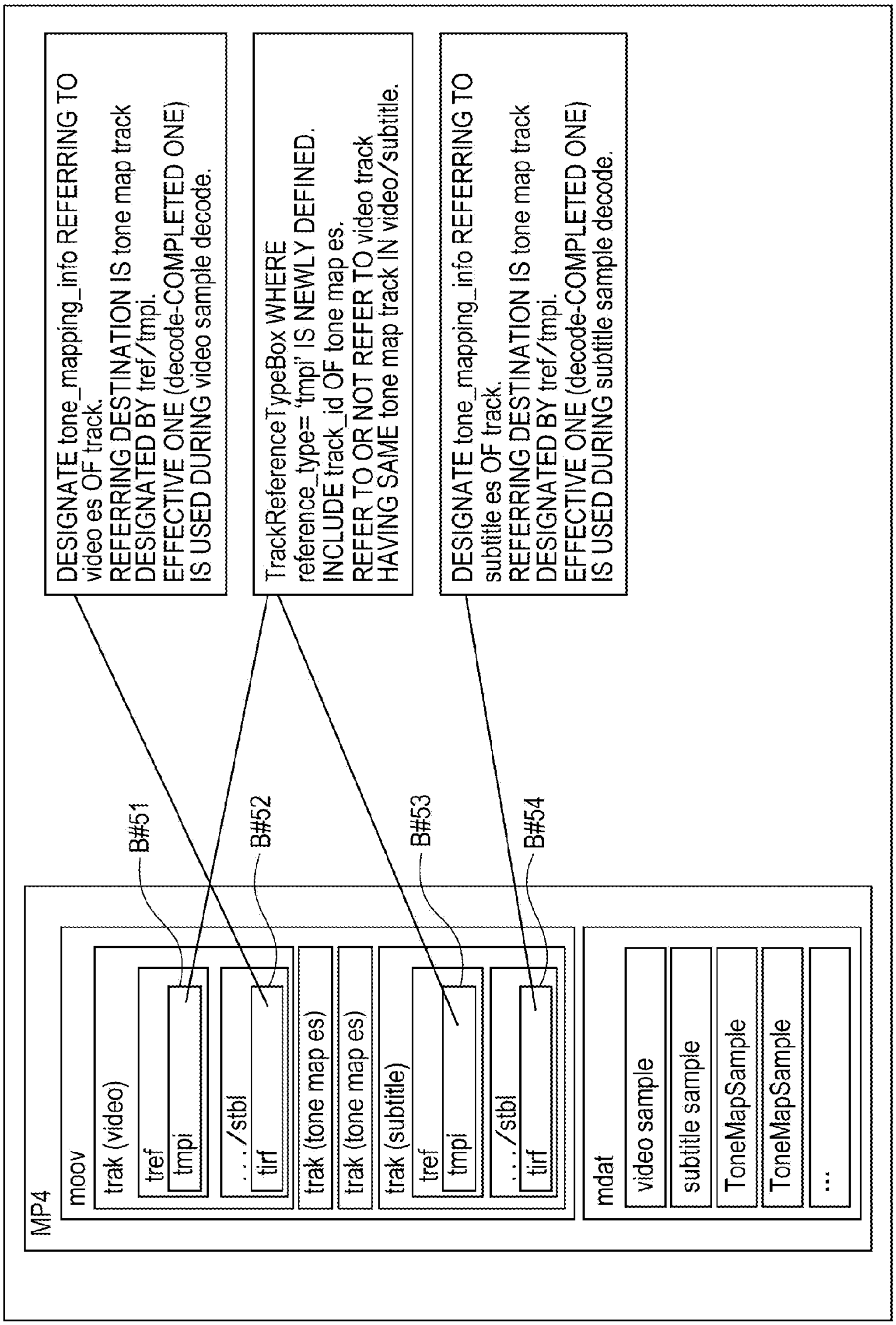
FIG. 60 is a diagram illustrating another example of the third MP4 file generated by the generation apparatus 1.

FIG. 60 is a diagram illustrating another example of the third MP4 file generated by the generation apparatus 1 of FIG. 55.

The third MP4 file of FIG. 60 is an MP4 file of the non-fragmented movie which does not include any fragment, and a moov box includes a trak box of a video, a trak box of an ST, and (two) trak boxes of TMIs (tone map es).

Therefore, the third MP4 file of FIG. 60 is configured to include a track of a video, a track of an ST, and a track of a TMI.

Similarly to FIG. 56, in FIG. 60, the track of the video and the track of the ST include the tmpi box and the tirf box, respectively, In addition, the mdat box includes a sample of the video, a sample of the ST, and a sample of the TMI (ToneMapSample).

Herein, in the MP4 file of the non-fragmented movie, as illustrated in FIG. 60, the tmpi box B#51 which stores the track_IDs[ ] (FIG. 57) representing the track_id of the TMI track of the TMI which is to be applied to the video is stored in the trak/tref box of the track of the video of the moov box.

In addition, the tirf box B#52 which stores the tone_mapping_info_id_ref representing the tone_map_id of the TMI which is to be applied to the video is stored in the stbl box included in the trak of the track of the video of the moov box.

Similarly to the track of the video, the track of the ST may include the tmpi box B#53, and the tirf box B#54.

Namely, the tmpi box B#53 which stores the track_IDs[ ] representing the track_id of the TMI track of the TMI which is to be applied to the video is stored in the trak/tref box of the track of the ST of the moov box.

In addition, the tirf box B#54 which stores the tone_mapping_info_id_ref representing the tone_map_id of the TMI which is to be applied to the ST is stored in the stbl box included in the trak box of the track of the ST of the moov box.

Therefore according to the third MP4 file of FIG. 60, for example, if the track of the ST is considered to be a target track, the TMI track of the TMI which is to be applied to the track of the ST which is a target track may be recognized by the track_id stored in the trak/tref/tmpi box B#53 of the ST of the moov box.

In addition, it may be recognized that the TMI which has the tone_map_id represented by the tone_mapping_info_id_ref stored in the tark/stbl/tirf box B#54 of the track of the ST which is a target track of the moov box among the TMIs of the TMI track is a TMI which is to be applied to the target track.

With respect to the video, in a similar manner, the TMI which is to be applied to the video may be recognized.

In addition, in the MP4 file of the non-fragmented movie, an effective TMI among the TMIs having the tone_map_id represented by the tone_mapping_info_id_ref stored in the tirf box of the target track is applied to the target track.

In addition, the TMI track of the TMI which is to be applied to the video and the TMI track of the TMI which is to be applied to the ST may be the same TMI track or may be different TMI tracks.

As described above, in the generation apparatus 1 of FIG. 55, since the third MP4 file which stores the TMI track of the TMI as the HDR information and the track_IDs[ ] as the track designating information designating the TMI track of the TMI which is to be applied to the target track of interest among the TMIs included in the TMI track and the tone_mapping_info_id_ref as the HDR designating information designating the TMI which is to be applied to the target track is generated, the TMI which is to be applied to each of the media can be independently added to each of the media such as the video or the ST.

In addition, in the case of encoding the video, for example, in accordance with the HEVC scheme, although the video stream where the TMI of the video is inserted into the SEI is generated, in the third MP4 file, the TMI which is to be applied to each of the media can be added to the media other than the video independently of the TMI which is inserted into the SEI.

Therefore, the video including the TMI having an m2ts format recorded in, for example, a Blu-ray (registered trademark) disk and the ST reproduced together with the TMI can be converted into the MP4 file without separately adding the TMI which is to be applied to the ST to the ST.

As a result, the introduction of the TMI to the MP4 file is facilitated, so that it is possible to increase the chance that a user enjoys an HDR image such an HDR video or an HDR ST.

In addition, in the case of encoding the video, for example, in accordance with the HEVC scheme, since the video stream where the TMI of the video is inserted into the SEI is generated, in the third MP4 file, the TMI inserted into the SEI and the TMI of the TMI track exist as the TMI of the video.

In this case, in the reproduction apparatus 2 (FIG. 1), which one of the TMI inserted into the SEI and the TMI of the TMI track is used as the TMI which is to be used as the video may, for example, be determined in advance or be selected according to user's manipulation.

In the embodiment, it is assumed that, with respect to the third MP4 file, for example, the TMI of the TMI track among the TMI inserted into the SEI and the TMI of the TMI track is sued as the TMI which is to be applied to the video.

Herein, according to the data of the ST having an SMPTE-TT format, although plural display screens of the ST may be included in one sample which is the unit of access to the MP4 file, in the third MP4 file, in a case where the plural display screens of the ST are included in one sample, by arranging (mapping) the sample (ToneMapSample) of the TMI in accordance with the display time of the plural display screens of the ST included in one sample, it is possible to switch (change) the TMI which is to be applied to the display screen for each of the plural display screens of the ST included in one sample.

In addition, in the third MP4 file, since the TMI track exits besides the track of the media, load of the processes of the generation apparatus 1 and the reproduction apparatus 2 is increased. However, the degree of increase is not so great.

<Configurational Example of Encode Processing Unit 202>

Figure 61:
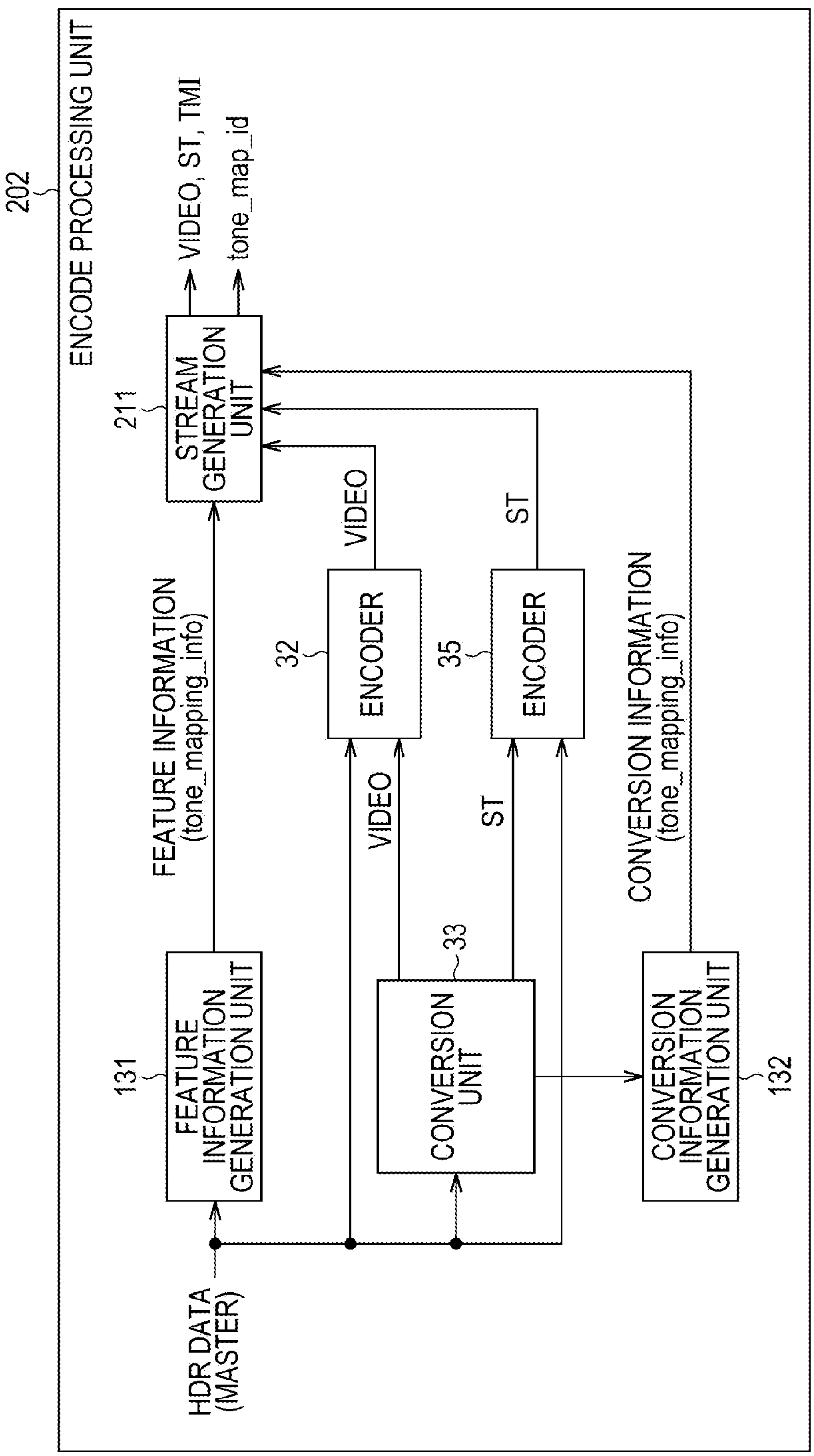
FIG. 61 is a block diagram illustrating a configurational example of an encode processing unit 202.

FIG. 61 is a block diagram illustrating a configurational example of the encode processing unit 202 of FIG. 55.

In addition, in the figure, the components corresponding to the encode processing unit 22 of FIG. 26 or the encode processing unit 122 of FIG. 46 are denoted by the same reference numerals, and hereinafter, the description thereof will be appropriately omitted.

The encode processing unit 202 of FIG. 61 is configured to include an encoder 32, a conversion unit 33, an encoder 35, a feature information generation unit 131, a conversion information generation unit 132, and a stream generation unit 211.

Therefore, the encode processing unit 202 of FIG. 61 is the same as the encode processing unit 122 of FIG. 46 in that the encode processing unit 202 is configured to include the encoder 32, the conversion unit 33, the encoder 35, the feature information generation unit 131, and the conversion information generation unit 132.

However, the encode processing unit 202 of FIG. 61 is different from the encode processing unit 122 of FIG. 46 in that the stream generation unit 211 is installed instead of the stream generation unit 133.

The stream generation unit 211 performs the same processes as those of the stream generation unit 36 of FIG. 26.

Namely, the stream generation unit 211 supplies tone_map_id of TMI as feature information of the video and the ST supplied by the feature information generation unit 131 to the controller 21 (FIG. 55).

In addition, the stream generation unit 211 supplies tone_map_id of TMI as conversion information of the video and the ST supplied by the conversion information generation unit 132 to the controller 21.

In addition, the stream generation unit 211 inserts the TMI of the video as the SEI into the encoded data of the video supplied by the encoder 32 to generate a video stream.

In addition, the stream generation unit 211 supplies data of the ST supplied by the encoder 35 as the ST stream together with the video stream to the file generation unit 203 of FIG. 55.

In this manner, in addition to performing the same processes as those of the stream generation unit 36 of FIG. 26, the stream generation unit 211 generates a TMI stream (es (elementary stream)) of TMI by using the TMI as feature information of the video and the ST supplied by the feature information generation unit 131 and the TMI as conversion information of the video and the ST supplied by the conversion information generation unit 132 and supplies the TMI stream to the file generation unit 203 of FIG. 55.

In addition, in the stream generation unit 211, the TMI of the video may not be inserted into the encoded data of the video supplied by the encoder 32, and the encoded data may be considered to be the video stream without change.

<File Generating Process of Generation Apparatus 1>

Figure 62:
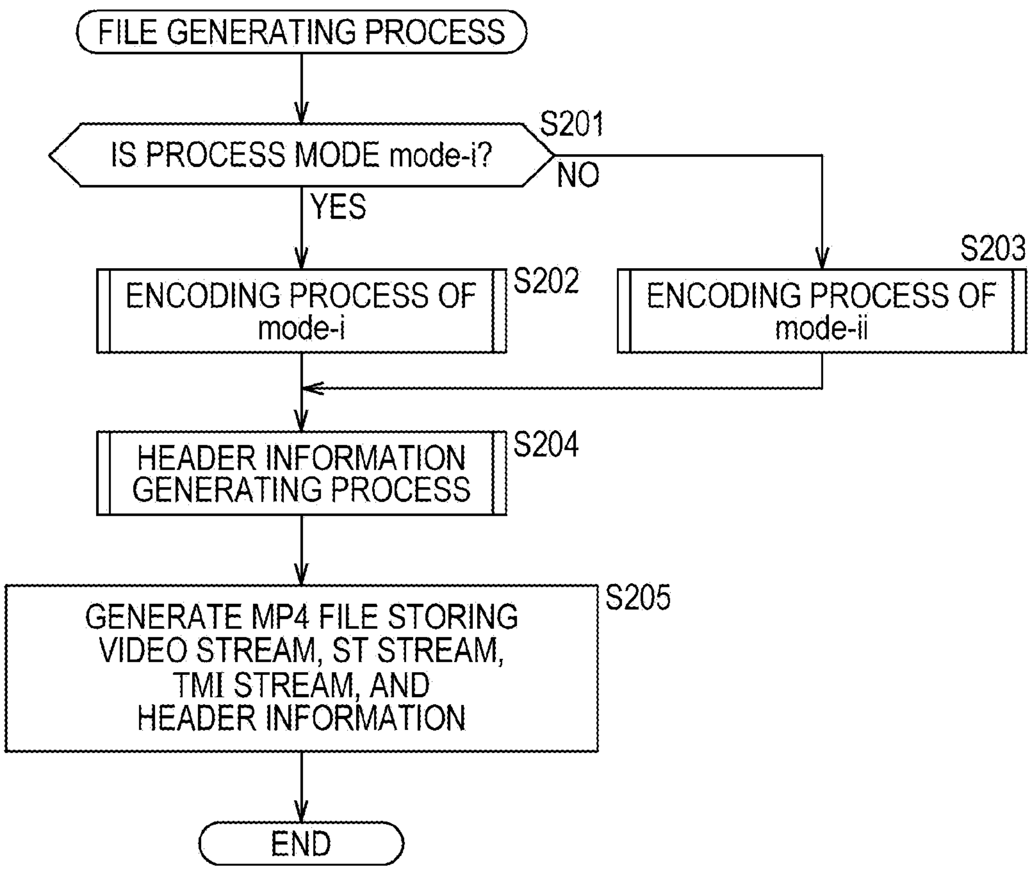
FIG. 62 is a flowchart for describing an example of a file generating process performed by the generation apparatus 1.

FIG. 62 is a flowchart for describing an example of the file generating process performed by the generation apparatus 1 of FIG. 55.

If the HDR data of the master are input to the generation apparatus 1, similarly to step S1 of FIG. 29, in step S201, the controller 21 of the generation apparatus 1 determines whether or not the process mode is mode-i.

In a case where it is determined in step S1 that the process mode is mode-i, the procedure proceeds to step S202, and the encode processing unit 202 performs the encoding process of the mode-i. The video stream, the ST stream, and the TMI stream generated through the encoding process of the mode-i are supplied from the encode processing unit 202 to the file generation unit 203.

On the other hand, in a case where it is determined in step S201 that the process mode is mode-ii, the procedure proceeds to step S203, and the encode processing unit 202 performs the encoding process of the mode-ii. The video stream, the ST stream, and the TMI stream generated through the encoding process of the mode-ii are supplied from the encode processing unit 202 to the file generation unit 203.

After step S202 or S203, the procedure proceeds to step S204, and the header information generation unit 201A performs a header information generating process. The header information in the header information generating process is supplied from the header information generation unit 201A to the file generation unit 203, and the procedure proceeds to step S205.

In step S205, the file generation unit 203 generates and outputs the third MP4 file of FIG. 56 or 60 which stores the video stream, the ST stream, the TMI stream supplied by the encode processing unit 202 and the header information supplied by the header information generation unit 201A, and the file generating process is ended.

Figure 63:
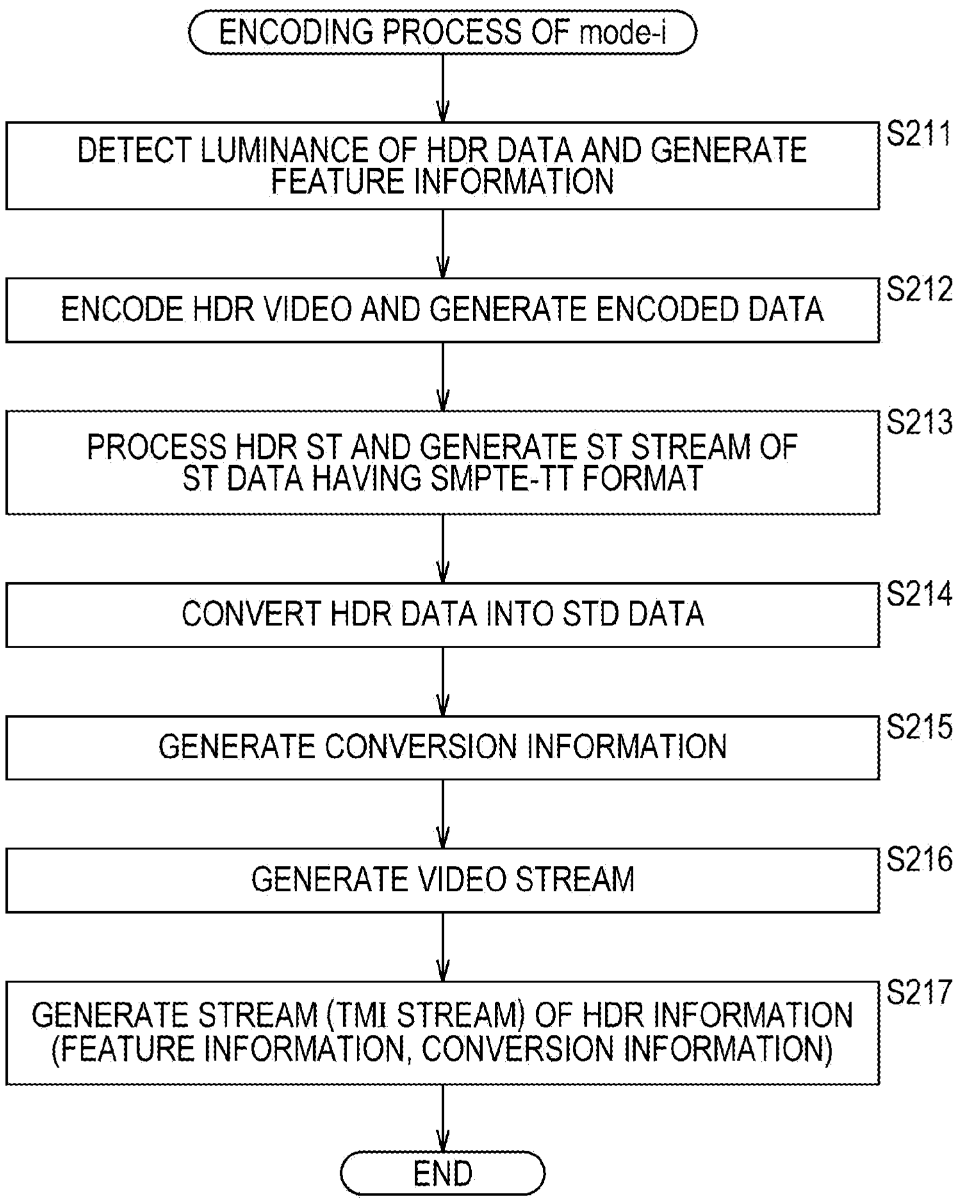
FIG. 63 is a flowchart for describing an example of an encoding process of mode-i performed in step S202.

FIG. 63 is a flowchart for describing an example of the encoding process of the mode-i performed in step S202 of FIG. 62.

In steps S211 to S215, the encode processing unit 202 (FIG. 61) performs the same processes as those of steps S121 to S125 of FIG. 48.

Next, after step S215, the procedure proceeds to step S216, and the stream generation unit 211 inserts, as the SEI of the encoded data, the TMI as the feature information supplied by the feature information generation unit 131 and the TMI as the conversion information supplied by the conversion information generation unit 132 into the encoded data supplied by the encoder 32 to generate a video stream.

In addition, the stream generation unit 211 supplies the data of the ST supplied by the encoder 35 as the ST stream, and the procedure proceeds from step S216 to step S217.

In step S217, the stream generation unit 211 generates a TMI stream of the TMIs from the TMI of the video and the TMI of the ST and supplies the TMI stream together with the video stream and the ST stream to the file generation unit 203 (FIG. 55).

Next, the stream generation unit 211 supplies the tone_map_id of the TMI of the video and the tone_map_id of the TMI of the ST to the controller 21 (FIG. 55), and the encoding process of the mode-i is ended.

Figure 64:
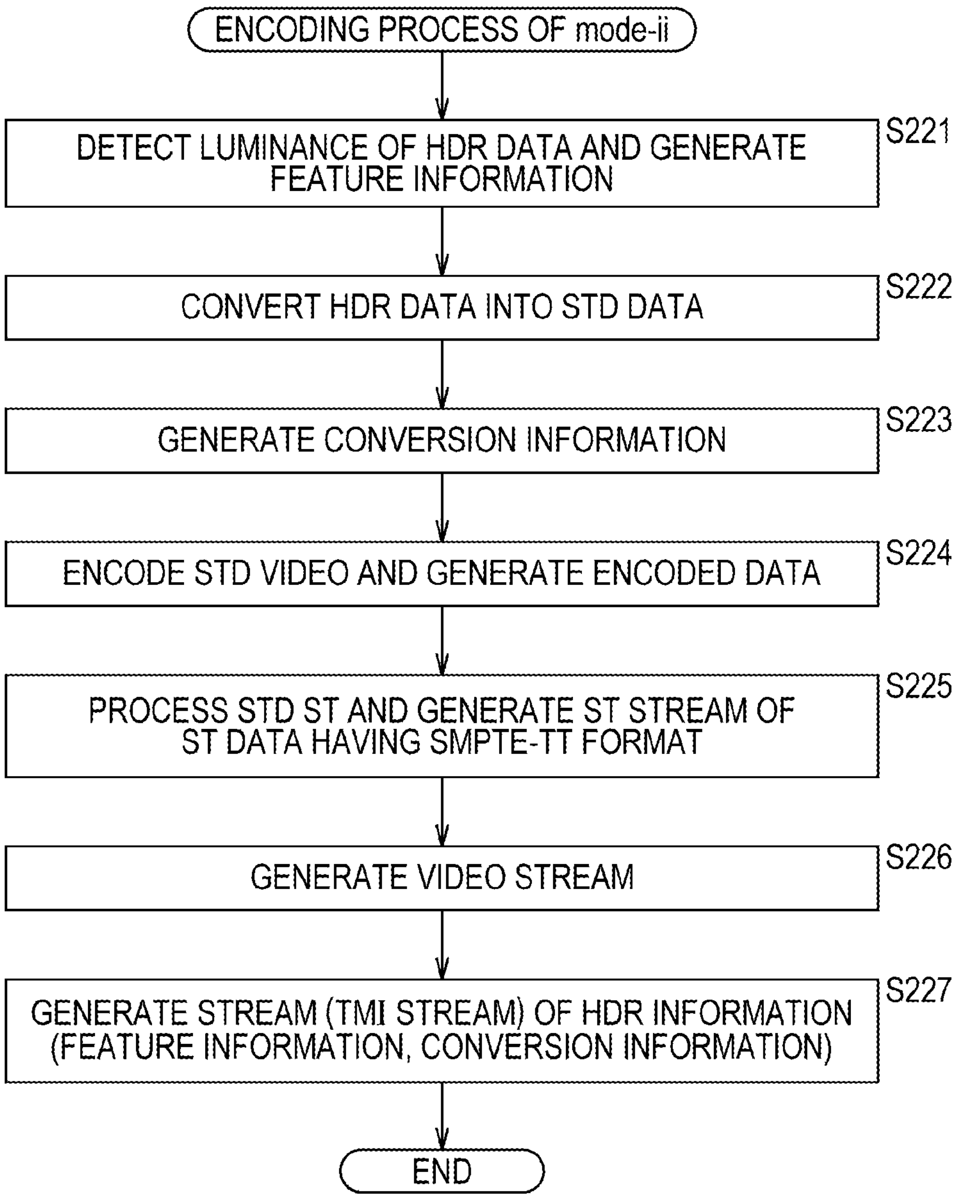
FIG. 64 is a flowchart for describing an example of an encoding process of mode-ii performed in step S203.

FIG. 64 is a flowchart for describing an example of the encoding process of the mode-ii performed in step S203 of FIG. 62.

In steps S221 to S225, the encode processing unit 202 (FIG. 61) performs the same processes as those of steps S131 to S135 of FIG. 49.

Next, in steps S226 and S227, the same processes as those of steps S216 and S217 of FIG. 63 are performed, and the encoding process of the mode-ii is ended.

Figure 65:
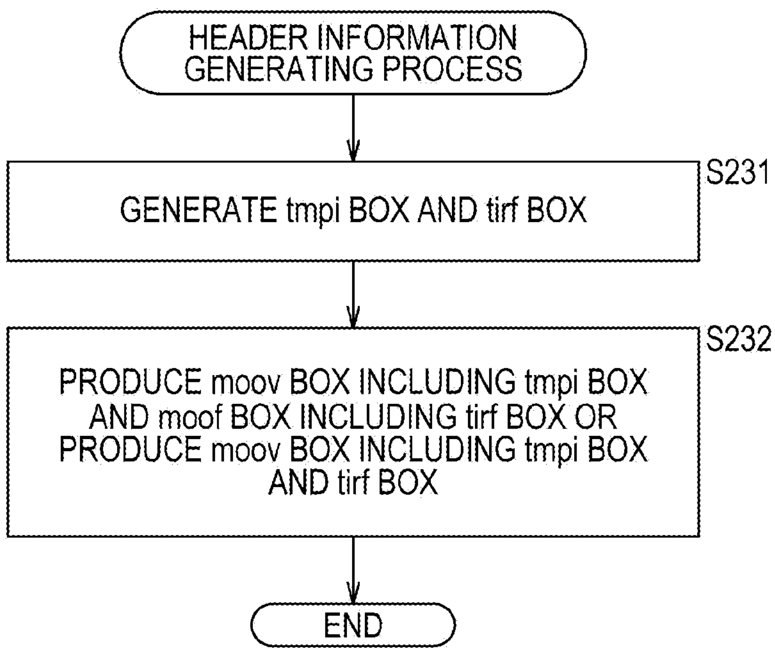
FIG. 65 is a flowchart for describing an example of a header information generating process performed in step S204.

FIG. 65 is a flowchart for describing an example of the header information generating process performed in step S204 of FIG. 62.

In step S231, the header information generation unit 201A of the controller 21 (FIG. 55) generates a tirf box (FIG. 24, FIG. 56, FIG. 60) which stores the tone_mapping_info_id_ref representing the tone_map_id of the TMI (TMI which is to be applied to the video) of the video supplied by the encode processing unit 202 (stream generation unit 211 thereof (FIG. 61)).

In addition, the header information generation unit 201A generates a tirf box which stores the tone_mapping_info_id_ref representing the tone_map_id of the TMI (TMI which is to be applied to the ST) of the ST supplied by the encode processing unit 202.

In addition, the header information generation unit 201A generates a tmpi box (FIG. 56, FIG. 57, FIG. 60) which stores the track_IDs[ ] representing the track_id of the track of the TMI stream of the TMI which is to be applied to the video.

In addition, the header information generation unit 201A generates a tmpi box which stores the track_IDs[ ] representing the track_id of the track of the TMI stream of the TMI which is to be applied to the ST, and the procedure proceeds from step S231 to step S232.

In step S232, the header information generation unit 201A produces the moov box including the tmpi box and the moof box including the tirf box or produces the moov box including the tmpi box and the tirf box and supplies the produced box as the header information to the file generation unit 203 (FIG. 55), and the header information generating process is ended.

Namely, in the file generation unit 203, in a case where the MP4 file of the fragmented movie is generated, the header information generation unit 201A generates a moov box including the tmpi box in the respective trak/tref boxes of the tracks of the video and the ST as illustrated in FIG. 56.

In addition, the header information generation unit 201A generates a moof box including a tirf box in the respective traf boxes of the tracks of the video and the ST as illustrated in FIG. 56.

On the other hand, in the file generation unit 203, in a case where the MP4 file of the non-fragmented movie is generated, the header information generation unit 201A generates a moov box including the tmpi box in the respective trak/tref boxes of the tracks of the video and the ST and including the tirf box in the respective trak boxes/stbl boxes of the tracks of the video and the ST as illustrated in FIG. 60.

<Third Configurational Example of Reproduction Apparatus 2>

Figure 66:
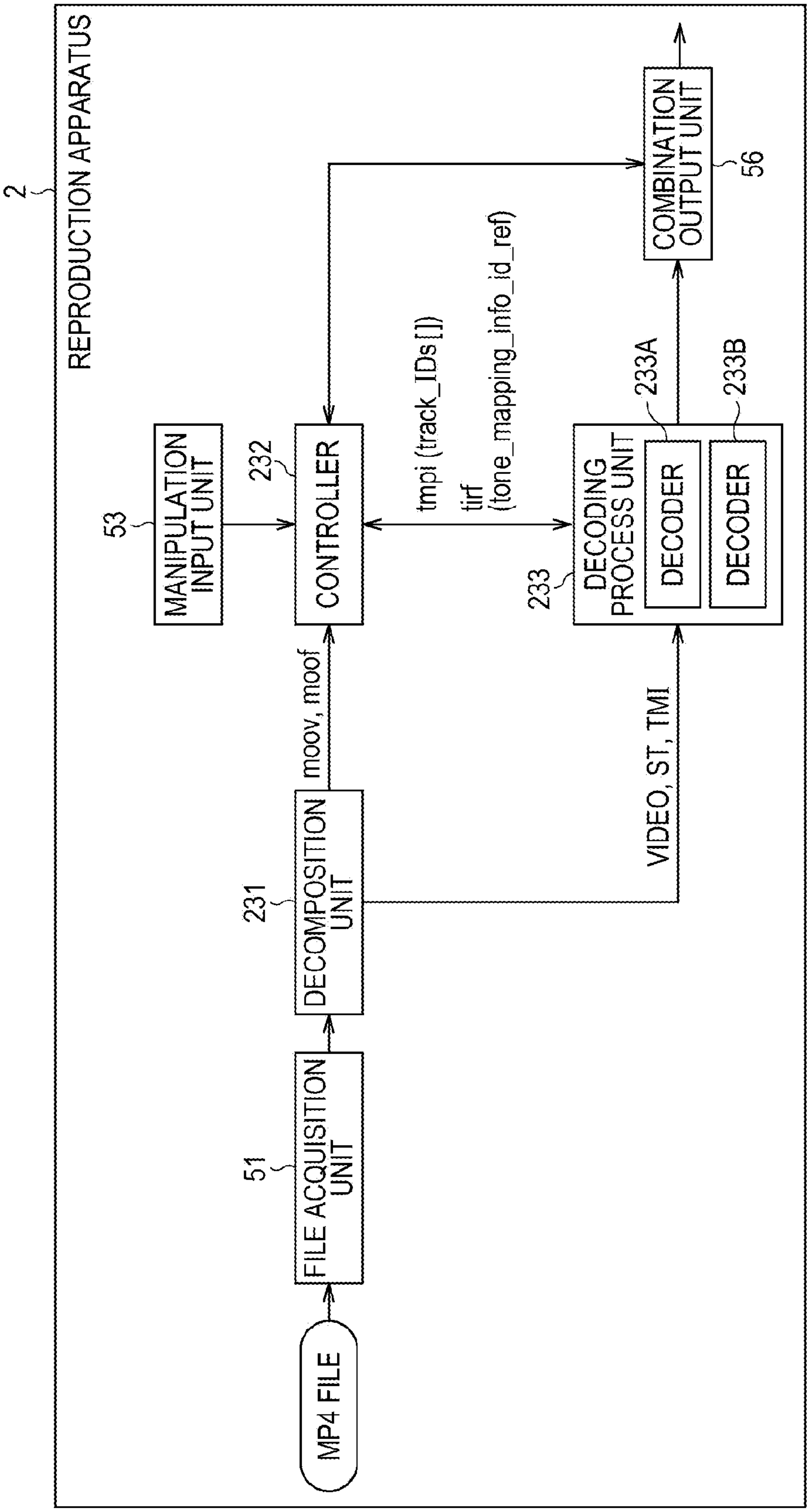
FIG. 66 is a block diagram illustrating a third configurational example of the reproduction apparatus 2.

FIG. 66 is a block diagram illustrating a third configurational example of the reproduction apparatus 2 of FIG. 1.

In addition, in the figure, the components corresponding to the case of FIG. 33 or 51 are denoted by the same reference numerals, and hereinafter, the description thereof will be appropriately omitted.

In FIG. 66, the reproduction apparatus 2 is configured to include a file acquisition unit 51, a manipulation input unit 53, a combination output unit 56, a decomposition unit 231, a controller 232, and a decoding process unit 233.

Therefore, the reproduction apparatus 2 of FIG. 66 is the same as that of the case of FIG. 33 in that the reproduction apparatus 2 is configured to include the file acquisition unit 51, the manipulation input unit 53, and the combination output unit 56.

However, the reproduction apparatus 2 of FIG. 66 is different from that of the case of FIG. 33 in that the decomposition unit 231, the controller 232, and the decoding process unit 233 are installed instead of the decomposition unit 52, the controller 54, and the decoding process unit 55.

Similarly to the decomposition unit 52 of FIG. 33, the decomposition unit 231 extracts (acquires) the moov box or the moof box as the header information from the third MP4 file of the file acquisition unit 51 and supplies the moov box or the moof box to the controller 232.

In addition, the decomposition unit 231 extracts (acquires) the video stream, the ST stream, and the TMI stream as the actual data stored in the mdat box from the third MP4 file of the file acquisition unit 51 and supplies the video stream, the ST stream, and the TMI stream to the decoding process unit 233.

The controller 232 is configured with a CPU, ROM, RAM, and the like. The controller 232 controls overall operations of the reproduction apparatus 2 by executing a predetermined program.

For example, the controller 232 supplies the track_IDs[ ] (FIG. 56, FIG. 57, FIG. 60) stored in the tmpi box included in the moon box supplied by the decomposition unit 231 or the tone_mapping_info_id_ref (FIG. 24, FIG. 56, FIG. 60) stored in the tirf box to the decoding process unit 233. In addition, for example, the controller 232 supplies the tone_mapping_info_id_ref stored in the tirf box included in the moof box supplied by the decomposition unit 231 to the decoding process unit 233.

The decoding process unit 233 is configured to include a decoder 233A and a decoder 233B.

The decoder 233A functions as an acquisition unit which acquires, as a TMI of the video, the TMI included in the TMI stream of the TMI track having the track_id represented by the track_IDs[ ] stored in the tmpi box of the track of the video supplied by the controller 232 among the streams (herein, the video stream, the ST stream, and the TMI stream) supplied by the decomposition unit 231.

In addition, the decoder 233A decodes the encoded data included in the video stream supplied by the decomposition unit 231 in accordance with the HEVC scheme.

In addition, the decoder 233A acquires, as a TMI which is to be applied to the video, the TMI which has the tone_map_id represented by the tone_mapping_info_id_ref stored in the tirf box of the track of the video and is supplied by the controller 232 among the TMIs of the video.

Next, if necessary, the decoder 233A converts the HDR video or the STD video obtained as a result of the decoding into an STD video or an HDR video based on the TMI as the conversion information which is to be applied to the video and outputs the STD video or the HDR video to the combination output unit 56.

In a case where the decoder 233A outputs the HDR video, the decoder 233A outputs the TMI as the feature information which is to be applied to the video together with the HDR video to the combination output unit 56.

The decoder 233B decodes the ST stream supplied by the decomposition unit 231.

In addition, the decoder 233B functions as an acquisition unit which acquires, as a TMI of the ST, the TMI which is included in the TMI stream of the TMI track having the track_id represented by the track_IDs[ ] stored in the tmpi box of the track of the ST and is supplied by the controller 232 among the streams supplied by the decomposition unit 231 (herein, the video stream, the ST stream, and the TMI stream).

In addition, the decoder 233B acquires, as a TMI which is to be applied to the ST, the TMI which has the tone_map_id represented by the tone_mapping_info_id_ref stored in the tirf box of the track of the ST and is supplied by the controller 232 among the TMIs of the ST.

Next, if necessary, the decoder 233B converts the HDR ST or the STD ST obtained as a result of the decoding into an STD ST or an HDR ST based on the TMI as the conversion information which is to be applied to the ST and outputs the STD ST or the HDR ST to the combination output unit 56.

In a case where the decoder 233B outputs the HDR ST, the decoder 233B outputs the TMI as the feature information which is to be applied to the ST together with the HDR ST to the combination output unit 56.

<Reproducing Process of Reproduction Apparatus 2>

Figure 67:
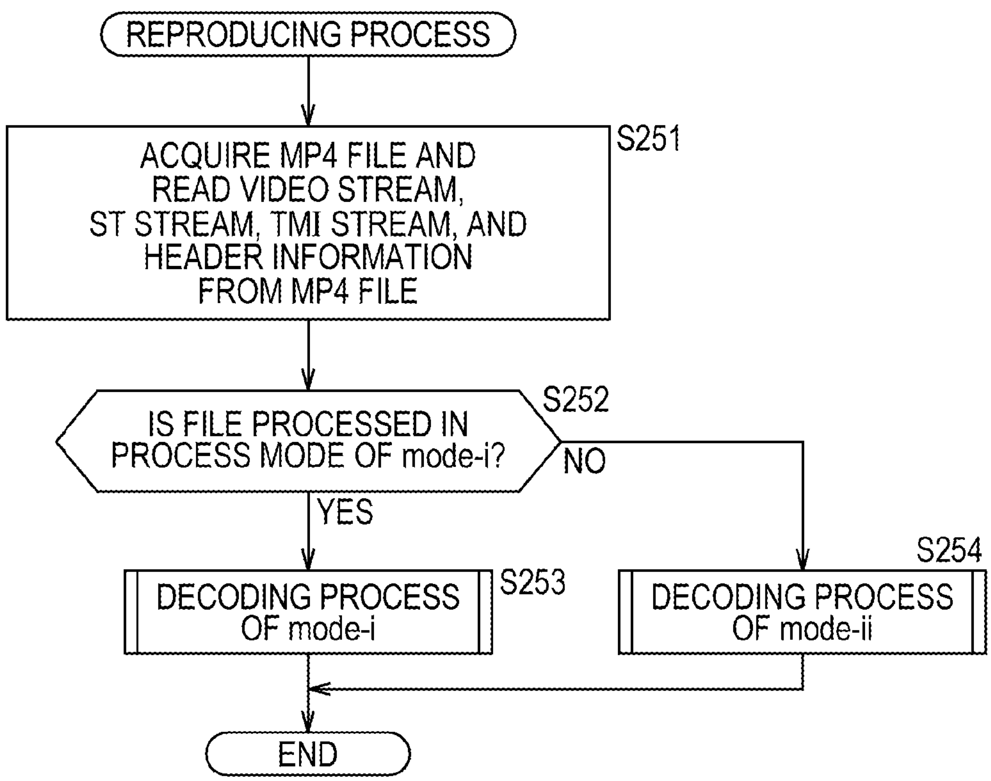
FIG. 67 is a flowchart for describing an example of a reproducing process performed by the reproduction apparatus 2.

FIG. 67 is a flowchart for describing an example of the reproducing process performed by the reproduction apparatus 2 of FIG. 66.

In step S251, the file acquisition unit 51 generates a third MP4 file generated by the generation apparatus 1 and supplies the third MP4 file to the decomposition unit 231.

The decomposition unit 231 reads the moon box or the moof box as the header information and the video stream, the ST stream, and the TMI stream as the actual data stored in the mdat box from the MP4 file supplied by the file acquisition unit 51.

Next, the decomposition unit 231 supplies the moov box or the moof box as the header information to the controller 232 and supplies the video stream, the ST stream, and the TMI stream to the decoding process unit 233.

In addition, the controller 232 supplies the track_IDs[ ] stored in the tmpi box included in the moov box supplied by the decomposition unit 231 and the tone_mapping_info_id_ref stored in the tirf box to the decoding process unit 233. In addition, the controller 232 supplies the tone_mapping_info_id_ref stored in the tirf box included in the moof box supplied by the decomposition unit 231 to the decoding process unit 233.

After that, the procedure proceeds from step S251 to step S252, and similarly to the case of step S42 of FIG. 34, the controller 232 determines whether the process mode of the third MP4 file acquired by the file acquisition unit 51 is mode-i or mode-ii.

In a case where it is determined in step S252 that the process mode is mode-i, the procedure proceeds to step S253, and the decoding process unit 233 performs the decoding process of the mode-i.

On the other hand, in a case where it is determined in step S252 that the process mode is mode-ii, the procedure proceeds to step S254, and the decoding process unit 233 performs the decoding process of the mode-ii.

After the decoding process is performed in step S253 or step S254, the reproducing process is ended.

Figure 68:
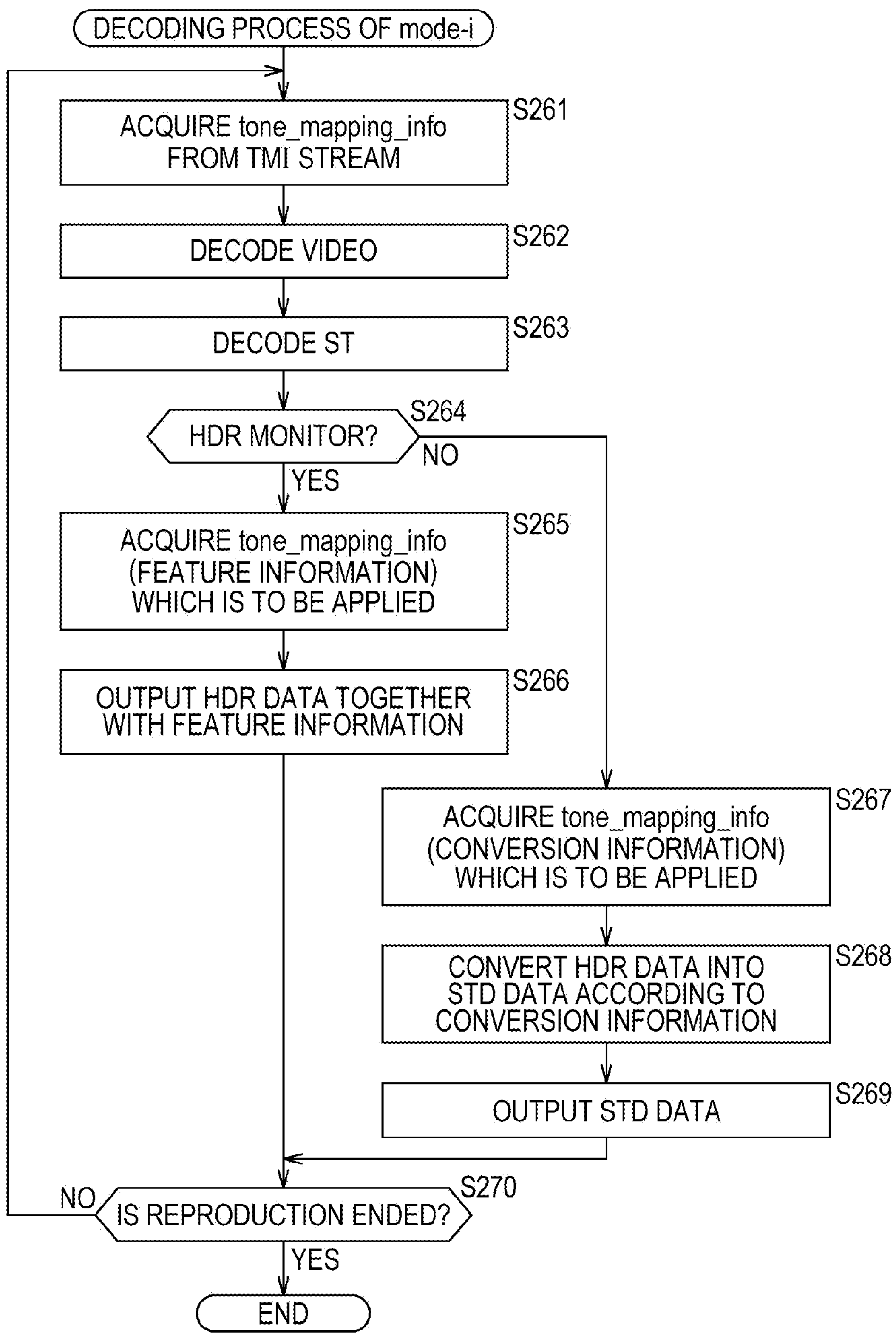
FIG. 68 is a flowchart for describing an example of a decoding process of mode-i performed in step S253.

FIG. 68 is a flowchart for describing the decoding process of the mode-i in step S253 of FIG. 67.

In step S261, the decoder 233A acquires the TMI track which has the track_id represented by the track_IDs[ ] stored in the tmpi box of the track of the video and is supplied by the controller 232 among the streams supplied by the decomposition unit 231 and acquires, as a TMI of the video, the TMI included in the TMI stream.

In addition, the decoder 233B acquires the TMI track which has the track_id represented by the track_IDs[ ] stored in the tmpi box of the track of the ST and is supplied by the controller 232 among the streams supplied by the decomposition unit 231 and acquires, as a TMI of the ST, the TMI included in the TMI stream.

After that, the procedure proceeds from step S261 to step S262, and the decoder 233A decodes the encoded data included in the video stream supplied by the decomposition unit 231 in accordance with the HEVC scheme to generate an HDR video, and the procedure proceeds to step S263. In addition, the video decode (encode) scheme is not limited to the HEVC scheme.

In step S263, the decoder 233B decodes the ST stream supplied by the decomposition unit 231, namely, for example, the stream of the data of the ST having an SMPTE-TT format into an HDR ST, and the procedure proceeds to step S264.

In step S264, similarly to step S64 of FIG. 35, the controller 232 determines whether or not the monitor included in the display apparatus 3 is an HDR monitor.

In a case where it is determined in step S264 that the monitor included in the display apparatus 3 is an HDR monitor, the procedure proceeds to step S265.

In step S265, the decoder 233A acquires, as a TMI which is to be applied to the video, the TMI (TMI designated by the tone_mapping_info_id_ref as the HDR designating information) which has the tone_map_id represented by the tone_mapping_info_id_ref stored in the tirf box of the track of the video and is supplied by the controller 232 among the TMIs of the video acquired in step S261.

In addition, the decoder 233B acquires, as a TMI which is to be applied to the ST, the TMI (TMI designated by the tone_mapping_info_id_ref as the HDR designating information) which has the tone_map_id represented by the tone_mapping_info_id_ref stored in the tirf box of the track of the ST and is supplied by the controller 232 among the TMIs of the ST acquired in step S261.

After that, the procedure proceeds from step S265 to step S266. Hereinafter, in steps S266 and S270, the same processes as those of steps S66 and S70 of FIG. 35 are performed.

On the other hand, in a case where it is determined in step S264 that the monitor included in the display apparatus 3 is not an HDR monitor but an STD monitor, the procedure proceeds to step S267.

In step S267, similarly to step S265, the decoders 233A and 233B acquire TMIs which are to be applied to the video and the ST, respectively.

After that, the procedure proceeds from step S267 to step S268, and hereinafter, in steps S268 to S270, the same processes as those of steps S68 to S70 of FIG. 35 are performed.

Figure 69:
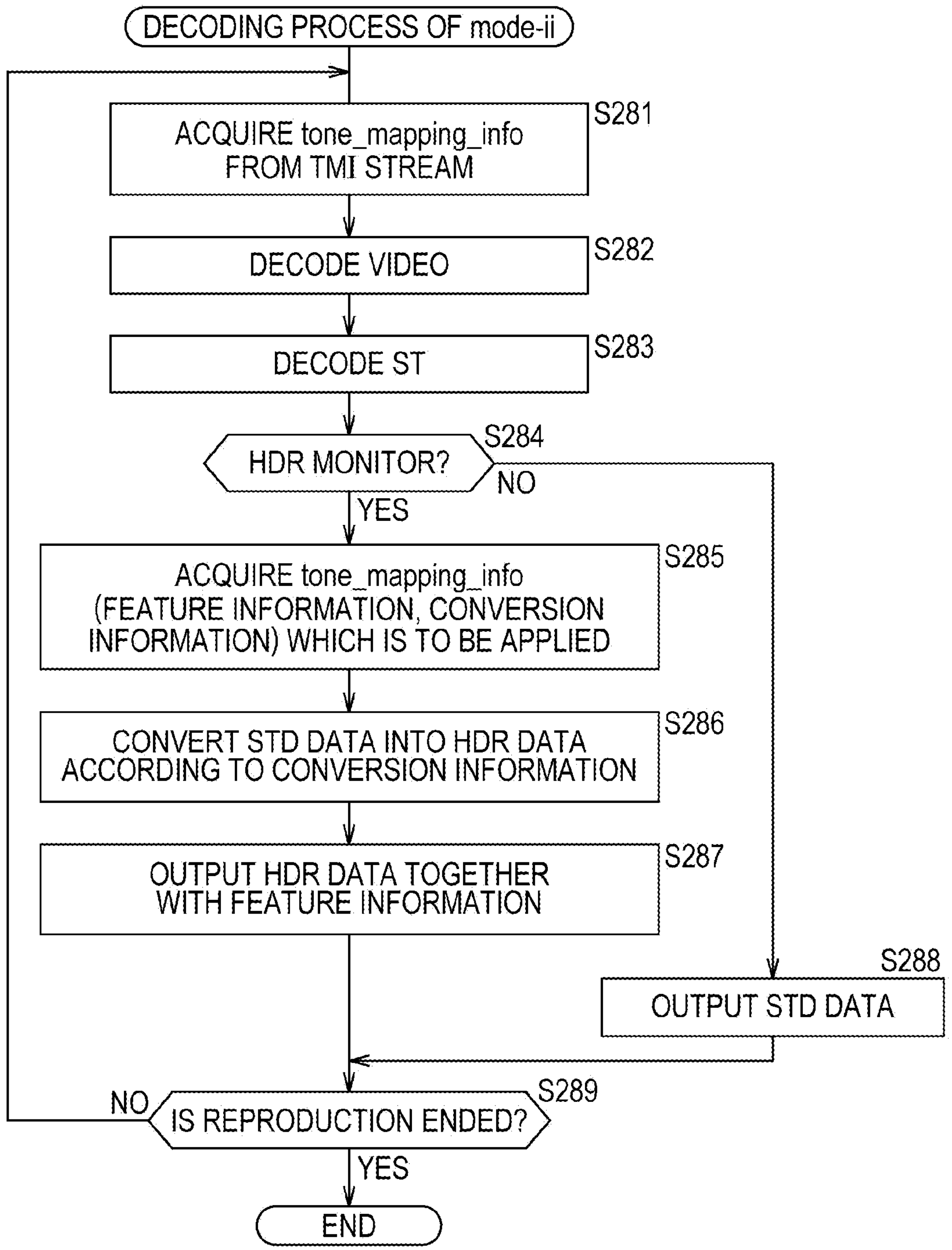
FIG. 69 is a flowchart for describing an example of a decoding process of mode-ii performed in step S254.

FIG. 69 is a flowchart for describing the decoding process of the mode-ii in step S254 of FIG. 67.

In step S281, similarly to step S261 of FIG. 68, the decoders 233A and 233B acquires the TMIs.

Namely, the decoder 233A acquires the TMI track which has the track_id represented by the track_IDs[ ] stored in the tmpi box of the track of the video and is supplied by the controller 232 among the streams supplied by the decomposition unit 231 and acquires, as a TMI of the video, the TMI included in the TMI stream.

In addition, the decoder 233B acquires the TMI track which has the track_id represented by the track_IDs[ ] stored in the tmpi box of the track of the ST and is supplied by the controller 232 among the streams supplied by the decomposition unit 231 and acquires, as a TMI of the ST, the TMI included in the TMI stream.

After that, the procedure proceeds from step S281 to step S282, and in steps S282 to S284, the same processes as those of steps S82 to S84 of FIG. 36 are performed.

Namely, in the step S282, the decoder 233A decodes the encoded data included in the video stream supplied by the decomposition unit 231 to generate an STD video. In step S283, the decoder 233B decodes the ST stream of the data of the ST having an SMPTE-TT format which is supplied by the decomposition unit 231 into an STD ST.

Next, in step S284, the controller 232 determines whether or not the monitor included in the display apparatus 3 is an HDR monitor.

In a case where it is determined in step S284 that the monitor included in the display apparatus 3 is an HDR monitor, the procedure proceeds to step S285.

In step S285, the decoder 233A acquires, as a TMI which is to be applied to the video, the TMI which has the tone_map_id represented by the tone_mapping_info_id_ref stored in the tirf box of the track of the video and is supplied by the controller 232 among the TMIs of the video acquired in step S281.

In addition, the decoder 233B acquires, as a TMI which is to be applied to the ST, the TMI which has the tone_map_id represented by the tone_mapping_info_id_ref stored in the tirf box of the track of the ST and is supplied by the controller 232 among the TMIs of the ST acquired in step S281.

After that, the procedure proceeds from step S285 to step S286, and in steps S286 to S289, the same processes as those of steps S86 to S89 of FIG. 36 are performed.

As described above, the generation apparatus 1 of the third configurational example stores the TMI track which is a track of the TMI (stream thereof) besides the track of video (stream thereof) and the track of the ST (stream thereof) in the third MP4 file.

In addition, the track of each of the media may include the tmpi box which stores the track_IDs[ ] representing the track_id as the track designating information designating the TMI track of the TMI which is to be applied to the media (track thereof) and the tirf box which stores the tone_mapping_info_id_ref as the HDR designating information designating the TMI which is to be applied to the media among the TMIs of the TMI track.

As a result, with respect to each of the media, the reproduction apparatus 2 acquires, as a TMI which is to be applied to the media, the TMI (having the tone_map_id) designated by the tone_mapping_info_id_ref stored in the tirf box among the TMIs of the TMI track (track_id thereof) designating the track_IDs[ ] stored in the tmpi box included in the track of the media and can use the TMI for the processing of the media.

<Fourth Configurational Example of Generation Apparatus 1>

Figure 70:
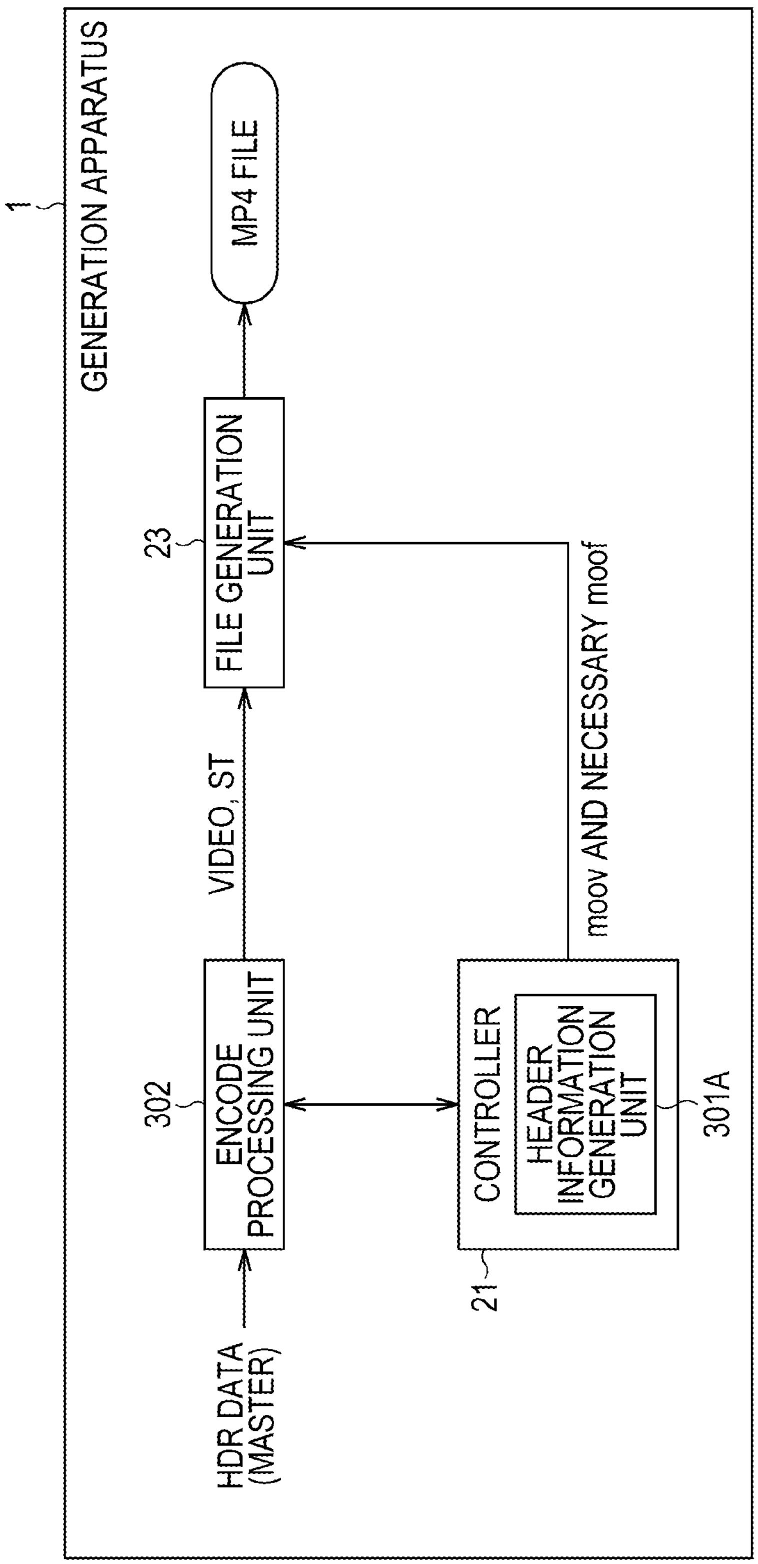
FIG. 70 is a block diagram illustrating a fourth configurational example of the generation apparatus 1.

FIG. 70 is a block diagram illustrating a fourth configurational example of the generation apparatus 1 of FIG. 1.

In addition, in the figure, the components corresponding to the case of FIG. 20 are denoted by the same reference numerals, and hereinafter, the description thereof will be appropriately omitted.

In FIG. 70, the generation apparatus 1 is configured to include a controller 21, a file generation unit 23, and an encode processing unit 302.

Therefore, the generation apparatus 1 of FIG. 70 is the same as that of the case of FIG. 20 in that the generation apparatus 1 is configured to include the controller 21, and the file generation unit 23, and the generation apparatus 1 of FIG. 70 is different from that of the case of FIG. 20 in that the encode processing unit 302 is installed instead of the encode processing unit 22.

In addition, the generation apparatus 1 of FIG. 70 is different from that of the case of FIG. 20 in that the controller 21 is configured to include a header information generation unit 301A instead of the header information generation unit 21A.

In the generation apparatus 1 of FIG. 70, HDR data of a master are input to the encode processing unit 302.

The header information generation unit 301A generates moon and necessary moof of the MP4 file generated by the file generation unit 23 as header information and supplies the header information to the file generation unit 23.

Similarly to the encode processing unit 22 of FIG. 20, the encode processing unit 302 generates a video stream and an ST stream by performing encoding the HDR data of the master and outputs the video stream and the ST stream to the file generation unit 23.

However, in the embodiment, the HDR storing element is newly defined as the element of the XML which stores the TMI as the HDR information, and with respect to the ST, the encode processing unit 302 allows the HDR storing element which stores the TMI as the HDR information as the element of the XML to be included in the data of the ST having an SMPTE-TT format obtained as a result of the encoding the ST to generate an ST stream.

Therefore, since the HDR storing element which stored the TMI as the HDR information is included in the data of the ST having an SMPTE-TT format as the ST stream generated by the encode processing unit 302, the displaying the HDR ST or the like by using the TMI as the HDR information may be performed by using only the data of the ST having an SMPTE-TT format.

Namely, with respect to the TMI which is to be applied to the data of the ST having an SMPTE-TT format as the ST stream stored in the above-described first to third MP4 files, since the TMI is allowed to be stored in the tinf box or the TMI included in the track other than the track of the ST is allowed to be referred to (used), in a case where the ST stream stored in the first to third MP4 files is stored without change in a file or data having a container format other than that of the MP4 file, it is difficult to perform the displaying the HDR ST or the like by using the TMI as the HDR information.

On the contrary, since the HDR storing element which stores the TMI as the HDR information is included in the data of the ST having an SMPTE-TT format (hereinafter, sometimes referred to as new TT data) as the ST stream generated by the encode processing unit 302, the displaying the HDR ST or the like by using the TMI as the HDR information may be performed by using only the new TT data.

Therefore, although the new TT data is provided with any container format as well as the MP4 file, the displaying the HDR ST or the like by using the TMI as the HDR information may be performed.

Namely, in the generation apparatus 1 of FIG. 70, although the new TT data are provided in the state that the data are stored in the MP4 file, the new TT data may be provided, for example, in the state that the data are stored, for example, in an IP packet or a file or data having any other arbitrary container format besides the state that the data are stored in the MP4 file.

In addition, even in a case where the new TT data are provided alone or provided in the state that the data are multiplexed with other data such as the video, the displaying the HDR ST or the like by using the TMI as the HDR information may be performed.

Therefore, according to the new TT data, the introduction of the TMI to the data of the ST having an SMPTE-TT format is facilitated, so that it is possible to increase the chance that a use enjoys the HDR ST.

<Configurational Example of Encode Processing Unit 302>

Figure 71:
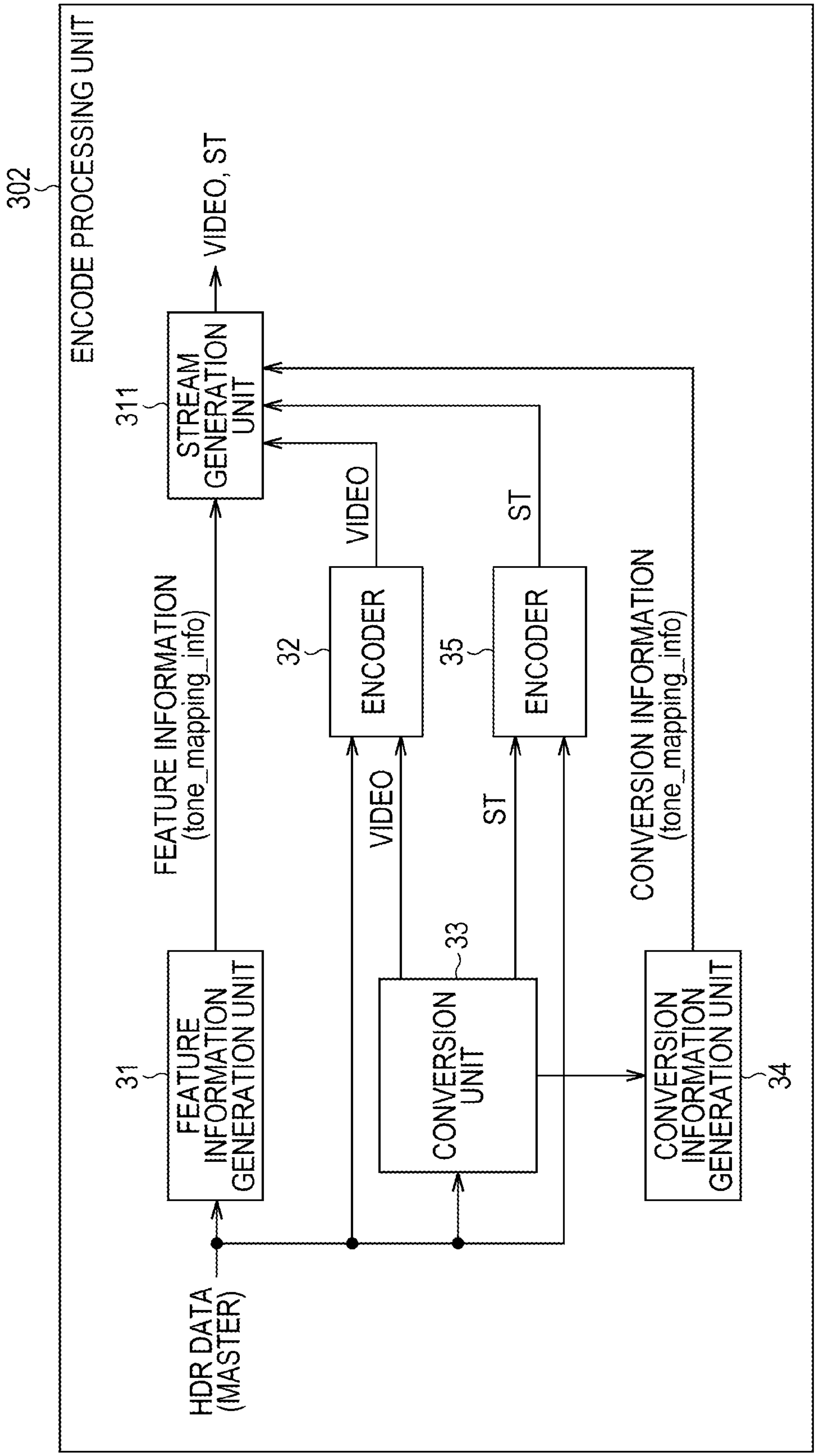
FIG. 71 is a block diagram illustrating a configurational example of an encode processing unit 302.

FIG. 71 is a block diagram illustrating a configurational example of the encode processing unit 302 of FIG. 70.

In addition, in the figure, the components corresponding to the encode processing unit 22 of FIG. 26 are denoted by the same reference numerals, and hereinafter, the description thereof will be appropriately omitted.

The encode processing unit 302 is configured to include a feature information generation unit 31, an encoder 32, a conversion unit 33, a conversion information generation unit 34, an encoder 35, and a stream generation unit 311.

Therefore, the encode processing unit 302 is the same as that of the encode processing unit 22 of FIG. 26 in that the encode processing unit 302 is configured to include the feature information generation unit 31, the encoder 32, the conversion unit 33, the conversion information generation unit 34, and the encoder 35.

However, the encode processing unit 302 is different from the encode processing unit 22 of FIG. 26 in that the stream generation unit 311 is installed instead of the stream generation unit 36.

The stream generation unit 311 inserts, as the SEIs, the TMIs of the video supplied by the feature information generation unit 31 and the conversion information generation unit 34 into the encoded data of the video supplied by the encoder 32 to generate a video stream and supplies the video stream to the file generation unit 23 (FIG. 70).

In addition, the stream generation unit 311 generates an HDR storing element which stores the TMIs of the ST supplied by the feature information generation unit 31 and the conversion information generation unit 34.

In addition, the stream generation unit 311 inserts the HDR storing element or the like into the data of the ST having an SMPTE-TT format supplied by the encoder 35 to generate new TT data and supplies a stream of the new TT data (ST stream) to the file generation unit 23.

In addition, similarly to the feature information generation unit 131 of FIG. 46, in FIG. 71, with respect to the HDR video and the HDR ST, the feature information generation unit 31 may separately generate the TMIs as the feature information; with respect to the HDR video, the feature information generation unit 31 may generate the TMI as the feature information of the HDR video; and with respect to the HDR ST, the feature information generation unit 31 may employ the TMI as the feature information of the HDR video which is simultaneously displayed with the HDR ST as the TMI as the feature information of the ST (HDR ST).

In addition, similarly to the conversion information generation unit 132 of FIG. 46, in FIG. 71, with respect to the HDR video and the HDR ST, the conversion information generation unit 34 may separately generate the TMI as the conversion information; with respect to the HDR video, the conversion information generation unit 34 may generate the TMI as the conversion information of the HDR video; and with respect to the HDR ST, the conversion information generation unit 34 may employ the TMI as the conversion information of the HDR video which is simultaneously displayed with the HDR ST as the TMI as the conversion information of the ST (HDR ST).

<HDR Storing Element>

FIG. 72 is a diagram illustrating an example of an HDR storing element.

As the HDR storing element, there are a ToneMap element which stores the TMI as the conversion information and an Hdrinfo element which stores the TMI as the feature information.

A of FIG. 72, B of FIG. 72, and C of FIG. 72 indicate examples of the ToneMap element, and D of FIG. 72 indicates an example of the Hdrinfo element.

The ToneMap element of A of FIG. 72 corresponds to the TMI of FIG. 7 when the tone_map_id is 0; the ToneMap element of B of FIG. 72 corresponds to the TMI of FIG. 7 when the tone_map_id is 2; and the ToneMap element of C of FIG. 72 corresponds to the TMI of FIG. 7 when the tone_map_id is 3.

The Hdrinfo element of D of FIG. 72 corresponds to the TMI of FIG. 7 when the tone_map_id is 4.

In addition, the ToneMap element and the Hdrinfo element (TMI stored therein) of FIG. 72 are identified by xml:id as identification information.

In FIG. 72, numbers are used as the xml:id of the ToneMap element and the Hdrinfo element. However, arbitrary characters (string) (including numbers) may be used as the xml:id.

The ToneMap element and the Hdrinfo element may be arranged (described), for example, in a tt, head, body, region, div, p, span, or set element as a predetermined element of XML.

FIG. 73 is a diagram illustrating an example of definition of the toneMapRef attribute and the hdrInfoRef attribute.

The toneMapRef attribute is a designation attribute which is newly defined below a predetermined name space (for example, a name space hdr described later) as an attribute designating the ToneMap element storing the TMI which is to be applied to the ST.

In a case where some element has the toneMapRef attribute, the TMI stored in the ToneMap element designated by the toneMapRef attribute is acquired and used as the TMI which is to be applied to the ST described in the element having the toneMapRef attribute.

The hdrInfoRef attribute is a designation attribute which is newly defined below a predetermined name space (for example, a name space hdr described later) as an attribute designating the Hdrinfo element storing the TMI which is to be applied to the ST.

In a case where some element has the hdrInfoRef attribute, the TMI stored in the Hdrinfo element designated by the hdrinfoRef attribute is acquired and used as the TMI which is to be applied to the ST described in the element having the hdrinfoRef attribute.

The toneMapRef attribute and the hdrinfoRef attribute may be described, for example, in a body, div, p, region, span, or set element as a predetermined element of XML.

FIG. 74 is a diagram illustrating a first example of the new TT data.

In the new TT data of FIG. 74, in the description n1, the name space hdr about the TMI as the HDR information is defined.

In addition, the descriptions n2 and n3 are ToneMap elements. The ToneMap element of the description n2 is identified by, xml:id="A"; and the ToneMap element of the description n3 is identified by xml:id="B".

In addition, the ToneMap elements of the descriptions n2 and n3 correspond to the ToneMap elements of B of FIG. 72 and C of FIG. 72, respectively.

In addition, With respect to the ToneMap elements of the descriptions n2 and n3 of FIG. 74, a portion of the descriptions is omitted.

The description n4 is a p element and has hdr:toneMapRef="A" as the toneMapRef attribute.

According to the p element of the description n4, in accordance with hdr:toneMapRef="A" as the toneMapRef attribute, the TMI stored in the ToneMap element of the description n2 identified by xml:id="A" is acquired and used as the TMI which is to be applied to the text "this subtitle references ToneMap whose id is A" as the ST described in the p element of the description n4.

The description n5 is a p element and has hdr:toneMapRef="B" as the toneMapRef attribute.

According to the p element of the description n5, in accordance with hdr:toneMapRef="B" as the toneMapRef attribute, the TMI stored in the ToneMap element of the description n3 identified by xml:id="B" is acquired and used as the TMI which is to applied to the text "this subtitle references ToneMap whose id is B" as the ST described in the p element of the description n5.

In addition, in FIG. 74, the ToneMap elements of the descriptions n2 and n3 are arranged in a body element. However, the ToneMap elements may be arranged at other positions.

In addition, in FIG. 74, the ToneMap element of the description n2 or n3 and the p element of the description n4 or n5 having the toneMapRef attribute designating the ToneMap element are described in the same file. However, the ToneMap element and the p element may be described in different files.

FIG. 75 is a diagram illustrating a second example of the new TT data.

In the new TT data of FIG. 75, similarly to the description n1 of FIG. 74, in the description n11, the name space hdr about the TMI as the HDR information is defined.

In addition, the descriptions n12 and n13 are Hdrinfo elements. The Hdrinfo element of the description n12 is identified by xml:id="AA"; and the Hdrinfo element of the description n13 is identified by xml:id="BB".

In addition, all the Hdrinfo elements of the descriptions n12 and n13 correspond to the Hdrinfo element of D of FIG. 72.

In addition, with respect to the Hdrinfo elements of the descriptions n12 and n13 of FIG. 75, a portion of the description is omitted.

The description n14 is a p element and has hdr:hdrInfoRef="AA" as the hdrInfoRef attribute.

According to the p element of the description n14, in accordance with hdr:hdrInfoRef="AA" as the hdrInfoRef attribute, the TMI stored in the Hdrinfo element of the description n12 identified by xml:id="AA" is acquired and used as the TMI which is to be applied to the text "this subtitle references Hdrinfo whose id is AA" as the ST described in the p element of the description n14.

The description n15 is a p element and has hdr:hdrInfoRef="BB" as the hdrInfoRef attribute.

According to the p element of the description n15, in accordance with hdr:hdrInfoRef="BB" as the hdrInfoRef attribute, the TMI stored in the Hdrinfo element of the description n13 identified by xml:id="BB" is acquired and used as the TMI which is to be applied to the text "this subtitle references Hdrinfo whose id is BB" as the ST described in the p element of the description n15.

In addition, in FIG. 75, the Hdrinfo elements of the descriptions n12 and n13 are arranged in a body element. However, the Hdrinfo elements may be arranged at other positions.

In addition, in FIG. 75, the Hdrinfo element of the description n12 or n13 and the p element of the description n14 or n15 having the hdrInfoRef attribute designating the Hdrinfo element are described in the same file. However, the Hdrinfo element and the p element may be described in different files.

In addition, in FIGS. 74 and. 75, only one of the ToneMap element and the Hdrinfo element is described in the new TT data. However, both of the ToneMap element and the Hdrinfo element may be described in the new TT data.

In addition, in FIGS. 74 and. 75, only one of the toneMapRef attribute and hdrInfoRef attribute is designated in the p element. Both of the toneMapRef attribute and the hdrInfoRef attribute may be designated in one element.

FIG. 76 is a diagram illustrating a third example of the new TT data.

Herein, in the first example of the new TT data of FIG. 74, the ToneMap element which stores the TMI which is to be applied to the ST is designated by the toneMapRef attribute. However, in the third example of the new TT data of FIG. 76, the toneMapRef attribute is not used, but the ToneMap element which stores the TMI which is to be applied to the ST is designated.

Namely, in the third example of the new TT data of FIG. 76, by arranging the ToneMap element which stores the TMI which is to be applied to the ST in the element where the ST is displayed, the ToneMap element arranged in the element where the ST is displayed is designated as the ToneMap element which stores the TMI which is to be applied to the ST.

In the new TT data of FIG. 76, similarly to the description n1 of FIG. 74, in the description n21, the name space hdr about the TMI as the HDR information is defined.

In addition, in FIG. 76, the ToneMap element of the description n23 which is equal to the description n2 of FIG. 74 is arranged in the div element of the description n22.

In addition, the p element of the description n24 where the text "this subtitle references ToneMap whose identifiers are A" is displayed as the ST is arranged in the div element of the description n22.

As a result, with respect to the p element of the description n24 arranged in the div element of the description n22, similarly, the TMI stored in the ToneMap element of the description n23 arranged in the div element of the description n22 is acquired and used as the TMI which is applied to the text "this subtitle references ToneMap whose identifiers are A" as the ST described in the p element of the description n24.

In addition, in FIG. 76, the ToneMap element of the description n26 which is equal to the description n3 of FIG. 74 is arranged in the div element of the description n25.

In addition, the p element of the description n27 where the text "this subtitle references ToneMap whose identifiers are B" is displayed as the ST is arranged in the div element of the description n25.

As a result, with respect to the p element of the description n27 arranged in the div element of the description n25, similarly, the TMI stored in the ToneMap element of the description n26 arranged in the div element of the description n25 is acquired and used as the TMI which is to be applied to the text "this subtitle references ToneMap whose identifiers are B" as the ST described in the p element of the description n27.

FIG. 77 is a diagram illustrating a fourth example of the new TT data.

Herein, in the second example of the new TT data of FIG. 75, the Hdrinfo element stored in the TMI which is to be applied to the ST is designated by the hdrinfoRef attribute. However, in the fourth example of the new TT data of FIG. 77, the hdrinfoRef attribute is not used, but the Hdrinfo element which stores the TMI which is to be applied to the ST is designated.

Namely, in the fourth example of the new TT data of FIG. 77, similarly to the case of FIG. 76, by arranging the Hdrinfo element which stores the TMI which is to be applied to the ST is arranged in the element where the ST is displayed, the Hdrinfo element arranged in the element where the ST is displayed is designated as the Hdrinfo element which stores the TMI which is to be applied to the ST.

In the new TT data of FIG. 77, similarly to the description n1 of FIG. 74, in the description n31, the name space hdr about the TMI as the HDR information is defined.

In addition, in FIG. 77, the HdrInfo element of the description n33 which is equal to the description n12 of FIG. 75 is arranged in the div element of the description n32.

In addition, the p element of the description n34 where the text "this subtitle references HdrInfo whose identifiers are AA" is displayed as the ST is arranged in the div element of the description n32.

As a result, with respect to the p element of the description n34 arranged in the div element of the description n32, similarly, the TMI stored in the HdrInfo element of the description n33 arranged in the div element of the description n32 is acquired and used as the TMI which is applied to the text "this subtitle references HdrInfo whose identifiers are AA" as the ST described in the p element of the description n34.

In addition, in FIG. 77, the HdrInfo element of the description n36 which is equal to the description n13 of FIG. 75 is arranged in the div element of the description n35.

In addition, the p element of the description n37 where the text "this subtitle references HdrInfo whose identifiers are BB" is displayed as the ST is arranged in the div element of the description n35.

As a result, with respect to the p element of the description n37 arranged in the div element of the description n35, similarly, the TMI stored in the HdrInfo element of the description n36 arranged in the div element of the description n35 is acquired and used as the TMI which is to be applied to the text "this subtitle references HdrInfo whose identifiers are BB" as the ST described in the p element of the description n37.

In addition, in FIGS. 76 and 77, only one of the ToneMap element and the HdrInfo element is described in the new TT data. However, both of the ToneMap element and the HdrInfo element may be described in the new TT data.

<File Generating Process of Generation Apparatus 1>

Figure 78:
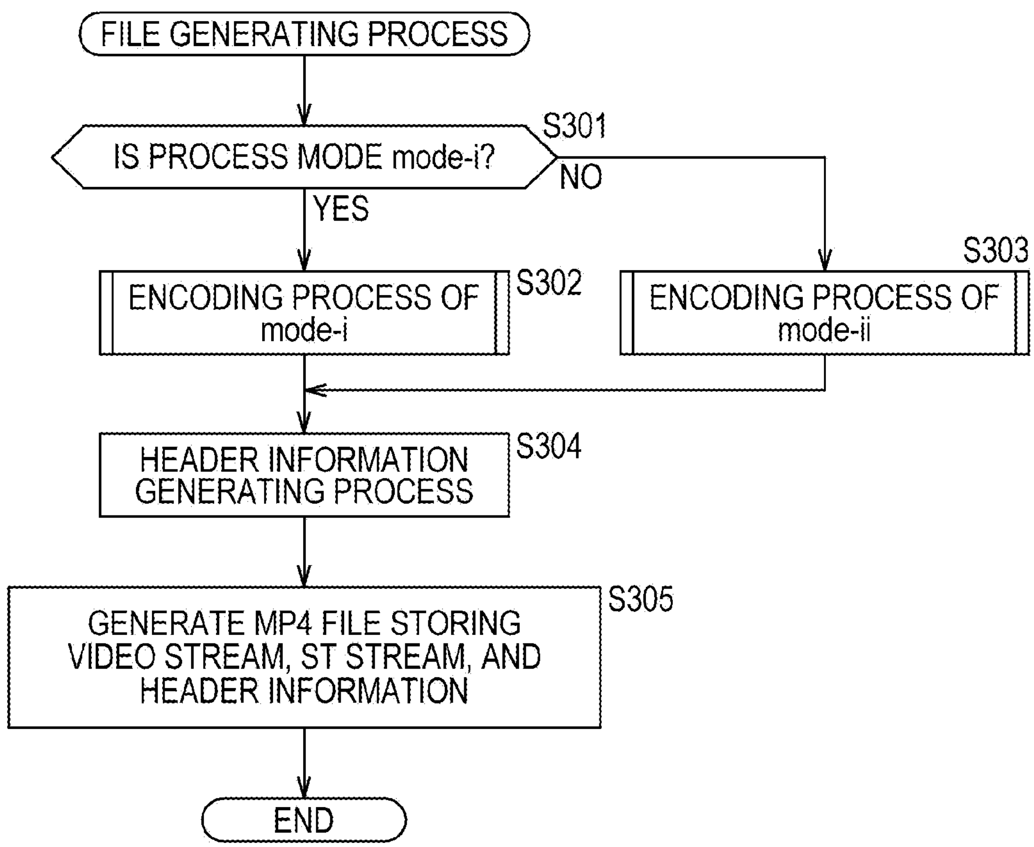
FIG. 78 is a flowchart for describing an example of a file generating process performed by the generation apparatus 1.

FIG. 78 is a flowchart for describing an example of the file generating process performed by the generation apparatus 1 of FIG. 70.

If the HDR data of the master are input to the generation apparatus 1, similarly to step S1 of FIG. 29, in step S301, the controller 21 of the generation apparatus 1 determines whether or not the process mode is mode-i.

In a case where it is determined in step S301 that the process mode is mode-i, the procedure proceeds to step S302, and the encode processing unit 302 performs the encoding process of the mode-i. The video stream and the ST stream (es) generated through the encoding process of the mode-i are supplied from the encode processing unit 302 to the file generation unit 23.

On the other hand, in a case where it is determined in step S301 that the process mode is mode-ii, the procedure proceeds to step S303, and the encode processing unit 302 performs the encoding process of the mode-ii. The video stream and the ST stream (es) generated through the encoding process of the mode-ii are supplied from the encode processing unit 302 to the file generation unit 23.

After step S302 or S303, the procedure proceeds to step S304, and the header information generation unit 301A performs a header information generating process. moon and necessary moof as the header information generated in the header information generating process is supplied from the header information generation unit 301A to the file generation unit 23, and the procedure proceeds to step S305.

In step S305, the file generation unit 23 generates and outputs the MP4 file which stores the video stream and the ST stream supplied by the encode processing unit 302 and the header information supplied by the header information generation unit 301A, and the file generating process is ended.

Figure 79:
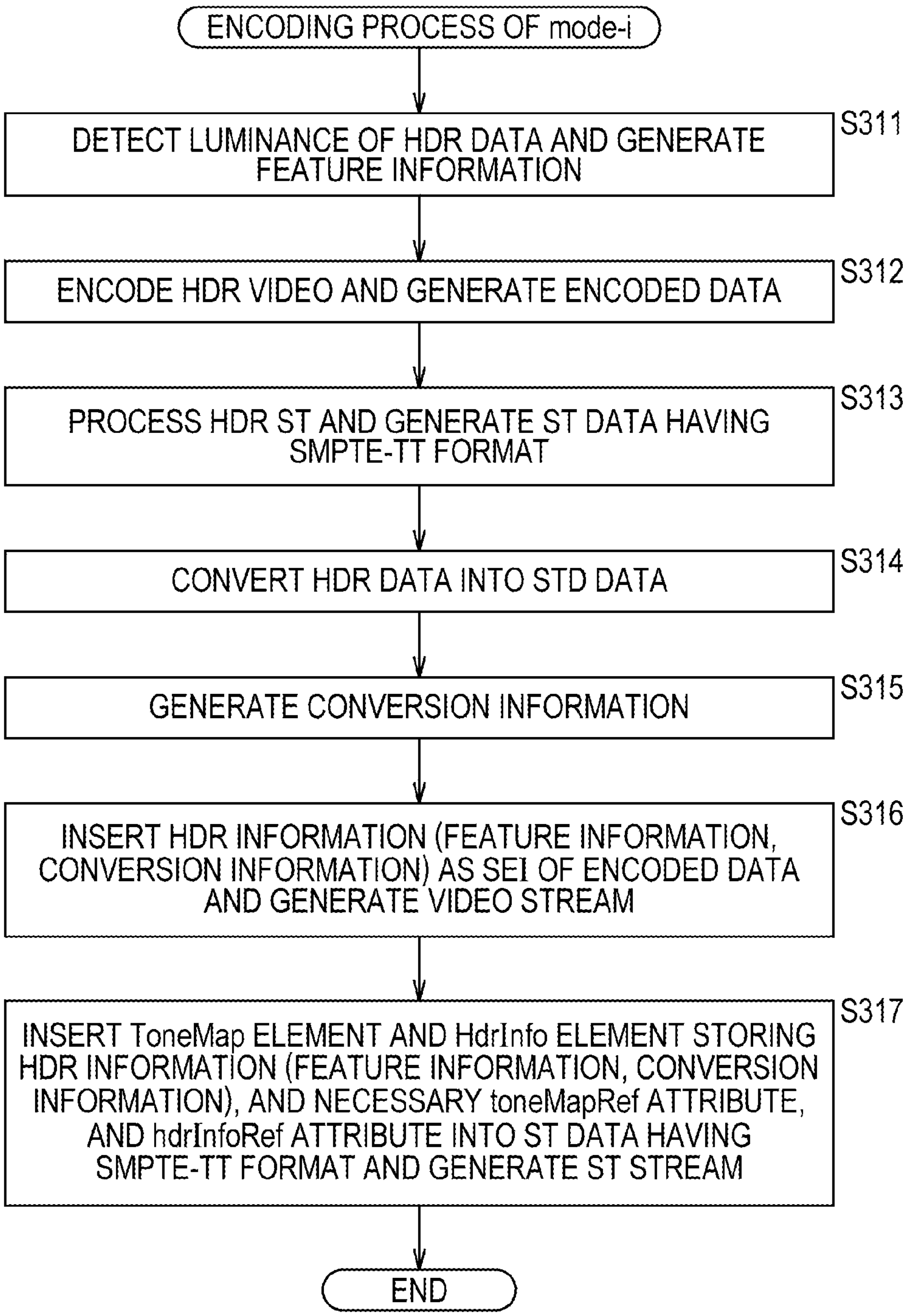
FIG. 79 is a flowchart for describing an example of an encoding process of mode-i performed in step S302.

FIG. 79 is a flowchart for describing an example of the encoding process of the mode-i performed in step S302 of FIG. 78.

In steps S311 to S315, the same processes as those of steps S11 to S15 of FIG. 30 are performed.

After that, in the step S316, the stream generation unit 311 of the encode processing unit 302 (FIG. 71) inserts, as the SEI of the encoded data, the TMI of the video as the feature information supplied by the feature information generation unit 31 and the TMI of the video as the conversion information supplied by the conversion information generation unit 34 into the encoded data supplied by the encoder 32 to generate a video stream, and the procedure proceeds to step S317.

In step S317, the stream generation unit 311 generates an HdrInfo element which stores the TMI of the ST as the feature information supplied by the feature information generation unit 31 and a ToneMap element which stores the TMI of the ST as the conversion information supplied by the conversion information generation unit 34.

In addition, the stream generation unit 311 inserts the HdrInfo element, the ToneMap element, the necessary toneMapRef attribute, and the hdrInfoRef attribute into the data of the ST having an SMPTE-TT format supplied by the encoder 35 to generate new TT data.

Next, the stream generation unit 311 supplies the ST stream which is a stream of the new TT data together with the video stream to the file generation unit 23 (FIG. 70), and the encoding process of the mode-i is ended (returned).

Figure 80:
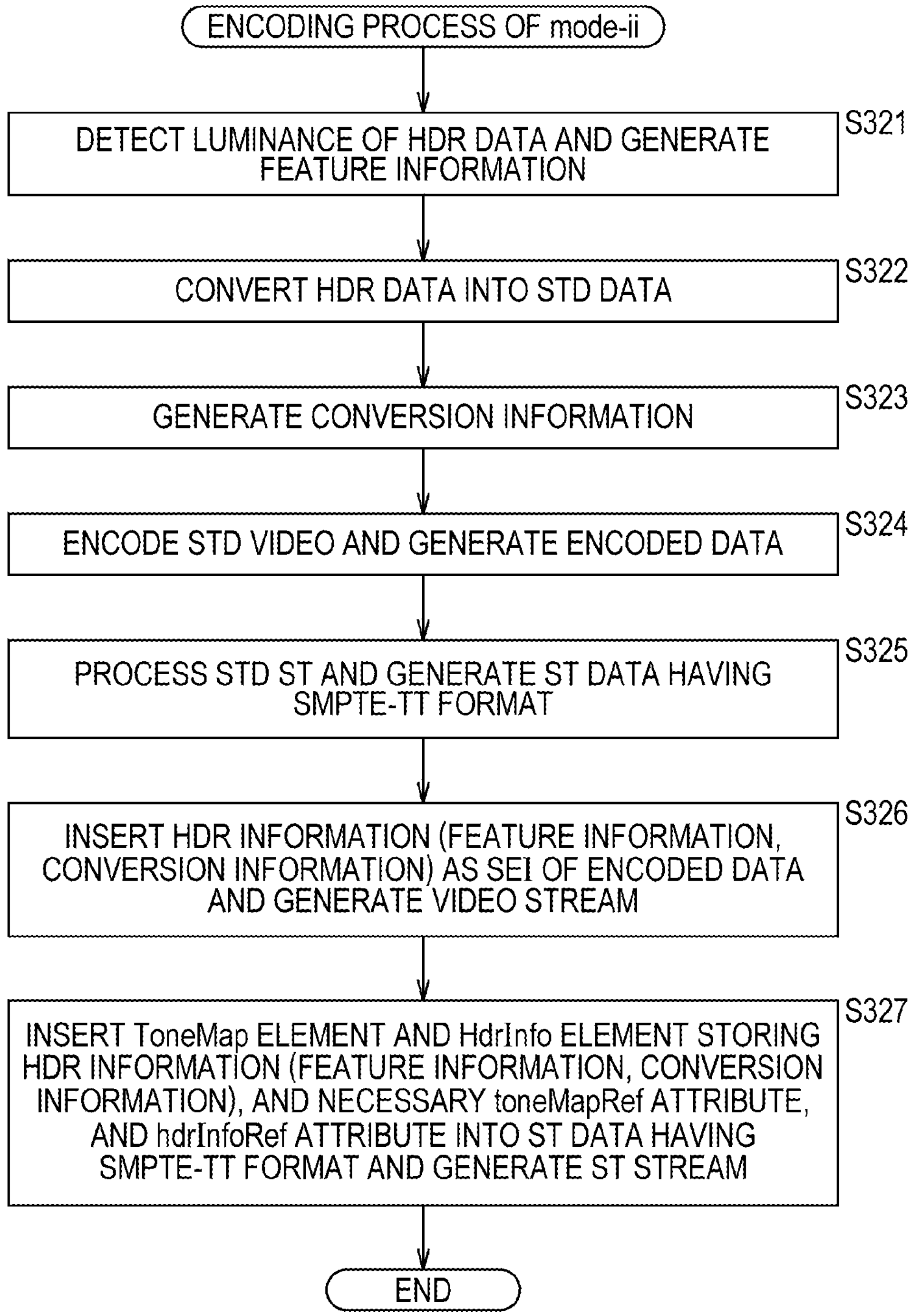
FIG. 80 is a flowchart for describing an example of an encoding process of mode-ii performed in step S303.

FIG. 80 is a flowchart for describing an example of the encoding process of the mode-ii performed in step S303 of FIG. 78.

In steps S321 to S325, the same processes as those of steps S21 to S25 of FIG. 31 are performed.

Next, in steps S326 and S327, the same processes as those of steps S316 and S317 of FIG. 79 are performed.

<Fourth Configurational Example of Reproduction Apparatus 2>

Figure 81:
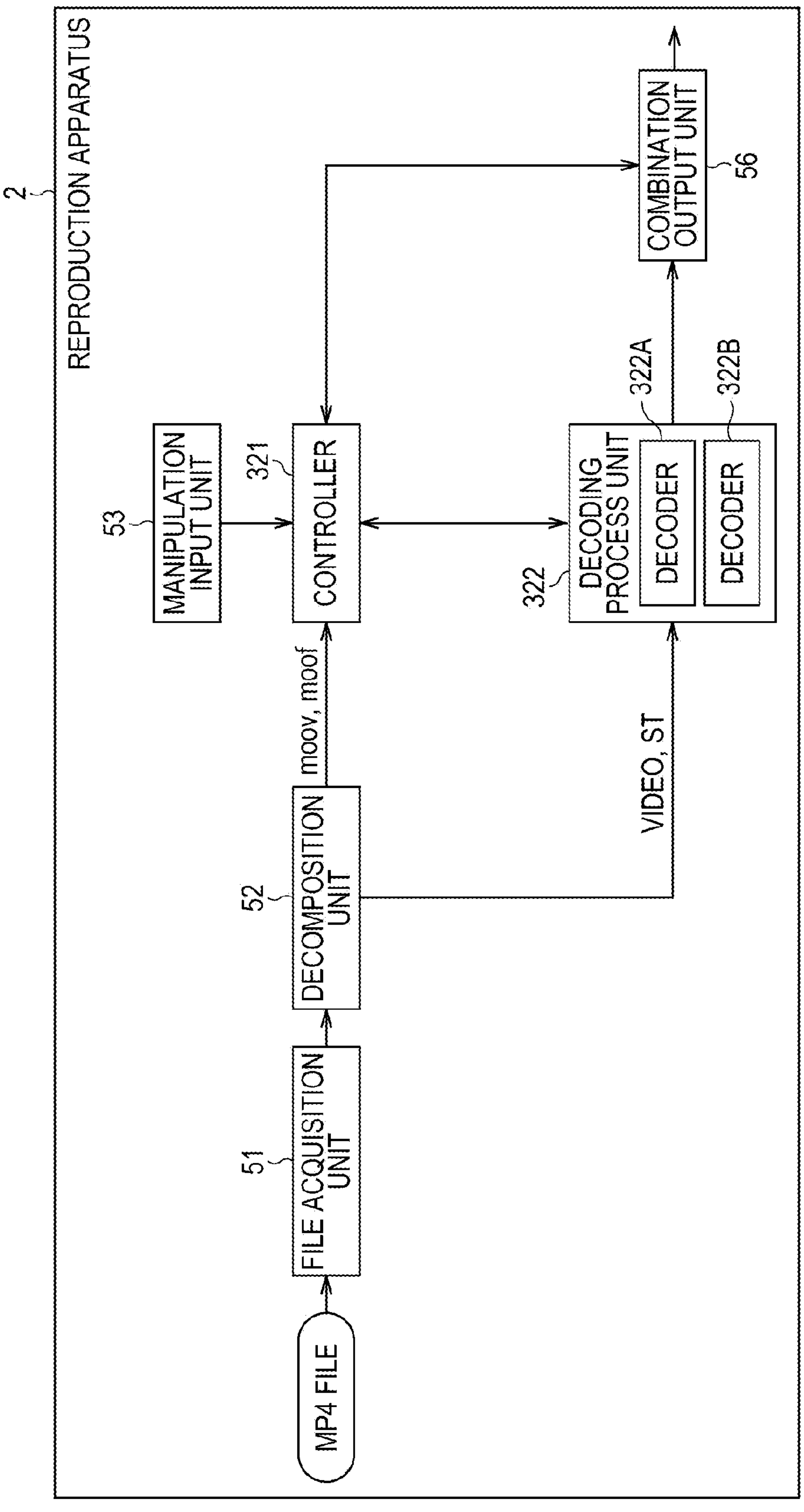
FIG. 81 is a block diagram illustrating a fourth configurational example of the reproduction apparatus 2.

FIG. 81 is a block diagram illustrating a fourth configurational example of the reproduction apparatus 2 of FIG. 1.

In addition, in the figure, the components corresponding to the case of FIG. 33 are denoted by the same reference numerals, and hereinafter, the description thereof will be appropriately omitted.

In FIG. 81, the reproduction apparatus 2 is configured to include a file acquisition unit 51, a decomposition unit 52, a manipulation input unit 53, a combination output unit 56, a controller 321, and a decoding process unit 322.

Therefore, the reproduction apparatus 2 of FIG. 81 is the same as that of the case of FIG. 33 in that the reproduction apparatus 2 is configured to include the file acquisition unit 51, the decomposition unit 52, manipulation input unit 53, the and the combination output unit 56.

However, the reproduction apparatus 2 of FIG. 81 is different from that of the case of FIG. 33 in that the controller 321 and the decoding process unit 322 are installed instead of the controller 54 and the decoding process unit 55.

The controller 321 is configured with a CPU, ROM, RAM, and the like. The controller 321 controls overall operations of the reproduction apparatus 2 by executing a predetermined program.

For example, the controller 321 controls the decoding process unit 322 according to a moon box or a moof box supplied by the decomposition unit 52.

The decoding process unit 322 is configured to include a decoder 322A and a decoder 322B.

The decoder 322A acquires, as a TMI which is to be applied to video, the TMI (tone_mapping_info) as the feature information and the conversion information from the SEI of the video stream supplied by the decomposition unit 52.

In addition, the decoder 322A decodes the encoded data included in the video stream supplied by the decomposition unit 52 in accordance with the HEVC scheme.

Next, if necessary, the decoder 322A converts the HDR video or the STD video obtained as a result of the decoding into an STD video or an HDR video based on the TMI as the conversion information which is to be applied to the video and outputs the STD video or the HDR video to the combination output unit 56.

In a case where the decoder 322A outputs the HDR video, the decoder 322A outputs the TMI as the feature information which is to be applied to the video together with the HDR video to the combination output unit 56.

The decoder 322B decodes the ST stream supplied by the decomposition unit 52.

In addition, the decoder 322B functions as an acquisition unit which acquires, as a TMI which is to be applied to ST, the TMI stored in the ToneMap element and the Hdrinfo element (ToneMap element or Hdrinfo element designated by the oneMapRef attribute or the hdrinfoRef attribute, in a case where the ToneMap element or the Hdrinfo element is designated by the toneMapRef attribute or hdrinfoRef attribute) included in the ST stream.

Therefore, if necessary, the decoder 322B converts the HDR ST or the STD ST obtained as a result of the decoding into an STD ST and an HDR ST based on the TMI as the conversion information which is to be applied to the ST and outputs the STD ST or the HDR ST to the combination output unit 56.

In a case where the decoder 322B outputs the HDR ST, the decoder 322B outputs the TMI as the feature information which is to be applied to the ST together with the HDR ST to the combination output unit 56.

<Reproducing Process of Reproduction Apparatus 2>

Figure 82:
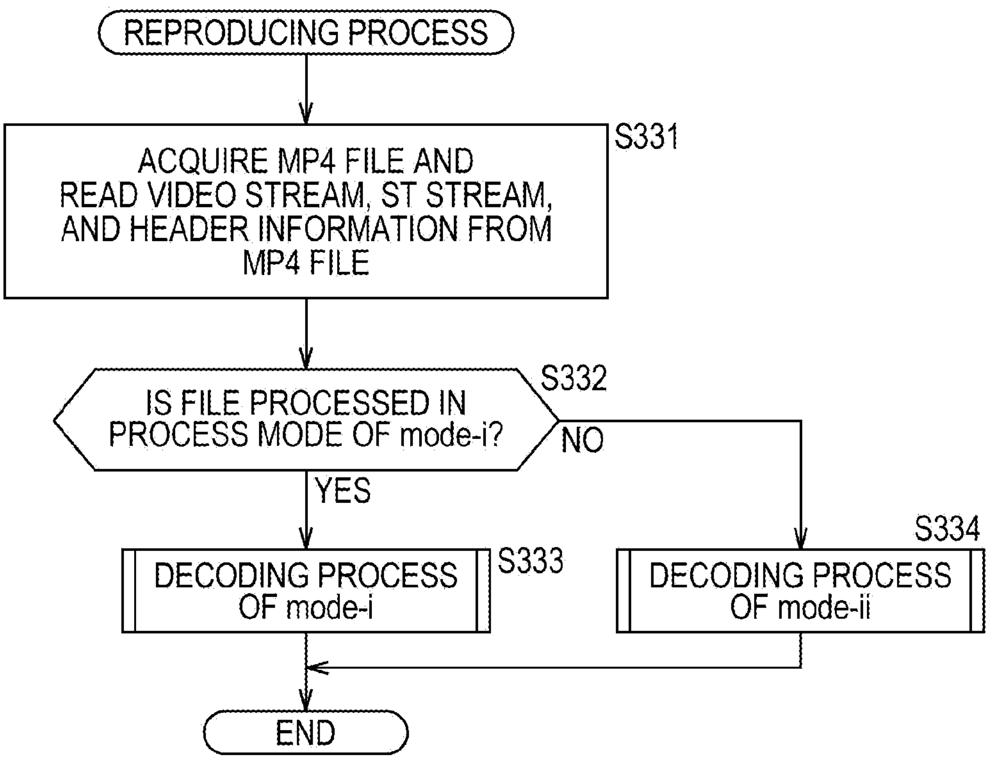
FIG. 82 is a flowchart for describing an example of a reproducing process performed in the reproduction apparatus 2.

FIG. 82 is a flowchart for describing an example of the reproducing process performed by the reproduction apparatus 2 of FIG. 81.

In step S331, the file acquisition unit 51 acquires the MP4 file generated by the generation apparatus 1 and supplies the MP4 file to the decomposition unit 52.

The decomposition unit 52 reads the moov box or the moof box as the header information and reads the video stream or the ST stream as the actual data stored in the mdat box from the MP4 file supplied by the file acquisition unit 51.

Next, the decomposition unit 52 supplies the moov box or the moof box as the header information to the controller 321 and supplies the video stream or the ST stream to the decoding process unit 322.

After that, the procedure proceeds from step S331 to step S332, and similarly to step S42 of FIG. 34, the controller 321 determines whether or not the process mode of the MP4 file acquired by the file acquisition unit 51 is mode-i or mode-ii.

In a case where it is determined in step S332 that the process mode is mode-i, the procedure proceeds to step S333, and the decoding process unit 322 performs the decoding process of the mode-i.

On the other hand, in a case where it is determined in step S332 that the process mode is mode-ii, the procedure proceeds to step S334, and the decoding process unit 322 performs the decoding process of the mode-ii.

After the decoding process is performed in step S333 or step S334, the reproducing process is ended.

Figure 83:
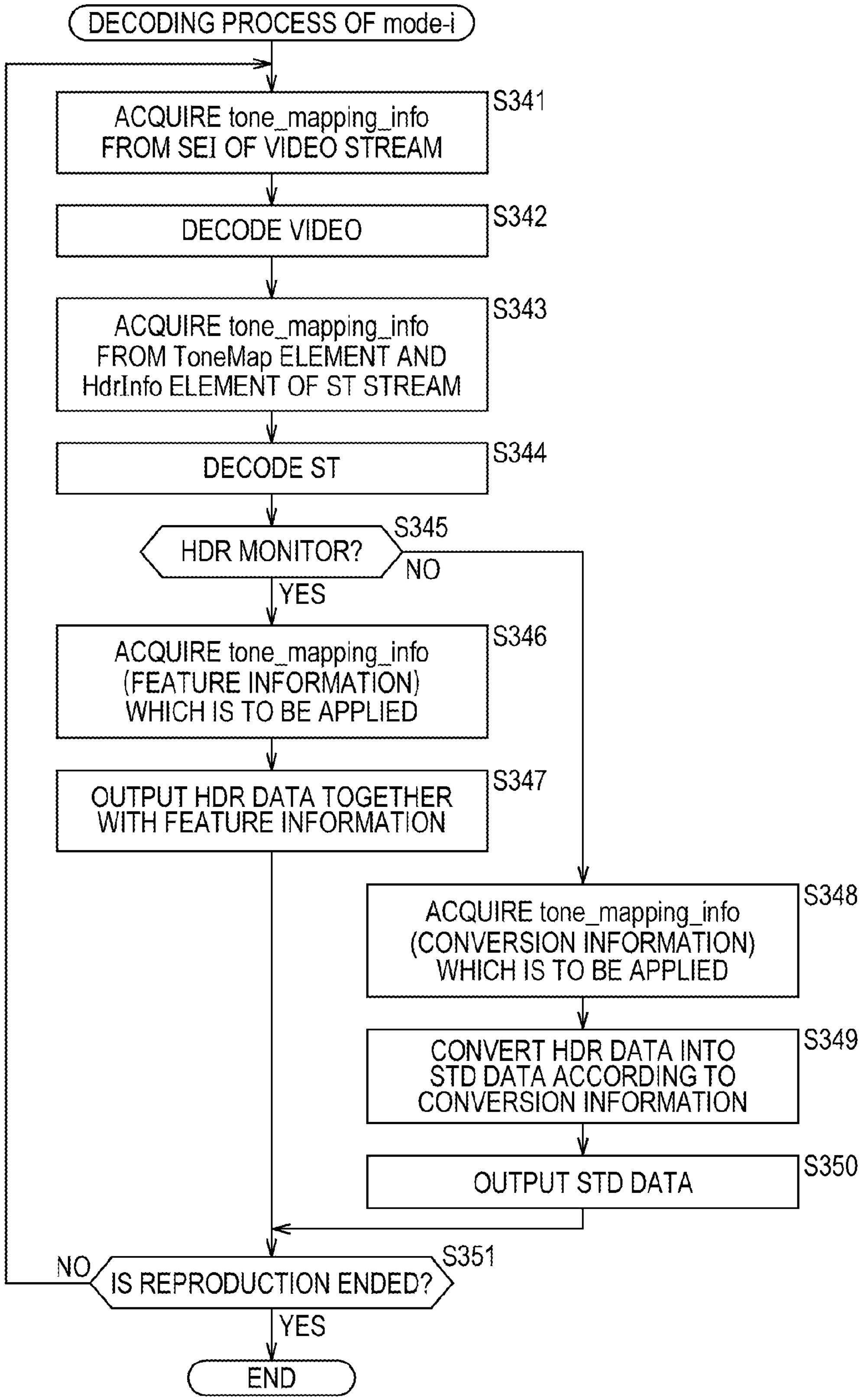
FIG. 83 is a flowchart for describing an example of an encoding process of mode-i performed in step S333.

FIG. 83 is a flowchart for describing the decoding process of the mode-i in step S333 of FIG. 82.

In step S341, the decoder 322A acquires TMI as the feature information and the conversion information from the SEI of the video stream supplied from the decomposition unit 52.

After that, the procedure proceeds from step S341 to step S342, and the decoder 322A decodes the encoded data included in the video stream supplied from the decomposition unit 52 in accordance with an HEVC scheme to generate an HDR video, and the procedure proceeds to step S343. In addition, the video decode (encode) scheme is not limited to the HEVC scheme.

In step S343, the decoder 322B acquires the TMI stored in the ToneMap element included in the ST stream (new TT data) supplied by the decomposition unit 52 and the TMI stored in the Hdrinfo element, and the procedure proceeds to step S344.

In step S344, the decoder 322B decodes the ST stream supplied from the decomposition unit 52 in an HDR ST, and the procedure proceeds to step S345.

In step S345, similarly to step S64 of FIG. 35, the controller 321 determines whether or not the monitor included in the display apparatus 3 is an HDR monitor.

In a case where it is determined in step S345 that the monitor included in the display apparatus 3 is an HDR monitor, the procedure proceeds to step S346.

In step S346, the decoder 322A acquires a TMI which is to be applied to the video from the TMI acquired in step S341. Herein, as the method of acquiring the TMI which is to be applied to the video stored in the MP4 file, for example, the method or the like described in the first configurational example of the generation apparatus 1 and the reproduction apparatus 2 may be employed.

In addition, the decoder 322B acquires a TMI (TMI stored in the ToneMap element or the Hdrinfo element designated by the oneMapRef attribute or the hdrinfoRef attribute, in a case where the ToneMap element or the Hdrinfo element is designated by the toneMapRef attribute or the hdrinfoRef attribute) which is to be applied to the ST from the TMI acquired in step S343.

After that, the procedure proceeds from step S346 to step S347. Hereinafter, in steps S347 and S351, the same processes as those of steps S66 and S70 of FIG. 35 are performed.

On the other hand, in a case where it is determined in step S345 that the monitor included in the display apparatus 3 is not an HDR monitor but an STD monitor, the procedure proceeds to step S348.

In step S348, similarly to step S346, the decoders 322A and 322B acquire as a TMI which is to be applied to the video and the ST.

After that, in steps S349 to S351, the same processes as those of steps S68 to S69 of FIG. 35 are performed.

Figure 84:
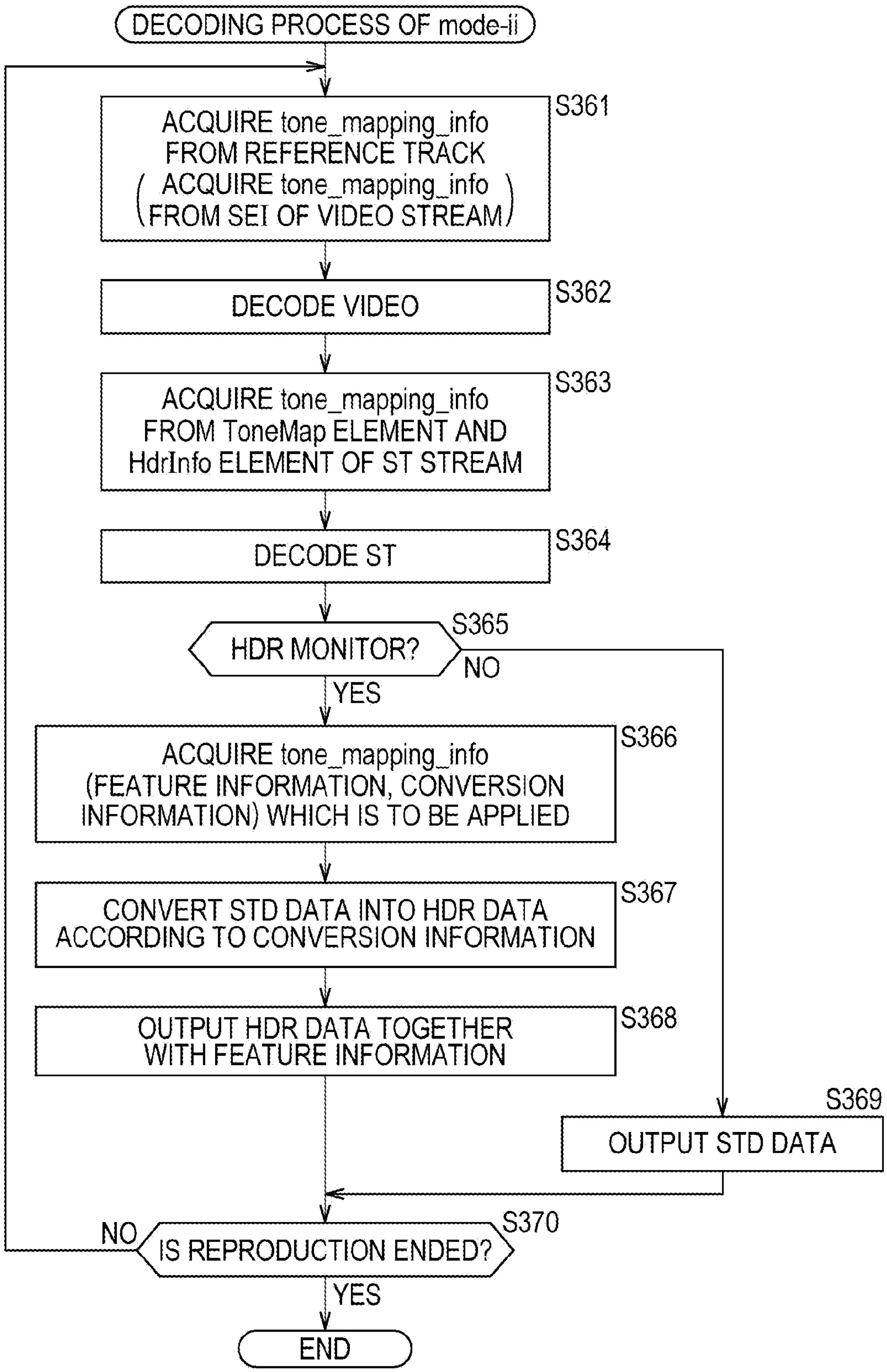
FIG. 84 is a flowchart for describing an example of an encoding process of mode-ii performed in step S334.

FIG. 84 is a flowchart for describing the decoding process of the mode-ii in step S334 of FIG. 82.

In step S361, similarly to the step S341 of FIG. 83, the decoder 322A acquires the TMI as the feature information and the conversion information from the SEI of the video stream supplied by the decomposition unit 52.

After that, the procedure proceeds from step S361 to step S362, the decoder 322A decodes the encoded data included in the video stream supplied from the decomposition unit 52 in accordance with an HEVC scheme to generate an STD video, and the procedure proceeds to step S363. In addition, the video decode (encode) scheme is not limited to the HEVC scheme.

In step S363, similarly to step S343 of FIG. 83, the decoder 322B acquires the TMI stored in the ToneMap element included in the ST stream (new TT data) supplied by the decomposition unit 52 and the TMI stored in the Hdrinfo element, and the procedure proceeds to step S364.

In step S364, the decoder 322B decodes the ST stream supplied from the decomposition unit 52 in an STD ST, and the procedure proceeds to step S365.

In step S365, for example, similarly to step S345 of FIG. 83, the controller 321 determines whether or not the monitor included in the display apparatus 3 is an HDR monitor.

In a case where it is determined in step S365 that the monitor included in the display apparatus 3 is an HDR monitor, the procedure proceeds to step S366.

In step S366, similarly to step S346 of FIG. 83, the decoders 322A and 322B acquire as the TMIs which are to be applied to video and the ST.

Namely, in step S366, the decoder 322A acquires a TMI which is to be applied to the video from the TMI acquired in step S361.

In addition, the decoder 322B acquires a TMI (TMI stored in the ToneMap element or the Hdrinfo element designated by the oneMapRef attribute or the hdrinfoRef attribute, in a case where the ToneMap element or the Hdrinfo element is designated by the toneMapRef attribute or hdrinfoRef attribute) which is to be applied to the ST from the TMI acquired in step S363.

After that, and the procedure proceeds from step S366 to step S367, and in steps S367 to S370, the same processes as those of steps S86 to S89 of FIG. 36 are performed.

As described above, the generation apparatus 1 of the fourth configurational example generates new TT data of the XML which including the ToneMap element or the Hdrinfo element as the HDR storing element which stores the TMI as the HDR information as the element of the XML.

As a result, the reproduction apparatus 2 acquires a TMI which is to be applied to the ST from the new TT data and can use the TMI for the processing of the ST.

In addition, the ToneMap element or the Hdrinfo element or the toneMapRef attribute or the hdrinfoRef attribute may be applied to the case of displaying arbitrary images other than the ST using arbitrary markup language besides the case of displaying the ST by the SMPTE-TT using the XML.

<Description of Computer Employing the Present Technique>

Next, a series of the processes described above may be performed by hardware or by software. In a case where a series of the processes is performed by software, a program constituting the software is installed in a general-purpose computer or the like.

Figure 85:
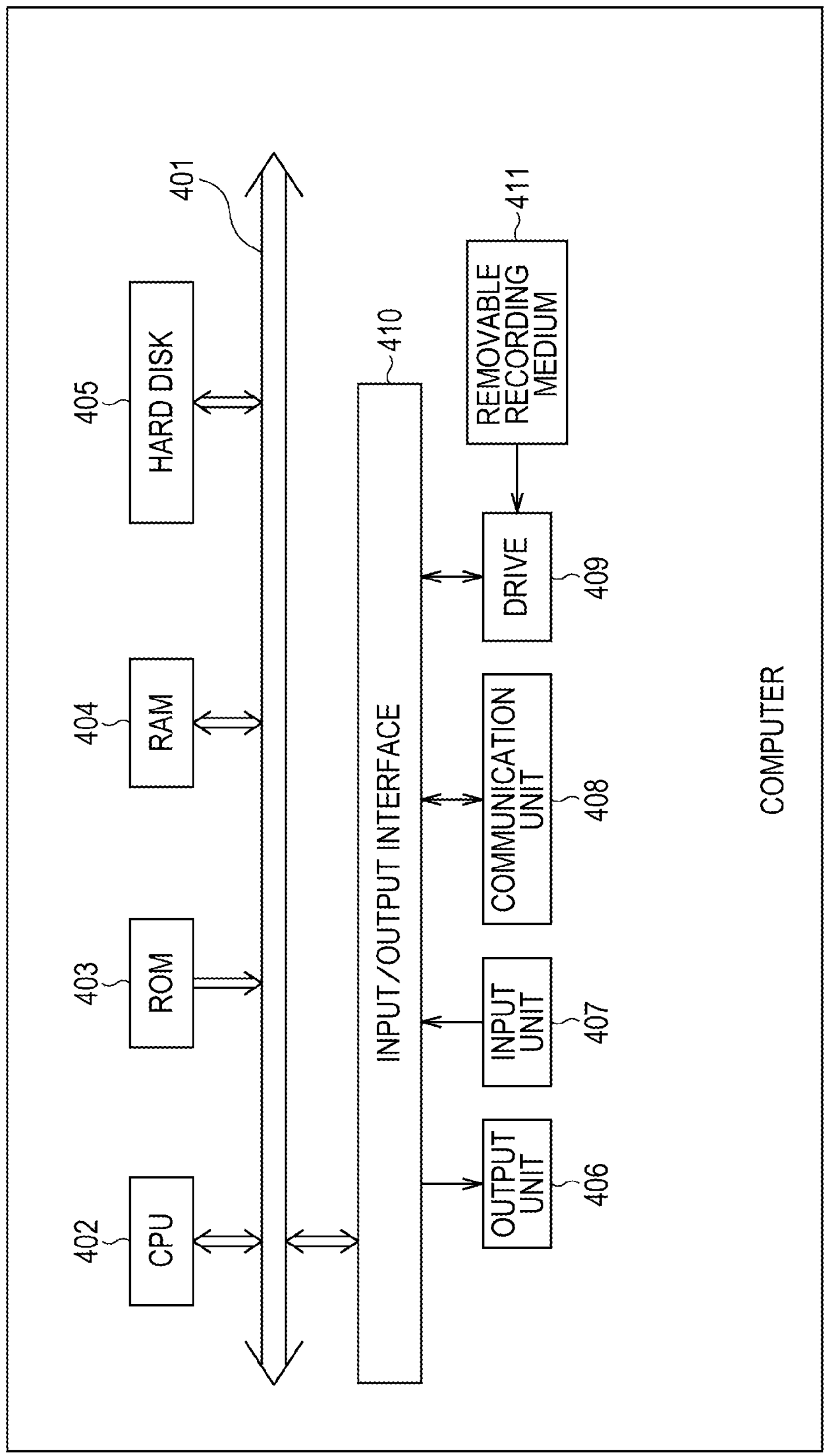
FIG. 85 is a block diagram illustrating a configurational example of an embodiment of a computer employing the present technique.

FIG. 85 illustrates a configurational example of an embodiment of the computer where the program executing a series of the processes described above is installed.

The program may be recorded in advance in a hard disk 405 or ROM 403 as a recording medium built in the computer.

Alternatively, the program may be stored (recorded) in a removable recording medium 411. The removable recording medium 411 may be provided as so-called package software. Herein, as the removable recording medium 411, there are, for example, a flexible disk, a CD-ROM (Compact Disc Read Only Memory), an MO (Magneto Optical) disk, a DVD (Digital Versatile Disc), a magnetic disk, semiconductor memory, and the like.

In addition, besides the installation of the program from the removable recording medium 411 in the computer as described above, the program may be downloaded through a communication network or a broadcasting network to the computer to be installed in the built-in hard disk 405. Namely, the program may be transmitted in a wireless manner, for example, from a download site through an artificial satellite for digital satellite broadcasting to the computer or may be transmitted in a wired manner through a network such as a LAN (Local Area Network) or the Internet to the computer.

The computer includes a CPU (Central Processing Unit) 402, and an input/output interface 410 is connected to the CPU 402 via a bus 401.

If a command is input through the input/output interface 410 by a user manipulating an input unit 407, the CPU 402 executes the program stored in ROM (Read Only Memory) 403 according to the command. Alternatively, the CPU 402 loads the program stored in the hard disk 405 on RAM (Random Access Memory) 404 to execute the program.

Therefore, the CPU 402 performs the process according to the above-described flowcharts or the processes performed by the configurations of the above-described block diagrams. Next, if necessary, the CPU 402 outputs the results of the processes, for example, through the input/output interface 410 from the output unit 406, transmits the results of the processes from the communication unit 408, or records the result of the processes in the hard disk 405.

In addition, the input unit 407 is configured with a keyboard, a mouse, a microphone, and the like. In addition, the output unit 406 is configured to include an LCD (Liquid Crystal Display), a speaker, and the like.

Herein, in the present specification, the processes performed by the computer according to the program need not be performed in time series in accordance with the order of described in the flowcharts. Namely, the processes performed by the computer according to the program also include processes which are executed in parallel or individually (for example, parallel processes or processes by objects).

In addition, the program may be intended to be processed by a single computer (processor) or may be subjected to distributed processing by plural computers. In addition, the program may also be intended to be transmitted to a remote computer to be executed.

In addition, in the present specification, a system denotes a set of plural components (apparatuses, modules (parts), or the like), and it does not matter whether or not all the components exist in the same case. Therefore, plural apparatuses which are accommodated in separate cases and are connected to each other via a network and a single apparatus where plural modules are accommodated in a signal case are systems.

In addition, embodiments of the present technique are not limited to the above-described embodiments, but various changes are available within the scope without departing from the spirit of the present technique.

For example, the present technique may have a configuration of cloud computing where one function is shared by plural apparatuses via a network to be cooperatively processed.

In addition, each step described in the above-described flowcharts may be executed by a single apparatus or may be shared by plural apparatuses to be executed.

In addition, in a case where plural processes are included in one step, the plural processes included in the one step may be executed by a single apparatus or may be shared by plural apparatuses to be executed.

In addition, the effects described in the present specification are exemplary ones but not limited thereto, and thus, other effects may be obtained.

In addition, the present technique may have the following configurations.

<1>

A file generation apparatus including a file generation unit which generates a file storing a target track including HDR information which is configured with feature information representing features of luminance of an HDR (high dynamic range) image having a dynamic range higher than that of an STD (standard) image and conversion information representing a conversion rule of converting the one of the STD image and the HDR image into the other, and HDR designating information designating the HDR information which is to be applied to the target track of interest.

<2>

The file generation apparatus according to <1>, wherein the file is a file having a box structure.

<3>

The file generation apparatus according to <2>, wherein the file is an MP4 file regulated in ISO/IEC 14496-14.

<4>

The file generation apparatus according to <3>, wherein the target track includes a tinf box (ToneMappingInformationBox) defined as a box which stores the HDR information.

<5>

The file generation apparatus according to <3> or <4>, wherein the target track includes a tirf box (ToneMappingInformationReferecenceBox) defined as a box which stores the HDR designating information.

<6>

The file generation apparatus according to any of <1> to <5>, wherein the HDR information is HDR information which is to be commonly applied to plural components of the image, HDR information which is to be applied to one component among the plural components of the image, or HDR information which is to be applied to each of the plural components of the image.

<7>

A file generating method including generating a file storing a target track including HDR information which is configured with feature information representing features of luminance of an HDR (high dynamic range) image having a dynamic range higher than that of an STD (standard) image and conversion information representing a conversion rule of converting the one of the STD image and the HDR image into the other, and HDR designating information designating the HDR information which is to be applied to the target track of interest.

<8>

A file reproduction apparatus including an acquisition unit which acquires HDR information designated by HDR designating information from a file storing a target track including the HDR information which is configured with feature information representing features of luminance of an HDR (high dynamic range) image having a dynamic range higher than that of an STD (standard) image and conversion information representing a conversion rule of converting the one of the STD image and the HDR image into the other, and the HDR designating information designating the HDR information which is to be applied to the target track of interest.

<9>

The file reproduction apparatus according to <8>, wherein the file is a file having a box structure.

<10>

The file reproduction apparatus according to <9>, wherein the file is an MP4 file regulated in ISO/IEC 14496-14.

<11>

The file reproduction apparatus according to <10>, wherein the target track includes a tinf box (ToneMappingInformationBox) defined as a box which stores the HDR information, and wherein the acquisition unit acquires the HDR information stored in the tinf box.

<12>

The file reproduction apparatus according to <10> or <11>, wherein the target track includes a tirf box (ToneMappingInformationReferecenceBox) defined as a box which stores the HDR designating information, and wherein the acquisition unit acquires the HDR information designated by the HDR designating information stored in the tirf box.

<13>

The file reproduction apparatus according to any of <8> to <12>, wherein the HDR information is HDR information which is to be commonly applied to plural components of the image, HDR information which is to be applied to one component among the plural components of the image, or HDR information which is to be applied to each of the plural components of the image.

<14>

A file reproducing method including acquiring HDR information designated by HDR designating information from a file storing a target track including the HDR information which is configured with feature information representing features of luminance of an HDR (high dynamic range) image having a dynamic range higher than that of an STD (standard) image and conversion information representing a conversion rule of converting the one of the STD image and the HDR image into the other, and the HDR designating information designating the HDR information which is to be applied to the target track of interest.

<15>

A file generation apparatus including a file generation unit which generates a file storing an HDR information track which is a track of a stream of HDR information which is configured with feature information representing features of luminance of an HDR (high dynamic range) image having a dynamic range higher than that of an STD (standard) image and conversion information representing a conversion rule of converting the one of the STD image and the HDR image into the other, and a target track including track designating information designating the HDR information track including the HDR information which is to be applied to the target track of interest and HDR designating information designating the HDR information which is to be applied to the target track in the HDR information of the HDR information track designated by the track designating information.

<16>

The file generation apparatus according to <15>, wherein the file is a file having a box structure.

<17>

The file generation apparatus according to <16>, wherein the file is an MP4 file regulated in ISO/IEC 14496-14.

<18>

The file generation apparatus according to <17>, wherein the target track includes a tirf box (ToneMappingInformationReferecenceBox) defined as a box which stores the HDR designating information.

<19>

The file generation apparatus according to <17> or <18>, wherein the target track includes a TrackReferenceTypeBox where tmpi which is defined as reference_type of the TrackReferenceTypeBox and which represents that the TrackReferenceTypeBox included in a TrackReferenceBox is to be used for storing the track designating information becomes the reference_type.

<20>

The file generation apparatus according to any of <15> to <19>, wherein the HDR information is HDR information which is to be commonly applied to plural components of the image, HDR information which is to be applied to one component among the plural components of the image, or HDR information which is to be applied to each of the plural components of the image.

<21>

A file generating method including generating a file storing an HDR information track which is a track of a stream of HDR information which is configured with feature information representing features of luminance of an HDR (high dynamic range) image having a dynamic range higher than that of an STD (standard) image and conversion information representing a conversion rule of converting the one of the STD image and the HDR image into the other, and a target track including track designating information designating the HDR information track including the HDR information which is to be applied to the target track of interest and HDR designating information designating the HDR information which is to be applied to the target track in the HDR information of the HDR information track designated by the track designating information.

<22>

A file reproduction apparatus including an acquisition unit which acquires HDR information designated by HDR designating information in the HDR information of an HDR information track designated by track designating information from a file storing the HDR information track which is a track of a stream of the HDR information which is configured with feature information representing features of luminance of an HDR (high dynamic range) image having a dynamic range higher than that of an STD (standard) image and conversion information representing a conversion rule of converting the one of the STD image and the HDR image into the other, and a target track including the track designating information designating the HDR information track including the HDR information which is to be applied to the target track of interest and the HDR designating information designating the HDR information which is to be applied to the target track in the HDR information of the HDR information track designated by the track designating information.

<23>

The file reproduction apparatus according to <22>, wherein the file is a file having a box structure.

<24>

The file reproduction apparatus according to <23>, wherein the file is an MP4 file regulated in ISO/IEC 14496-14.

<25>

The file reproduction apparatus according to <24>, wherein the target track includes a tirf box (ToneMappingInformationReferecenceBox) defined as a box which stores the HDR designating information, and wherein the acquisition unit acquires the HDR information designated by the HDR designating information stored in the tirf box included in the target track.

<26>

The file reproduction apparatus according to <24> or <25>, wherein the target track includes a TrackReferenceTypeBox where tmpi which is defined as reference_type of the TrackReferenceTypeBox and which represents that the TrackReferenceTypeBox included in a TrackReferenceBox is to be used for storing the track designating information becomes the reference_type, and wherein the acquisition unit acquires the HDR information designated by the HDR designating information from the HDR information of the HDR information track designated by the track designating information stored in the TrackReferenceTypeBox where the reference_type becomes the tmpi.

<27>

The file reproduction apparatus according to any of <22> to <26>, wherein the HDR information is HDR information which is to be commonly applied to plural components of the image, HDR information which is to be applied to one component among the plural components of the image, or HDR information which is to be applied to each of the plural components of the image.

<28>

A file reproducing method including acquiring HDR information designated by HDR designating information in the HDR information of an HDR information track designated by track designating information from a file storing the HDR information track which is a track of a stream of the HDR information which is configured with feature information representing features of luminance of an HDR (high dynamic range) image having a dynamic range higher than that of an STD (standard) image and conversion information representing a conversion rule of converting the one of the STD image and the HDR image into the other, and a target track including the track designating information designating the HDR information track including the HDR information which is to be applied to the target track of interest and the HDR designating information designating the HDR information which is to be applied to the target track in the HDR information of the HDR information track designated by the track designating information.

REFERENCE SIGNS LIST

1 Generation apparatus
2 Reproduction apparatus
3 Display apparatus
4 Cable
11 Recording medium
12 Transmission medium
21 Controller
21A Header information generation unit
22 Encode processing unit
23 File generation unit
31 Feature information generation unit
32 Encoder
33 Conversion unit

34 Conversion information generation unit
35 Encoder
36 Stream generation unit
51 File acquisition unit
52 Decomposition unit
53 Manipulation input unit
54 Controller
55 Decoding process unit
55A, 55B Decoder
56 Combination output unit
101 Controller
101A Memory
102 Communication unit
103 Signal processing unit
104 Monitor
121A Header information generation unit
122 Encode processing unit
131 Feature information generation unit
132 Conversion information generation unit
133 Stream generation unit
141 Controller
142 Decoding process unit
142A, 142B Decoder
201A Header information generation unit
202 Encode processing unit
203 File generation unit
211 Stream generation unit
231 Decomposition unit
232 Controller
233 Decoding process unit
233A, 233B Decoder
301A Header information generation unit
302 Encode processing unit
311 Stream generation unit
321 Controller
322 Decoding process unit
322A, 322B Decoder
401 Bus
402 CPU
403 ROM
404 RAM
405 Hard disk
406 Output unit
407 Input unit
408 Communication unit
409 Drive
410 Input/output interface
411 Removable recording medium
1001, 1002 Element

The invention claimed is:

1. A file generation apparatus comprising at least one processor programmed to:

receive at least one high dynamic range (HDR) image, the at least one HDR image having a dynamic range higher than that of a standard (STD) image; and generate a file based on the at least one HDR image, the file comprising:

a target track including a plurality of sets of HDR information, wherein the plurality of sets of HDR information comprise a first set of HDR information comprising feature information representing features of luminance of the at least one HDR image, and a second set of HDR information comprising conversion information representing a conversion rule of converting one of the STD image and the at least one HDR image into the other; and HDR designating information designating one or more sets of the plurality of sets of HDR information to be applied to the target track.

2. The file generation apparatus according to claim 1, wherein the file is a file having a box structure.

3. The file generation apparatus according to claim 2, wherein the file is an MP4file regulated in ISO/IEC 14496-14.

4. The file generation apparatus according to claim 3, wherein the target track includes a tinf box (ToneMapping-InformationBox), and at least one set of the plurality of sets of HDR information is stored in the tinf box.

5. The file generation apparatus according to claim 4, wherein the target track includes a tirf box (ToneMapping-InformationReferecenceBox), and the HDR designating information is stored in the tirf box.

6. The file generation apparatus according to claim 3, wherein the plurality of sets of HDR information comprise a set of HDR information which is to be commonly applied to a plurality of components of the at least one HDR image, a set of HDR information which is to be applied to one component among the plurality of components of the at least one HDR image, or a set of HDR information which is to be applied to each of the plurality of components of the at least one HDR image.

7. A file generating method performed by at least one processor, the method comprising acts of:

receiving at least one high dynamic range (HDR) image, the at least one HDR image having a dynamic range higher than that of a standard (STD) image; and generating a file based on the at least one HDR image, the file comprising:

a target track including a plurality of sets of HDR information, wherein the plurality of sets of HDR information comprise a first set of HDR information comprising feature information representing features of luminance of the at least one HDR image, and a second set of HDR information comprising conversion information representing a conversion rule of converting one of the STD image and the at least one HDR image into the other; and HDR designating information designating one or more sets of the plurality of sets of HDR information to be applied to the target track.

8. A file reproduction apparatus comprising at least one processor programmed to:

receive a file, the file comprising:

a target track including a plurality of sets of high dynamic range (HDR) information, wherein the plurality of sets of HDR information comprise a first set of HDR information comprising feature information representing features of luminance of an HDR image having a dynamic range higher than that of a standard (STD) image, and a second set of HDR information comprising conversion information representing a conversion rule of converting one of the STD image and the HDR image into the other; and HDR designating information designating one or more sets of the plurality of sets of HDR information to be applied to the target track;

acquire the HDR designating information from the file;

use the HDR designating information acquired from the file to acquire the one or more sets of the plurality of sets of HDR information from the target track; and apply the one or more sets of the plurality of sets of HDR information to the target track.

9. The file reproduction apparatus according to claim 8, wherein the file is a file having a box structure.

10. The file reproduction apparatus according to claim 9, wherein the file is an MP4file regulated in ISO/IEC 14496-14.

11. The file reproduction apparatus according to claim 10,
wherein the target track includes a tinf box (ToneMappingInformationBox), and at least one set of the plurality of sets of HDR information is stored in the tinf box, and
wherein the at least one processor is programmed to acquire the at least one set of HDR information stored in the tinf box.

12. The file reproduction apparatus according to claim 11,
wherein the target track includes a tirf box (ToneMappingInformationReferecenceBox), and the HDR designating information is stored in the tirf box, and
wherein the at least one processor is programmed to acquire the HDR designating information stored in the tirf box.

13. The file reproduction apparatus according to claim 10, wherein the plurality of sets of HDR information comprise a set of HDR information which is to be commonly applied to a plurality of components of the at least one HDR image, a set of HDR information which is to be applied to one component among the plurality of components of the at least one HDR image, or a set of HDR information which is to be applied to each of the plurality of components of the at least one HDR image.

14. A file reproducing method performed by at least one processor, the method comprising acts of:
receiving a file, the file comprising:
a target track including a plurality of sets of high dynamic range (HDR) information, wherein the plurality of sets of HDR information comprise a first set of HDR information comprising feature information representing features of luminance of an HDR image having a dynamic range higher than that of a standard (STD) image, and a second set of HDR information comprising conversion information representing a conversion rule of converting one of the STD image and the HDR image into the other; and
HDR designating information designating one or more sets of the plurality of sets of HDR information to be applied to the target track;
acquiring the HDR designating information from the file;
using the HDR designating information acquired from the file to acquire the one or more sets of the plurality of sets of HDR information from the target track; and
applying the one or more sets of the plurality of sets of HDR information to the target track.

15. A file generation apparatus comprising at least one processor programmed to:
receive at least one high dynamic range (HDR) image, the at least one HDR image having a dynamic range higher than that of a standard (STD) image; and
generate a file based on the at least one HDR image, the file comprising:
an HDR information track comprising a plurality of sets of HDR information, wherein the plurality of sets of HDR information comprise a first set of HDR information comprising feature information representing features of luminance of the at least one HDR image, and a second set of HDR information comprising conversion information representing a conversion rule of converting one of the STD image and the at least one HDR image into the other; and
a target track including:
track designating information designating the HDR information track; and
HDR designating information designating one or more sets of the plurality of sets of HDR information to be applied to the target track.

16. The file generation apparatus according to claim 15, wherein the file is a file having a box structure.

17. The file generation apparatus according to claim 16, wherein the file is an MP4file regulated in ISO/IEC 14496-14.

18. The file generation apparatus according to claim 17, wherein the target track includes a tirf box (ToneMappingInformationReferecenceBox), and the HDR designating information is stored in the tirf box.

19. The file generation apparatus according to claim 18, wherein the target track includes a TrackReferenceTypeBox where tmpi which is defined as reference_type of the TrackReferenceTypeBox and which represents that the TrackReferenceTypeBox included in a TrackReferenceBox is to be used for storing the track designating information becomes the reference_type.

20. The file generation apparatus according to claim 17, wherein the plurality of sets of HDR information comprise a set of HDR information which is to be commonly applied to a plurality of components of the at least one HDR image, a set of HDR information which is to be applied to one component among the plurality of components of the at least one HDR image, or a set of HDR information which is to be applied to each of the plurality of components of the at least one HDR image.

21. A file generating method performed by at least one processor, the method comprising acts of:
receiving at least one high dynamic range (HDR) image, the at least one HDR image having a dynamic range higher than that of a standard (STD) image; and
generating a file based on the at least one HDR image, the file comprising:
an HDR information track comprising a plurality of sets of HDR information, wherein the plurality of sets of HDR information comprise a first set of HDR information comprising feature information representing features of luminance of the at least one HDR image, and a second set of HDR information comprising conversion information representing a conversion rule of converting one of the STD image and the at least one HDR image into the other; and
a target track including:
track designating information designating the HDR information track: and
HDR designating information designating one or more sets of the plurality of sets of HDR information to be applied to the target track.

22. A file reproduction apparatus comprising at least one processor programmed to:
receive a file, the file comprising:
a high dynamic range (HDR) information track comprising a plurality of sets of HDR information, wherein the plurality of sets of HDR information comprise a first set of HDR information comprising feature information representing features of luminance of an HDR image having a dynamic range higher than that of a standard (STD) image, and a second set of HDR information comprising conversion information representing a conversion rule of converting one of the STD image and the HDR image into the other; and a target track including:

track designating information designating the HDR information track; and

HDR designating information designating one or more sets of the plurality of sets of HDR information to be applied to the target track;

acquire the track designating information and the HDR designating information from the file;

use the track designating information and the HDR designating information acquired from the file to acquire the one or more sets of the plurality of sets of HDR information from the HDR information track; and apply the one or more sets of the plurality of sets of HDR information to the target track.

23. The file reproduction apparatus according to claim 22, wherein the file is a file having a box structure.

24. The file reproduction apparatus according to claim 23, wherein the file is an MP4file regulated in ISO/IEC 14496-14.

25. The file reproduction apparatus according to claim 24, wherein the target track includes a tirf box (ToneMappingInformationReferecenceBox), and the HDR designating information is stored in the tirf box, and wherein the at least one processor is programmed to acquire the HDR designating information stored in the tirf box included in the target track.

26. The file reproduction apparatus according to claim 25, wherein the target track includes a TrackReferenceTypeBox where tmpi which is defined as reference_type of the TrackReferenceTypeBox and which represents that the TrackReferenceTypeBox included in a TrackReferenceBox is to be used for storing the track designating information becomes the reference_type, and wherein the acquisition unit acquires the HDR information designated by the HDR designating information from the HDR information of the HDR information track designated by the track designating information stored in the TrackReferenceTypeBox where the reference_type becomes the tmpi.

27. The file reproduction apparatus according to claim 24, wherein the plurality of sets of HDR information comprise a set of HDR information which is to be commonly applied to a plurality of components of the at least one HDR image, a set of HDR information which is to be applied to one component among the plurality of components of the at least one HDR image, or a set of HDR information which is to be applied to each of the plurality of components of the at least one HDR image.

28. A file reproducing method performed by at least one processor, the method comprising acts of:

receiving a file, the file comprising:

a high dynamic range (HDR) information track comprising a plurality of sets of HDR information, wherein the plurality of sets of HDR information comprise a first set of HDR information comprising feature information representing features of luminance of an HDR image having a dynamic range higher than that of a standard (STD) image, and a second set of HDR information comprising conversion information representing a conversion rule of converting one of the STD image and the HDR image into the other; and a target track including:

track designating information designating the HDR information track; and

HDR designating information designating one or more sets of the plurality of sets of HDR information to be applied to the target track;

acquiring the track designating information and the HDR designating information from the file;

using the track designating information and the HDR designating information acquired from the file to acquire the one or more sets of the plurality of sets of HDR information from the HDR information track; and applying the one or more sets of the plurality of sets of HDR information to the target track.

* * * * *